United States Patent
Ouchi et al.

(10) Patent No.: US 7,142,616 B2
(45) Date of Patent: Nov. 28, 2006

(54) FRONT END PROCESSOR FOR DATA RECEIVER AND NONLINEAR DISTORTION EQUALIZATION METHOD

(75) Inventors: Mikihiro Ouchi, Katano (JP); Ippei Kanno, Kyotanabe (JP); Hisaya Kato, Souraku Gun (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 838 days.

(21) Appl. No.: 10/104,481

(22) Filed: Mar. 25, 2002

(65) Prior Publication Data

US 2002/0172297 A1 Nov. 21, 2002

(30) Foreign Application Priority Data

Apr. 9, 2001 (JP) .............................. 2001-110202
Dec. 27, 2001 (JP) .............................. 2001-397657

(51) Int. Cl.
    *H03K 9/00*   (2006.01)
(52) U.S. Cl. ........................................ 375/316; 375/264
(58) Field of Classification Search ................. 375/316, 375/264, 229, 230, 232, 233, 235, 324, 346, 375/350
    See application file for complete search history.

(56) References Cited

U.S. PATENT DOCUMENTS 5,226,060 A   7/1993  Goodson et al.
5,307,376 A   4/1994  Castelain et al.
2001/0010709 A1 *  8/2001  Iwamatsu et al. ........... 375/264

FOREIGN PATENT DOCUMENTS

| EP | 1 021 019 A | 7/2000 |
| EP | 1 085 714 B | 9/2003 |
| EP | 0 762 703 B | 12/2004 |
| FR | 2 698 504 A | 5/1994 |
| JP | 9-7300 A | 1/1997 |

OTHER PUBLICATIONS

Nishijima et al., "A Sub-Optimum Non-Linear Distortion Compensation Scheme for Orthogonal Multi-Carrier Modulation Systems", Personal, Indoor and Mobile Radio Communications, Seventh IEEE International Symposium on Taipei, Taiwan, Oct. 15-18, 1996, pp. 45-48, vol. 1, IEEE, New York, USA.

* cited by examiner

*Primary Examiner*—Dac Ha
*Assistant Examiner*—Jaison Joseph
(74) *Attorney, Agent, or Firm*—Smith Patent Office

(57) ABSTRACT

An OFDM baseband signal that has undergone a synchronization carrier modulation or a differential carrier modulation is inputted to a complex signal converter for nonlinear distortion equalization so as to be converted according to the N-th order function conversion characteristics (N>1). Then, nonlinear distortion in the OFDM baseband signal is compensated for. At this time, the following is used as a conversion equation:

$$y(n)=x(n)+\Sigma a_m(n)x^m(n) (m>1)$$

wherein the values of the input signal, the output signal and the coefficient for m-th order distortion equalization at time n are, respectively, $x(n)$, $y(n)$ and $a_m(n)$.

25 Claims, 96 Drawing Sheets

F I G. 4
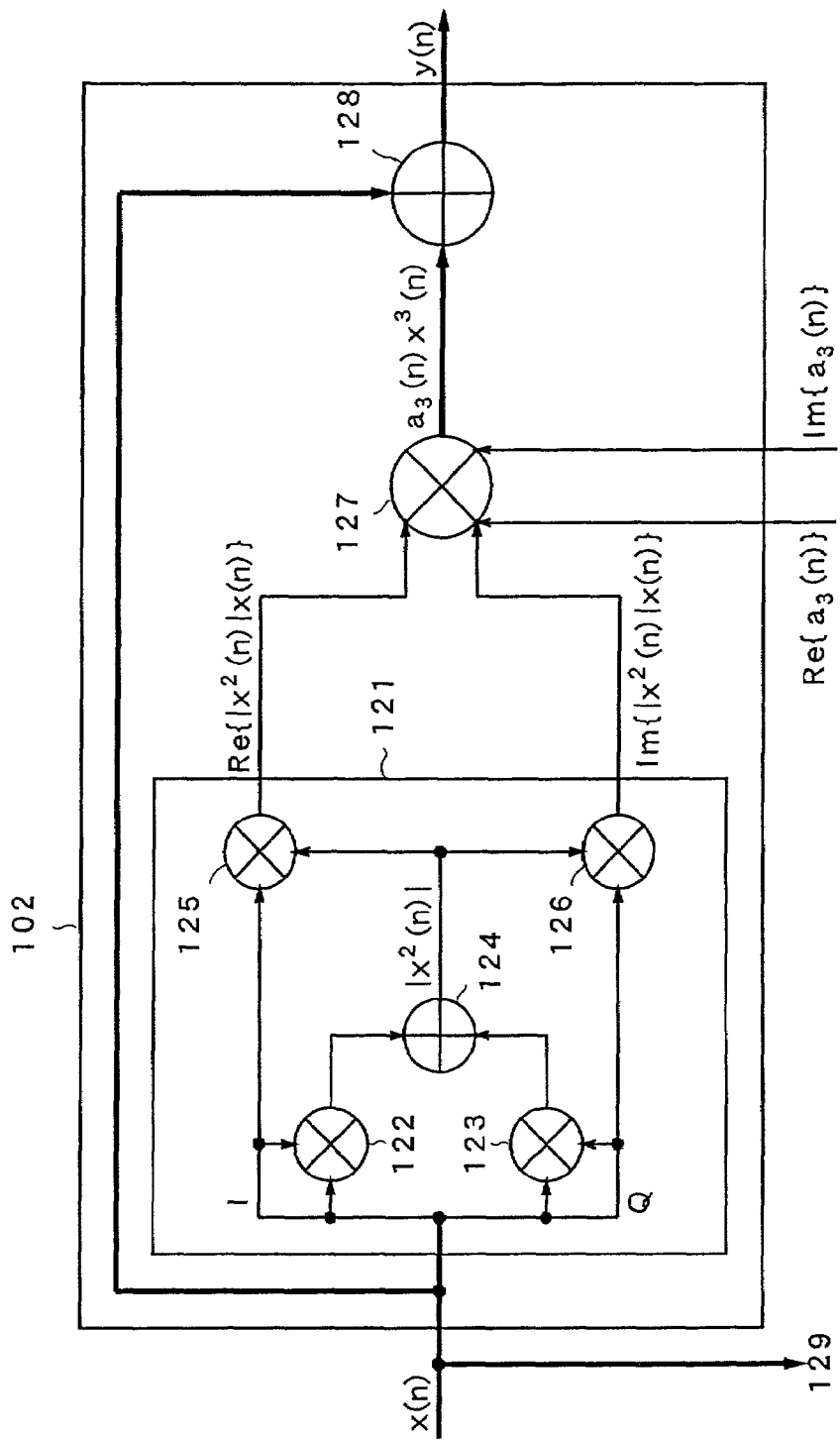

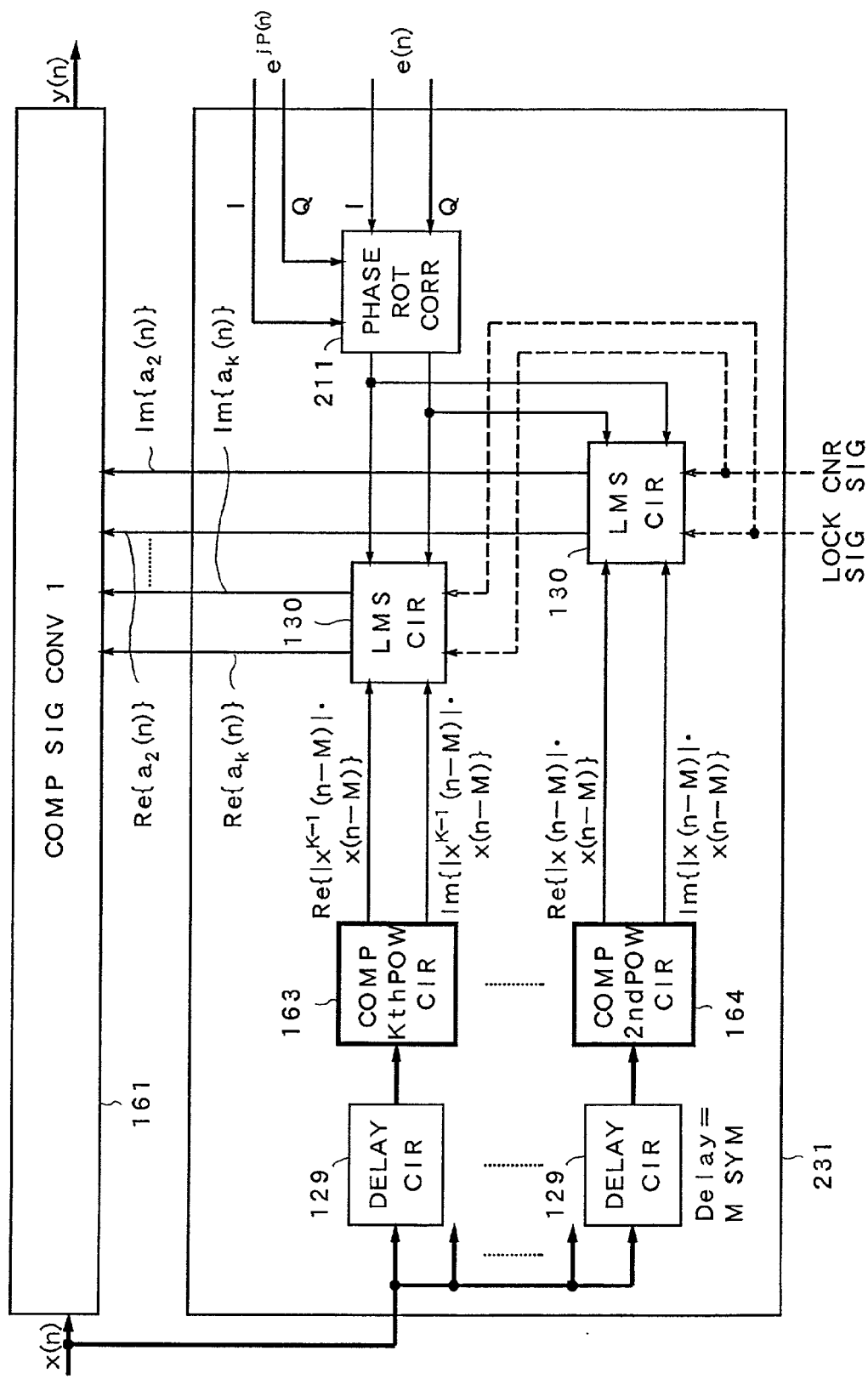
F I G. 14

F I G. 3 3
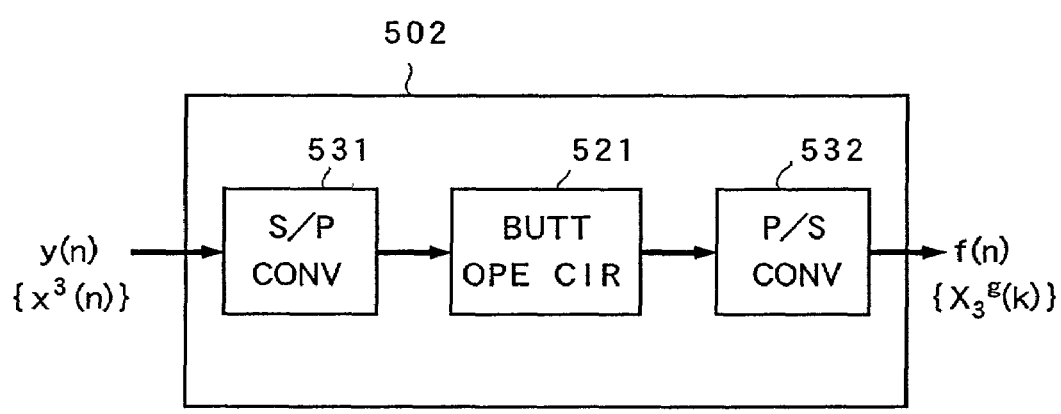

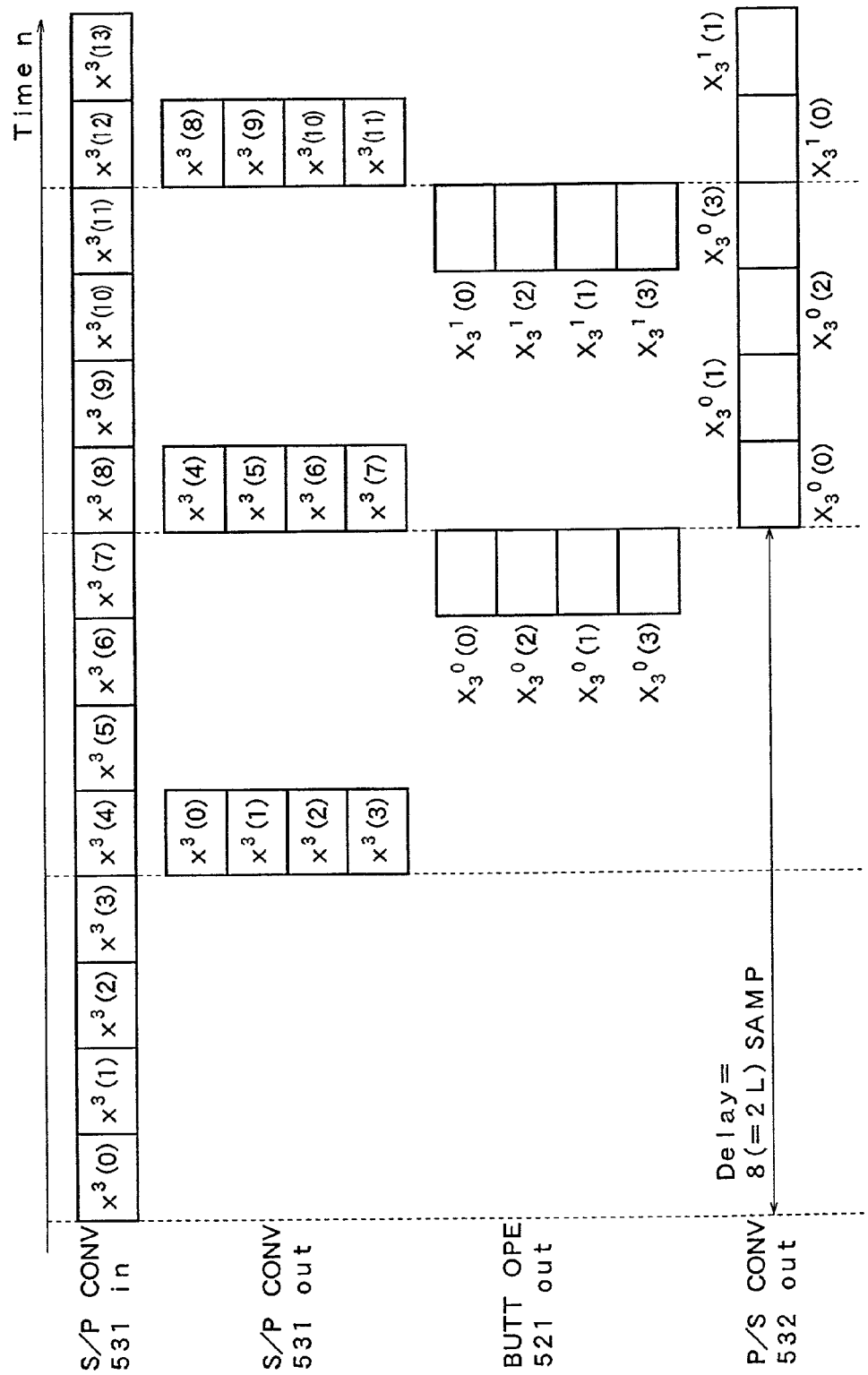

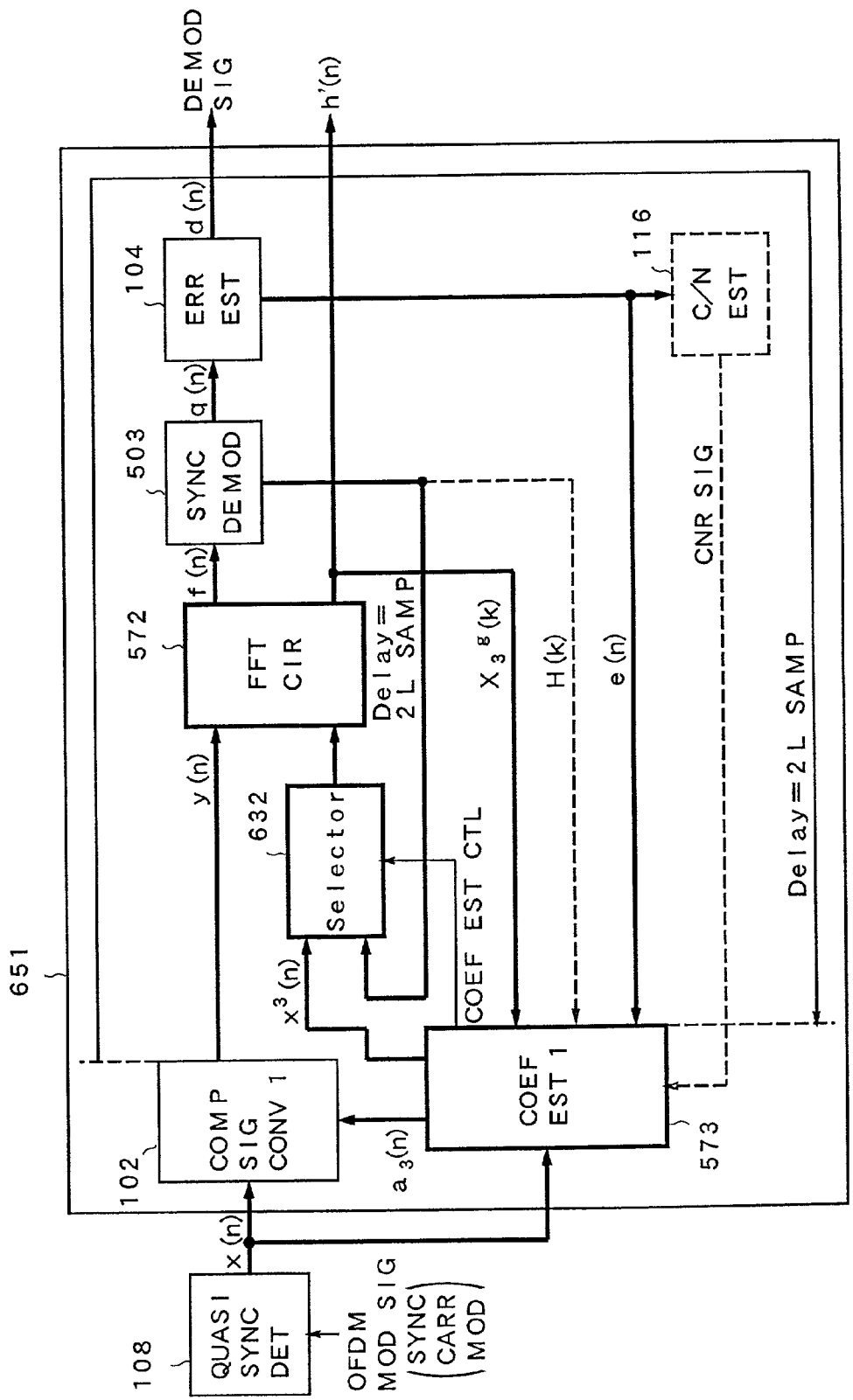

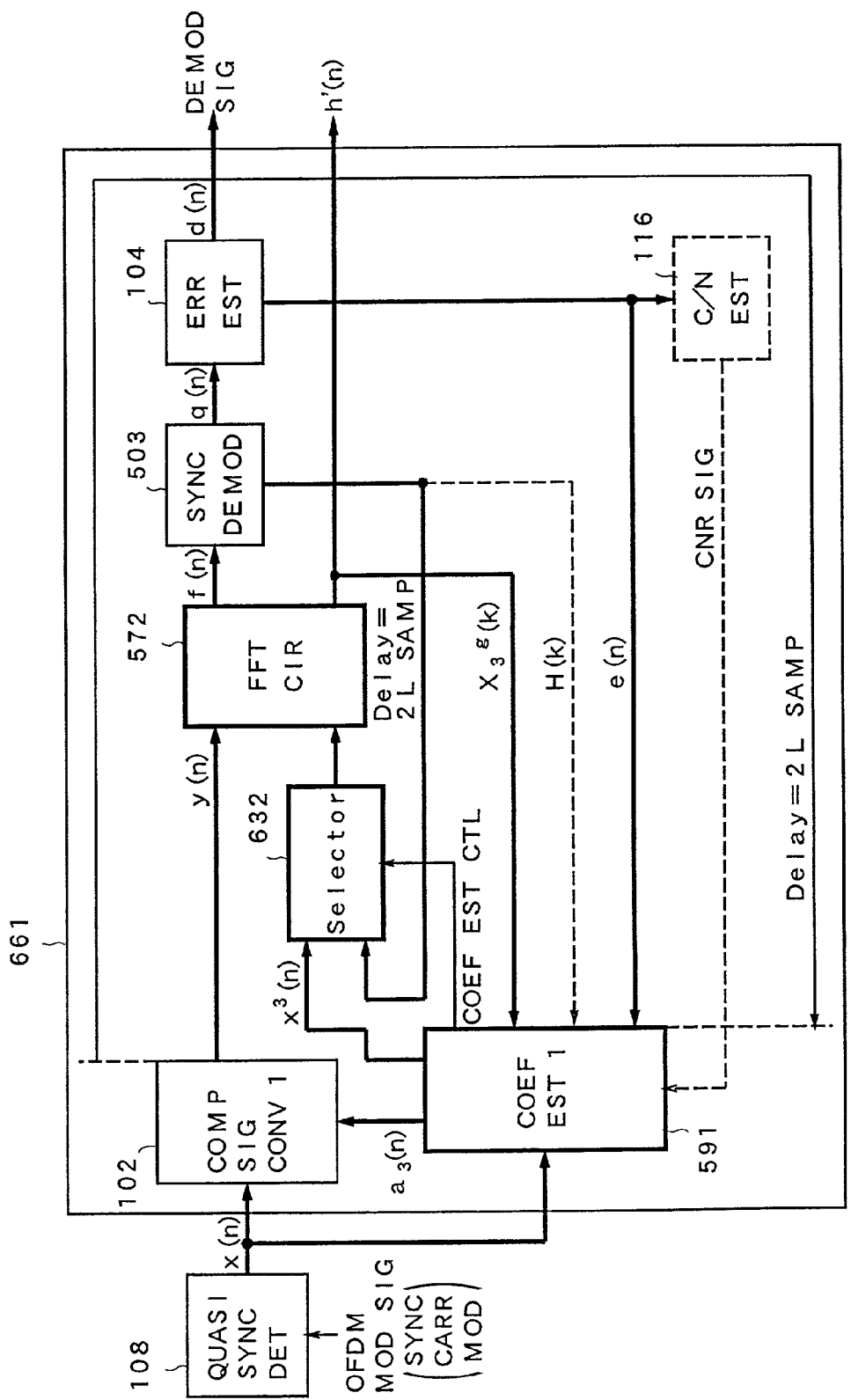
F I G. 5 6

F I G. 8 1
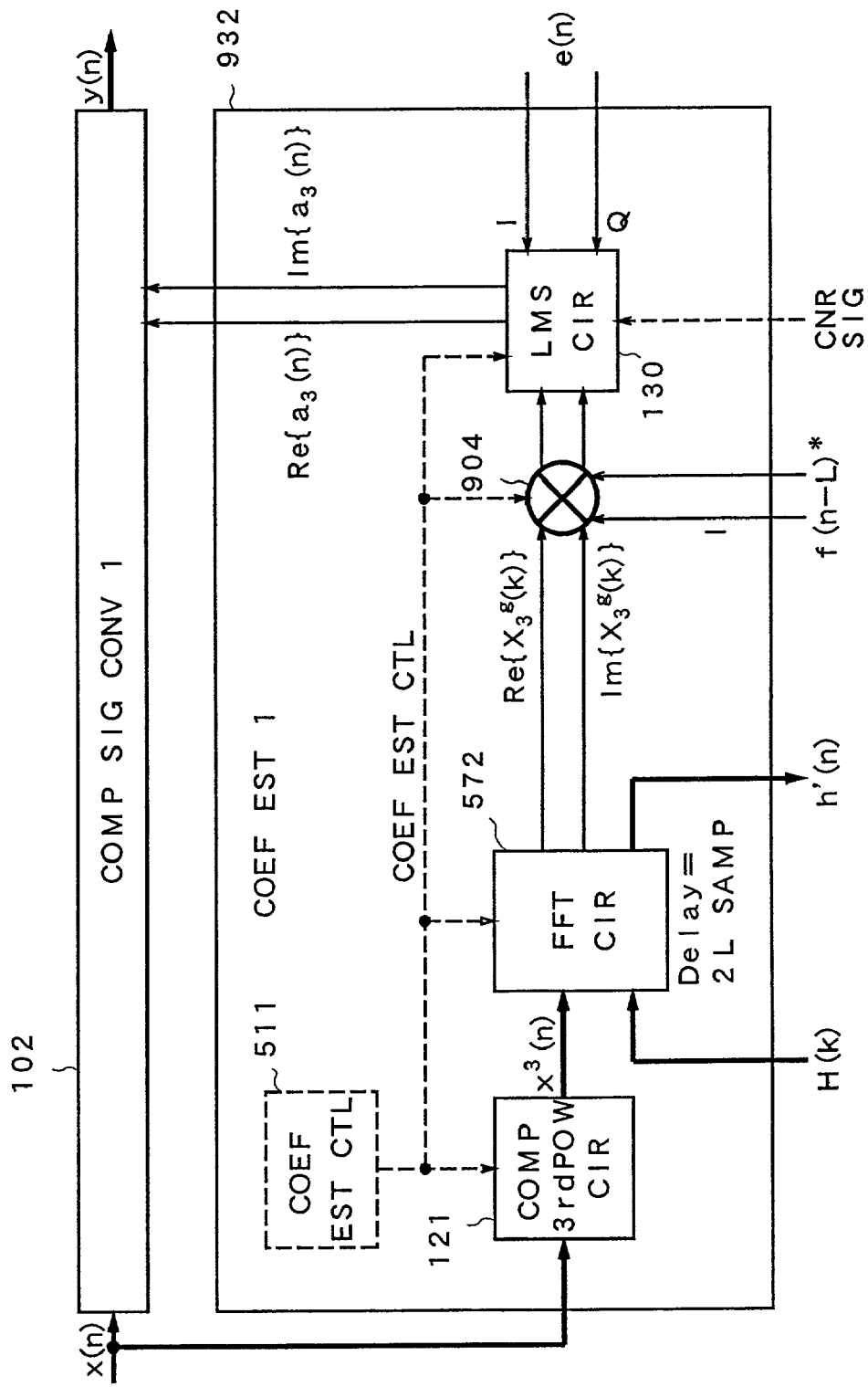

F I G. 8 2
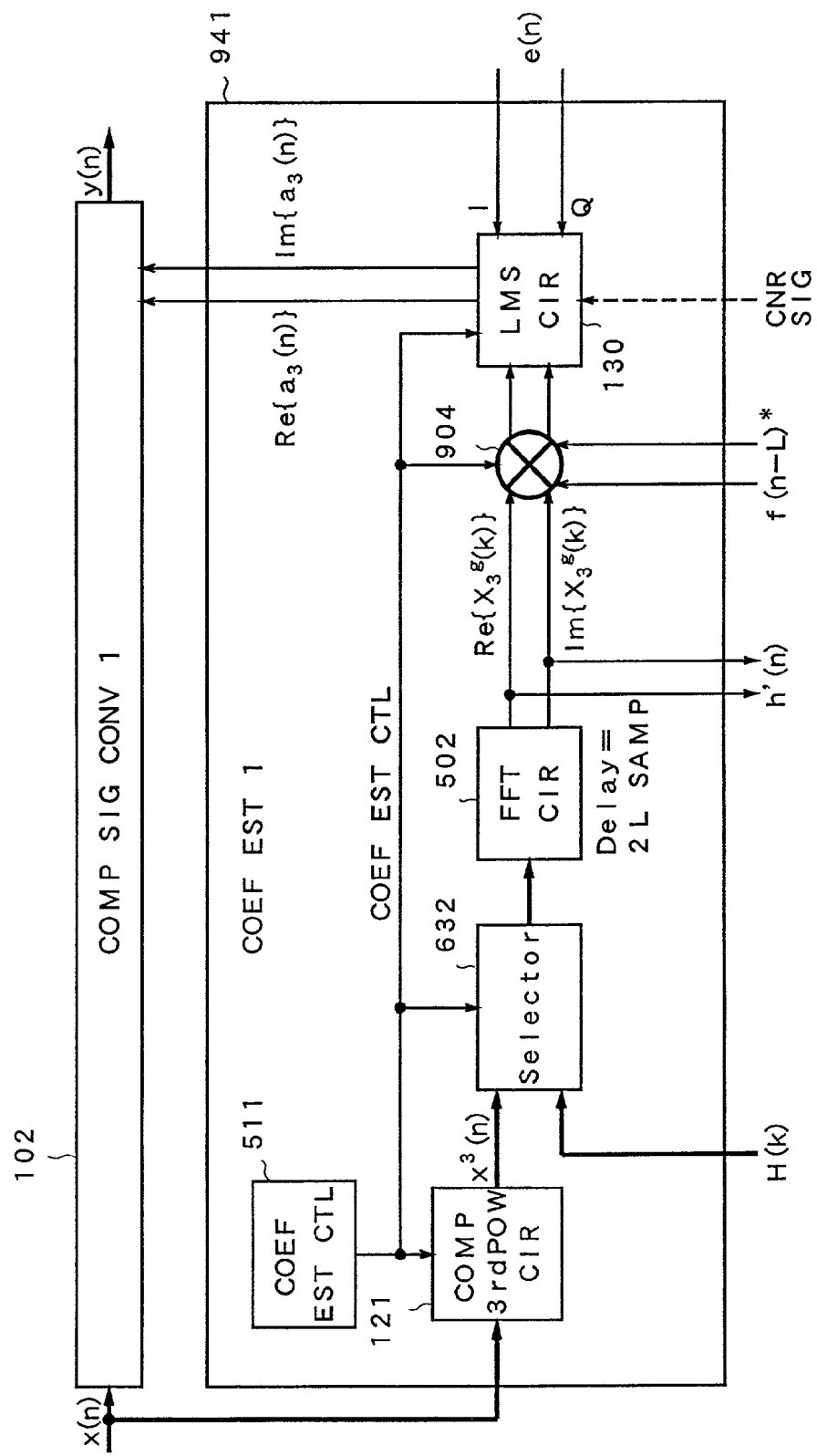

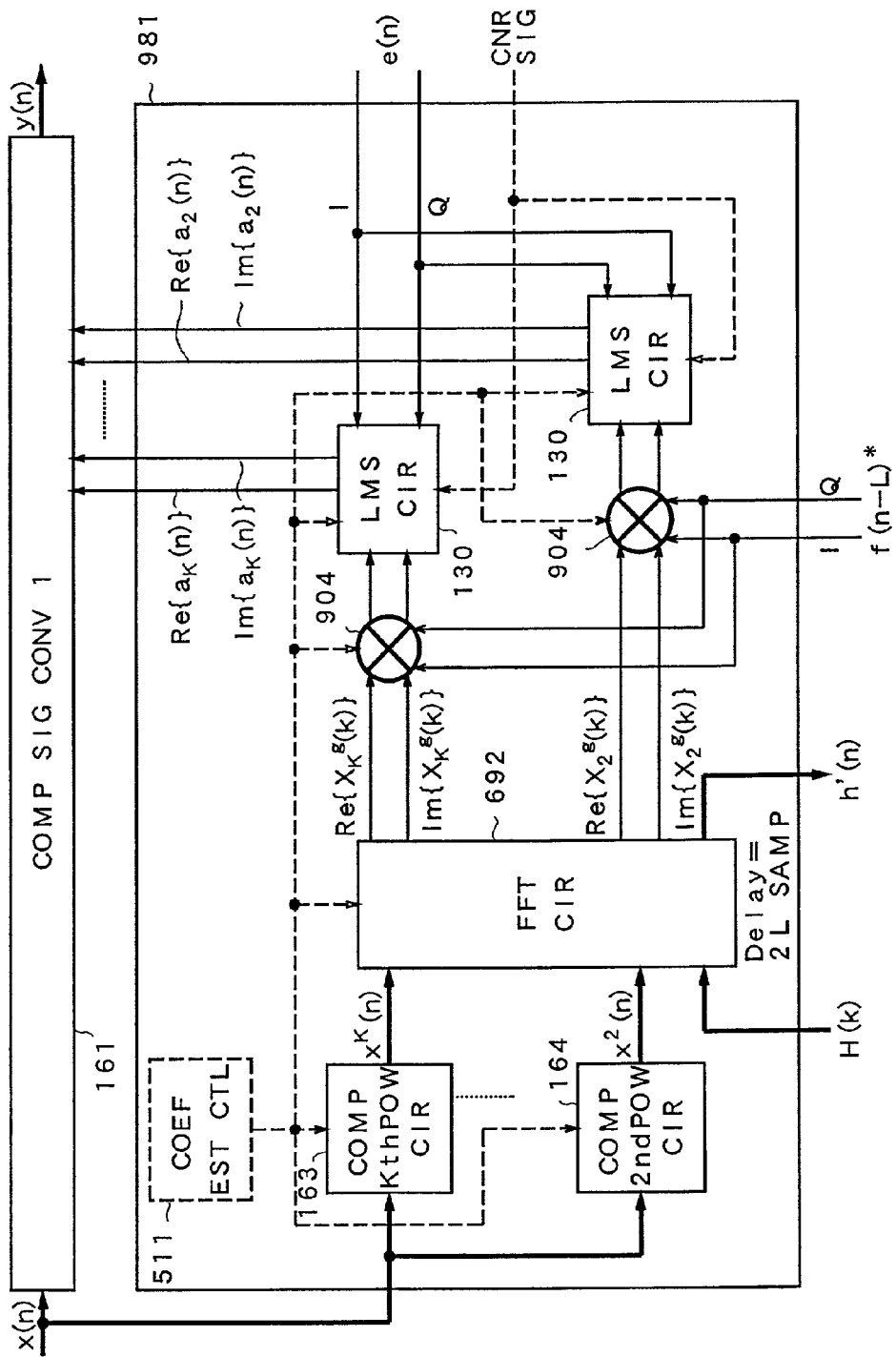
F I G. 86

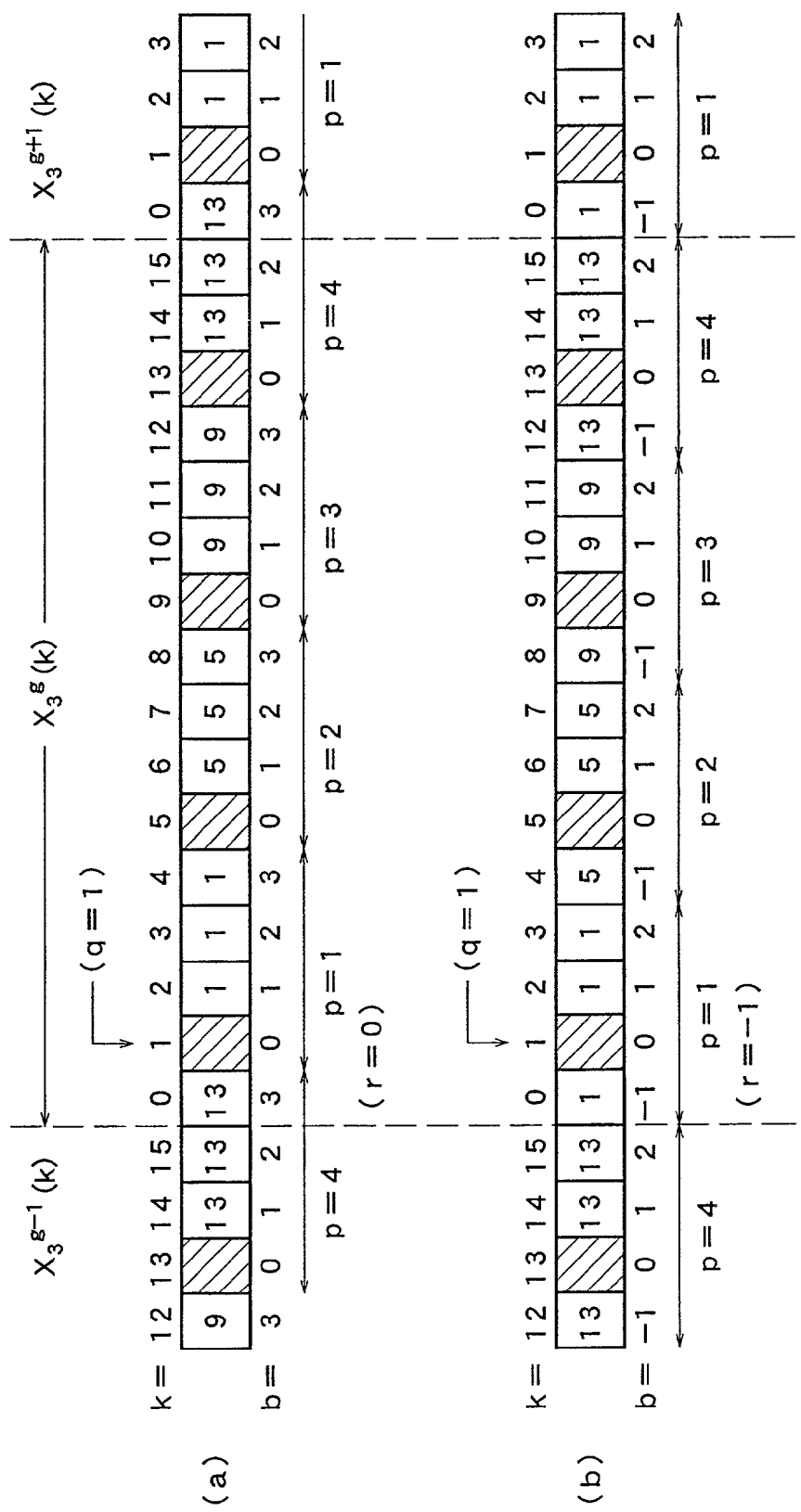
F I G. 90

US 7,142,616 B2

FRONT END PROCESSOR FOR DATA RECEIVER AND NONLINEAR DISTORTION EQUALIZATION METHOD

BACKGROUND OF THE INVENTION

1. Field of the Invention

The present invention relates to a technology for removing nonlinear distortion that occurs in digital transmission such as satellite broadcasting, terrestrial broadcasting and cable television broadcasting.

2. Discussion of the Related Art

In recent years the digitization of TV broadcasts has rapidly progressed in the cable, satellite and terrestrial media in Japan as well as in Western countries. In Japan, regular BS digital broadcasting started in December, 2000. In addition, regular terrestrial digital broadcasting is scheduled to start in metropolitan areas by 2003.

In BS broadcasting the transmission distance reaches over several tens of thousands of kilometers. Therefore, an amplifier in a transponder within a broadcast satellite has little back-off and operates in the area wherein amplification factor is high. Therefore, radio waves emitted from the transmission station receive nonlinear distortion and are transmitted to a reception antenna of each home from the broadcast satellite. In addition, an amplifier is mounted in a receiver for amplifying the received signal regardless of the media, such as satellite, terrestrial or cable, so that the received signal, of which amplitude is large, is affected by the nonlinear characteristics of the amplifier.

On the other hand, a reproduction head (hereinafter referred to as MR head) utilizing a magnetic resistance effect is used in a magnetic recording and reproduction apparatus, such as a magnetic disk apparatus (HDD). In a magnetic recording and reproduction apparatus that uses an MR head, the magnetic field-reproduction output conversion characteristics become nonlinear due to a shift of a biased magnetic field or due to the dispersion of the magnetic characteristics of the MR element. Therefore, the reproduction signal waveform receives nonlinear distortion.

The above described nonlinear distortion becomes a major factor that causes the deterioration of the error ratio, and the like. Conventionally, as for a method for compensating for nonlinear distortion, there is a configuration wherein a front end equalization circuit having opposite characteristics to the amplifier is provided in front of the amplifier in, for example, the transponder (Tsuzuku, et al "Advanced Satellite Broadcasting System in the 21 GHz Band, 16 QAM Transmission with Pre-distortion," technical report of Institute of Television Engineers, BCS94-25 (August 1994)).

In addition, a nonlinear distortion equalization method in a magnetic recording and reproduction apparatus utilizing an MR head is shown in, for example, Japanese unexamined patent publication H9(1997)-7300. FIG. 1 shows, as extracted from the above gazette, a configuration diagram of the entirety of the nonlinear compensation equalizer. This nonlinear compensation equalizer is formed to include an amplitude value converter 1, an FIR filter 2, an equalization error calculator 3 and an LMS algorithm coefficient learning apparatus 4, as shown in FIG. 1.

The amplitude value converter 1 has a multiplier 12a for squaring the input of a reproduction waveform 11, a multiplier 12b for multiplying the reproduction waveform 11 by the output of the multiplier 12a, a coefficient multiplier 14a for multiplying the output 13 of the multiplier 12a by a coefficient value c2, a coefficient multiplier 14b for multiplying the output of the multiplier 12b by a coefficient value c3 and an adder 15 for adding together the output of the coefficient multiplier 14a, the output of the coefficient multiplier 14b and the reproduction waveform 11.

The FIR filter 2 shown in FIG. 1 has a first coefficient multiplier 22a for multiplying a first tap input value 21a by a coefficient value h1, . . . an N-th coefficient multiplier 22n for multiplying an N-th tap input value 21n by a coefficient value hn, a delay element 23a for sequentially delaying the input signal, . . . a delay element 23n, an adder 24 for adding together the outputs of the first coefficient multiplier 22a, . . . the N-th coefficient multiplier 22n.

The equalization error calculator 3 has a subtracter 31 for calculating the difference between the equalization output outputted from the FIR filter 2 and the equalization target and for outputting the value of the difference as an equalization error 32.

FIG. 2 shows a configuration diagram of the LMS algorithm coefficient learning apparatus 4. This LMS algorithm coefficient learning apparatus 4 is formed of a coefficient learning circuit control part 5, a first coefficient learning circuit 6 and a second coefficient learning circuit 7. The first coefficient learning circuit 6 is a circuit for learning the tap coefficient of the FIR filter 2 of FIG. 1. The second coefficient learning circuit 7 is a circuit for learning the tap coefficient of the amplitude value converter 1 of FIG. 1.

The first coefficient learning circuit 6 has, as a learning circuit of the coefficient value 1h, a multiplier 61a for multiplying the equalization error 32 by the coefficient value 1h, a multiplier 62a for multiplying the step size parameter u by the output of the multiplier 61a, an adder 63a for adding the output of the multiplier 62a to the output of the delay element 64a and a delay element 64a for delaying the output of the adder 63a, which is returned to the adder 63a. In addition, the first coefficient learning circuit 6 has, as a learning circuit of the coefficient value hn, a multiplier 61n for multiplying the equalization error 32 by the coefficient value hn, a multiplier 62n for multiplying the step size parameter u by the output of multiplier 61n, an adder 63n for adding the output of the multiplier 62n to the output of the delay element 64n and a delay element 64n for delaying the output of the adder 63n, which is returned to the adder 63n.

The second coefficient learning circuit 7 has, as a learning circuit of the coefficient value c2, a multiplier 71a for multiplying the equalization error 32 by the coefficient value c2, a multiplier 72a for multiplying the step size parameter u by the output of the multiplier 71a, an adder 73a for adding the output of the multiplier 72a to the output of the delay element 74a and a delay element 74a for delaying the output of the adder 73a, which is again returned to the adder 73a. In addition, the second coefficient learning circuit 7 has, as a learning circuit of the coefficient value c3, a multiplier 71b for multiplying the equalization error 32 by the coefficient value c3, a multiplier 72b for multiplying the step size parameter u by the output of the multiplier 71b, an adder 73b for adding the output of the multiplier 72b to the output of the delay element 74b and a delay element 74b which delays the output of the adder 73b, and returns to the adder 73b.

The operation of the nonlinear compensation equalizer of such a configuration is herein described. The amplitude value converter 1 of FIG. 1 has third order function conversion characteristics. The reproduction waveform 11 that has been reproduced by the MR head is given to the multipliers 12a and 12b so as to gain the squared value and the cubed value. The coefficient multiplier 14a multiplies the squared value by the coefficient value c2. The coefficient multiplier 14b multiplies the cubed value by the coefficient value c3. The adder 15 adds together the reproduction waveform 11, which is of the value to the first power, the output of the coefficient multiplier 14a and the output of the coefficient multiplier 14b. In general, when the amplitude value converter 1 has the third order function conversion characteristics, it can sufficiently compensate for distortion due to nonlinearity of the magnetic field-reproduction output conversion characteristics of the MR head, that is to say, waveform distortion in the reproduction signal waveform.

The FIR filter 2 forms a partial response equalizer. This FIR filter 2 carries out a waveform equalization for giving partial response characteristics. The equalization error calculator 3 finds the difference between the equalization output of the FIR filter 2 and the equalization target. The found equalization error 32 is inputted to the LMS algorithm coefficient learning apparatus 4.

The tap input values 21a to 21n inputted, respectively, to the coefficient multipliers 22a to 22n of FIG. 1 are given to the coefficient learning circuit control part 5 of FIG. 2 as a tap input value sequence 41 (h1_in, . . . ,hn_in) of the FIR filter.

The coefficient learning circuit control part 5 outputs the tap input value sequence 41 of the FIR filter as the tap input values h1_in to hn_in, respectively at a synchronized timing of calculation of the equalization error. Then, the first coefficient learning circuit 6 finds the product of the tap input values h1_in to hn_in and the equalization error 32 with respect to each tap and multiplies the step size parameter u for controlling the learning speed and stability, respectively. Then, the first coefficient learning circuit 6 adds this multiplication result to the immediately preceding coefficient value that has been stored by using the delay elements 64a to 64n. The coefficient learning circuit control part 5 generates an FIR filter coefficient update command 42 according to the above result and updates the coefficient values h1 to hn.

Tap input values 13a and 13b to each of the coefficient multipliers 14a and 14b are given to the coefficient learning circuit control part 5 of FIG. 2 as a tap input value sequence 43 in the same manner as in the amplitude value converter 1 of FIG. 1. The LMS algorithm coefficient learning apparatus 4 calculates the coefficient in the same manner as the FIR filter 2 by using the tap input value sequence 43 and the equalization error 32 and respectively updates the coefficient values c2 and c3 of the amplitude value converter 1 by outputting the amplitude value converter coefficient update command 44.

The nonlinear distortion equalization circuit that has been conventionally used in a magnetic recording and reproduction apparatus operates in the above described configuration and compensates waveform distortion in the reproduction signal due to the nonlinearity of the magnetic field-reproduction output conversion characteristics of the MR head.

In the above described nonlinear distortion equalization method, however, nonlinear distortion in the complex signal cannot be compensated for in digital transmissions such as those of BS digital broadcasting. In addition, the signals wherein the phase synchronization of the carrier wave is not established are not dealt with as signals as objects of equalization in the above described nonlinear distortion equalization method.

On the other hand, as a method for compensating for nonlinear distortion in the complex signal, a method has been conceived of providing a front end compensation circuit, having characteristics opposite to those of the amplifier, to the transponder of the transmission end. However, a method of compensating for nonlinear distortion in the complex signal on the reception end has not been conceived.

SUMMARY OF THE INVENTION

A front end processor for a data receiver of the present invention is characterized in having a nonlinear distortion equalizer that reduces nonlinear distortion in the case that a complex signal with nonlinear distortion is inputted. In particular, a complex signal converter for nonlinear distortion equalization is provided in the nonlinear distortion equalizer so that nonlinear distortion in the complex signal is compensated for by converting the complex input signal according to the N-th order function conversion characteristics (N>1).

In particular, in the case that a carrier recovery circuit for establishing the phase synchronization exists between the complex signal converter for nonlinear distortion equalization and the error estimator that calculates an error relative to an mapping point, the phase rotation that is carried out in the carrier recovery circuit is corrected and, thereby, nonlinear distortion in the complex signal is compensated for.

In addition, a complex signal converter for nonlinear distortion equalization that converts the OFDM baseband signal, which has undergone a synchronization carrier modulation, according to the N-th order function conversion characteristics (N>1) as well as a synchronized demodulator are provided so as to compensate for nonlinear distortion in the OFDM baseband signal that has undergone a synchronization carrier modulation.

In addition, a complex signal converter for nonlinear distortion equalization that converts the OFDM baseband signal, which has undergone a differential carrier modulation, according to the N-th order function conversion characteristics (N>1) as well as a differential demodulator are provided so as to compensate for nonlinear distortion in the OFDM baseband signal that has undergone a differential carrier modulation.

Furthermore, a nonlinear distortion equalization method of the present invention embodies a signal processing method for implementing nonlinear distortion equalization implements simplification and energy conservation in a signal processing circuit at the time when the circuit is utilized in an IC.

BRIEF DESCRIPTION OF THE DRAWINGS

The above and other objects and features of the present invention will be clearly understood from the following description with respect to the preferred embodiments thereof when considered in conjunction with the accompanying drawings and diagrams, in which:

FIG. 4 is a block diagram showing a configuration of a complex signal converter for nonlinear distortion equalization according to Embodiment 1;

FIG. 14 is a block diagram of another example showing configurations of a complex signal converter for nonlinear distortion equalization and a coefficient estimator for nonlinear distortion equalization according to Embodiment 2;

FIG. 33 is a block diagram showing a configuration of an FFT circuit according to Embodiment 5;

FIG. 34 is an explanatory diagram showing an example of the operation of the FFT circuit according to Embodiment 5;

FIG. 55 is a block diagram of another example showing the entire configuration of the front end processor for a data receiver according to Embodiment 5;

FIG. 56 is a block diagram of another example showing the entire configuration of the front end processor for a data receiver according to Embodiment 5;

FIG. 81 is a block diagram of another example showing a configuration of the coefficient estimator for nonlinear distortion equalization according to Embodiment 7;

FIG. 82 is a block diagram of another example showing a configuration of the coefficient estimator for nonlinear distortion equalization according to Embodiment 7;

FIG. 86 is a block diagram of another example showing a configuration of the coefficient estimator for nonlinear distortion equalization according to Embodiment 7;

FIG. 90 is an explanatory diagram (part 3) showing the interpolation method of the FFT conversion according to Embodiment 7;

DETAILED DESCRIPTION OF THE PREFERRED EMBODIMENTS

Embodiment 1

Figure 1:
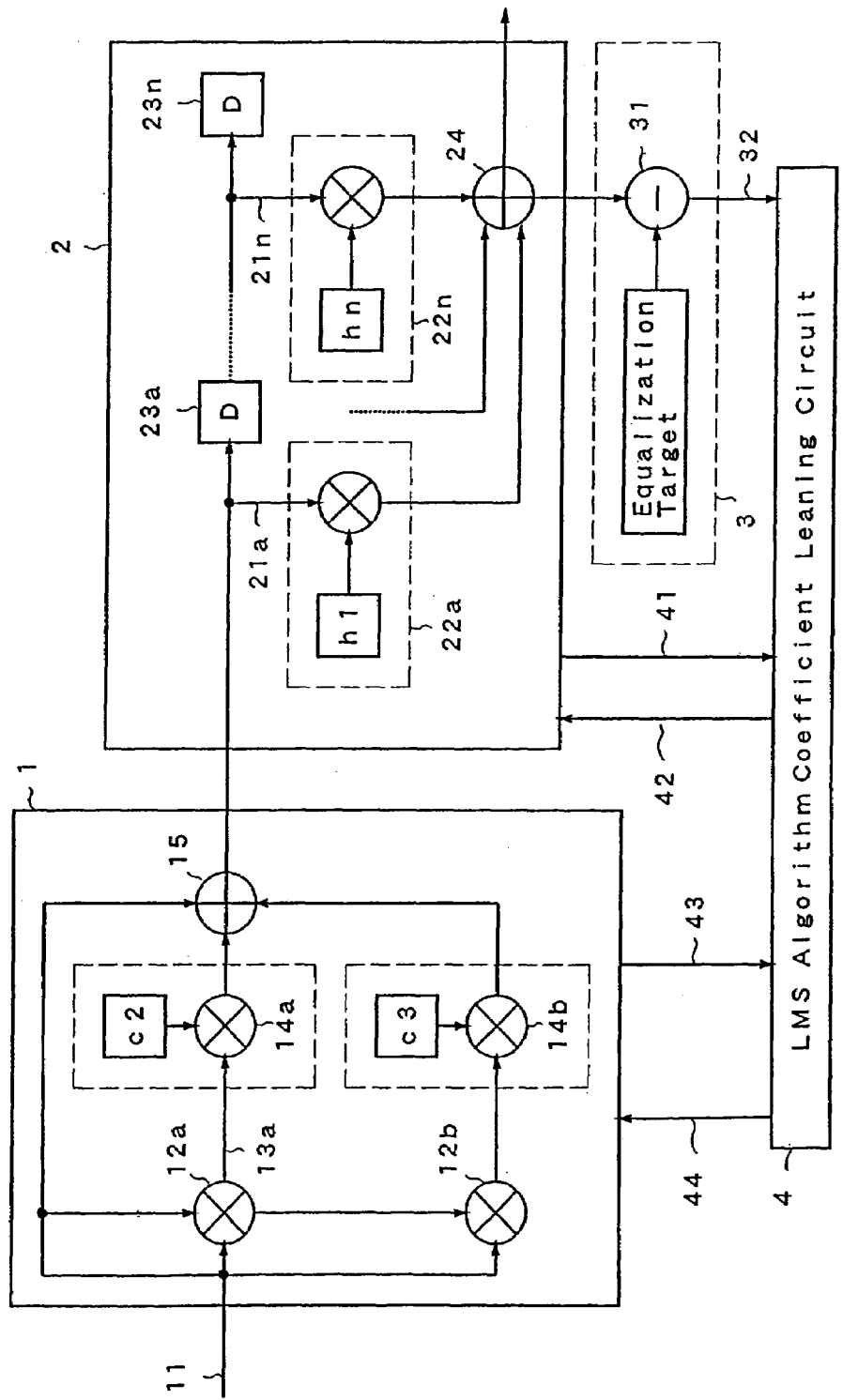
FIG. 1 is a block diagram showing the entire configuration of a nonlinear compensation equalizer according to a prior art.
Figure 2:
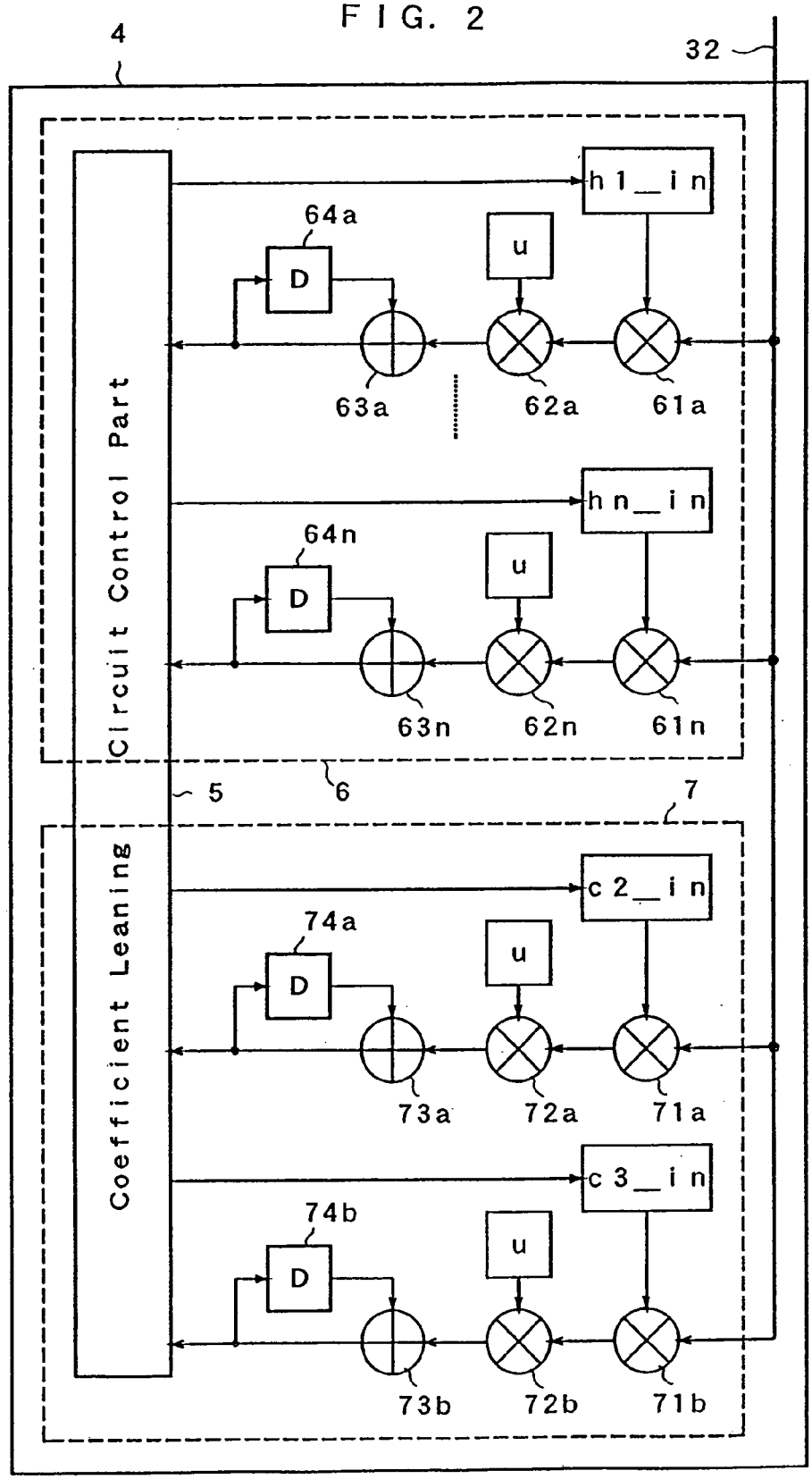
FIG. 2 is a configuration diagram of a portion of the nonlinear compensation equalizer according to the prior art.
Figure 3:
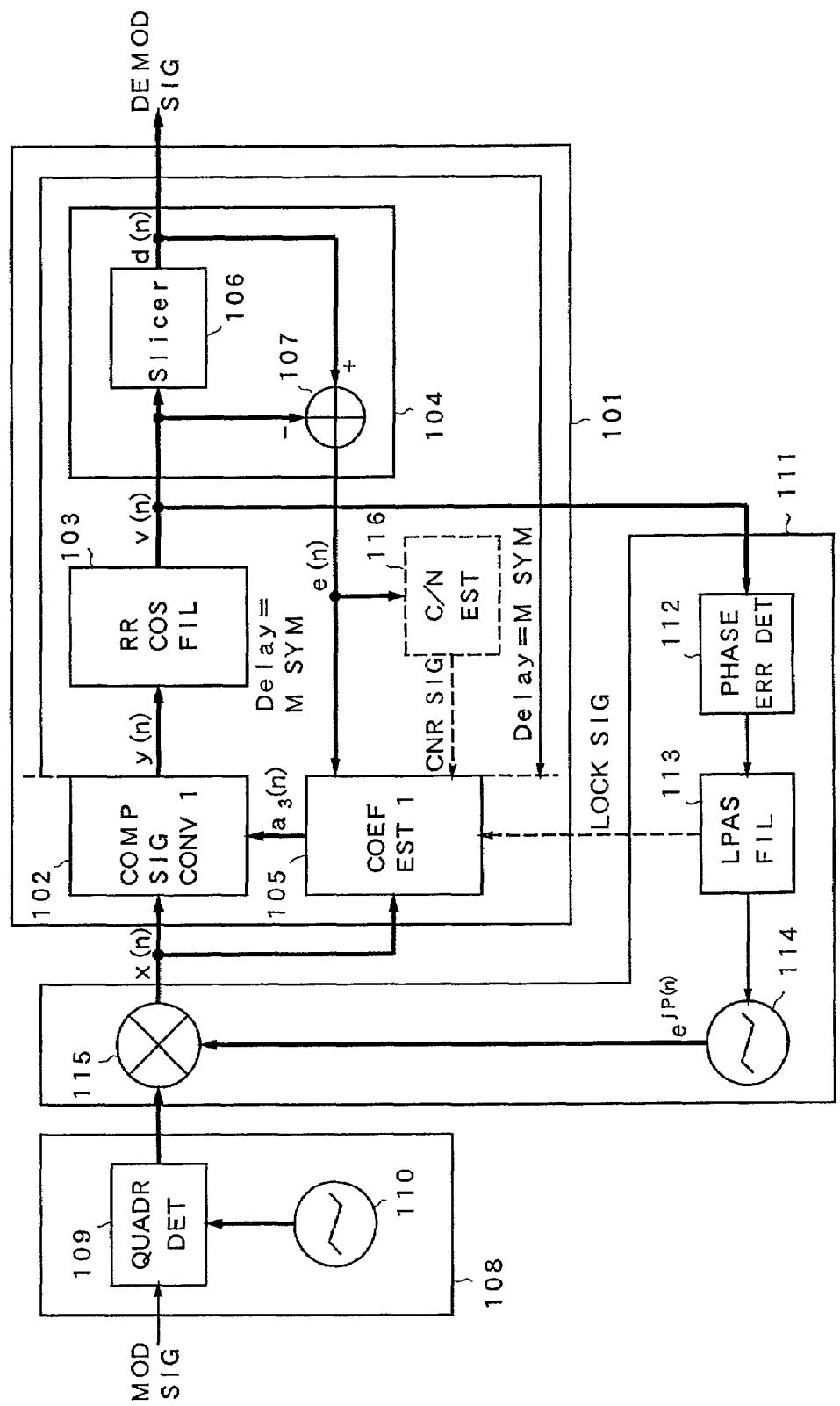
FIG. 3 is a block diagram showing the entire configuration of a front end processor for a data receiver according to Embodiment 1 of the present invention.

A front end processor for a data receiver according to Embodiment 1 of the present invention is described in reference to the figures. FIG. 3 is a block diagram showing the entire configuration of a front end processor 100 for data receiver according to the present embodiment. The front end processor for data receiver is formed to include a nonlinear distortion equalizer 101, quasi-synchronized detector 108 and a carrier recovery circuit 111. In each of the block diagrams shown in the following, thick solid lines show flows of complex signals (vector information) and solid lines, which are thinner than these, show flows scalar information.

The nonlinear distortion equalizer 101 of FIG. 3 has a complex signal converter 102 for nonlinear distortion equalization, a root raised cosine filter 103, an error estimator (ERR EST) 104 and a coefficient estimator 105 for nonlinear distortion equalization. The complex signal converter 102 for nonlinear distortion equalization is described in the abbreviation form "COMP SIG CONV 1" in the drawings. The root raised cosine filter 103 is described in the abbreviation form "RR COS FIL" in the drawings. The coefficient estimator 105 for nonlinear distortion equalization is described in the abbreviation form "COEF EST 1" in the drawings. The error estimator 104 is formed of a slicer 106 and a complex subtracter 107.

The quasi-synchronized detector 108 that is provided at the first stage of the front end processor for data receiver has a quadrature detector 109 and a reference carrier generator 110. The carrier recovery circuit 111 is provided between the quasi-synchronized detector 108 and the nonlinear distortion equalizer 101 and has a phase error detector (PHASE ERR DET) 112, a low pass filter (LPAS FIL) 113, a numerical controlled oscillator 114 and a complex multiplier 115.

The quasi-synchronized detector 108 detects a modulation signal that is received by an antenna, which is not shown. Therefore, the reference carrier generator 110 of the quasi-synchronized detector 108 oscillates the sine wave of a tuned frequency. The quadrature detector 109 generates a cosine wave by delaying the phase of the sine wave by 90° and detects the I axis and the Q axis data by multiplying the above described modulation signal by the sine wave, the above described modulation signal and the cosine wave, respectively.

When the phase error angle of the detected signal at sampling time n is denoted as P(n), the carrier recovery circuit 111 removes the phase error $e^{-jP(n)}$ of the detected output and outputs the signal x(n), of which the phase synchronization is established, to the nonlinear distortion equalizer 101. The phase error detector 112 of the carrier recovery circuit 111 calculates the phase error between the output v(n) of the root raised cosine filter 103 and the closest mapping point. The low pass filter 113 averages the phase error. The numerical controlled oscillator 114 generates a sine wave $e^{jP(n)}$ for canceling the phase error $e^{-jP(n)}$ by using the average value gained by the low pass filter 113. The complex multiplier 115 carries out a complex multiplication of the detected output of the quadrature detector 109 and the sine wave $e^{jP(n)}$ of the numerical controlled oscillator 114 so as to output the signal x(n).

Next, the operation of the nonlinear distortion equalizer 101 is described. The complex signal converter 102 for nonlinear distortion equalization uses a coefficient $a_3(n)$ for third order distortion equalization that is generated in the coefficient estimator 105 for nonlinear distortion equalization so as to remove third order distortion included in the signal x(n). Then, the root raised cosine filter 103 allows only the signal v(n) in the Nyquist band width to pass through. The error estimator 104 calculates the error between the signal v(n) and the closest mapping point d(n) and outputs the mapping point d(n) to an error correction part, not shown, as a demodulated signal. Here, in the case that the error correction part carries out soft decision decoding, the nonlinear distortion equalizer 101 outputs the signal v(n) that is inputted to the error estimator 104 to the error correction part as a demodulated signal. The coefficient estimator 105 for compensating nonlinear distortion uses this error signal e(n) and the signal x(n) so as to update the coefficient $a_3(n)$ for third order distortion equalization by means of the LMS (least mean square) algorithm.

Figure 5:
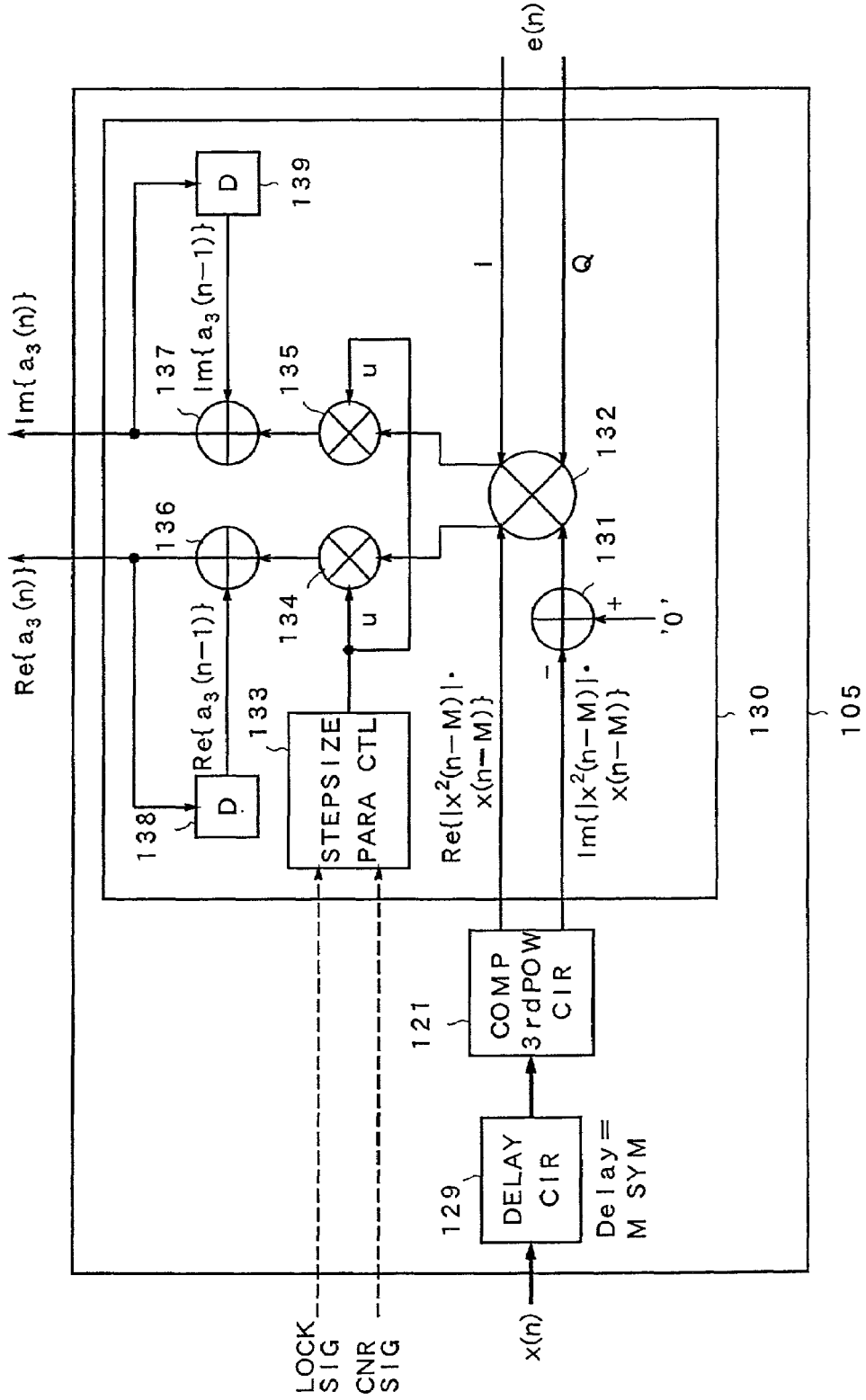
FIG. 5 is a block diagram showing a configuration of coefficient estimator for nonlinear distortion equalization according to Embodiment 1.

A concrete configuration diagram of the complex signal converter 102 for nonlinear distortion equalization is shown in FIG. 4. In addition, a concrete configuration diagram of the coefficient estimator 105 for nonlinear distortion equalization is shown in FIG. 5. As shown in FIG. 4, the complex signal converter 102 for nonlinear distortion equalization has a complex cube calculator (COMP 3rd POW CIR) 121, a complex multiplier 127 and a complex adder 128. The complex cube calculator 121 is formed of multipliers 122, 123, 125 and 126 as well as an adder 124. In addition, as shown in FIG. 5, the coefficient estimator 105 for compensating nonlinear distortion has a delay element (DELAY CIR) 129, a complex cube calculator (COMP 3rd POW CIR) 121 and an LMS circuit 130. The LMS circuit 130 is formed of a subtracter 131, a complex adder 132, a step size parameter controller 133, multipliers 134 and 135, adders 136 and 137 as well as delay elements 138 and 139.

The operation of the complex signal converter 102 for nonlinear distortion equalization is described in the following. When the signal x(n), of which the phase synchronization is established, is inputted to the complex cube calculator 121, the complex signal converter 102 for nonlinear distortion equalization squares the I, Q axis components (real part, imaginary part) by using the multiplier 122, 123 and carries out an addition by using the adder 124 so as to generate $|x^2(n)|$. On the other hand, the I, Q axis components of x(n) are, respectively, inputted to the multipliers 125, 126, the complex signal converter 102 for nonlinear distortion equalization carries out a multiplication of x(n) by $|x^2(n)|$ so as to output $|x^2(n)|x(n)$. Here, $|x^2(n)|x(n)$ is defined as a cubed value $x^3(n)$. The complex multiplier 127 carries out a complex multiplication of the coefficient $a_3(n)$ for third order distortion equalization generated in the coefficient estimator 105 for linear distortion equalization by the cubed value $x^3(n)$. The complex adder 128 carries out a complex addition of the output of the complex multiplier 127 and the inputted signal x(n) so as to output a signal y(n) gained by removing third order distortion from the signal x(n). The signal y(n) is represented in the next equation. Here, when the initial value of the coefficient for third order distortion equalization is denoted as $a_3(0)$, $a_3(0)=0$.

$$y(n)=x(n)+a_3(n)x^3(n) \quad \text{equation (1-1)}$$

Next, the operation of the coefficient estimator 105 for nonlinear distortion equalization is described. When the signal x(n), of which the phase synchronization is established, is inputted, the delay element 129 delays the signal x(n) by M symbols. Then, the complex cube calculator 121 converts the signal x(n) into $|x^2(n-M)|x(n-M)$ and outputs the conversion result as the cubed value $x^3(n-M)$. Here, the amount of delay of the root raised cosine filter 103 of FIG. 3 is M symbols while the amount of delay of the error estimator 104 is set at 0. The delay element 129 carries out delay adjustment for M symbols until the error signal e(n) is calculated from the signal y(n).

The subtracter 131 generates the complex conjugation $[x^3(n-M)]^*$ by inverting the sign of the Q axis signal in the LMS circuit 130 of FIG. 5. Here, "*" is a symbol for representing the conjugate complex number. Then, the complex multiplier 132 carries out a complex multiplication of the complex conjugation $[x^3(n-M)]^*$ by the error signal e(n). The multipliers 134 and 135 multiply a constant u outputted from the step size parameter controller 133 by the I and Q axis signals outputted from the complex multiplier 132. The adders 136 and 137 add the multiplication results of the I and Q axes and the outputs from the delay elements 138 and 139 so as to output the addition results to the complex signal converter 102 for nonlinear distortion equalization of FIG. 4 as the coefficient $a_3(n)$ for third order distortion equalization. Here, the delay elements 138 and 139 of FIG. 5 delay the coefficient Re[$a_3(n)$] of the I axis and the coefficient Im[$a_3(n)$] of the Q axis, respectively, by one symbol.

Next, a coefficient update algorithm of the coefficient estimator 105 for nonlinear distortion equalization is described. The error signal e(n) is represented in the next equation in reference to FIG. 3.

$$e(n)=d(n)-v(n) \quad \text{equation (1-2)}$$

Here, the signal v(n) is a signal gained by limiting the band of the signal y(n), and when the signal v(n) is assumed to be substantially equal to y(n), the following equation is formed.

$$e(n)=d(n)-y(n) \quad \text{equation (1-3)}$$

The next equation is gained from equation (1-3) and equation (1-1).

$$e(n)=d(n)-[x(n)+a_3(n)x^3(n)] \quad \text{equation (1-4)}$$

When the evaluation function of the coefficient $a_3$ is denoted as $J(a_3)$, the evaluation function $J(a_3)$ is given as the squared amplitude of the error signal e(n) and, therefore, the next equation is formed.

$$J(a_3)=|e(n)|^2 \quad \text{equation (1-5)}$$

As for the algorithm that minimizes the evaluation function $J(a_3)$, that is to say, the LMS algorithm, in many cases the following equation is used to update the coefficient based on a gradient algorithm that uses the steepest gradient method.

$$a_3(n+1)=a_3(n)-\alpha \cdot dJ(a_3)/da_3(n) \quad \text{equation (1-6)}$$

Here, equation (1-4) is substituted to equation (1-5) and partial differentiation is carried out so as to gain the following equation.

$$dJ(a_3)/da_3(n)=2\{e(n)\cdot de(n)/da_3(n)\}=-2e(n)[x^3(n)]^* \quad \text{equation (1-7)}$$

When it is assumed to be $u=2\alpha$ and equation (1-7) is substituted into equation (1-6), the following equation is gained.

$$a_3(n+1)=a_3(n)+ue(n)[x^3(n)]^* \quad \text{equation (1-8)}$$

On the other hand, $a_3(n)$ is represented in the following equation in reference to FIG. 5.

$$a_3(n)=a_3(n-1)+ue(n-M)[|x^2(n-M)|x(n-M)]^* \quad \text{equation (1-9)}$$

The error signal e(n) is generated from the signal v(n) that is assumed to be gained by delaying x(n) by M symbols and delay adjustment is carried out. In equation (1-9) the following is assumed:

$$[|x^2(n-M)|x(n-M)]^*=[x^3(n-M)]^*.$$

In equation (1-9) the coefficient $a_3(n)$ is delayed by one symbol in comparison with the error signal e(n) and the signal x(n). The convergence speed of the coefficient update is comparatively slow in the LMS algorithm, however, the one symbol delay does not in practice cause any obstacles.

Figure 6:
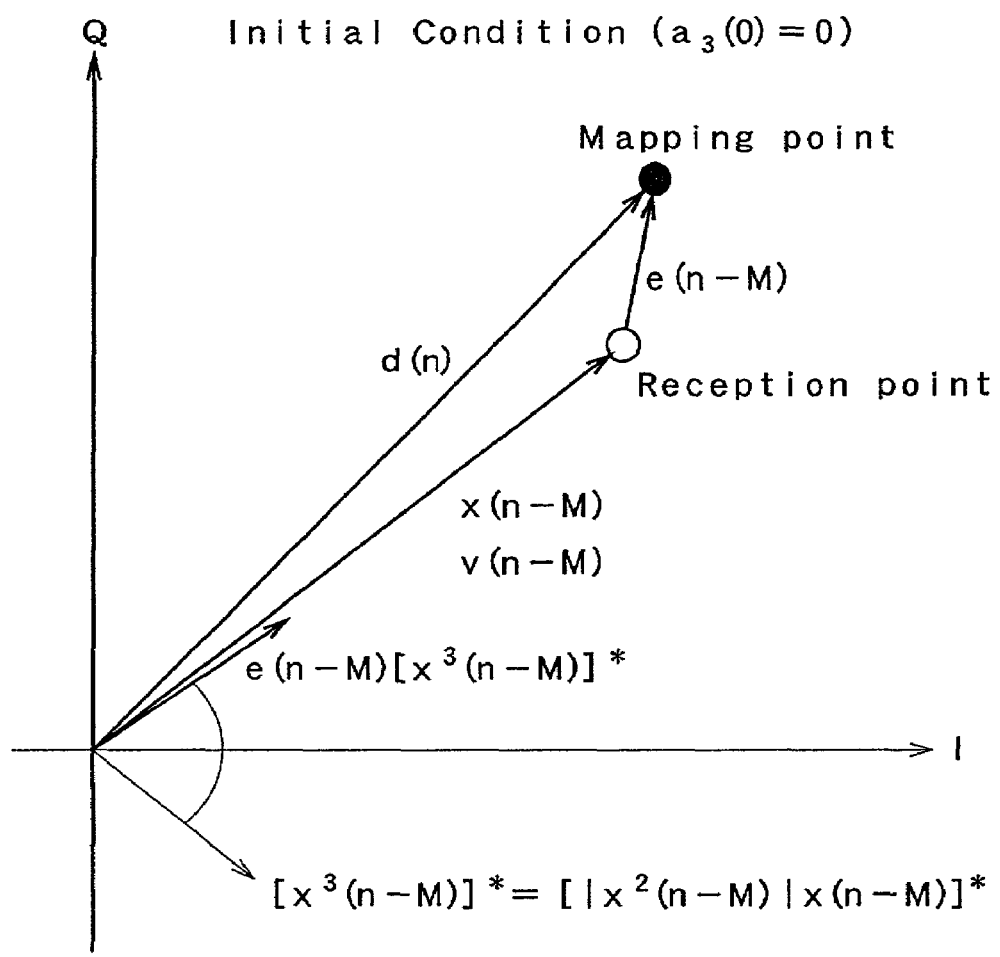
FIG. 6 is an explanatory diagram showing the appearance of update of the coefficient $a_3(n)$ for third order distortion equalization according to Embodiment 1.

The appearance of update of the coefficient $a_3(n)$ for third order distortion equalization is shown in FIG. 6. The initial condition is $a_3(0)=0$. The difference between the mapping point d(n) that is the closest to the reception point and the reception point x(n-M) is the error signal e(n-M). Here, the reception point x(n-M) is limited in the band by means of the root raised cosine filter 103 that follows the complex signal converter 102 for nonlinear distortion equalization and is transformed to v(n-M). Since it is set as $[x^3(n-M)]^*=[|x^2(n-M)|x(n-M)]^*$, $[x^3(n-M)]^*$ has a phase that is symmetrical to the reception point x(n-M) relative to the I axis and has an amplitude that is $|x^2(n-M)|$ times as large.

The phase of $e(n-M)[x^3(n-M)]^*$ becomes the sum of the phase of e(n-M) and the phase of $[x^3(n-M)]^*$. The amplitude of $e(n-M)[x^3(n-M)]^*$ becomes the product of the amplitude of e(n-M) and the amplitude of $[x^3(n-M)]^*$. Therefore, a vector that approximately points in the phase direction of x(n-M) is gained as shown in FIG. 6 and the coefficient $a_3(n)$ for third order distortion equalization is updated in the direction where the amplitude that has been reduced in size due to third order distortion is increased. Therefore, it can properly be assumed to be $[x^3(n-M)]^*=[|x^2(n-M)|x(n-M)]^*$ in equation (1-9).

Here, the output y(n) of the complex signal converter 102 for nonlinear distortion equalization passes through the root raised cosine filter 103. By taking this into consideration, the nonlinear distortion in the complex signal may be compensated for with a higher precision.

Figure 7:
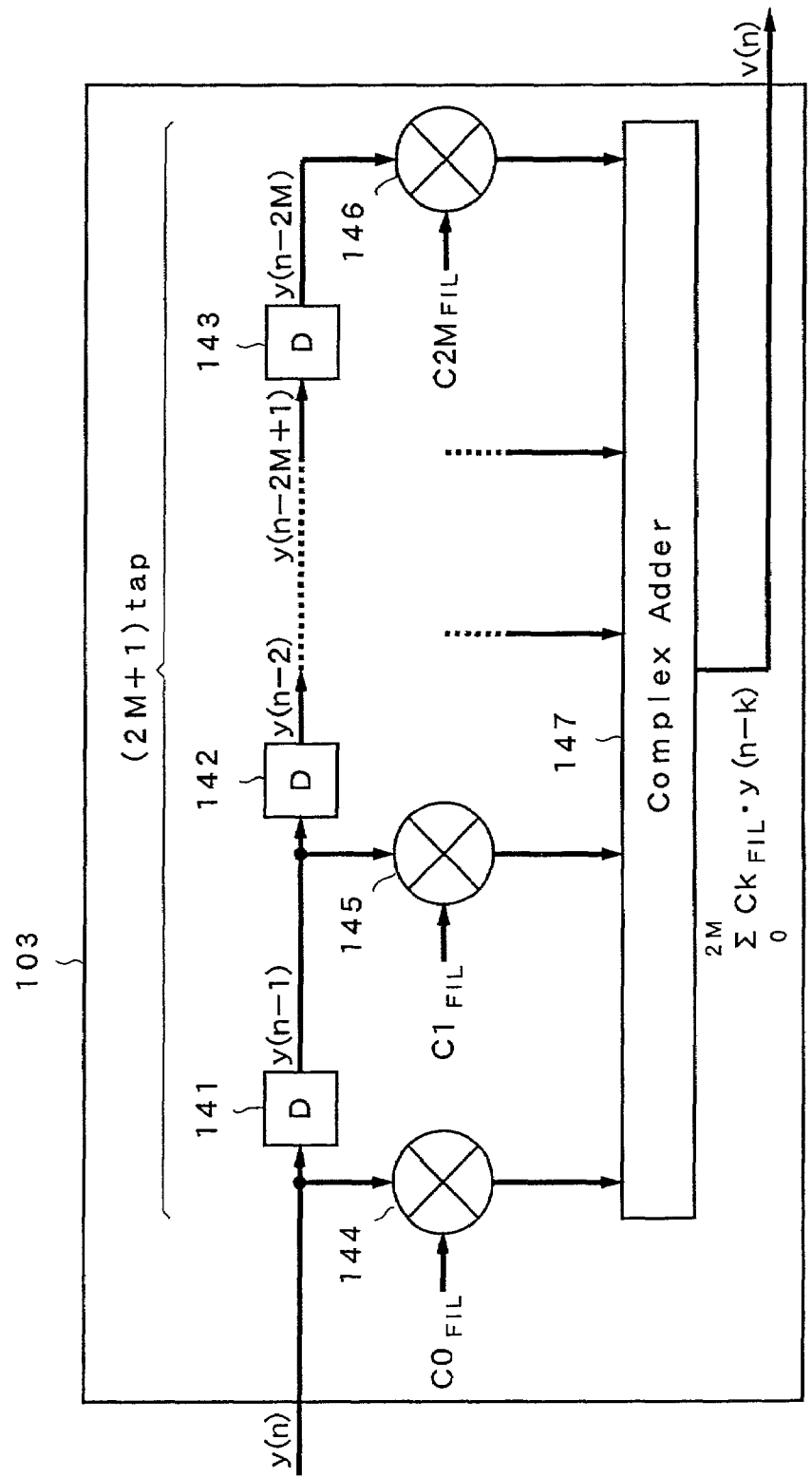
FIG. 7 is a block diagram showing a configuration of a root raised cosine filter according to Embodiment 1.

The configuration of the root raised cosine filter 103 is shown in FIG. 7. The root raised cosine filter 103 has delay elements 141, 142 and 143 as well as complex multipliers 144, 145 and 146. As shown in FIG. 7, in the case that the number of the taps is (2M+1) the filter is formed of 2M delay elements in total and (2M+1) complex multipliers in total and the amount of delay becomes of M symbols up to the center tap.

Figure 8:
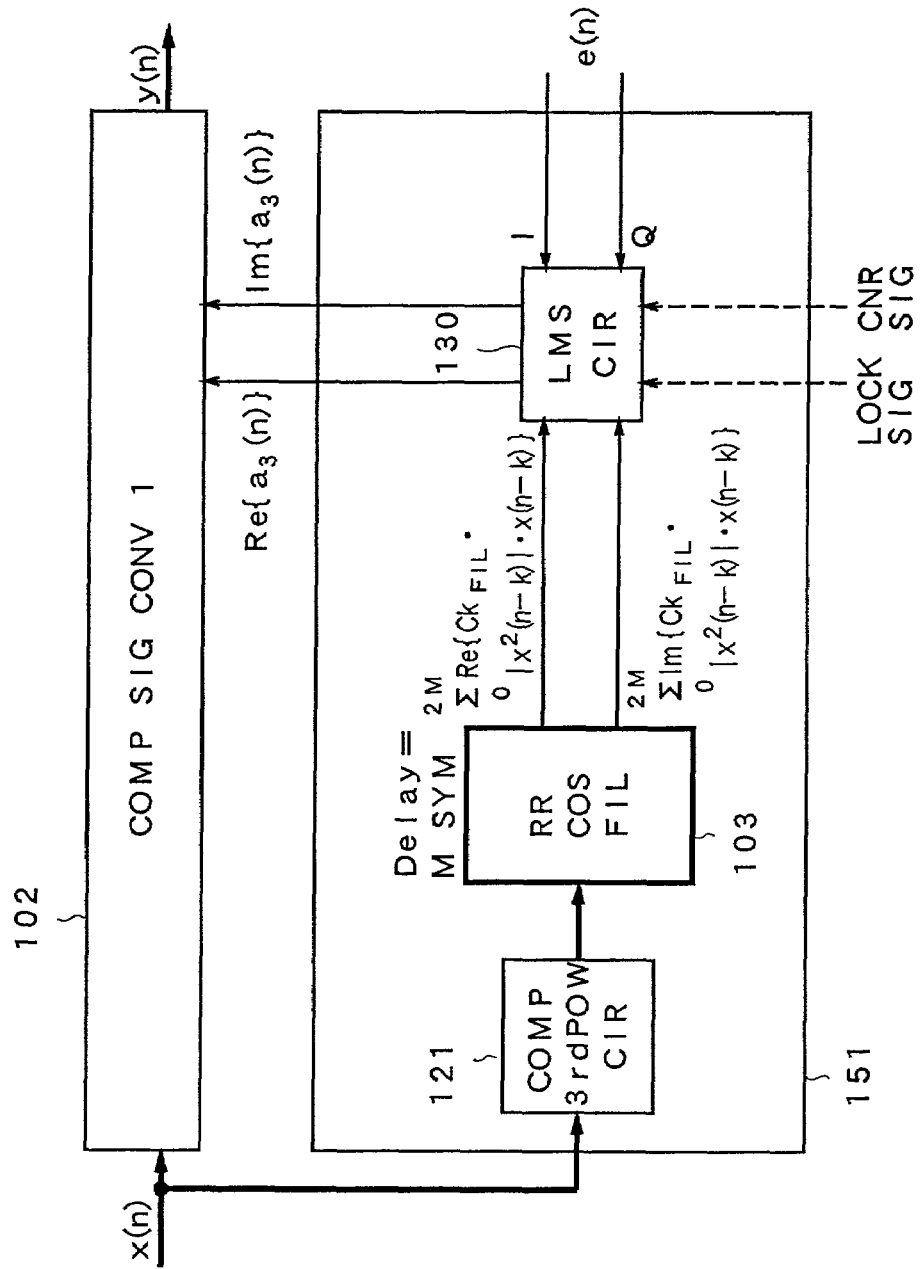
FIG. 8 is a block diagram of another example showing a configuration of the coefficient estimator for nonlinear distortion equalization according to Embodiment 1.

The configuration of the coefficient estimator 151 for nonlinear distortion equalization in the case that the passage of the output through the root raised cosine filter 103 is taken into consideration is shown in FIG. 8. The coefficient estimator 151 for nonlinear distortion equalization is gained by eliminating the delay element 129 and by providing the root raised cosine filter 103 at the rear stage of the complex cube calculator 121 in the coefficient estimator 105 for nonlinear distortion equalization of FIG. 5. The LMS circuit 130 at this rear stage is the same as of FIG. 5.

The operation of the coefficient estimator 151 for nonlinear distortion equalization is described. When the signal x(n), of which the phase synchronization is established, is inputted the complex cube calculator 121 converts the signal x(n) into $|x^2(n)|x(n)$ so as to output the conversion result as the cubed value $x^3(n)$. The root raised cosine filter 103 carries out the band limitation of $|x^2(n)|x(n)$ so as to output $\Sigma Ck_{FIL}|x^2(n-k)|x(n-k)$. Here, $Ck_{FIL}$ is each coefficient of the root raised cosine filter 103. Since the amount of delay of the root raised cosine filter 103 is M symbols, the delay element 129 of FIG. 5 becomes unnecessary. The LMS circuit 130 carries out an update of the coefficient $a_3(n)$ for third order distortion equalization by using the output signal of the root raised cosine filter 103 and the error signal e(n) and outputs to the complex signal converter 102 for nonlinear distortion equalization. In this case, the coefficient $a_3(n)$ for third order distortion equalization is represented in the following equation.

$$a_3(n+1)=a_3(n)+ue(n)[\Sigma Ck_{FIL}x^3(n-k)]^* \quad \text{equation (1-10)}$$

In the above described configuration, the compensation of the nonlinear distortion in the complex signal can be carried out with a higher precision.

In addition, the coefficient estimator 105 for nonlinear distortion equalization of FIG. 5 and the coefficient estimator 151 for nonlinear distortion equalization of FIG. 8 may start the coefficient update after the establishment of the phase synchronization. In this case, the filter output of the low pass filter 113 in the carrier recovery circuit 111 of FIG. 3 is monitored and the lock signal is set at "H" when, in the case that the output is stable, the phase synchronization is assumed to have been established.

In the coefficient estimator 105 for nonlinear distortion equalization of FIG. 5 and the coefficient estimator 151 for nonlinear distortion equalization of FIG. 8, the step size parameter controller 133 in the LMS circuit 130 sets the step size parameter at u=0 in the case that the lock signal (LOCK SIG) is "L". In this case, $a_3(n)=0$. Then, the complex signal converter 102 for nonlinear distortion equalization outputs y(n)=x(n).

In the case that the lock signal is "H" the step size parameter controller 133 substitutes a predetermined value for the step size parameter u so as to start the coefficient update. According to the above described operation, the nonlinear distortion equalizer can compensate for the nonlinear distortion in the complex signal without negatively affecting the operation of the carrier recovery circuit 111.

In addition, the coefficient estimator 105 for nonlinear distortion equalization of FIG. 5 and the coefficient estimator 151 for nonlinear distortion equalization of FIG. 8 may carry out a coefficient update only at the time of high C/N. In this case, a C/N estimator (C/N EST) 116 is provided in the nonlinear distortion equalizer 101 of FIG. 3. The C/N estimator 116 uses the error signal e(n) so as to calculate and average C/Ns by regarding the distance between each C/N and the closest mapping point as noise and outputs the result thereof to the coefficient estimator 105 for nonlinear distortion equalization of FIG. 5 and the coefficient estimator 151 for nonlinear distortion equalization of FIG. 8.

In the coefficient estimator 105 for nonlinear distortion equalization of FIG. 5 and the coefficient estimator 151 for nonlinear distortion equalization of FIG. 8, the step size parameter controller 133 in the LMS circuit 130 sets the step size parameter at u=0 in the case that the C/N shown by the CNR signal is smaller than the set threshold value. In this case, $a_3(n)=0$ and the complex signal converter 102 for nonlinear distortion equalization outputs as y(n)=x(n). In the case that the C/N shown by the CNR signal is the set threshold value, or greater, the step size parameter controller 133 substitutes a predetermined value for the step size parameter u so as to carry out a coefficient update. Thus, the nonlinear distortion in the complex signal can be compensated for without negative effects at the time of low C/N.

Here, the present embodiment is formed so as to remove only the dominant third order distortion that is nonlinear distortion as shown in equation (1-1). However, arbitrary high order nonlinear distortion that is second order, or higher, distortion may be compensated by assuming as follows:

$$y(n)=x(n)+\Sigma a_m(n)x^m(n)(m>1) \quad \text{equation (1-11)}.$$

The coefficient update equations of this case are gained in the following for the respective orders.

$$a_m(n+1)=a_m(n)+ue(n)[x^m(n)]^*(m>1) \quad \text{equation (1-12)}$$

wherein $x^m(n)=|x^{m-1}(n)|x(n)$ is formed.

Figure 9:
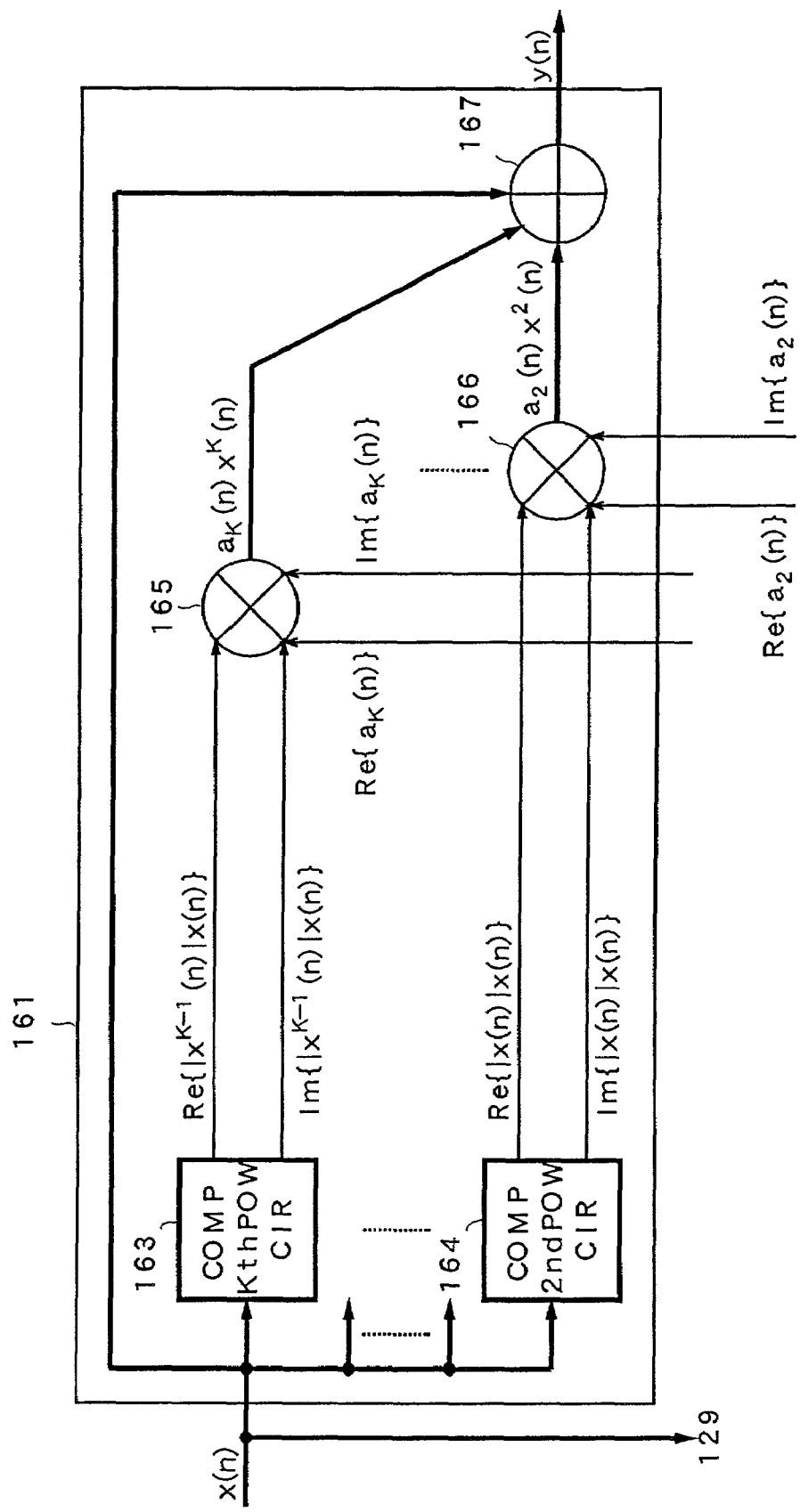
FIG. 9 is a block diagram of another example showing a configuration of the complex signal converter for nonlinear distortion equalization according to Embodiment 1.
Figure 10:
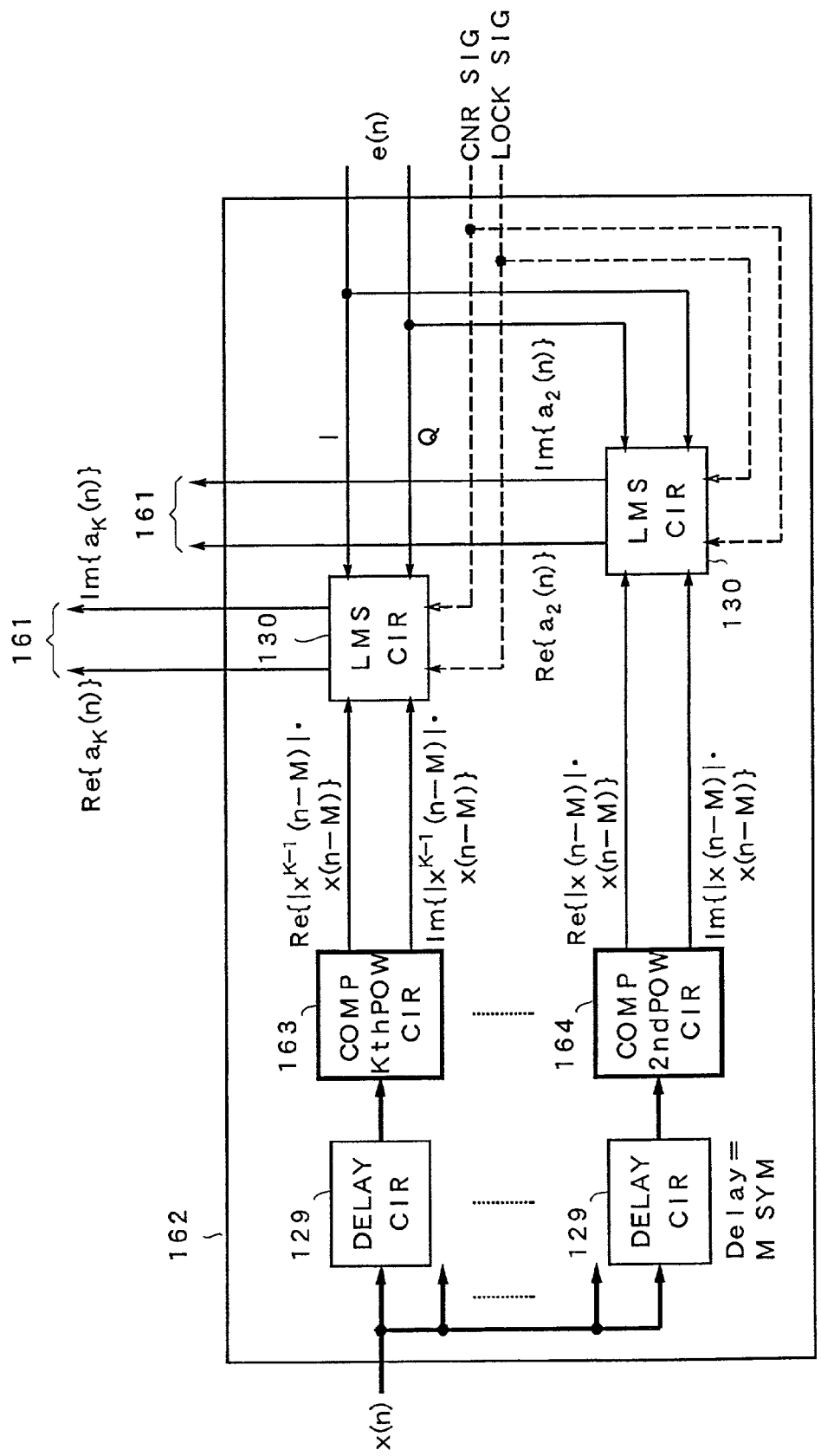
FIG. 10 is a block diagram of another example showing a configuration of the coefficient estimator for nonlinear distortion equalization according to Embodiment 1.

A configuration of a complex signal converter 161 for nonlinear distortion equalization that compensates high order nonlinear distortion at least second order distortion and no more than K-th order distortion is shown in FIG. 9. In addition, a configuration of a coefficient estimator 162 for nonlinear distortion equalization is shown in FIG. 10. The complex signal converter 161 for nonlinear distortion equalization of FIG. 9 has a complex K-th power calculator 163 to a complex square calculator 164, complex multipliers 165 to 166 and a complex adder 167. In addition, the coefficient estimator 162 for nonlinear distortion equalization of FIG. 10 has a plurality of delay elements 129 in the same number as the number of orders, a complex K-th power calculator 163 to a complex square calculator 164 and a plurality of LMS circuit 130 in the same number as the number of orders.

The operation of the complex signal converter 161 for nonlinear distortion equalization of such configuration is described. When the signal x(n), of which the phase synchronization is established, is inputted to the complex signal converter 161 for nonlinear distortion equalization, the complex K-th power calculator 163 generates $|x^{K-1}(n)|x(n)$ as the K-th power value $x^K(n)$. In addition, the complex square calculator 164 generates $|x(n)|x(n)$ as the squared value $x^2(n)$. The complex K-th power calculator 163 to the complex square calculator 164 are formed of multipliers and adders in the same manner as of the complex cube calculator 121 shown in FIG. 4.

The complex multiplier 165 carries out a complex multiplication of the coefficient $a_K(n)$ for K-th order distortion equalization generated in the coefficient estimator 162 for nonlinear distortion equalization by K-th power value $x^k(n)$. The complex multiplier 166 carries out a complex multiplication of the coefficient $a_2(n)$ for second order distortion equalization by the squared value $x^2(n)$. The complex adder 167 carries out a complex addition of $a_k(n)x^k(n)$, $a_2(n)x^2(n)$ and x(n) so as to output a signal y(n) gained by removing K-th order distortion and second order distortion from the signal x(n). In a similar manner with respect to the other orders, the complex m-th power circuit generates $|x^{m-1}(n)|x(n)$ as $x^m(n)$. Then, the complex multiplier carries out a complex multiplication of the coefficient $a_m(n)$ for m-th order distortion equalization that is generated in the coefficient estimator 162 for nonlinear distortion equalization by the value raised to the m-th power $x^m(n)$. In addition, the complex adder 167 carries out a complex addition of the multiplication result to the signal x(n) so as to remove m-th order distortion from the signal x(n).

When the signal x(n), of which the phase synchronization is established, is inputted to the coefficient estimator 162 for nonlinear distortion equalization, the delay element 129 of each order delays the signal x(n) by M symbols. Then, the complex K-th power calculator 163 converts the signal x(n) into $|x^{K-1}(n-M)|x(n-M)$ and outputs the conversion result as the value raised to the K-th power $x^K(n-M)$. The complex square calculator 164 converts the signal x(n) into $|x(n-M)|x(n-M)$ and outputs the conversion result as the squared value $x^2(n-M)$. The LMS circuit 130 of each order carries out a coefficient update by using the above described conversion result and the error signal e(n) so as to output the coefficient $a_K(n)$ for K-th order distortion equalization and the coefficient $a_2(n)$ for second order distortion equalization to the complex signal converter 161 for nonlinear distortion equalization.

In the same manner as in the other orders, the delay element 129 delays the signal x(n) by M symbols. The complex m-th power circuit converts the signal x(n) into $|x^{m-1}(n)|x(n)$ and outputs the conversion result as the value raised to the m-th power $x^m(n)$. Then, the LMS circuit 130 carried out a coefficient update by using the conversion result and the error signal e(n) so as to output the coefficient $a_m(n)$ for m-th order distortion equalization to the complex signal converter 161 for nonlinear distortion equalization. According to the above described operation, arbitrary high order nonlinear distortion of second order distortion, or higher, can be compensated for.

The output y(n) of the complex signal converter 161 for nonlinear distortion equalization passes through the root raised cosine filter 103. By taking this into consideration, in the case that nonlinear distortion in the complex signal is compensated for with a higher precision arbitrary high order nonlinear distortion of second order distortion, or higher, can be compensated for in the same manner as the above. In this case, the delay element 129 of each order is eliminated and root raised cosine filters 103 are provided at the rear stages of the complex K-th power calculator 163 to the complex square calculator 164 and the complex m-th power circuit for each order in the coefficient estimator 162 for nonlinear distortion equalization.

Here, FIG. 10 shows the case wherein the delay element 129 is provided for each order. However, one delay element 129 may be shared so that the output signal of the delay element 129 is distributed to the complex K-th power calculator 163 to the complex square calculator 164 and the complex m-th power circuit for each order.

In addition, the above described example includes the complex K-th power calculator 163 and the complex square calculator 164, etc., as well as the complex m-th power circuit for each order. However, the shared use of the circuits by using the configuration wherein, for example, the I and Q axis components raised to a power and are sequentially outputted to a circuit of to the next higher order, can be achieved. In addition, other methods for circuit sharing may be used.

Embodiment 2

Figure 11:
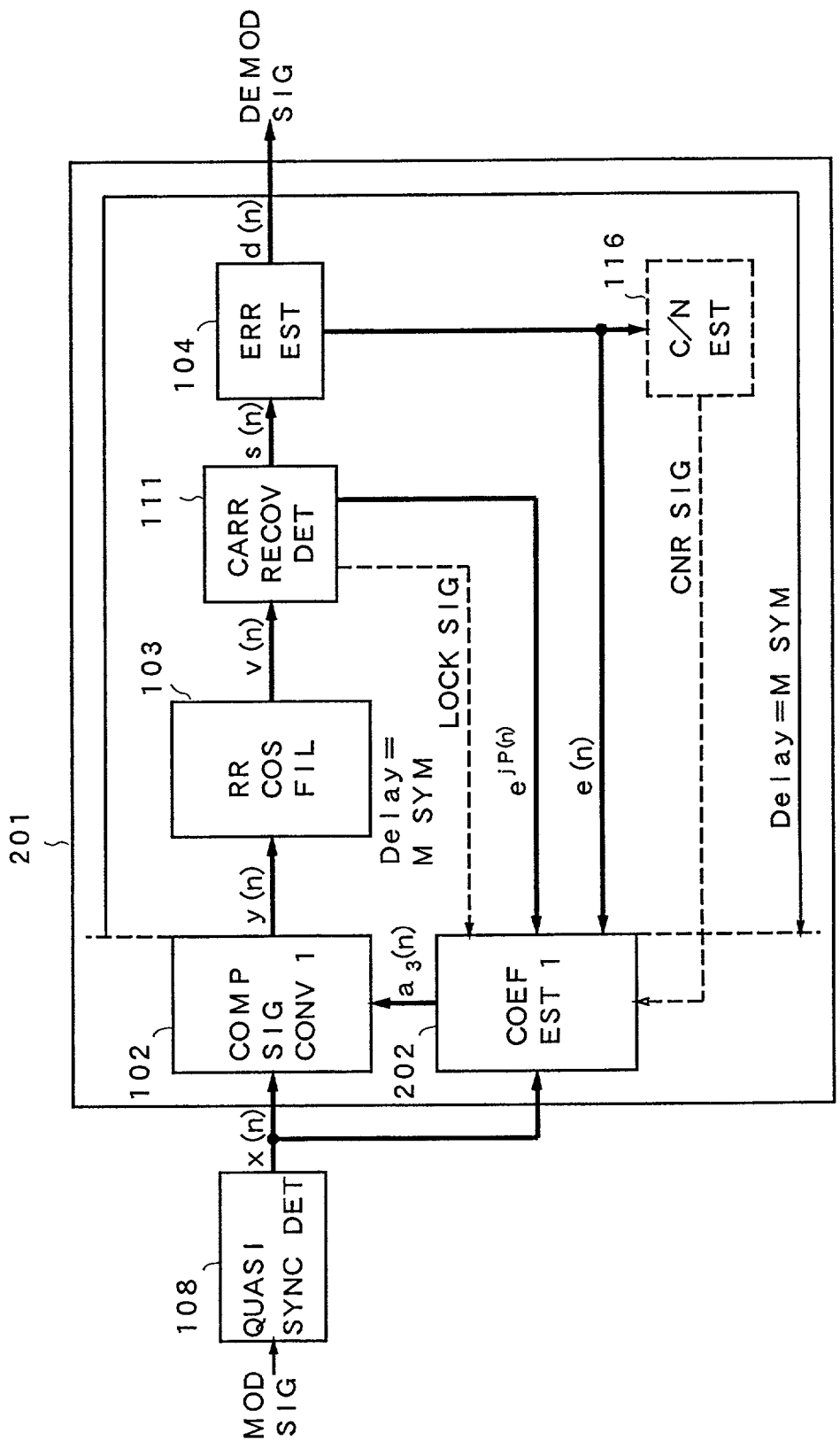
FIG. 11 is a block diagram showing the entire configuration of a nonlinear distortion equalizer according to Embodiment 2 of the present invention.

Next, a front end processor for data receiver according to Embodiment 2 of the present invention is described in reference to the figures. FIG. 11 is a block diagram showing the configuration of a front end processor 200 for data receiver according to the present embodiment. The front end processor 200 for data receiver is formed to include a quasi-synchronized detector 108 and a nonlinear distortion equalizer 201. The nonlinear distortion equalizer 201 according to the present embodiment differs from the nonlinear distortion equalizer 101 of Embodiment 1 in the configuration of the coefficient estimator 202 for nonlinear distortion equalization. The nonlinear distortion equalizer 201 is characterized in that the carrier recovery circuit 111 that is located at the front stage of the nonlinear distortion equalizer 101 of FIG. 3 is provided in the rear stage of the root raised cosine filter 103 in the nonlinear distortion equalizer 201. The quasi-synchronized detector 108 is the same as shown in FIG. 3 and each of the other blocks in the nonlinear distortion equalizer 201 is the same as each of the blocks in the nonlinear distortion equalizer 101 of FIG. 3.

The quasi-synchronized detector 108 detects the I axis and Q axis data with respect to the modulation signal received by the antenna, not shown, in the same manner as in Embodiment 1 so as to generate the detected output x(n).

The operation of the nonlinear distortion equalizer 201 of such a configuration will now be described. The complex signal converter 102 for nonlinear distortion equalization removes third order distortion included in the detected signal x(n) in the same manner as in Embodiment 1 by using the coefficient $a_3(n)$ for third order distortion equalization that is generated in the coefficient estimator 202 for nonlinear distortion equalization. Then, the root raised cosine filter 103 allows only the signals in the Nyquist bandwidth to pass through and outputs a band limitation signal v(n). Next, the carrier recovery circuit 111 removes a phase error $e^{-jP(n)}$ of v(n) and outputs the signal s(n), of which the phase synchronization is established, to the error estimator 104.

The error estimator 104 calculates the error between the signal s(n) and the mapping point d(n) that is the closest to the signal s(n). In addition, the error estimator 104 outputs the signal d(n) to an error correction part, not shown, as a demodulation signal. Here, in the case that the error correction part carries out a soft decision decoding, the nonlinear distortion equalizer 201 outputs the input signal s(n) of the error estimator 104 to the error correction part as a demodulation signal. The coefficient estimator 202 for nonlinear distortion equalization uses this error signal e(n) and the signal x(n) as well as a phase rotation signal $e^{jP(n)}$ that is generated in the carrier recovery circuit 111 so as to update the coefficient $a_3(n)$ by using the LMS algorithm.

Figure 12:
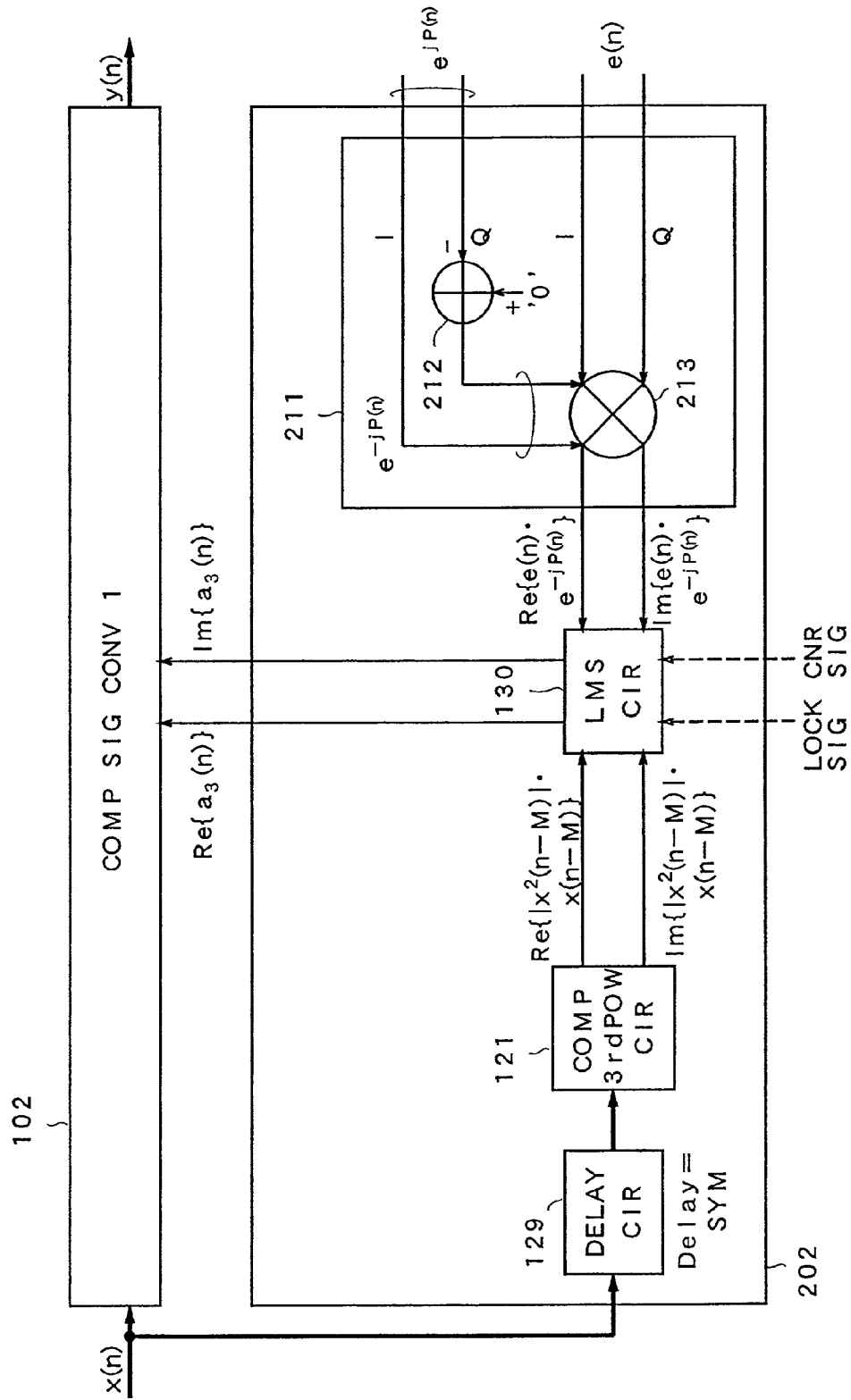
FIG. 12 is a block diagram showing a configuration of a coefficient estimator for nonlinear distortion equalization according to Embodiment 2.

The configuration of the coefficient estimator 202 for nonlinear distortion equalization is shown in FIG. 12. The coefficient estimator 202 for nonlinear distortion equalization is gained by adding a phase rotation corrector 211 to the coefficient estimator 105 for nonlinear distortion equalization of Embodiment 1. The phase rotation corrector 211 has a subtracter 212 and a complex multiplier 213. Here, each of the other blocks of the coefficient estimator 202 for nonlinear distortion equalization is the same as in the coefficient estimator 105 for nonlinear distortion equalization of FIG. 5.

The operation of the coefficient estimator 202 for nonlinear distortion equalization will now be described. When the detected output x(n) is inputted in FIG. 12, the delay element 129 and the complex cube calculator 121 converts the signal x(n) into $|x^2(n-M)|x(n-M)$ and outputs the conversion result to the LMS circuit 130 as the cubed value $x^3(n-M)$. On the other hand, when a phase rotation signal $e^{jP(n)}$ is inputted, the subtracter 212 inverts the sign of the Q axis signal and, thereby, the phase rotation corrector 211 generates the complex conjugation $e^{-jP(n)}$. The complex multiplier 213 carries out a multiplication of the complex conjugation $e^{-jP(n)}$ by the error signal e(n) and corrects the phase rotation that is carried out in the carrier recovery circuit 111 so as to output the correction result to the LMS circuit 130. The LMS circuit 130 carries out the coefficient update in the same manner as in Embodiment 1 using $|x^2(n-M)|x(n-M)$ and $e(n)e^{-jP(n)}$ as inputs so as to output the coefficient $a_3(n)$ for third order distortion equalization to the complex signal converter 102 for nonlinear distortion equalization.

In the case that a carrier recovery circuit 111 that establishes phase synchronization exists between the complex signal converter 102 for nonlinear distortion equalization and the error estimator 104, nonlinear distortion in the complex signal can be compensated for by correcting the phase rotation carried out in the carrier recovery circuit 111.

The coefficient update algorithm of the coefficient estimator 202 for nonlinear distortion equalization is represented in the following equation by adding the phase rotation correction to the equation (1-7).

$$a_3(n+1)=a_3(n)+ue(n)[x^3(n)]^*e^{-jP(n)} \qquad \text{equation (2-1)}$$

On the other hand, the coefficient $a_3(n)$ is represented in the following equation in reference to FIG. 12.

$$a_3(n)=a_3(n-1)+ue(n-M)[|x^2(n-M)|x(n-M)]^*e^{-jP(n-m)} \qquad \text{equation (2-2)}$$

Here, the error signal e(n) is generated from the signal s(n) that can be assumed to be gained by delaying the signal x(n) by M symbols, a delay adjustment is carried out in equation (2-2) by making the setting $[|x^2(n-M)|x(n-M)]^*=[x^3(n-M)]^*$. By taking this M symbol delay into consideration, the error signal is represented as e(n−M) and the phase rotation correction is represented as $e^{-jP(n-M)}$.

In addition, though the coefficient $a_3(n)$ is delayed by one symbol in comparison with the error signal e(n), the signal x(n) and the phase signal $e^{-jP(n)}$ in equation (2-2), the convergence speed of the coefficient update is relatively slow and no problems are, in practice, caused with the LMS algorithm.

In the nonlinear distortion equalizer according to the present embodiment, the output y(n) of the complex signal converter 102 for nonlinear distortion equalization passes through the root raised cosine filter 103. By taking this into consideration, nonlinear distortion in the complex signal may be compensated for with a higher precision.

Figure 13:
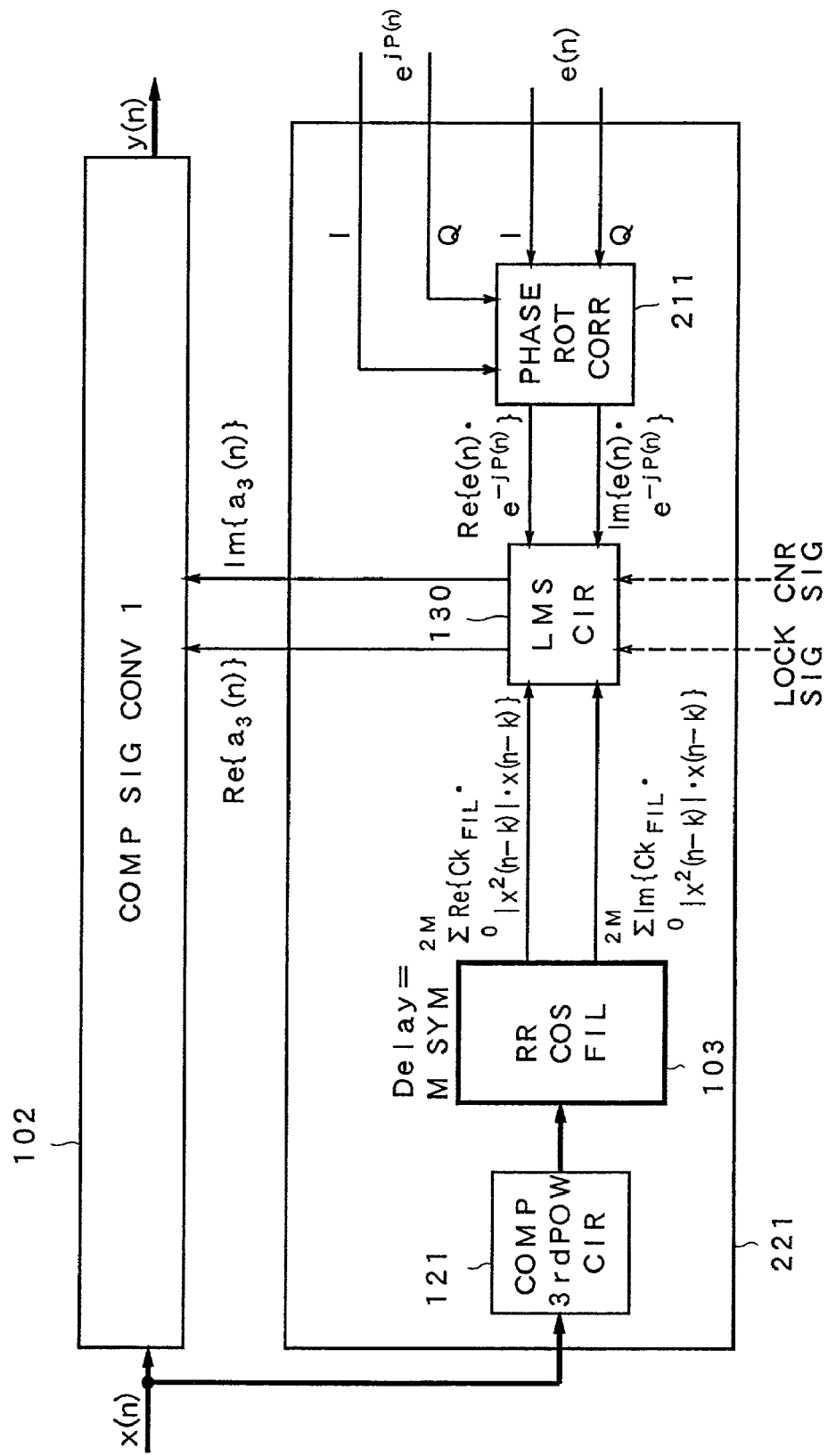
FIG. 13 is a block diagram of another example showing a configuration of the coefficient estimator for nonlinear distortion equalization according to Embodiment 2.

The configuration of the coefficient estimator 221 for nonlinear distortion equalization in the case wherein the passage of the output through the root raised cosine filter 103 is taken into consideration is shown in FIG. 13. This coefficient estimator 221 for nonlinear distortion equalization is gained by eliminating the delay element 129 and by providing a root raised cosine filter 103 at the rear stage of the complex cube calculator 121 in the coefficient estimator 202 for nonlinear distortion equalization of FIG. 12. The LMS circuit 130 at this rear stage and the phase rotation corrector 211 that generates the other input of the LMS circuit 130 are the same as those shown in FIG. 12.

When the detected output x(n) is inputted into the coefficient estimator 221 for nonlinear distortion equalization, the complex cube calculator 121 converts the signal x(n) into $|x^2(n)|x(n)$ and outputs the conversion result as the cubed value $x^3(n)$. The root raised cosine filter 103 carries out a band limitation on the conversion result and outputs $\Sigma Ck_{FIL}|x^2(n-k)|x(n-k)$ to the LMS circuit 130. Here, $Ck_{FIL}$ is each coefficient of the root raised cosine filter 103. Since the amount of delay of the root raised cosine filter 103 is M symbols, the delay element 129, as shown in FIG. 12, becomes unnecessary.

On the other hand, when the phase rotation signal $e^{jP(n)}$ and the error signal e(n) are inputted in the same manner as in FIG. 12, the phase rotation corrector 211 corrects the phase rotation that is carried out in the carrier recovery circuit 111 and outputs $e(n)e^{-jP(n)}$ to the LMS circuit 130. The LMS circuit 130 updates the coefficient $a_3(n)$ for third order distortion equalization by using these two signals and outputs the result to the complex signal converter 102 for nonlinear distortion equalization. The coefficient $a_3(n)$ in this case is represented in the following equation.

$$a_3(n+1)=a_3(n)+ue(n)[\Sigma Ck_{FIL}x^3(n-k)]^*e^{-jP(n)} \qquad \text{equation (2-3)}$$

According to the above described operation, nonlinear distortion in the complex signal can be compensated for with a higher precision. In addition, the coefficient estimator 202 for nonlinear distortion equalization of FIG. 12 and the coefficient estimator 221 for nonlinear distortion equalization of FIG. 13 may start coefficient update after establishing the phase synchronization. Same as Embodiment 1, the low pass filter 113 in the carrier recovery circuit 111 in FIG. 11 sets the lock signal at "H" when the phase synchronization is established in the case that the filter output is stable.

The coefficient estimator 202 for nonlinear distortion equalization of FIG. 12 and the coefficient estimator 221 for nonlinear distortion equalization of FIG. 13 is set at $a_3(n)=0$ in the case that the lock signal is "L" in the same manner as in Embodiment 1 and the complex signal converter 102 for nonlinear distortion equalization outputs y(n)=x(n). Then, in the case that the lock signal is "H," the coefficient update is started. According to the above described operation, nonlinear distortion in the complex signal can be compensated for without negatively affecting the operation of the carrier recovery circuit 111.

In addition, the coefficient estimator 202 for nonlinear distortion equalization of FIG. 12 and the coefficient estimator 221 for nonlinear distortion equalization of FIG. 13 may carry out the coefficient update only at the time of high C/N. A C/N estimator 116 is provided in the nonlinear distortion equalizer 201 of FIG. 11 in the same manner as in Embodiment 1. Then, the C/N estimator 116 calculates and averages the C/N and outputs the result to the coefficient estimator 202 for nonlinear distortion equalization of FIG. 12 and the coefficient estimator 221 for nonlinear distortion equalization of FIG. 13 as a CNR signal.

The coefficient estimator 202 for nonlinear distortion equalization of FIG. 12 and the coefficient estimator 221 for nonlinear distortion equalization of FIG. 13 is set at $a_3(n)=0$ in the case that the C/N shown by the CNR signal is smaller than the set threshold value, and the complex signal converter 102 for nonlinear distortion equalization outputs y(n)=x(n) in the same manner as in Embodiment 1. In the case that the C/N shown by the CNR signal is the set threshold value, or greater, the coefficient estimator for nonlinear distortion equalization carries out the coefficient update. According to the above described operation, nonlinear distortion in the complex signal can be compensated for without negative effects at the time when the C/N is low.

Here, though in the present embodiment only third order distortion, which is dominant among the nonlinear distortion, is removed as shown in equations (1-1) and (2-1), arbitrary high order nonlinear distortion of second order, or higher, distortion may be compensated for by using equation (1-11) in the same manner as in Embodiment 1. The coefficient update equation in this case becomes as follows:

$$a_m(n+1)=a_m(n)+ue(n)[x^m(n)]^*e^{-jP(n)} \qquad \text{equation (2-4)}$$

wherein $x^m(n)=|x^{m-1}(n)|x(n)$ is formed.

The configuration of the coefficient estimator 231 for nonlinear distortion equalization that compensates for high order nonlinear distortion of at least second order distortion and no more than K-th order distortion is shown in FIG. 14. Here, the complex signal converter 161 for nonlinear distortion equalization in the figure is the same as in the case of Embodiment 1. The coefficient estimator 231 for nonlinear distortion equalization is gained by adding the phase rotation corrector 211 to the coefficient estimator 162 for nonlinear distortion equalization of FIG. 10.

When the detected output x(n) is inputted, the complex signal converter 231 for nonlinear distortion equalization generates $|x^{K-1}(n-M)|x(n-M)$ as the value raised to the K-th power $x^K(n-M)$ and generates $|x(n-M)|x(n-M)$ as $x^2(n-M)$ in the same manner as in Embodiment 1 which is then outputted to the LMS circuit 130. On the other hand, when the phase rotation signal $e^{jP(n)}$ and the error signal e(n) are inputted, the phase rotation corrector 211 corrects the phase rotation that is carried out in the carrier recovery circuit 111 in the same manner as in the case of FIG. 12 and outputs $e(n)e^{-jP(n)}$, to the LMS circuit 130.

By using two such signals, the LMS circuit 130 carries out the coefficient update and outputs the coefficient $a_K(n)$ for K-th order distortion equalization and the coefficient $a_2(n)$ for second order distortion equalization to the complex signal converter 161 for nonlinear distortion equalization. As for the other orders, the LMS circuit 130 carries out the coefficient update by using the value raised to the m-th power and $e(n)e^{-jP(n)}$ when $|x^{m-1}(n)|x(n)$ is given as the value to the m-th power $x^m(n)$ in the same manner as above and outputs the coefficient $a_m(n)$ for m-th order distortion equalization to the complex signal converter 161 for nonlinear distortion equalization. In addition, the complex signal converter 161 for nonlinear distortion equalization outputs y(n), shown by equation (1-11), according to the same operation as that described in Embodiment 1. According to the above described operation, arbitrary high order nonlinear distortion of second order, or greater, distortion can be compensated for.

The output y(n) of the complex square calculator 161 for nonlinear distortion equalization passes through root raised cosine filter 103. By taking this into consideration, in the case that nonlinear distortion in the complex signal is compensated for with a higher precision, arbitrary high order nonlinear distortion of second order, or greater, distortion can be compensated for. In this case, in the coefficient estimator 231 for nonlinear distortion equalization, the delay element 129 of each order is eliminated and a complex K-th power calculator 163 as well as a complex square calculator 164 are added and, further, a root raised cosine filter 103 is added to the rear stage of the complex m-th power calculator of each order.

Here, though FIG. 14 shows the case wherein the delay element 129 is provided for each order, one delay element 129 may be shared so that the delay signal is distributed to the complex K-th power calculator 163, the complex square calculator 164 and the complex m-th power calculator for each order.

In addition, in the above described example, the case is shown wherein the complex K-th power calculator 163, the complex square calculator 164 and the complex m-th power calculator for each order are, respectively, provided. However, a shared circuit may be achieved by sequentially outputting each value raised to a power of the I and Q axis components to, for example, the circuit of next higher order. Or, other sharing methods may be used.

Embodiment 3

Figure 15:
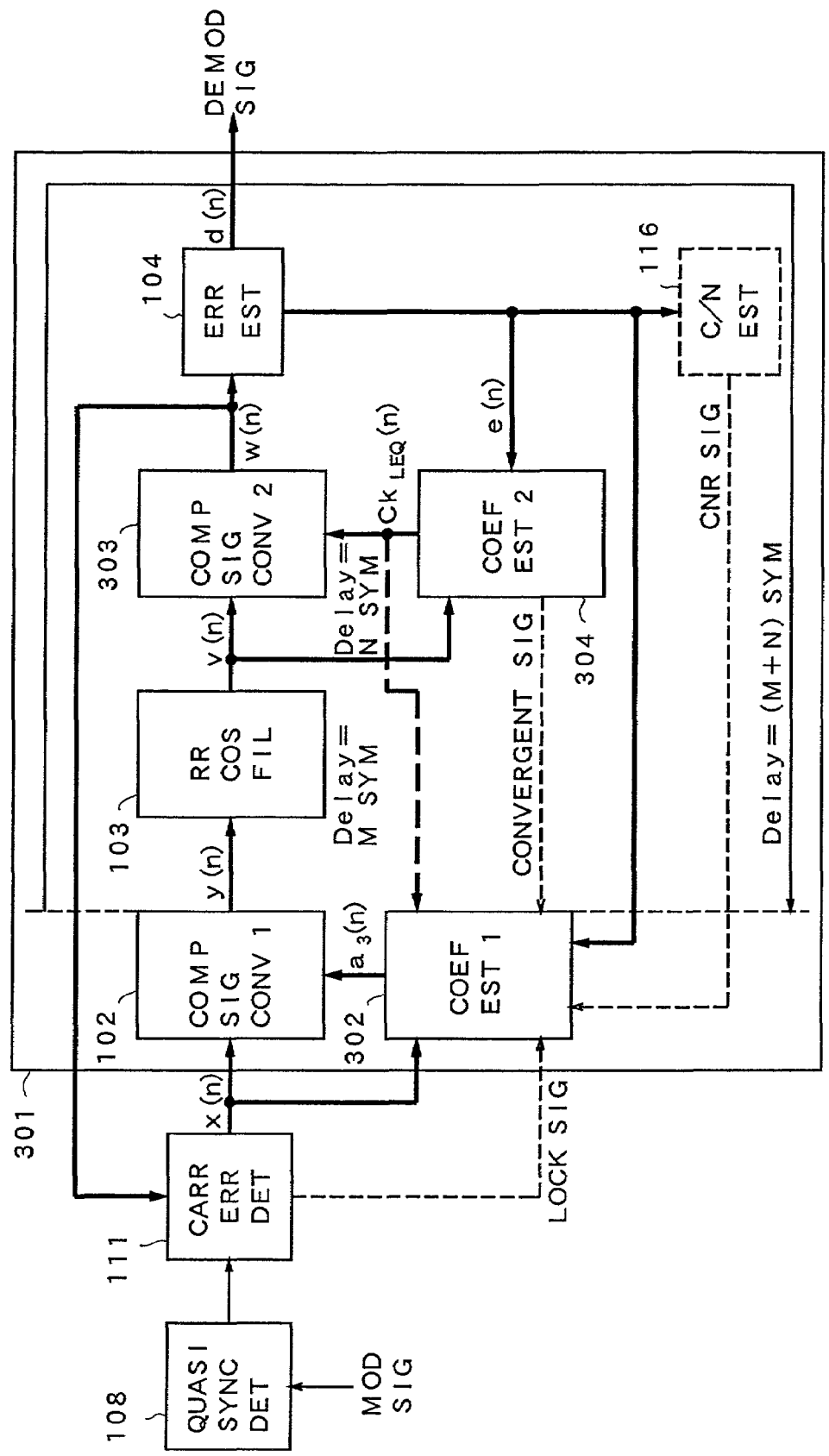
FIG. 15 is a block diagram showing the entire configuration of a front end processor for a data receiver according to Embodiment 3 of the present invention.

Next, a front end processor for data receiver according to Embodiment 3 of the present invention is described in reference to the figures. FIG. 15 is a block diagram showing the configuration of a front end processor 300 for data receiver according to the present embodiment. The front end processor 300 for data receiver is formed to include a quasi-synchronized detector 108, a carrier recovery circuit 111 and a nonlinear distortion equalizer 301. The nonlinear distortion equalizer 301 differs from the nonlinear distortion equalizer 101 of Embodiment 1 in the configuration of the coefficient estimator 302 for nonlinear distortion equalization. In the nonlinear distortion equalizer 301, a complex signal converter 303 for linear distortion equalization and a coefficient estimator 304 for linear distortion equalization are added to the rear stage of the root raised cosine filter 103. The complex signal converter 303 for linear distortion equalization is described in the abbreviation form "COMP SIG CONV 2" in the drawings. The coefficient estimator 304 for linear distortion equalization is described in the abbreviation form "COEF EST 2" in the drawings. The quasi-synchronized detector 108 and the carrier recovery circuit ill are the same as those shown in FIG. 3. In addition, each of the other blocks in the nonlinear distortion equalizer 301 is the same as each block in the nonlinear distortion equalizer 101 of FIG. 3.

The quasi-synchronized detector 108 detects I axis and Q axis data from a modulation signal received by an antenna, not shown, in the same manner as in Embodiment 1. Then, the carrier recovery circuit 111 removes the phase error $e^{-jP(n)}$ of the detected output and generates a signal x(n) of which the phase synchronization is established, which is then outputted to the nonlinear distortion equalizer 301.

The operation of the nonlinear distortion equalizer 301 that is formed in such a manner is described. The complex signal converter 102 for nonlinear distortion equalization uses a coefficient $a_3(n)$ for third order distortion equalization that is generated in the coefficient estimator 302 for nonlinear distortion equalization so as to remove the third order distortion that is included in the signal x(n) in the same manner as in Embodiment 1. Then, the root raised cosine filter 103 allows only the signal in the Nyquist band width to pass through and outputs a band limitation signal v(n). The complex signal converter 303 for linear distortion equalization uses each tap coefficient $Ck_{LEQ}(n)$ that is generated in the coefficient estimator 304 for linear distortion equalization so as to remove linear distortion that is included in the signal v(n) and outputs a signal w(n).

The error estimator 104 calculates an error signal e(n) in the same manner as in Embodiment 1 and outputs the mapping point d(n) that is the closest to this signal w(n) to an error correction part, not shown, as a demodulation signal. Here, in the case that the error correction part carries out a soft decision decoding, the nonlinear distortion equalizer 301 outputs the input w(n) of the error estimator 104 to the error correction part as a demodulation signal. The coefficient estimator 304 for linear distortion equalization uses the error signal e(n) and the signal v(n) so as to update the $Ck_{LEQ}(n)$ according to the LMS algorithm. In addition, the coefficient estimator 302 for nonlinear distortion equalization uses the error signal e(n) and the signal x(n) so as to update the coefficient $a_3(n)$ according to the LMS algorithm.

Figure 16:
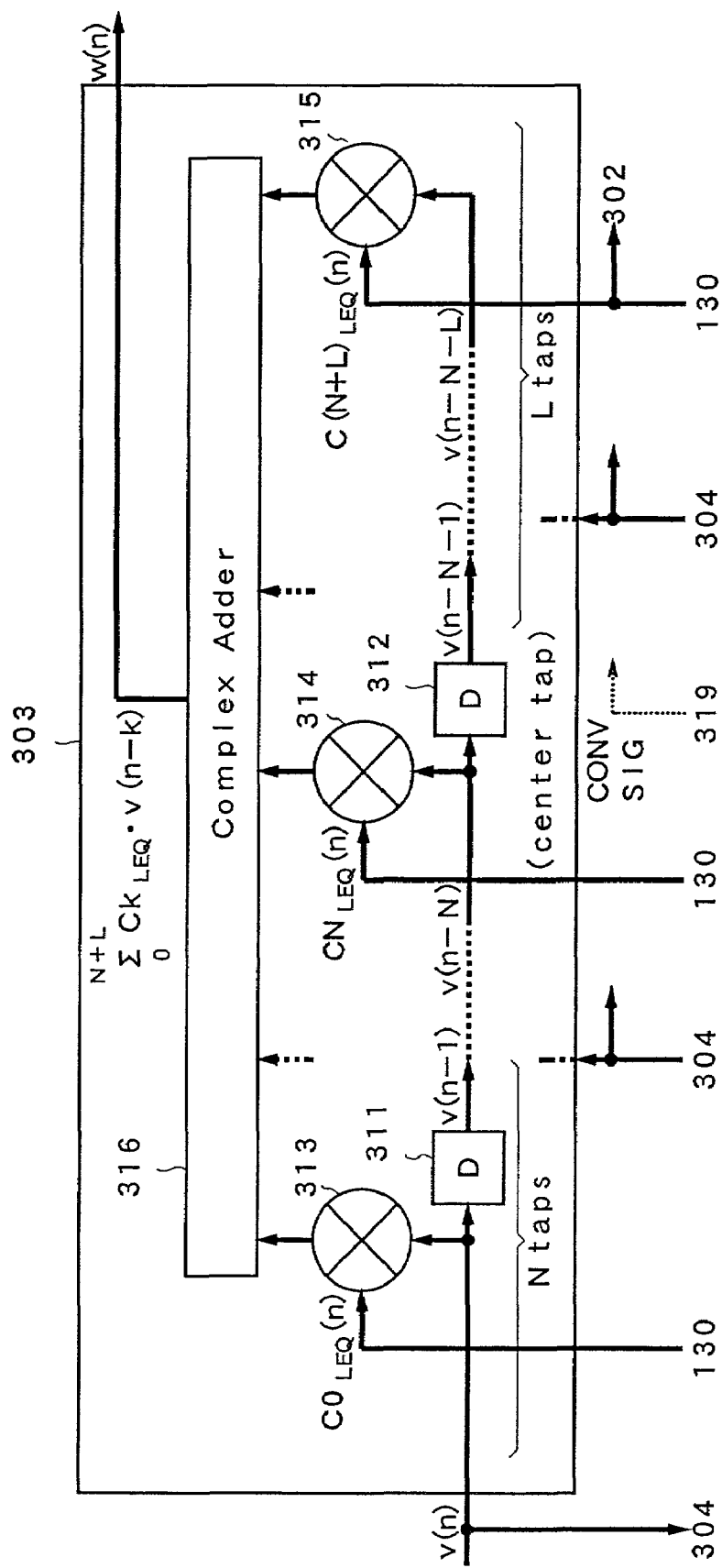
FIG. 16 is a block diagram showing a configuration of a complex signal converter for linear distortion equalization according to Embodiment 3.
Figure 17:
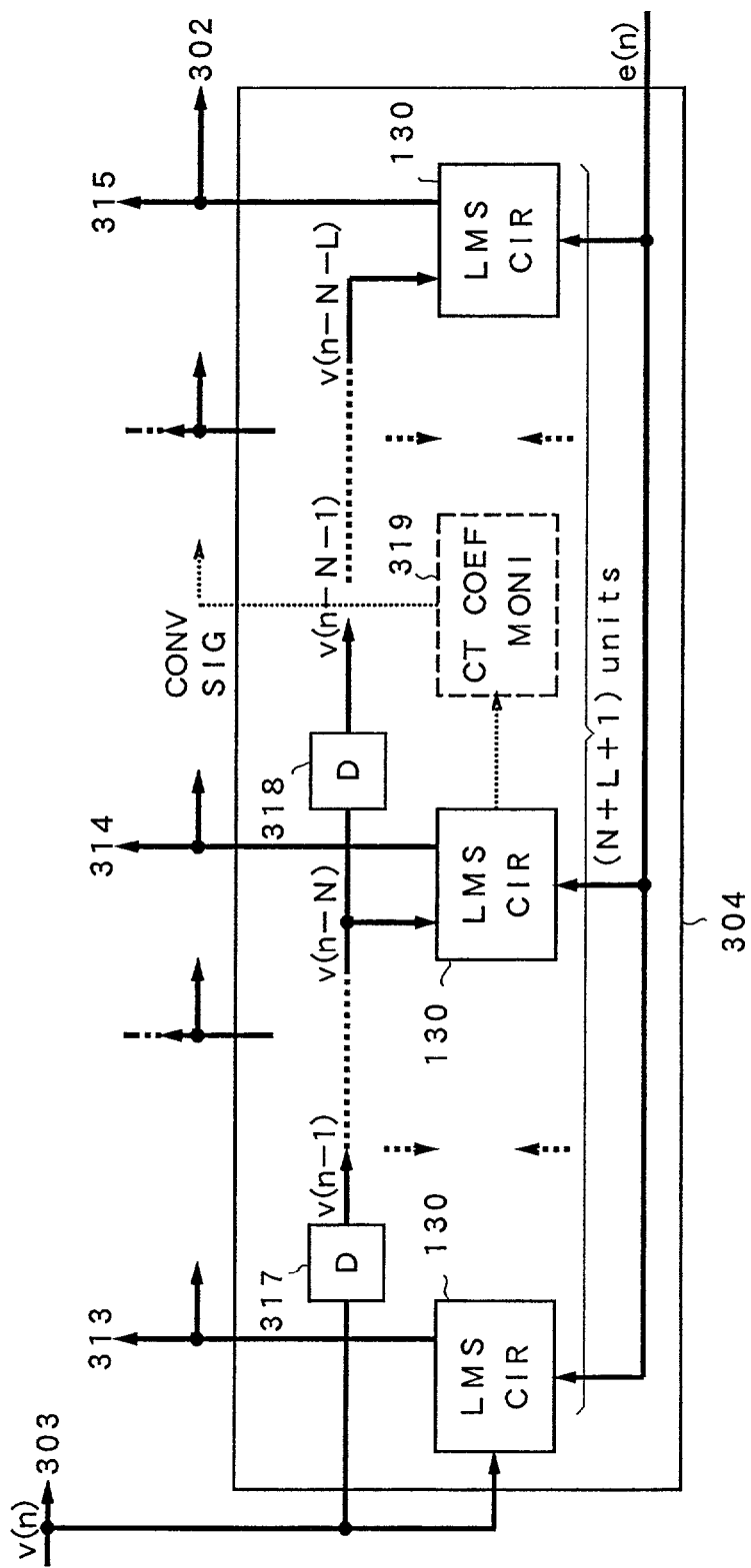
FIG. 17 is a block diagram showing a configuration of a coefficient estimator for linear distortion equalization according to Embodiment 3.

The configuration of the complex signal converter 303 for linear distortion equalization is shown in FIG. 16. In addition, the configuration of the coefficient estimator 304 for linear distortion equalization is shown in FIG. 17. The complex signal converter 303 for linear distortion equalization has delay elements 311 and 312, complex multipliers 313, 314 and 315 and a complex adder 316. In addition, the coefficient estimator 304 for linear distortion equalization of FIG. 17 has delay elements 317 and 318 and (N+L+1) LMS circuits 130.

Here, as shown in FIG. 16, N taps are provided for preceding ghost equalization and L taps are provided for delayed ghost equalization. Accordingly, the complex signal converter 303 for linear distortion equalization and the coefficient estimator 304 for linear distortion equalization have (N+L) delay elements in total, respectively. In addition, the complex signal converter 303 for linear distortion equalization has (N+L+1) complex multipliers in total. Then, the amount of delay becomes N symbols up to the center tap. Here, the delay elements, of which the total sum is (N+L), that are required for the complex signal converter 303 for linear distortion equalization and for the coefficient estimator 304 for linear distortion equalization may be shared.

In FIG. 16, when the band limitation signal v(n) is inputted, the complex signal converter 303 for linear distortion equalization shifts the signal v(n) by one symbol by using (N+L) delay elements. The complex multipliers of which the total sum is (N+L+1), carries out a complex multiplication of each tap coefficient $Ck_{LEQ}(n)$ that is generated in the coefficient estimator 304 for linear distortion equalization by the tap input v(n−k). The complex adder 316 carries out a complex addition of each multiplication result so as to output the signal w(n) that is gained by removing a ghost from the signal v(n). Therefore, the signal w(n) is represented by the following equation. Here, the initial value $Ck_{LEQ}(0)=0$.

$$W(n)=\Sigma Ck_{LEQ}(n)v(n-k) \quad \text{equation (3-1)}$$

In FIG. 17, when the band limitation signal v(n) is inputted, the coefficient estimator 304 for linear distortion equalization shifts the signal v(n) by one symbol by using (N+L) delay elements. The LMS circuits 130, of which the total sum is (N+L+1), use the error signal e(n) and the tap input v(n−k) so as to generate each tap coefficient $Ck_{LEQ}(n)$ according to the LMS algorithm, which is outputted to the complex signal converter 303 for linear distortion equalization. Here, when the step size parameter is λ, the $Ck_{LEQ}(n)$ is represented in the following equation.

$$Ck_{LEQ}(n+1)=Ck_{LEQ}(n)+\lambda e(n)v(n)^* \quad \text{equation (3-2)}$$

Figure 18:
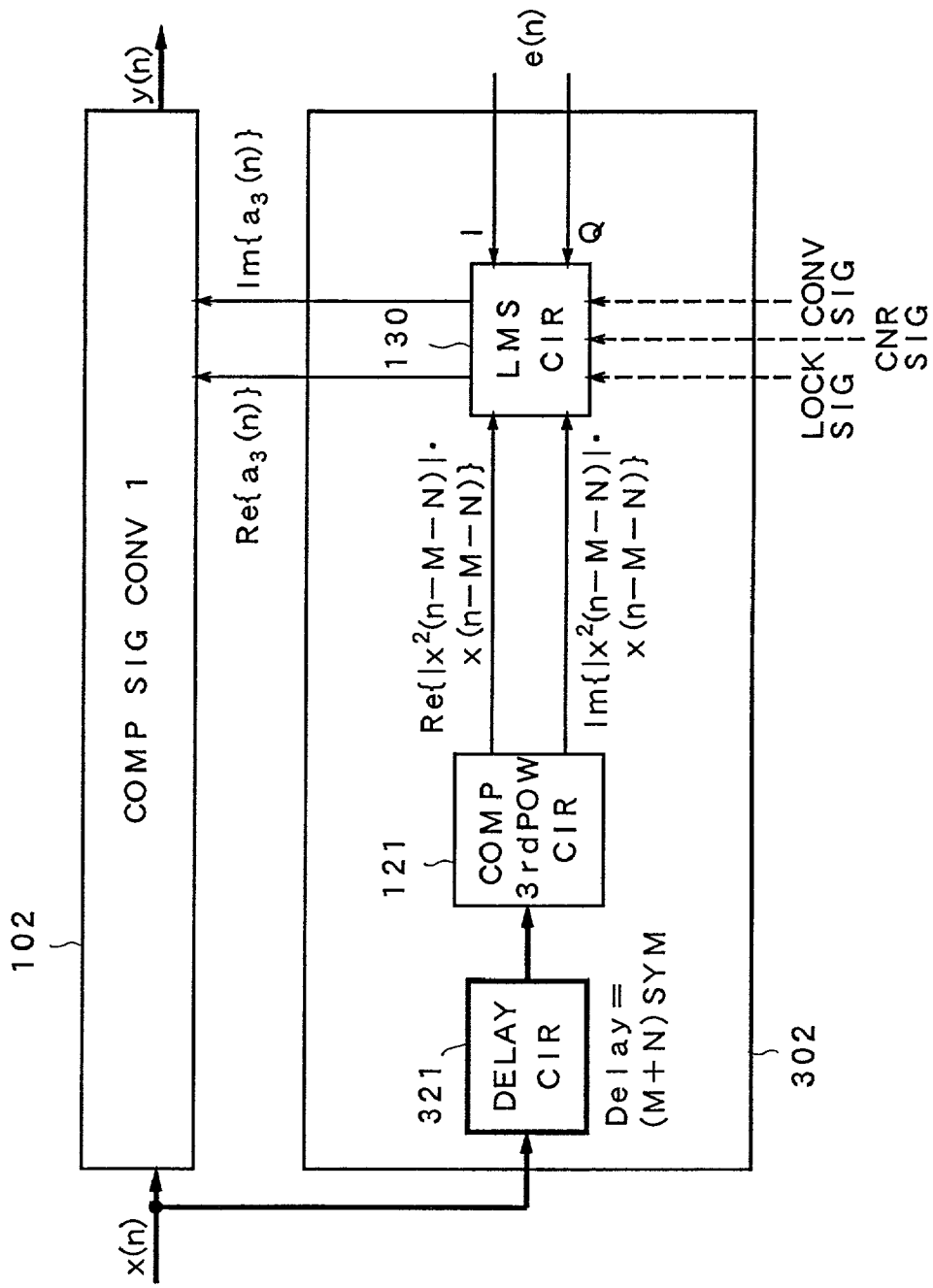
FIG. 18 is a block diagram showing a configuration of a coefficient estimator for nonlinear distortion equalization according to Embodiment 3.

The configuration of the coefficient estimator 302 for nonlinear distortion equalization is shown in FIG. 18. This coefficient estimator 302 for nonlinear distortion equalization can be gained by replacing the delay element 129 for the delay element 321 in the coefficient estimator 105 for nonlinear distortion equalization of Embodiment 1. Each of the other blocks is the same as in FIG. 5. Here, as shown in FIG. 15, the amount of delay of the root raised cosine filter 103 is M symbols and the amount of delay of the complex signal converter 303 for linear distortion equalization is N symbols while the amount of delay of the error estimator 104 is 0. The delay element 321 carries out a delay adjustment of (M+N) symbols until the error signal e(n) is calculated from the signal y(n).

When the signal x(n), of which the phase synchronization is established, is inputted to the coefficient estimator 302 for nonlinear distortion equalization, the delay element 321 generates a delay of (M+N) symbols. Then, the complex cube calculator 121 converts the signal x(n) into $|x^2(n-M-N)|x(n-M-N)$ so that the conversion result is outputted as the cubed value $x^3(n-M-N)$. The LMS circuit 130 uses the cubed value $x^3(n-M-N)$ and the error signal e(n) so as to generate a coefficient $a_3(n)$ for third order distortion equalization according to the LMS algorithm, which is outputted to the complex signal converter 102 for nonlinear distortion equalization.

The coefficient update algorithm of the coefficient estimator 302 for nonlinear distortion equalization is represented by equation (1-8). On the other hand, the coefficient $a_3(n)$ is represented in the following equation from FIG. 18.

$$a_3(n)=a_3(n-1)+ue(n-M-N)[|x^2(n-M-N)|x(n-M-N)]^* \quad \text{equation (3-3)}$$

The signal w(n) is gained by delaying the signal x(n) by (M+N) symbols. Here, the error signal e(n) is generated from the signal w(n) and, therefore, the delay of the coefficient update equation is adjusted according to $[|x^2(n-M-N)|x(n-M-N)]^*(=[x^3(n-M-N)]^*)$ in equation (3-3).

The error signal is represented as e(n−M−N) by taking the (M+N) symbol delay into consideration. In addition, the coefficient $a_3(n)$ is delayed by one symbol in comparison with the error signal e(n) and the signal x(n) in equation (3-3). In the LMS algorithm, however, the convergence speed of the coefficient update is relatively slow and, therefore, these delays do not, in practice, present an obstacle. According to the above described operation, the linear distortion is compensated for and nonlinear distortion in the complex signal can be compensated for.

Here, in the present embodiment, the output y(n) of the complex signal converter 102 for nonlinear distortion equalization passes through the root raised cosine filter 103. By taking this into consideration, nonlinear distortion in the complex signal may be compensated for with a higher precision.

Figure 19:
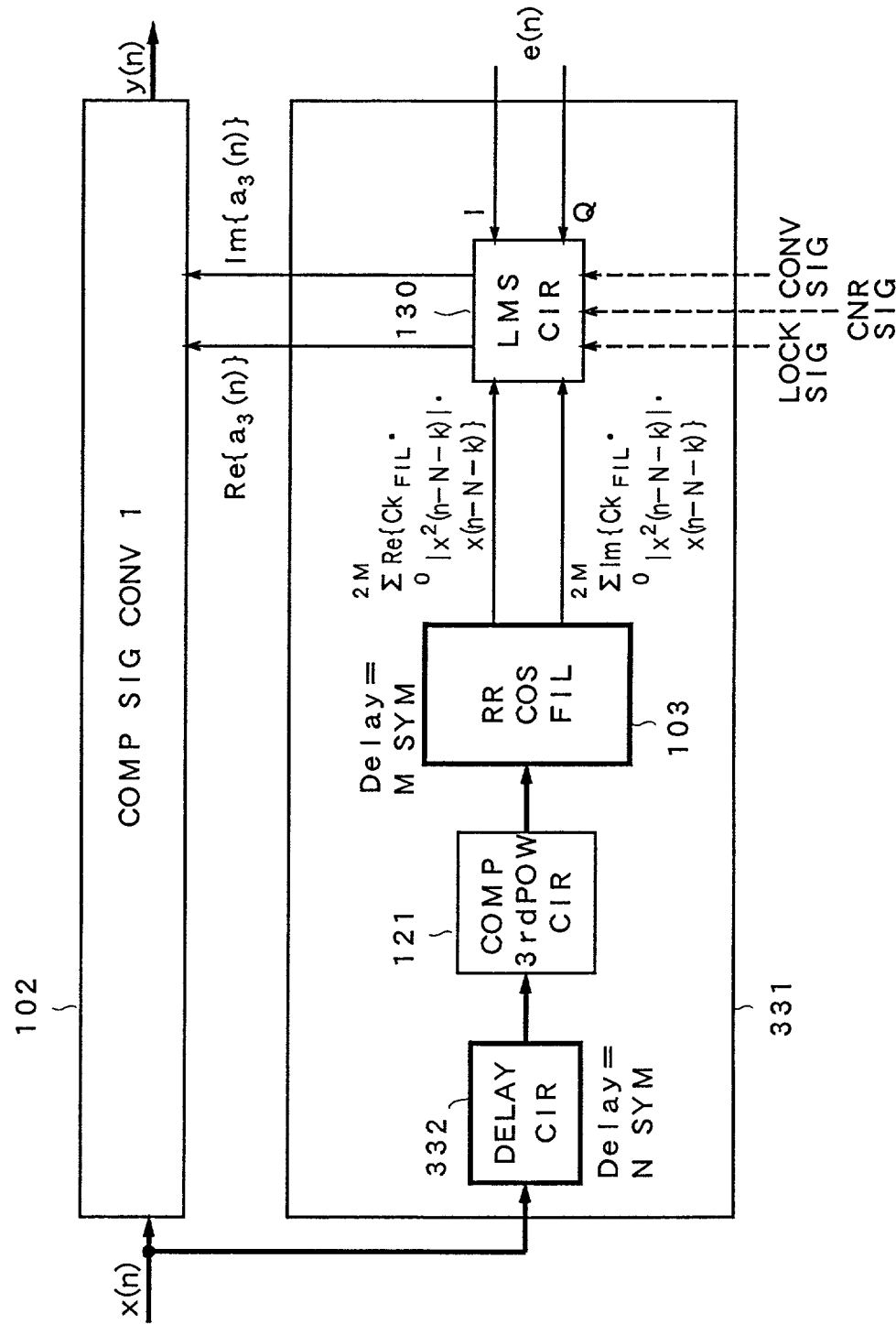
FIG. 19 is a block diagram of another example showing a configuration of the coefficient estimator for nonlinear distortion equalization according to Embodiment 3.

The configuration of the coefficient estimator 331 for nonlinear distortion equalization in the case that the passage through the root raised cosine filter 103 is taken into consideration is shown in FIG. 19. This coefficient estimator 331 for nonlinear distortion equalization is characterized in that the delay element 321 is replaced with a delay element 332 and a root raised cosine filter 103 is provided at the rear stage of the complex cube calculator 121 in the coefficient estimator 302 for nonlinear distortion equalization of FIG. 18. The LMS circuit 130 at the rear stage is the same as that shown in FIG. 18.

In FIG. 19, when the signal x(n), of which the phase synchronization is established, is inputted into the coefficient estimator 331 for nonlinear distortion equalization, the delay element 332 delays the signal x(n) by N symbols. Then, the complex cube calculator 121 converts the output of the delay element 332 into $|x^2(n-N)|x(n-N)$ and outputs the conversion result as the cubed value $x^3(n-N)$. Then, the root raised cosine filter 103 carries out a band limitation so as to generate $\Sigma Ck_{FIL}|x^2(n-N-k)|x(n-N-k)$, which is outputted to the LMS circuit 130. Here, $Ck_{FIL}$ is each coefficient of the root raised cosine filter 103. Since the amount of delay of the coefficient in the root raised cosine filter 103 is M symbols, the delay element 321 is replaced with the delay element 332 and the amount of delay up to the output of the root raised cosine filter 103 is made to be (M+N) symbols in total.

The LMS circuit 130 uses the output of the root raised cosine filter 103 and the error signal e(n) so as to update the coefficient $a_3(n)$ for third order distortion equalization according to the LMS algorithm, which is then outputted to the complex signal converter 102 for nonlinear distortion equalization. Accordingly, the coefficient $a_3(n)$ is represented in equation (1-10). According to such an operation, nonlinear distortion in the complex signal can be compensated for with a high precision.

Figure 20:
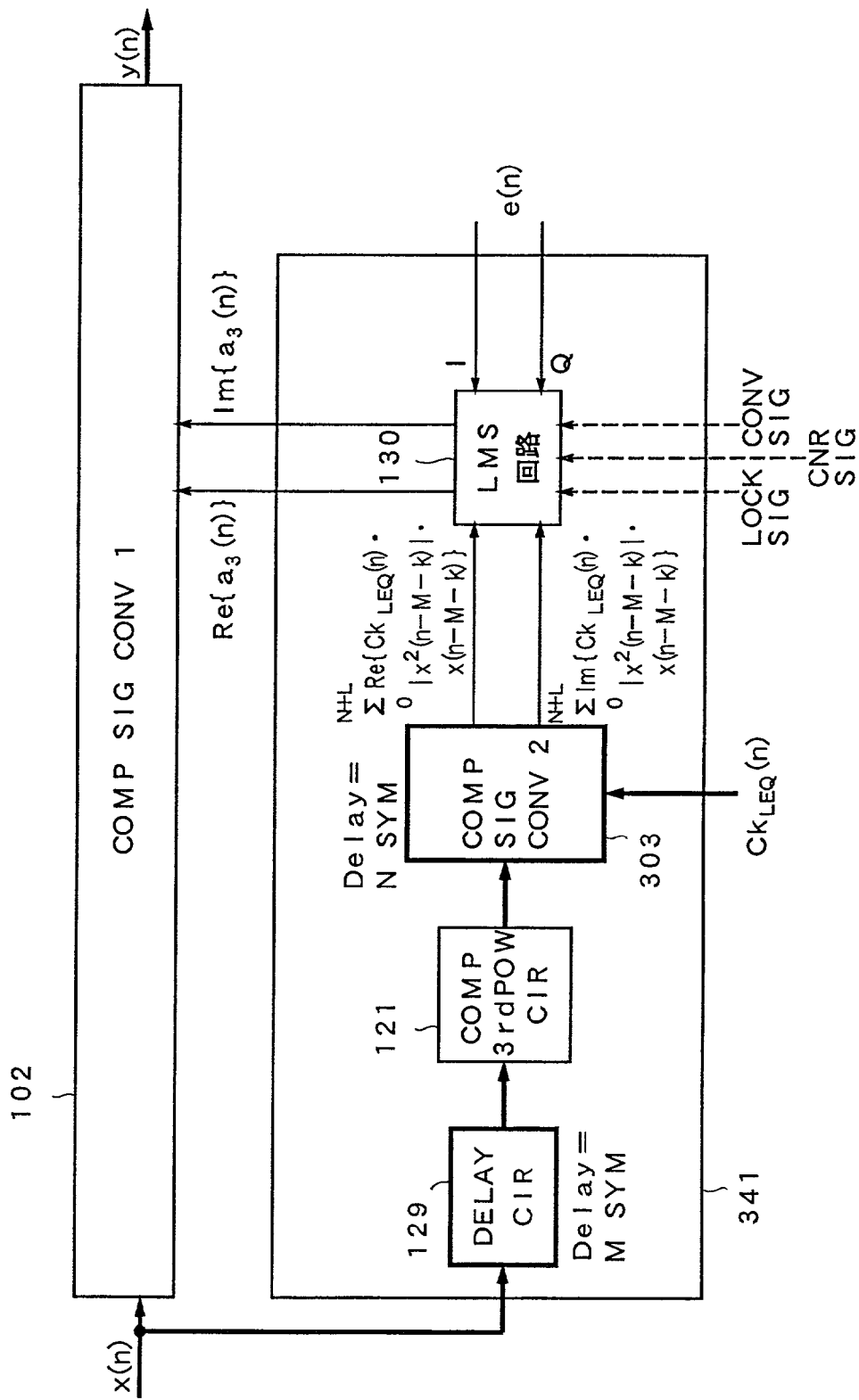
FIG. 20 is a block diagram of another example showing a configuration of the coefficient estimator for nonlinear distortion equalization according to Embodiment 3.

In addition, by taking into consideration that the output y(n) of the complex signal converter 102 for nonlinear distortion equalization passes through the complex signal converter 303 for linear distortion equalization, nonlinear distortion in the complex signal may be compensated for with a higher precision. The configuration of the coefficient estimator 341 for nonlinear distortion equalization in the case that the passage of the output y(n) through the complex signal converter 303 for linear distortion equalization is taken into consideration is shown in FIG. 20.

The coefficient estimator 341 for nonlinear distortion equalization is characterized in that the delay element 321 is replaced with the delay element 129 and a complex signal converter 303 for linear distortion equalization is provided at the rear stage of the complex cube calculator 121 in the coefficient estimator 302 for nonlinear distortion equalization of FIG. 18. The LMS circuit 130 at that rear stage is the same as that of the case of FIG. 18.

When the signal x(n), of which the phase synchronization is established, is inputted into the coefficient estimator 341 for nonlinear distortion equalization, the delay element 129 delays the signal x(n) by M symbols. Then, the complex cube calculator 121 converts the output of the delay element 129 into $|x^2(n-N)|x(n-N)$ and outputs the conversion result as the cubed value $x^3(n-N)$. The complex signal converter 303 for linear distortion equalization converts this output $x^3(n-N)$ into $\Sigma Ck_{LEQ}(n)|x^2(n-N-k)|x(n-N-k)$, which is outputted to the LMS circuit 130.

Since the amount of delay of the complex signal converter 303 for linear distortion equalization is N symbols, the delay element 321 is replaced with the delay element 129 so that the amount of delay up to the output of the complex signal converter 303 for linear distortion equalization becomes (M+N) symbols in total. The LMS circuit 130 uses the output signal of the complex signal converter 303 for linear distortion equalization and the error signal e(n) so as to update the coefficient $a_3(n)$ for third order distortion equalization according to the LMS algorithm, which is outputted to the complex signal converter 102 for nonlinear distortion equalization. In this case, the relationship between the coefficient $a_3(n)$ and $a_3(n+1)$ is represented in the following equation.

$$a_3(n+1)=a_3(n)+ue(n)[\Sigma Ck_{LEQ}(n)x^3(n-k)]^* \qquad \text{equation (3-4)}$$

According to such an operation, nonlinear distortion in the complex signal can be compensated for with a higher precision. In addition, the output y(n) of the complex signal converter 102 for nonlinear distortion equalization passes through both the root raised cosine filter 103 and the complex signal converter 303 for linear distortion equalization. By taking this into consideration, nonlinear distortion in the complex signal may be compensated for with a higher precision.

Figure 21:
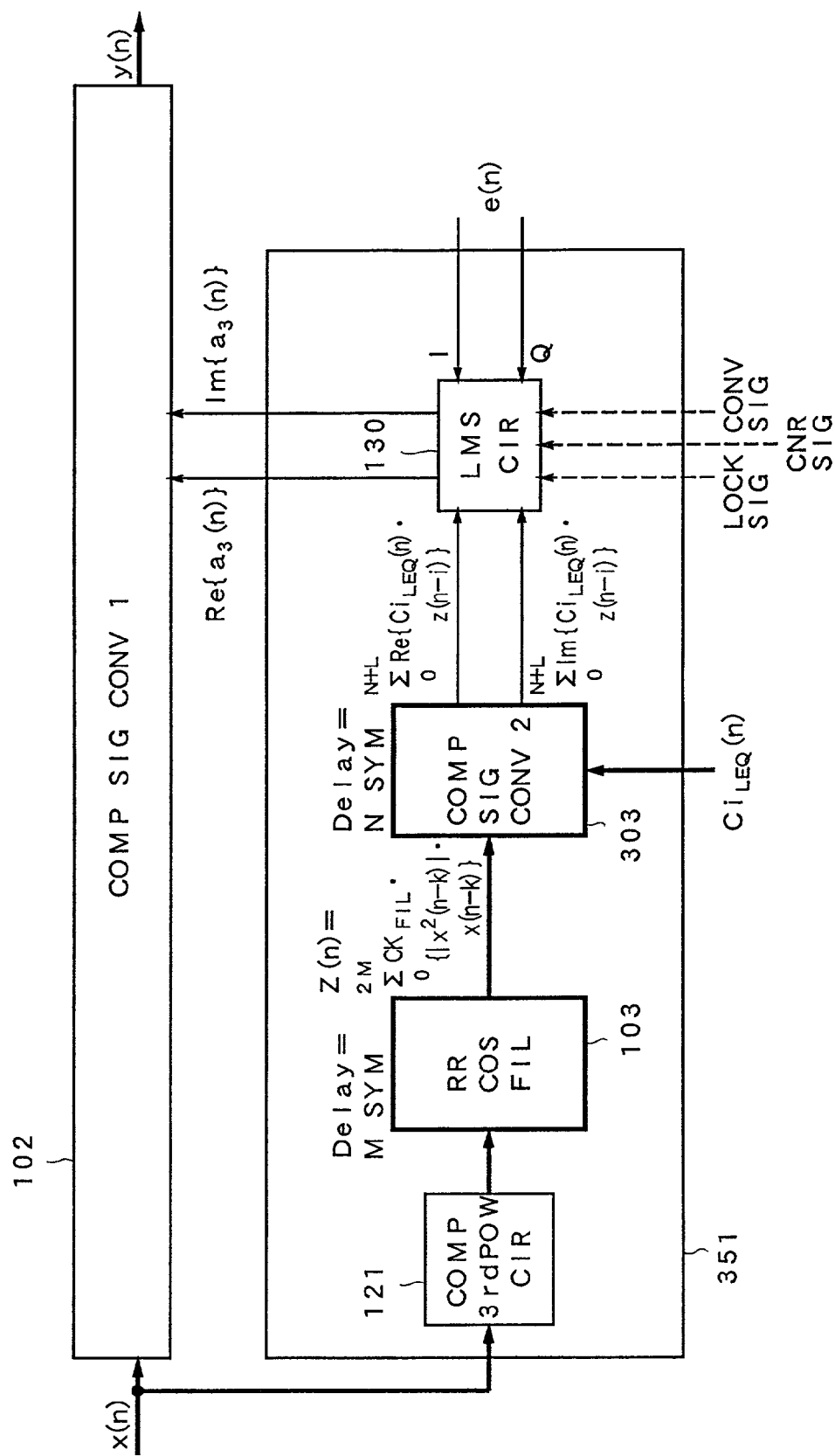
FIG. 21 is a block diagram of another example showing a configuration of the coefficient estimator for nonlinear distortion equalization according to Embodiment 3.

The configuration of the coefficient estimator 351 for nonlinear distortion equalization in the case that the passage of the output y(n) through both the root raised cosine filter 103 and the complex signal converter 303 for linear distortion equalization is taken into consideration is shown in FIG. 21. The coefficient estimator 351 for nonlinear distortion equalization is characterized in that the delay element 321 is eliminated and the root raised cosine filter 103 and the complex signal converter 303 for linear distortion equalization are provided at the rear stage of the complex cube calculator 121 in the coefficient estimator 302 for nonlinear distortion equalization of FIG. 18. The LMS circuit 130 at that rear stage is the same as that of the case of FIG. 18.

In FIG. 21, when the signal x(n), of which the phase synchronization is established, is inputted into the coefficient estimator 351 for nonlinear distortion equalization, the complex cube calculator 121 converts the signal x(n) into $|x^2(n)|x(n)$ and outputs the conversion result as the cubed value $x^3(n)$. Then, the root raised cosine filter 103 carries out a band limitation of the cubed value $x^3(n)$ so as to generate $z(n)=\Sigma Ck_{FIL}|x^2(n-k)|x(n-k)$, which is outputted to the complex signal converter 303 for linear distortion equalization. The complex signal converter 303 for linear distortion equalization transforms the output of the root raised cosine filter 103 and outputs the $\Sigma Ci_{LEQ}(n)z(n-i)$ to the LMS circuit 130.

Here, the amount of delay of the root raised cosine filter 103 is M symbols and the amount of delay of the complex signal converter 303 for linear distortion equalization is N symbols. Therefore, the delay element 321 is eliminated so that the amount of delay up to the output of the complex signal converter 303 for linear distortion equalization becomes (M+N) symbols in total. The LMS circuit 130 uses the output signal of the complex signal converter 303 for linear distortion equalization and the error signal e(n) so as to update the coefficient $a_3(n)$ for third order distortion equalization according to the LMS algorithm, which is outputted to the complex signal converter 102 for nonlinear distortion equalization. In this case, the relationship between the coefficient $a_3(n)$ and the coefficient $a_3(n+1)$ is represented in the following equation.

$$a_3(n+1)=a_3(n)+ue(n)[\Sigma Ci_{LEQ}(n)z(n-i)]^* \qquad \text{equation (3-5)}$$

$$z(n)=\Sigma Ck_{FIL}x^3(n-k) \qquad \text{equation (3-6)}$$

According to such an operation nonlinear distortion in the complex signal can be compensated for with a higher precision.

In addition, the coefficient estimator 302 for nonlinear distortion equalization of FIG. 18, the coefficient estimator 331 for nonlinear distortion equalization of FIG. 19, the coefficient estimator 341 for nonlinear distortion equalization of FIG. 20 and the coefficient estimator 351 for nonlinear distortion equalization of FIG. 21, respectively, may start the coefficient update after the establishment of the phase synchronization. The low pass filter 113 in the carrier recovery circuit 111 monitors the filter output in FIG. 15 in the same manner as in Embodiment 1 and sets the lock signal at "H" when the phase synchronization is established in the case that the output is stable.

The coefficient estimator 302 for nonlinear distortion equalization of FIG. 18, the coefficient estimator 331 for nonlinear distortion equalization of FIG. 19, the coefficient estimator 341 for nonlinear distortion equalization of FIG. 20 and the coefficient estimator 351 for nonlinear distortion equalization of FIG. 21 set at $a_3(n)=0$ in the case that the lock signal is "L" in the same manner as in Embodiment 1 and the complex signal converter 102 for nonlinear distortion equalization outputs y(n)=x(n). In the case that the lock signal is "H," the coefficient estimator for nonlinear distortion equalization starts the coefficient update. Such an operation does not negatively affect the operation of the carrier recovery circuit 111 so that nonlinear distortion in the complex signal can be compensated for.

In addition, the coefficient estimator 302 for nonlinear distortion equalization of FIG. 18, the coefficient estimator 331 for nonlinear distortion equalization of FIG. 19, the coefficient estimator 341 for nonlinear distortion equalization of FIG. 20 and the coefficient estimator 351 for nonlinear distortion equalization of FIG. 21 may start the coefficient update after the convergence of the linear distortion equalization. As shown in FIG. 17, a center tap coefficient monitor (CT COE MON1) 319 is provided in the coefficient estimator 304 for nonlinear distortion equalization so that this circuit observes the center tap coefficient and sets the convergent signal at "H" when the linear distortion equalization is converged in the case that the coefficient is stable.

This convergent signal is inputted to the coefficient estimator 302 for nonlinear distortion equalization. In the coefficient estimator 302 for nonlinear distortion equalization of FIG. 18, the step size parameter controller 133 in the LMS circuit 130 sets the step size parameter u=0 and, thereby, $a_3(n)=0$ is set in the case that the convergent signal is "L." Then, the complex signal converter 102 for nonlinear distortion equalization outputs y(n)=x(n). In the case that the convergent signal is "H," the step size parameter controller 133 substitutes a predetermined value for the step size parameter u so as to start the coefficient update.

The coefficient estimator 331 for nonlinear distortion equalization of FIG. 19, the coefficient estimator 341 for nonlinear distortion equalization of FIG. 20 and the coefficient estimator 351 for nonlinear distortion equalization of FIG. 21 are operated in the same manner. According to the above described operation the convergence operation of the linear distortion equalization is not negatively affected and linear distortion in the complex signal can be compensated for.

In addition, the coefficient estimator 302 for nonlinear distortion equalization of FIG. 18, the coefficient estimator 331 for nonlinear distortion equalization of FIG. 19, the coefficient estimator 341 for nonlinear distortion equalization of FIG. 20 and the coefficient estimator 351 for nonlinear distortion equalization of FIG. 21 may be set so as to carry out the coefficient update only at the time of high C/N. A C/N estimator 116 is provided in the nonlinear distortion equalizer 301 in FIG. in the same manner as in Embodiment 1 and the C/N estimator 116 calculates and averages the C/N so as to output the result as a CNR signal.

The coefficient estimator 302 for nonlinear distortion equalization of FIG. 18, the coefficient estimator 331 for nonlinear distortion equalization of FIG. 19, the coefficient estimator 341 for nonlinear distortion equalization of FIG. 20 and the coefficient estimator 351 for nonlinear distortion equalization of FIG. 21 sets $a_3(n)=0$ in the same manner as in Embodiment 1 in the case that the C/N shown by the CNR signal is smaller than the set threshold value. Then, the complex signal converter 102 for nonlinear distortion equalization outputs y(n)=x(n). In addition, in the case that the C/N shown by the CNR signal is no smaller than the set threshold value, the coefficient update is carried out. According to the above described operation, negative effects do not result at the time of low C/N so that nonlinear distortion in the complex signal can be compensated for.

Here, in the present embodiment only the dominant third order distortion that is nonlinear distortion as shown in equations (1-1) and (1-8) is removed. By using equation (1-11) in the same manner as in Embodiment 1, however, arbitrary high order nonlinear distortion of second order distortion, or higher, may be compensated for. The coefficient update equation of this case is gained by applying equation (1-12) with respect to the respective order as follows:

$$x^m(n)=|x^{m-1}(n)|x(n).$$

Figure 22:
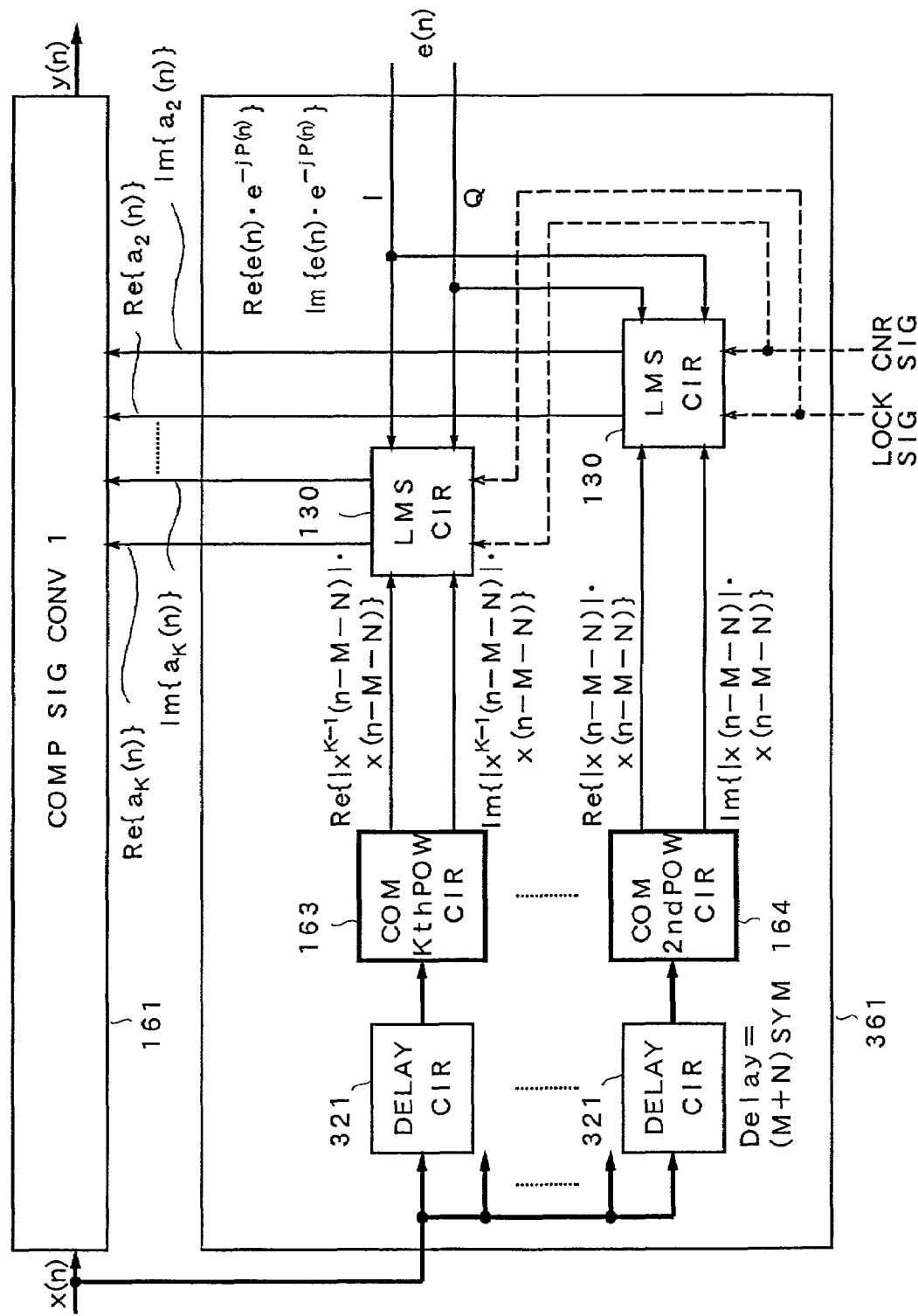
FIG. 22 is a block diagram of another example showing configurations of the complex signal converter for linear distortion equalization and the coefficient estimator for nonlinear distortion equalization according to Embodiment 3.

The configuration of coefficient estimator 361 for nonlinear distortion equalization that compensates for a high order nonlinear distortion no lower than second order distortion and no higher than K-th order distortion is shown in FIG. 22. Here, the complex signal converter 161 for nonlinear distortion equalization is the same as that in the case of Embodiment 1 shown in FIG. 9. A coefficient estimator 361 for nonlinear distortion equalization of FIG. 22 is gained by replacing the delay element 129 of each order in the coefficient estimator 162 for nonlinear distortion equalization shown in FIG. 10 with delay element 321.

The operation of the complex signal converter 361 for nonlinear distortion equalization is the same as that of Embodiment 1 except that when the signal x(n) of which the phase synchronization is established is inputted, the delay element 321 of each order delays the signal by (M+N) symbols. In addition, the complex signal converter 161 for nonlinear distortion equalization outputs the y(n) shown in equation (1-11) in the same manner as described in Embodiment 1. According to the above described operation, arbitrary high order nonlinear distortion of second order distortion, or higher, can be compensated for.

The output y(n) of the complex signal converter 161 for nonlinear distortion equalization passes through the root raised cosine filter 103. By taking this into consideration, in the case that nonlinear distortion in the complex signal is compensated for with a higher precision, arbitrary high order nonlinear distortion of second order distortion, or higher, can be compensated for. In this case, the delay element 321 of each order is replaced with the delay element 332 and a complex K-th power calculator 163 and a complex square calculator 164 are provided and, additionally, a root raised cosine filter 103 is provided at the rear stage of the complex m-th power calculator of each order in the coefficient estimator 361 for nonlinear distortion equalization.

The output y(n) of the complex signal converter 161 for nonlinear distortion equalization passes through the complex signal converter 303 for linear distortion equalization. By taking this into consideration, in the case that nonlinear distortion in the complex signal is compensated for with a higher precision, arbitrary high order nonlinear distortion of second order distortion, or higher, can be compensated for in the same manner. In this case, the delay element 321 of each order is replaced with the delay element 129 and a complex K-th power calculator 163 and a complex square calculator 164 are provided and, additionally, a complex signal converter 303 for linear distortion equalization is provided at the rear stage of the complex m-th power calculator of each order in the coefficient estimator 361 for nonlinear distortion equalization.

The output y(n) of the complex signal converter 161 for nonlinear distortion equalization passes through both the root raised cosine filter 103 and the complex signal converter 303 for linear distortion equalization. By taking this into consideration, in the case that nonlinear distortion in the complex signal is compensated for with a higher precision, arbitrary high order nonlinear distortion of second order distortion, or higher, can be compensated for in the same manner. In this case, the delay element 321 of each order is eliminated and additionally, a root raised cosine filter 103 and a complex signal converter 303 for linear distortion equalization are provided at the rear stage of the complex K-th power calculator 163 and the complex square calculator 164 and, the complex m-th power calculator of each order in the coefficient estimator 361 for nonlinear distortion equalization.

Here, though in the above described example a case is shown wherein a delay element is provided for each order, a configuration may be used wherein one delay element is shared and the output signal is distributed to the complex K-th power calculator 163, to the complex square calculator 164 and to the complex m-th power calculator of each order.

In addition, in the above described example a case is shown wherein the complex K-th power calculator 163, the complex square calculator 164 and the complex m-th power calculator of each order are, respectively, provided. However, the sharing of the circuit can be achieved by sequentially outputting, for example, the powers of the I and Q axis components to the next circuit of higher order. In addition, other sharing methods may be used.

Embodiment 4

Figure 23:
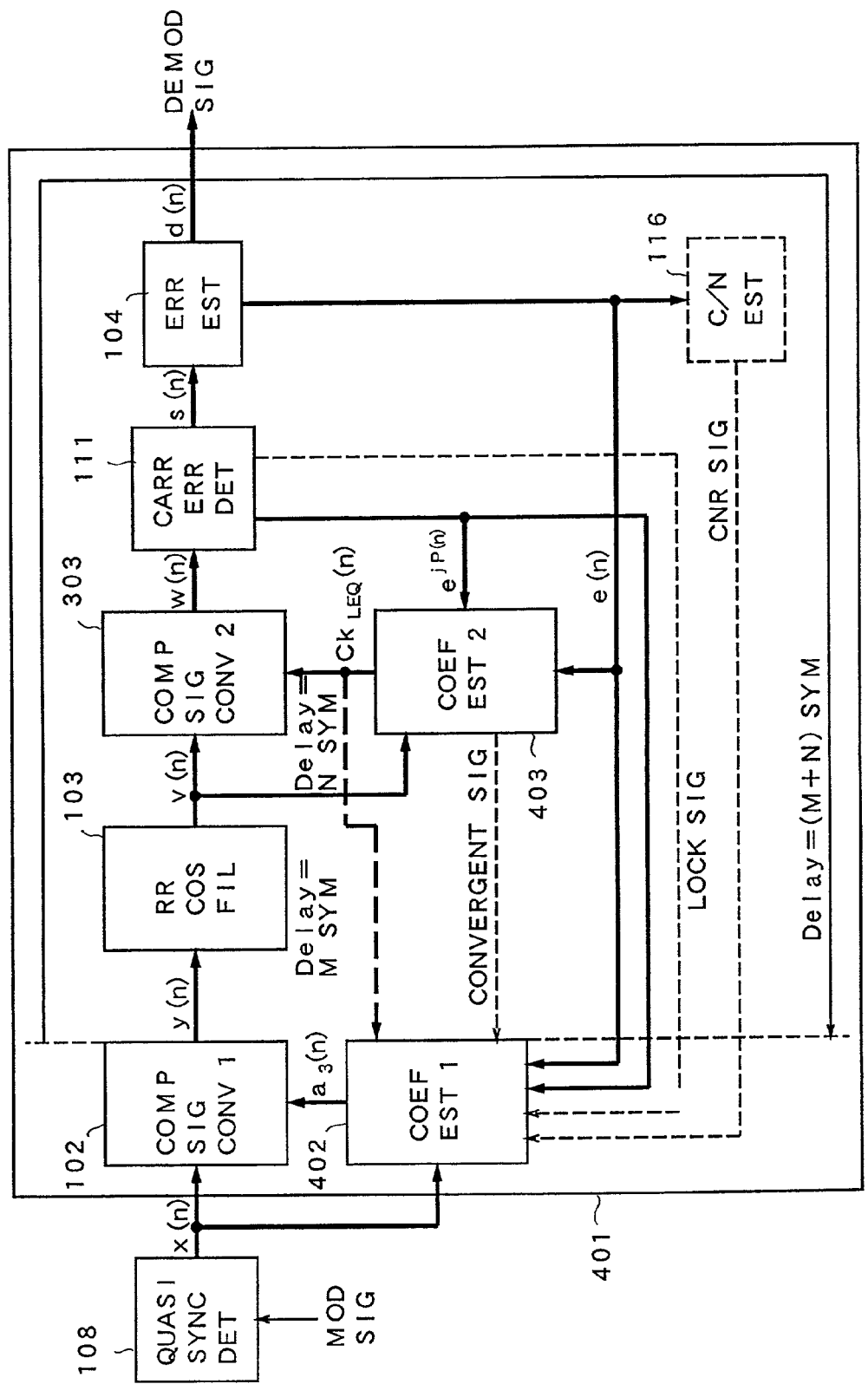
FIG. 23 is a block diagram showing the entire configuration of a front end processor for a data receiver according to Embodiment 4 of the present invention.

Next, a front end processor for data receiver in Embodiment 4 of the present invention is described in reference to the figures. FIG. 23 is a block diagram showing the configuration of a front end processor 400 for data receiver in the present embodiment. The front end processor 400 for data receiver is formed to include a quasi-synchronized detector 108 and a nonlinear distortion equalizer 401. The nonlinear distortion equalizer 401 is gained by changing the configurations of the coefficient estimator 302 for nonlinear distortion equalization and the coefficient estimator 304 for linear distortion equalization in the nonlinear distortion equalizer 301 of Embodiment 3, which is characterized in that the carrier recovery circuit 111 of the front stage of the nonlinear distortion equalizer 301 is provided at the rear stage of the complex signal converter 303 for linear distortion equalization in the nonlinear distortion equalizer 401. The quasi-synchronized detector 108 is the same as that shown in FIG. 15 and each of the other blocks in the nonlinear distortion equalizer 401 is the same as each block in the nonlinear distortion equalizer 301 of FIG. 15.

The synchronized detector 108 detects the quasi I axis and Q axis data for the modulation signal received by an antenna, not shown, in the same manner as in Embodiment 1 so as to give the detected output x(n) to the nonlinear distortion equalizer 401.

The operation of the nonlinear distortion equalizer 401 is herein described. By using the coefficient $a_3(n)$ for third order distortion equalization generated in the coefficient estimator 402 for nonlinear distortion equalization, the complex signal converter 102 for nonlinear distortion equalization removes third order distortion that is included in the nonlinear signal x(n) in the same manner as in Embodiment 1. Then, the root raised cosine filter 103 allows only the signal in the Nyquist band width to pass through and outputs the band limitation signal v(n). In the same manner as in Embodiment 3, the complex signal converter 303 for linear distortion equalization uses each tap coefficient $Ck_{LEQ}(n)$ that is generated in the coefficient estimator 403 for linear distortion equalization so as to output the signal w(n), from which linear distortion included in the signal v(n) is removed.

The carrier recovery circuit 111 removes the phase error $e^{-jP(n)}$ of the w(n) and outputs the signal s(n), of which the phase synchronization is established, to the error estimator 104. The error estimator 104 calculates an error between the signal s(n) and the closest mapping point d(n) and outputs the mapping point d(n) to an error correction part, not shown, as a demodulation signal. Here, in the case that the error correction part carries out a soft decision decoding, the nonlinear distortion equalizer 401 outputs the input s(n) of the error estimator 104 to the error correction part as a demodulation signal. The coefficient estimator 402 for nonlinear distortion equalization uses the error signal e(n), the phase rotation signal $e^{jP(n)}$ generated in the carrier recovery circuit 111 and the x(n) so as to update the coefficient $a_3(n)$ according to the LMS algorithm. Furthermore, the coefficient estimator 403 for linear distortion equalization uses the error signal e(n), the phase signal $e^{jP(n)}$ and the signal v(n) so as to update $Ck_{LEQ}(n)$ according to the LMS algorithm.

Figure 24:
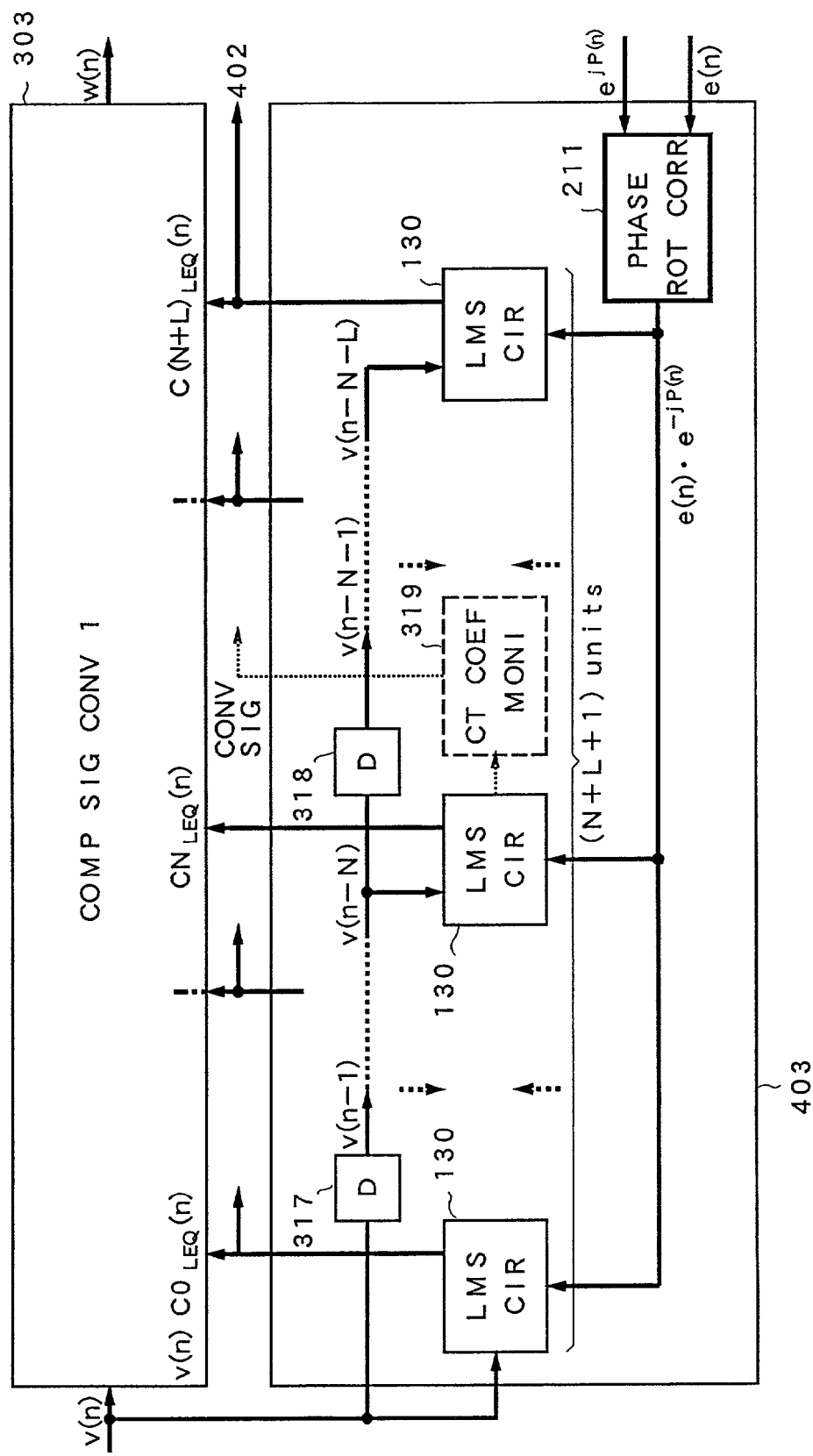
FIG. 24 is a block diagram showing configurations of a complex signal converter for linear distortion equalization and a coefficient estimator for linear distortion equalization according to Embodiment 4.

The configuration of the coefficient estimator 403 for linear distortion equalization is shown in FIG. 24. This coefficient estimator 403 for linear distortion equalization is characterized in that a phase rotation corrector 211 is provided in the coefficient estimator 304 for linear distortion equalization of Embodiment 3. Each of the other blocks in the coefficient estimator 403 for linear distortion equalization is the same as each block in the coefficient estimator 304 for linear distortion equalization of FIG. 17. Here, the delay elements provided in the complex signal converter 303 for linear distortion equalization and the coefficient estimator 403 for linear distortion equalization, respectively, of which the total number is (N+L), may be shared.

When the band limitation signal v(n) is inputted in FIG. 24, the coefficient estimator 403 for linear distortion equalization uses the (N+L) delay elements in the same manner as in Embodiment 3 so as to shift the signal v(n) by one symbol at a time. On the other hand, when the phase rotation signal $e^{jP(n)}$ is inputted, the phase rotation corrector 211 corrects the phase rotation that is carried out in the carrier recovery circuit 111 so as to output $e(n)e^{-jP(n)}$ to the (N+L+1) LMS circuits 130.

The LMS circuit 130 uses the LMS algorithm for the inputs of v(n−k) and $e(n)e^{-jP(n)}$ so as to generate each tap coefficient $Ck_{LEQ}(n)$, which is outputted to the complex signal converter 303 for linear distortion equalization. Here, when the step size parameter is λ, the coefficient $Ck_{LEQ}(n)$ is represented in the following equation:

$$Ck_{LEQ}(n+1)=Ck_{LEQ}(n)+\lambda e(n)v(n)^* e^{-jP(n)} \quad \text{equation (4-1).}$$

Figure 25:
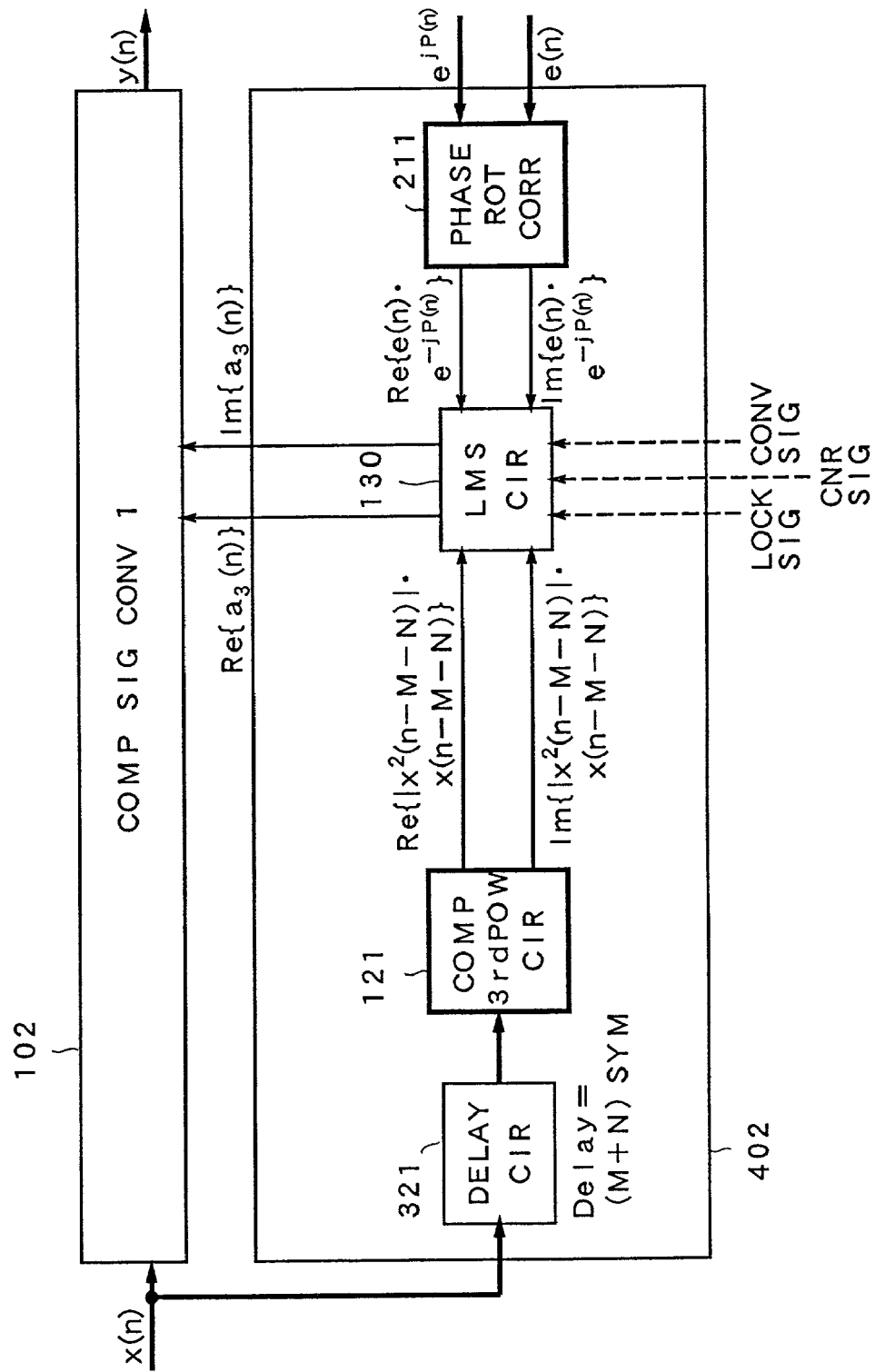
FIG. 25 is a block diagram showing a configuration of a coefficient estimator for nonlinear distortion equalization according to Embodiment 4.

The configuration of the coefficient estimator 402 for nonlinear distortion equalization is shown in FIG. 25. This coefficient estimator 402 for nonlinear distortion equalization is characterized by providing a phase rotation corrector 211 in the coefficient estimator 302 for nonlinear distortion equalization in Embodiment 3. Each of the other blocks in the coefficient estimator 402 for nonlinear distortion equalization is the same as each block shown in FIG. 18.

When the detected output x(n) is inputted to the coefficient estimator 402 for nonlinear distortion equalization, the delay element 321 and the complex cube calculator 121 convert the signal x(n) into $|x^2(n-M-N)|x(n-M-N)$ in the same manner as in Embodiment 3 and outputs the conversion result to the LMS circuit 130 as $x^3(n-M-N)$. On the other hand, when the error signal e(n) and the phase rotation signal $e^{jP(n)}$ are inputted, the phase rotation corrector 211 corrects the phase rotation that is carried out in the carrier recovery circuit 111 and outputs $e(n)e^{-jP(n)}$ to the LMS circuit 130. The LMS circuit 130 carries out coefficient update on the inputs of $|x^2(n-M-N)|x(n-M-N)$ and $e(n)e^{-jP(n)}$ and outputs the coefficient $a_3(n)$ for third order distortion equalization to the complex signal converter 102 for nonlinear distortion equalization.

The coefficient update algorithm of the coefficient estimator 402 for nonlinear distortion equalization is represented in equation (2-1). While, the coefficient $a_3(n)$ is represented in the following equation:

$$a_3(n)=a_3(n-1)+ue(n-M-N)[|x^2(n-M-N)|x(n-M-N)] *e^{-jP(n-M-N)} \quad \text{equation (4-2).}$$

The error signal e(n) is generated from the signal s(n) that is gained by delaying the signal x(n) by (M+N) symbols.

Therefore, a delay adjustment is carried out in equation (4-2) by making the setting $[|x^2(n-M-N)|x(n-M-N)]^* = [x^3(n-M-N)]^*$.

The error signal and the phase rotation correction are, respectively, represented by $e(n-M-N)$ and $e^{-jP(n-M-N)}$ by taking this (M+N) symbol delay into consideration. In addition, the coefficient $a_3(n)$ is delayed by one symbol in comparison with error signal $e(n)$, the signal $x(n)$ and the phase rotation signal $e^{-jP(n)}$ in equation (4-2). However, since the LMS algorithm is comparatively slow in the convergence speed of the coefficient update, this delay is not, in practice, an obstacle.

According to the above described operation, in the case that a carrier recovery circuit 111, of which the phase synchronization is established, exists between the complex signal converter 102 for nonlinear distortion equalization and the error estimator 104, linear distortion is compensated for by correcting the phase rotation that is carried out in the carrier recovery circuit 111 and nonlinear distortion in the complex signal can be compensated for.

Here, the output $y(n)$ of the complex signal converter 102 for nonlinear distortion equalization passes through the root raised cosine filter 103 in the nonlinear distortion equalizer of the present embodiment. By taking this into consideration, nonlinear distortion in the complex signal may be compensated for with a higher precision.

Figure 26:
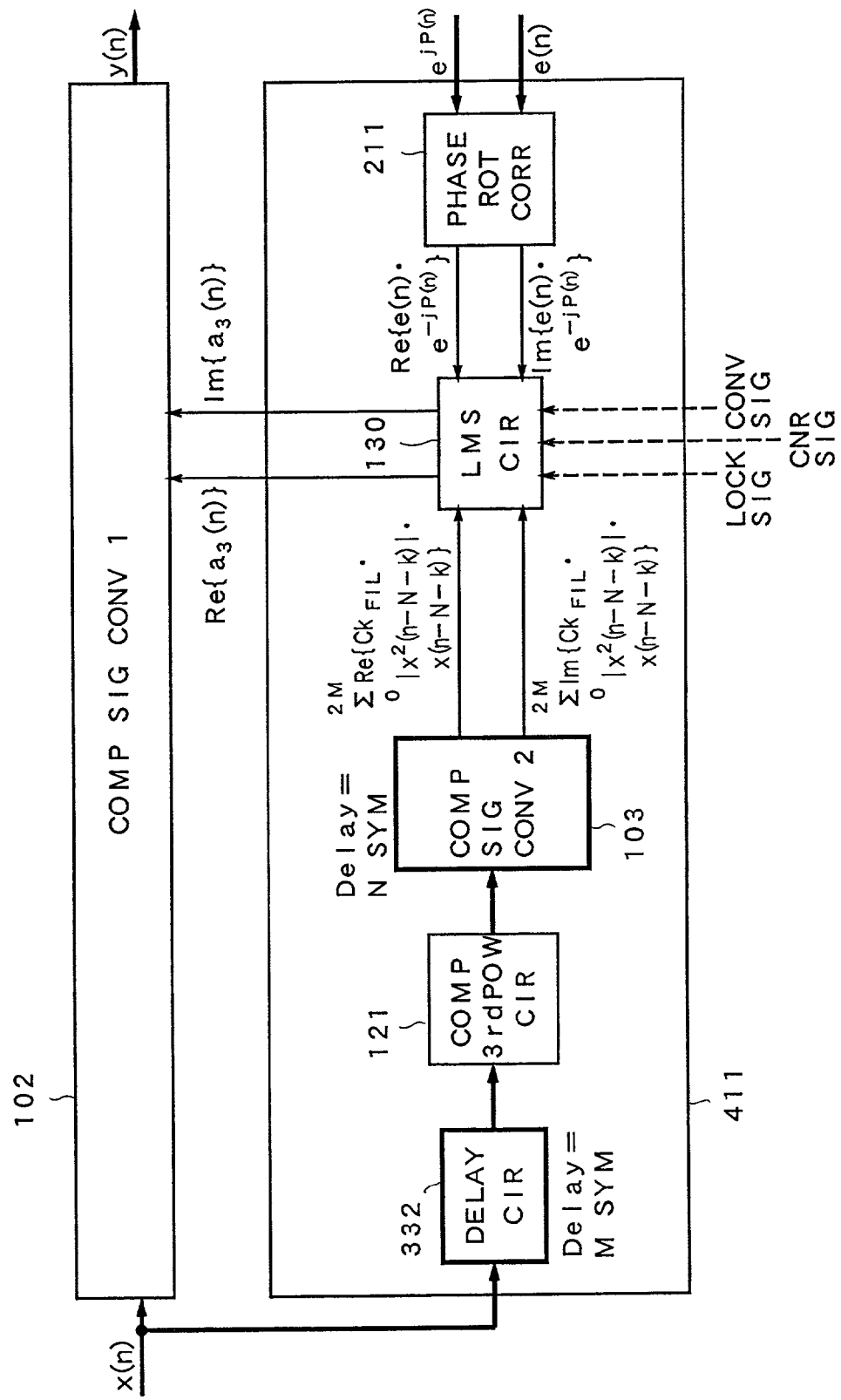
FIG. 26 is a block diagram of another example showing a configuration of the coefficient estimator for nonlinear distortion equalization according to Embodiment 4.

The configuration of the coefficient estimator 411 for nonlinear distortion equalization in the case that the passage of the signal through the root raised cosine filter 103 is taken into consideration is shown in FIG. 26. This coefficient estimator 411 for nonlinear distortion equalization is characterized in that the delay element 321 is replaced with the delay element 332 and a root raised cosine filter 103 is provided at the rear stage of the complex cube calculator 121 in the coefficient estimator 402 for nonlinear distortion equalization of FIG. 25. The LMS circuit 130 of the rear stage and the phase rotation corrector 211 that generates another input to the LMS circuit 130 are the same as those shown in FIG. 25.

In FIG. 26, when the detected output $x(n)$ is inputted into the coefficient estimator 411 for nonlinear distortion equalization, the delay element 322 creates a delay of N symbols. The complex cube calculator 121 converts the input signal into $|x^2(n-N)|x(n-N)$ and outputs the conversion result as $x^3(n-N)$. Then, the root raised cosine filter 103 carries out a band limitation on the conversion result and outputs $\Sigma Ck_{FIL}|x^2(n-N-k)|x(n-N-k)$ to the LMS circuit 130. Here, $Ck_{FIL}$ is each coefficient of the root raised cosine filter 103.

Since the amount of delay of the root raised cosine filter 103 is M symbols, the amount of delay up to the output of the root raised cosine filter 103 is set at (M+N) symbols in total by using the delay element 332. On the other hand, when the phase rotation signal $e^{jP(n)}$ and the error signal $e(n)$ are inputted, the phase rotation corrector 211 corrects the phase rotation that is carried out in the carrier recovery circuit 111 in the same manner as in the case of FIG. 25 and outputs $e(n)e^{-jP(n)}$ to the LMS circuit 130. By using these two signals the LMS circuit 130 updates the coefficient $a_3(n)$ for third order distortion equalization, which is outputted to the complex signal converter 102 for nonlinear distortion equalization. In this case, the coefficient $a_3(n)$ is represented in the following equation.

$$a_3(n+1) = a_3(n) + ue(n)[\Sigma Ck_{FIL} x^3(n-k)]^* e^{-jP(n)} \quad \text{equation (4-3)}$$

According to such operation, nonlinear distortion in the complex signal can be compensated for with a higher precision.

In addition, the output $y(n)$ of the complex signal converter 102 for nonlinear distortion equalization passes through the complex signal converter 303 for linear distortion equalization. By taking this into consideration, nonlinear distortion in the complex signal may be compensated for with a higher precision.

Figure 27:
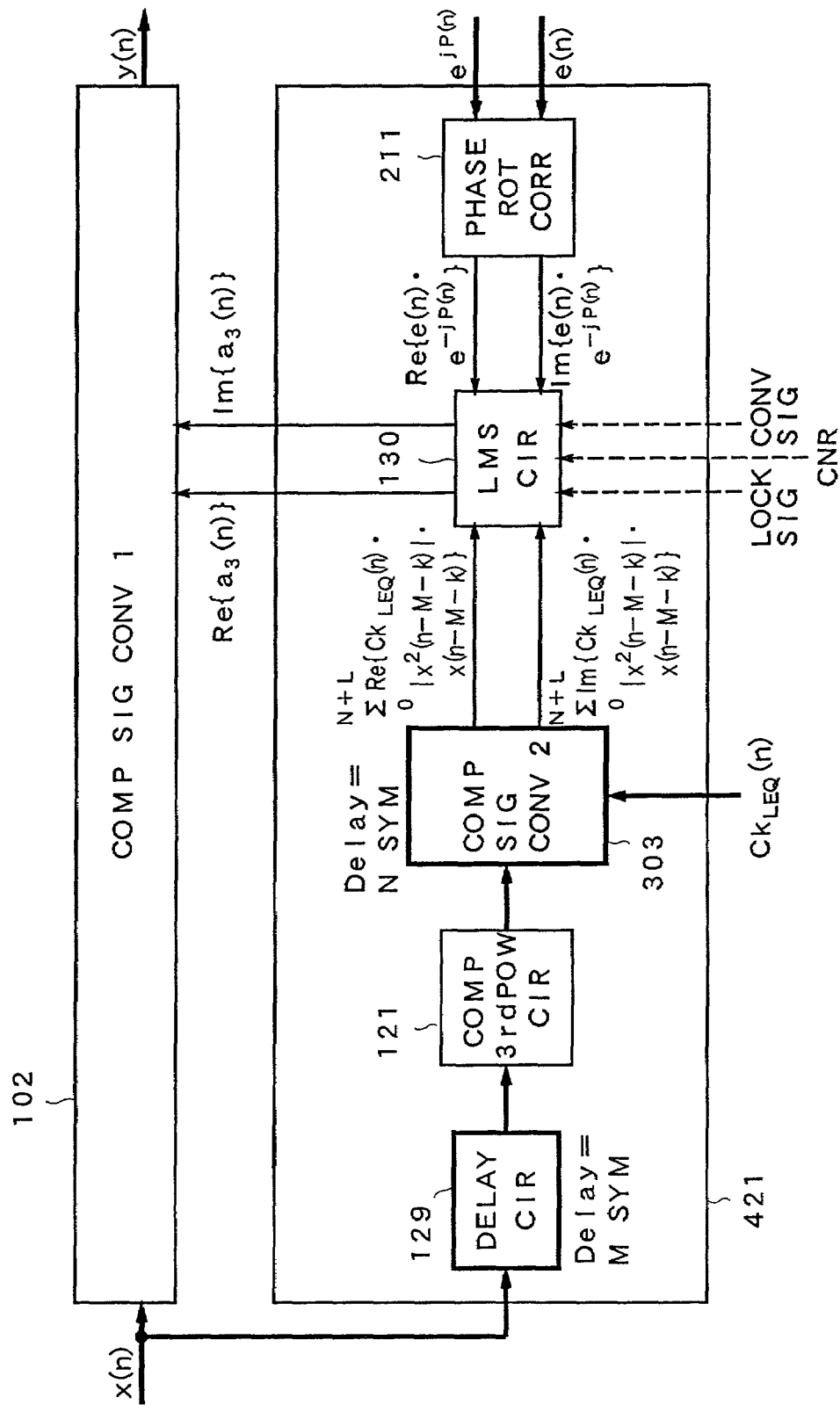
FIG. 27 is a block diagram of another example showing a configuration of the coefficient estimator for nonlinear distortion equalization according to Embodiment 4.

The configuration of the coefficient estimator 421 for nonlinear distortion equalization in the case that the passage of the signal through the complex signal converter 303 for linear distortion equalization is taken into consideration is shown in FIG. 27. This coefficient estimator 421 for nonlinear distortion equalization is characterized in that the delay element 321 is replaced with the delay element 129 and the complex signal converter 303 for linear distortion equalization is provided at the rear stage of the complex cube calculator 121 in the coefficient estimator 402 for nonlinear distortion equalization of FIG. 25. The LMS circuit 130 of this rear stage and the phase rotation corrector 211 that generates another input of the LMS circuit 130 are the same as those shown in FIG. 25.

In FIG. 27, when the detected output $x(n)$ is inputted to the coefficient estimator 421 for nonlinear distortion equalization, the delay element 129 delays the signal $x(n)$ by M symbols. The complex cube calculator 121 converts the input signal into $|x^2(n-M)|x(n-M)$ and outputs the conversion result as the cubed value $x^3(n-M)$. The complex signal converter 303 for linear distortion equalization transforms the conversion result and outputs $\Sigma Ck_{LEQ}(n)|x^2(n-M-k)|x(n-M-k)$ to the LMS circuit 130. The amount of delay of the complex signal converter 303 for linear distortion equalization is N symbols. Therefore, the delay up to the output of the complex signal converter 303 for linear distortion equalization is set at (M+N) symbols in total by replacing the delay element 321 with the delay element 129.

On the other hand, when the phase rotation signal $e^{jP(n)}$ and the error signal $e(n)$ are inputted, the phase rotation corrector 211 corrects the phase rotation that is carried out in the carrier recovery circuit 111 and outputs the $e(n)e^{-jP(n)}$ to the LMS circuit 130. The LMS circuit 130 uses these two signals so as to update the coefficient $a_3(n)$ for third order distortion equalization according to the LMS algorithm, which is outputted to the complex signal converter 102 for nonlinear distortion equalization. The coefficient $a_3(n)$ of this case is represented in the following equation.

$$a_3(n+1) = a_3(n) + ue(n)[\Sigma Ck_{LEQ}(n) x^3(n-k)]^* e^{-jP(n)} \quad \text{equation (4-4)}$$

According to such an operation, nonlinear distortion in the complex signal can be compensated for with a higher precision.

In addition, the output $y(n)$ of the complex signal converter 102 for nonlinear distortion equalization passes through both the root raised cosine filter 103 and the complex signal converter 303 for linear distortion equalization. By taking this into consideration, nonlinear distortion in the complex signal may be compensated for with a higher precision.

Figure 28:
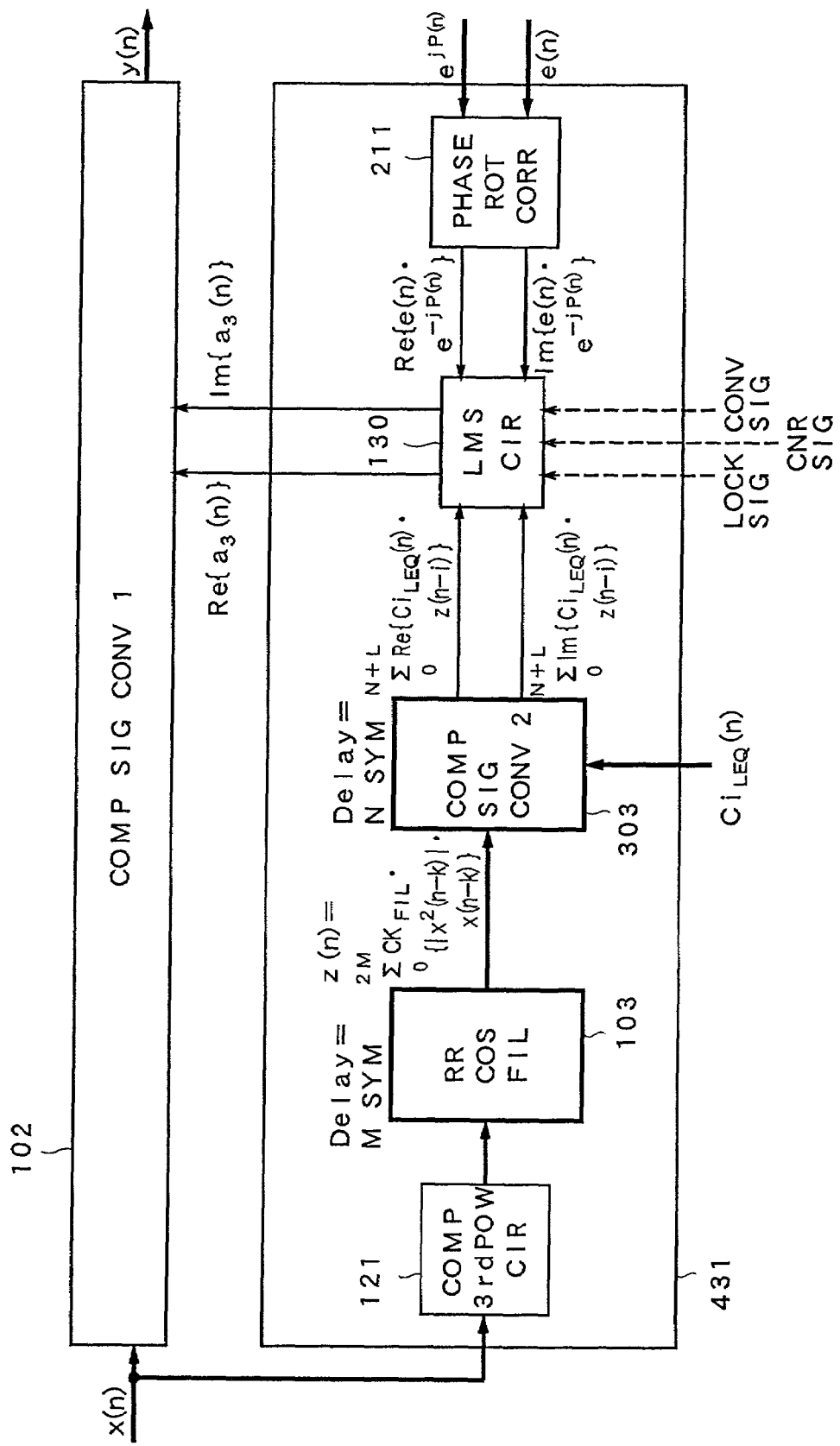
FIG. 28 is a block diagram of another example showing a configuration of the coefficient estimator for nonlinear distortion equalization according to Embodiment 4.

The configuration of the coefficient estimator 431 for nonlinear distortion equalization in the case that the passage of the signal through both the root raised cosine filter 103 and the complex signal converter 303 for linear distortion equalization is taken into consideration is shown in FIG. 28. This coefficient estimator 431 for nonlinear distortion equalization is characterized in that the delay element 321 is eliminated and the root raised cosine filter 103 and the complex signal converter 303 for linear distortion equalization are provided at the rear stage of the complex cube calculator 121 in the coefficient estimator 402 for nonlinear distortion equalization of FIG. 25. The LMS circuit 130 of that rear stage and the phase rotation corrector 211 that generates another input of the LMS circuit 130 are the same as those shown in FIG. 25.

The operation of the coefficient estimator 431 for nonlinear distortion equalization of such a configuration is herein described. When the detected output x(n) is inputted to the coefficient estimator 431 for nonlinear distortion equalization, the complex cube calculator 121 converts the signal x(n) into $|x^2(n)|x(n)$ and outputs the cubed value $x^3(n)$ as the conversion result. The root raised cosine filter 103 carries out a band limitation for the result of conversion and outputs $z(n)=\Sigma Ck_{FIL}|x^2(n-k)|x(n-k)$ to the complex signal converter 303 for linear distortion equalization. The complex signal converter 303 for linear distortion equalization transforms this output and outputs $\Sigma Ci_{LEQ}(n)z(n-i)$ to the LMS circuit 130. Here, the amount of delay of the root raised cosine filter 103 and of the complex signal converter 303 for linear distortion equalization are, respectively, M and N symbols. Therefore, the delay element 321 is eliminated and the amount of delay up to the output of the complex signal converter 303 for linear distortion equalization is set at (M+N) symbols in total.

On the other hand, when the phase rotation signal $e^{jp(n)}$ and the error signal e(n) are inputted, the phase rotation corrector 211 corrects the phase rotation carried out in the carrier recovery circuit 111 so as to output $e(n)e^{-jp(n)}$ to the LMS circuit 130. The LMS circuit 130 uses these two signals so as to update the coefficient $a_3(n)$ for third order distortion equalization according to the LMS algorithm, which is outputted to the complex signal converter 102 for nonlinear distortion equalization. In this case, the coefficient $a_3(n)$ is represented in the following equation.

$$a_3(n+1)=a_3(n)+ue(n)[\Sigma Ck_{LEQ}(n)z(n-i)]*e^{-jP(n)} \quad \text{equation (4-5)}$$

$$z(n)=\Sigma Ck_{FIL}x^3(n-k) \quad \text{equation (4-6)}$$

According to such an operation, nonlinear distortion in the complex signal can be compensated for with a higher precision.

In addition, the coefficient estimator 402 for nonlinear distortion equalization of FIG. 25, the coefficient estimator 411 for nonlinear distortion equalization of FIG. 26, the coefficient estimator 421 for nonlinear distortion equalization of FIG. 27 and the coefficient estimator 431 for nonlinear distortion equalization of FIG. 28 may be set so as to start the coefficient update after the establishment of phase synchronization. The low pass filter 113 in the carrier recovery circuit 111 monitors the filter output in FIG. 23 in the same manner as in Embodiment 1 and sets the lock signal at "H" when the phase synchronization is established in the case that the output is stable.

The coefficient estimator 402 for nonlinear distortion equalization of FIG. 25, the coefficient estimator 411 for nonlinear distortion equalization of FIG. 26, the coefficient estimator 421 for nonlinear distortion equalization of FIG. 27 and the coefficient estimator 431 for nonlinear distortion equalization of FIG. 28 implement the setting $a_3(n)=0$ in the case that the lock signal is "L" in the same manner as in Embodiment 1. Then, the complex signal converter 102 for nonlinear distortion equalization outputs y(n)=x(n). In the case that the lock signal is "H," the coefficient update is started. According to such an operation, nonlinear distortion in the complex signal can be compensated for without negatively affecting the operation of the carrier recovery circuit 111.

In addition, the coefficient estimator 402 for nonlinear distortion equalization of FIG. 25, the coefficient estimator 411 for nonlinear distortion equalization of FIG. 26, the coefficient estimator 421 for nonlinear distortion equalization of FIG. 27 and the coefficient estimator 431 for nonlinear distortion equalization of FIG. 28 may be set so as to start the coefficient update after the convergence of the linear distortion equalization. The linear distortion equalization converges in the case that the coefficient is stable in the same manner as in Embodiment 3 and the convergent signal shown in FIG. 23 is set at "H." As shown in FIG. 23, this convergent signal is inputted to the coefficient estimator 402 for nonlinear distortion equalization.

The coefficient estimator 402 for nonlinear distortion equalization of FIG. 25 implements the setting $a_3(n)=0$ in the same manner as in Embodiment 3 in the case that the convergent signal is "L" and the complex signal converter 102 for nonlinear distortion equalization outputs y(n)=x(n). In the case that the convergent signal is "H," the step size parameter controller 133 substitutes a predetermined value for the step size parameter u so as to start the coefficient update. The coefficient estimator 411 for nonlinear distortion equalization of FIG. 26, the coefficient estimator 421 for nonlinear distortion equalization of FIG. 27 and the coefficient estimator 431 for nonlinear distortion equalization of FIG. 28 perform in the same manner as above. According to such operation, nonlinear distortion in the complex signal can be compensated for without negatively affecting the convergence operation of the linear distortion equalization.

In addition, the coefficient estimator 402 for nonlinear distortion equalization of FIG. 25, the coefficient estimator 411 for nonlinear distortion equalization of FIG. 26, the coefficient estimator 421 for nonlinear distortion equalization of FIG. 27 and the coefficient estimator 431 for nonlinear distortion equalization of FIG. 28 may be set so as to carry out the coefficient update only at the time of high C/N.

A C/N estimator 116 is provided in the nonlinear distortion equalizer 401 in FIG. 23 in the same manner as in Embodiment 1 so that the C/N estimator 116 calculates and averages the C/N and outputs the result as a CNR signal. The coefficient estimator 402 for nonlinear distortion equalization of FIG. 25, the coefficient estimator 411 for nonlinear distortion equalization of FIG. 26, the coefficient estimator 421 for nonlinear distortion equalization of FIG. 27 and the coefficient estimator 431 for nonlinear distortion equalization of FIG. 28 implement the setting $a_3(n)=0$ in the case that the C/N shown by the CNR signal is smaller than the set threshold value, in the same manner as Embodiment 1. The complex signal converter 102 for nonlinear distortion equalization outputs y(n)=x(n). In the case that the C/N shown by the CNR signal is the set threshold value, or greater, the coefficient update is carried out. According to such operation, nonlinear distortion in the complex signal can be compensated for without negative effects at the time of low C/N.

Here, in the present embodiment only third order distortion dominant in nonlinear distortion is removed as shown in equation (1-1) and (2-1). By using equation (1-11) in the same manner as in Embodiment 1, however, arbitrary high order nonlinear distortion of second order distortion, or higher, may be compensated for. As for the coefficient update equation of this case, equation (2-4) is formed with respect to the respective order. In addition, $x^m(n)=|x^{m-1}(n)|x(n)$.

Figure 29:
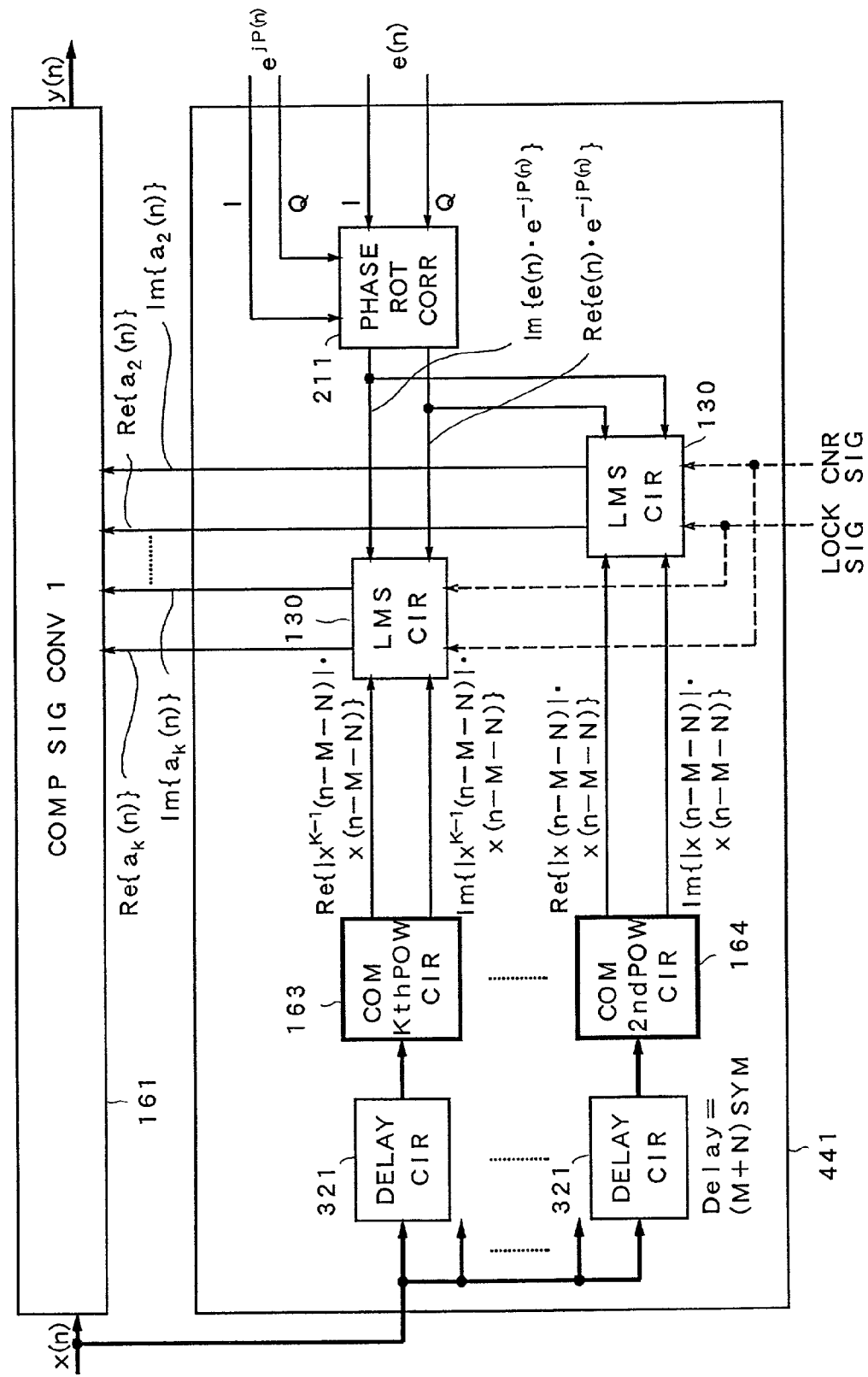
FIG. 29 is a block diagram of another example showing configurations of the complex signal converter for nonlinear distortion equalization and the coefficient estimator for nonlinear distortion equalization according to Embodiment 4.

The configuration of the coefficient estimator 441 for nonlinear distortion equalization that compensates for high order nonlinear distortion of at least second order distortion and at most K-th order distortion is shown in FIG. 29. The complex signal converter 161 for nonlinear distortion equalization is the same as in the case of Embodiment 1 shown in FIG. 9. As shown in FIG. 29, the coefficient estimator 441 for nonlinear distortion equalization is characterized in that the delay element 129 is replaced with the delay element 321 of each order in the coefficient estimator 231 for nonlinear distortion equalization of FIG. 14. The operation of the complex signal converter 441 for nonlinear distortion equalization is the same as that of Embodiment 2 except that when the detected output x(n) is inputted, the delay element 321 of each order implements a delay of (M+N) symbols. In addition, the complex signal converter 161 for nonlinear distortion equalization has the same configuration as described in Embodiment 1 and outputs y(n) shown in equation (1-11). According to such operation, arbitrary high order nonlinear distortion of second order distortion, or higher, can be compensated for.

The output y(n) of the complex signal converter 161 for nonlinear distortion equalization passes through the root raised cosine filter 103. By taking this into consideration, arbitrary high order nonlinear distortion of second order distortion, or higher, can also be compensated for in the same manner in the case that nonlinear distortion in the complex signal is compensated for with a higher precision. In this case, the delay element 321 of each order is replaced with the delay element 332 and root raised cosine filters 103 are provided to the rear stages of the complex K-th power calculator 163, the complex square calculator 164 and the complex m-th power calculator of each order in the coefficient estimator 441 for nonlinear distortion equalization.

The output y(n) of the complex signal converter 161 for nonlinear distortion equalization passes through the complex signal converter 303 for linear distortion equalization. By taking this into consideration, arbitrary high order nonlinear distortion of second order distortion, or higher, can also be compensated for in the same manner in the case that nonlinear distortion in the complex signal is compensated for with a higher precision. In this case, the delay element 321 of each order is replaced with the delay element 129 and complex signal converters 303 for linear distortion equalization are provided to the rear stages of the complex K-th power calculator 163, the complex square calculator 164 and the complex m-th power calculator of each order in the coefficient estimator 441 for nonlinear distortion equalization.

The output y(n) of the complex signal converter 161 for nonlinear distortion equalization passes through both the root raised cosine filter 103 and the complex signal converter 303 for linear distortion equalization. By taking this into consideration, arbitrary high order nonlinear distortion of second order distortion, or higher, can also be compensated for in the same manner in the case that nonlinear distortion in the complex signal is compensated for with a higher precision. In this case, the delay element 321 of each order is eliminated and root raised cosine filters 103 and complex signal converters 303 for linear distortion equalization are provided to the rear stages of the complex K-th power calculator 163, the complex square calculator 164 and the complex m-th power calculator of each order in the coefficient estimator 441 for nonlinear distortion equalization.

Here, in the above described example, a case is shown wherein a delay element is provided for each order. However, one delay element may be shared so as to distribute the output signal to the complex K-th power calculator 163, to the complex square calculator 164 and to the complex m-th power calculator of each order.

In addition, in the above described example, a case is shown wherein the complex K-th power calculator 163, the complex square calculator 164 and complex m-th power calculator of each order are, respectively, provided. However, sharing of circuits can be achieved by sequentially outputting, for example, the powers of the I and Q axis components to the next circuits of higher order. In addition, other sharing methods may be used.

Embodiment 5

Figure 30:
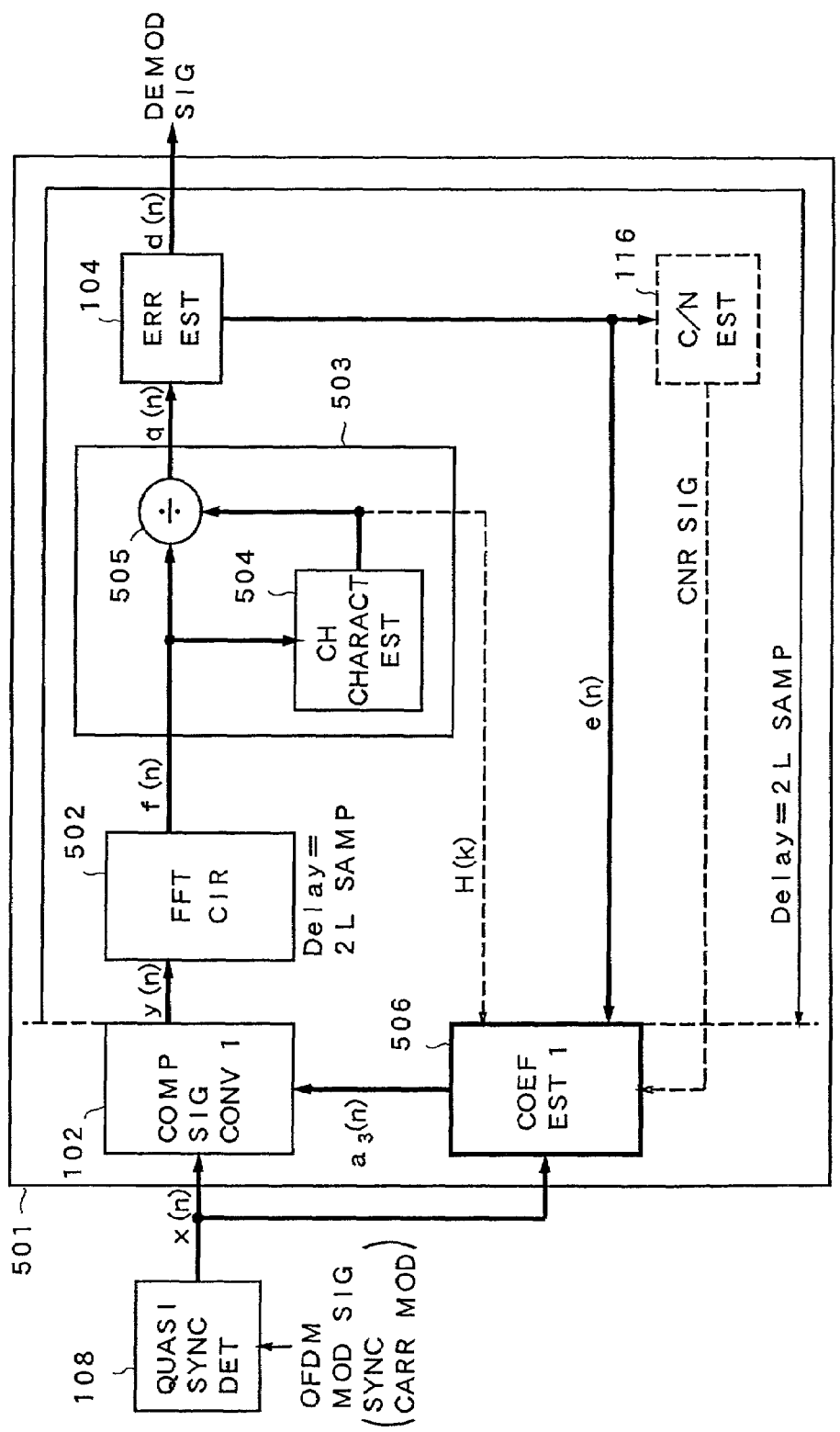
FIG. 30 is a block diagram showing the entire configuration of a nonlinear distortion equalizer according to Embodiment 5.

Next, a front end processor for data receiver in Embodiment 5 of the present invention is described in reference to the figures. FIG. 30 is a block diagram showing the configuration of a front end processor 500 for data receiver in the present embodiment. The front end processor 500 for data receiver is formed to include a quasi-synchronized detector 108 and a nonlinear distortion equalizer 501. The nonlinear distortion equalizer 501 has a complex signal converter 102 for nonlinear distortion equalization, an FFT circuit 502, a synchronized demodulator 503, an error estimator 104 and a coefficient estimator 506 for nonlinear distortion equalization. The synchronized demodulator 503 is formed of a channel characteristic estimator (CH CHARACT EST) 504 and a complex divider 505.

The quasi-synchronized detector 108 detects the I axis and Q axis data in the same manner as in Embodiment 1 so as to generate the detected output x(n) when an OFDM modulation signal on which a synchronization carrier modulation is carried out is received by an antenna.

The operation of the nonlinear distortion equalizer 501 is described in the following. The complex signal converter 102 for nonlinear distortion equalization uses the coefficient $a_3(n)$ for third order distortion equalization that is generated in the coefficient estimator 506 for nonlinear distortion equalization so as to remove third order distortion included in the signal x(n). The FFT circuit 502 carries out an FFT conversion so as to output the signal f(n) on the frequency axis to the synchronized demodulator 503. As shown in FIG. 30, the FFT circuit 502 carries out an FFT conversion of L points, wherein the amount of process delay is 2L samples. Here, in the above described Embodiments 1 to 4, each point in time represented by n is called a symbol. IN-th order to distinguish each point in time from the OFDM symbols, which collect L points of the IFFT conversion, each point in time is called a sample in the present embodiment and below.

In the synchronized demodulator 503, the channel characteristic estimator 504 calculates transmission path characteristics H(k) by using a pilot signal, and the like, that is included in the signal f(n). The complex divider 505 carries out a complex division of the signal f(n) by the transmission path characteristics H(k) and, thereby, carries out synchronization demodulation so as to output the signal q(n) to the error estimator 104. The error estimator 104 calculates an error between the signal q(n) and the closest mapping point d(n) and outputs the d(n) to an error correction part, not shown, as the demodulation signal. Here, in the case that an error correction part carries out a soft decision decoding, the nonlinear distortion equalizer 501 outputs the input q(n) of the error estimator 104 as a demodulation signal. The coefficient estimator 506 for nonlinear distortion equalization uses the error signal e(n) and the signal x(n) so as to update the coefficient $a_3(n)$ according to the LMS algorithm.

Figure 31:
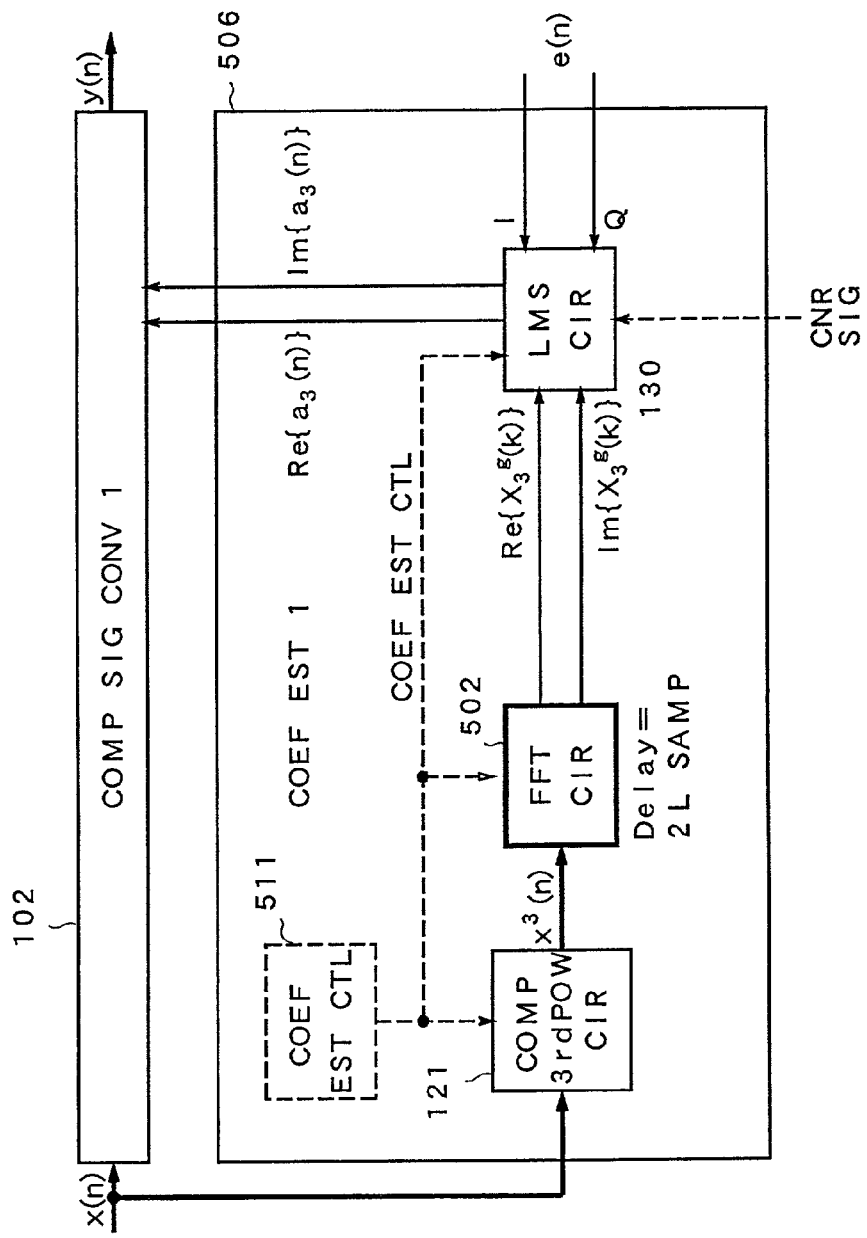
FIG. 31 is a block diagram showing a configuration of a coefficient estimator for nonlinear distortion equalization according to Embodiment 5.

The configuration of the coefficient estimator 506 for nonlinear distortion equalization is shown in FIG. 31. The coefficient estimator 506 for nonlinear distortion equalization has a complex cube calculator 121, an FFT circuit 502 and an LMS circuit 130.

When the signal x(n) that has undergone a quasi-synchronized detection is inputted to the coefficient estimator 506 for nonlinear distortion equalization, the complex cube calculator 121 converts the signal x(n) into $|x^2(n)|x(n)$ and outputs the conversion result as the cubed value $x^3(n)$. The FFT circuit 502 carries out an FFT conversion of the cubed value $x^3(n)$ and outputs the signal, that is to say the converted value $X_3{}^g(k)$ on the frequency axis, to the LMS circuit 130. The LMS circuit 130 carries out a coefficient update in the same manner as in Embodiment 1 by using the converted value $X_3{}^g(k)$ and the error signal e(n) as inputs so as to output the coefficient $a_3(n)$ for third order distortion equalization to the complex signal converter 102 for nonlinear distortion equalization.

Here, when it is assumed that the synchronized demodulator 503 and the error estimator 104 of FIG. 30 have no delays, the amount of delay up to the calculation of the error signal e(n) from the signal y(n) becomes 2L samples of the FFT circuit 502. The amount of delay in the coefficient estimator 506 for nonlinear distortion equalization matches the 2L samples of the FFT circuit 502 and the process delays become equal. According to the above described operation, nonlinear distortion in the OFDM baseband signal that has undergone the synchronization carrier modulation can be compensated for.

The coefficient update algorithm of the coefficient estimator 506 for nonlinear distortion equalization according to the present embodiment is described. From FIG. 30 the error signal e(n) is represented as follows:

$$e(n)=d(n)-q(n) \qquad \text{equation (5-1)}$$

wherein $$q(n)=f(n)/H(k) \qquad \text{equation (5-2)}$$

$$f(n)=FFT(y(n)) \qquad \text{equation (5-3)}.$$

These equations (5-2) and (5-3) are substituted to equation (5-1) so as to gain the following equation.

$$e(n)=d(n)-FFT(y(n))/H(k) \qquad \text{equation (5-4)}$$

Here, FFT(y(n)) represents the FFT conversion of y(n). Equation (1-1) is substituted to equation (5-4) so as to gain the following equation.

$$e(n)=d(n)-FFT(x(n)+a_3(n)x^3(n))/H(k) \qquad \text{equation (5)}$$

Since the LMS algorithm is comparatively slow in the convergence speed of the coefficient update, the coefficient $a_3(n)$ is regarded as a constant so as to gain the following equation.

$$e(n)=d(n)-FFT(x(n))/H(k)+a_3(n)\cdot FFT(x^3(n))/H(k) \qquad \text{equation (5-6)}$$

Here, equation (5-6) is substituted to equation (1-5) and a partial differentiation is carried out so as to gain the following equation.

$$dJ(a_3)/da_3(n) = 2[e(n)\cdot de(n)/da_3(n)]$$
$$= -2e(n)[FFT(x^3(n))/H(k)]^* \qquad \text{equation (5-7)}$$

Here, u=2α and equation (5-7) are substituted to equation (1-6) so as to gain the following equation.

$$a_3(n+1)=a_3(n)+ue(n)[FFT(x^3(n))/H(k)]^* \qquad \text{equation (5-8)}$$

while, the coefficient $a_3(n)$ is represented in the following equation from FIG. 31.

$$a_3(n)=a_3(n-1)+ue(n)[FFT(|x^2(n)|x(n))/H(k)]^* \qquad \text{equation (5-9)}$$

In equation (5-9), though $a_3(n)$ is delayed by one sample in comparison with e(n), x(n) and H(k), the LMS algorithm is comparatively slow in the convergence speed of the coefficient update and, therefore, this delay is not, in practice, an obstacle.

Here, in the following equation, a cumulative addition value $\Sigma F(x_i)$ of the functions $F(x_i)$ from i=A to i=B with respect to the parameter i of the function $F(x_i)$ is represented as "$\Sigma_{i=A\ to\ B}F(x_i)$" and the circular constant, the number n, is denoted as "pie" in the exponential function.

Here, the transmission path characteristics are regarded as approximately constant in the received frequency band, that is to say, H(k)=1, equation (5-8) is represented in the following equation.

$$a_3(n+1)=a_3(n)+ue(n)[FFT(x^3(n))]^* \qquad \text{equation (5-10)}$$

The above described configuration and operation of the nonlinear distortion equalizer is according to equation (5-10).

When the FFT circuit 502 starts the operation at time n=T, which satisfies equation (5-11) and the FFT conversion result of $x_3(n)$ during this period of time is denoted as $x_3{}^g(k)$, the conversion value $x_3{}^g(k)$ is represented in equation (5-12).

$$T+gL \leq n \leq T+(g+1)L-1(g=0, 1, \ldots) \qquad \text{equation (5-11)}$$

$$X_3{}^g(k)=\Sigma_{j=(T+gL)\ to\ (T+(g+1)L-1)}x^3(j)W_L{}^{k(j-T-gL)},\ W_L=e^{-j2pie/L}(k=0, 1, \ldots, L-1) \qquad \text{equation (5-12)}$$

When $FFT(x^3(n))$ is represented as $x_3{}^g(k)$ and k=n−T−gL is substituted into equations (5-8) and (5-10), respectively, equations (5-13) and (5-14) are gained.

$$a_3(n+1)=a_3(n)+ue(n)[X_3{}^g(n-T-gL)]^* \qquad \text{equation (5-13)}$$

$$a_3(n+1)=a_3(n)+ue(n)[X_3{}^g(n-T-gL)/H(n-T-gL)]^* \qquad \text{equation (5-14)}$$

The operation of the FFT circuit 502 is herein described. As an example, a case of point number L=4 of the FFT is considered. For the purpose of simplification T=0 and g=0 are substituted to equations (5-11) and (5-12) so as to gain equations (5-15) and (5-16), respectively.

$$0 \leq n \leq 3 \qquad \text{equation (5-15)}$$

$$X_3{}^0(k)=\Sigma_{j=0\ to\ 3}x^3(j)W_4{}^{kj},\ W_4=e^{-j2pie/4} \qquad \text{equation (5-16)}$$

Figure 32:
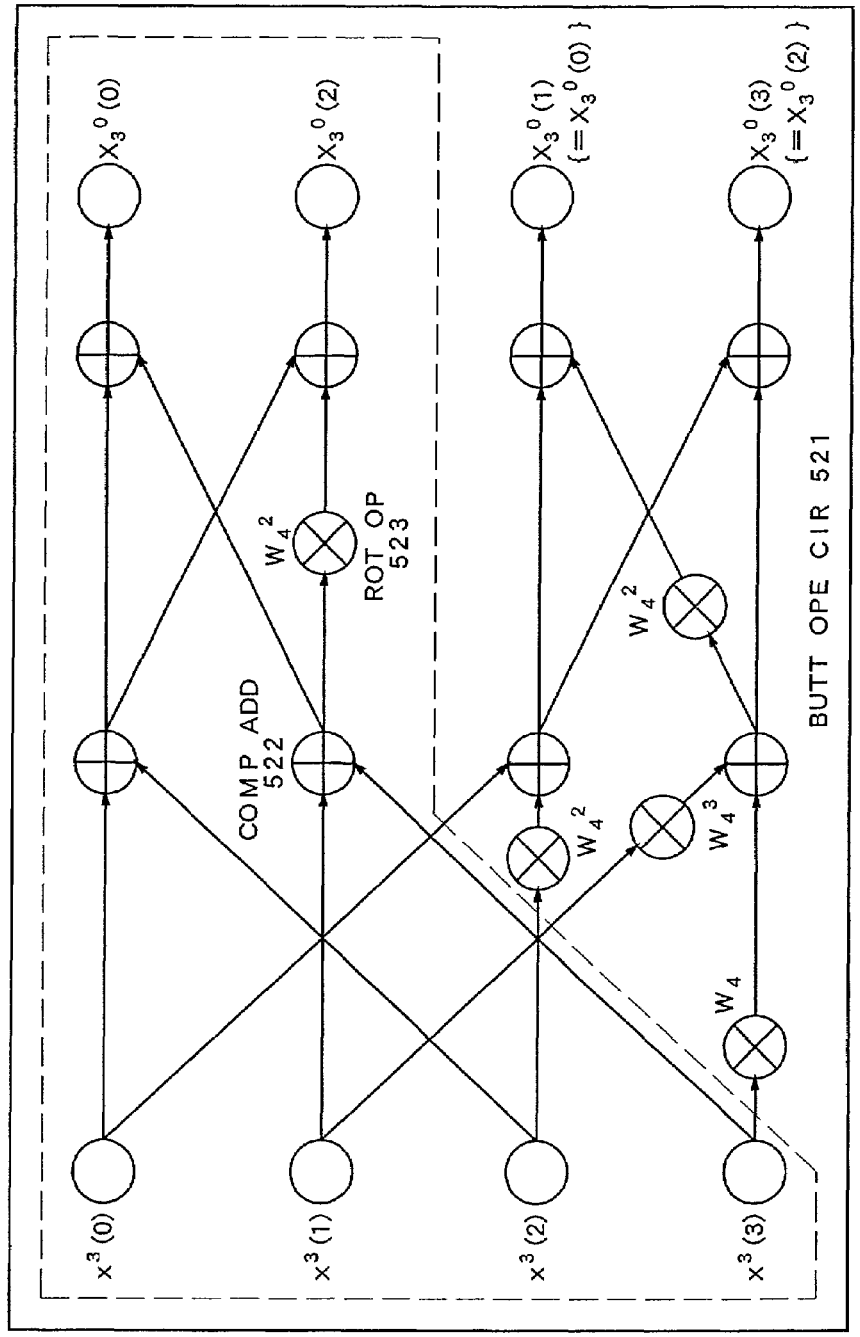
FIG. 32 is a block diagram showing a configuration of a butterfly operation circuit according to Embodiment 5.

The configuration of a butterfly operation circuit (BUTT OPE CIR) 521 that implements equation (5-16) is shown in FIG. 32. The butterfly operation circuit 521 of FIG. 32 has eight complex adders (COMP ADD) 522 and five rotation operators (ROT OP) 523.

The configuration of the FFT circuit 502 is shown in FIG. 33. The FFT circuit 502 has an S/P(serial to parallel) converter 531, the butterfly operation circuit 521 and a P/S(parallel to serial) converter 532. The appearance of the operation of the FFT circuit 502 is shown in FIG. 34. The horizontal axis of FIG. 34 is time n. The S/P converter 531 carries out an S/P conversion for every four samples so as to output parallel data. The butterfly operation circuit 521 carries out a butterfly operation of the above described parallel data. The P/S converter 532 rearranges the butterfly operation result and carries out a P/S conversion so as to output the result of the FFT conversion. In the example of FIG. 34, the process delay is eight (=2L) samples. Here, FIG. 34 shows the FFT conversion of the cubed value $x^3(n)$ and the FFT conversion of y(n) is shown in the same manner.

The output f(n) of the FFT circuit 502 in the nonlinear distortion equalizer 501 passes through the synchronized demodulator 503. By taking this into consideration, nonlinear distortion in the OFDM baseband signal that has undergone a synchronization carrier modulation may be compensated for with a higher precision according to equation (5-8).

Figure 35:
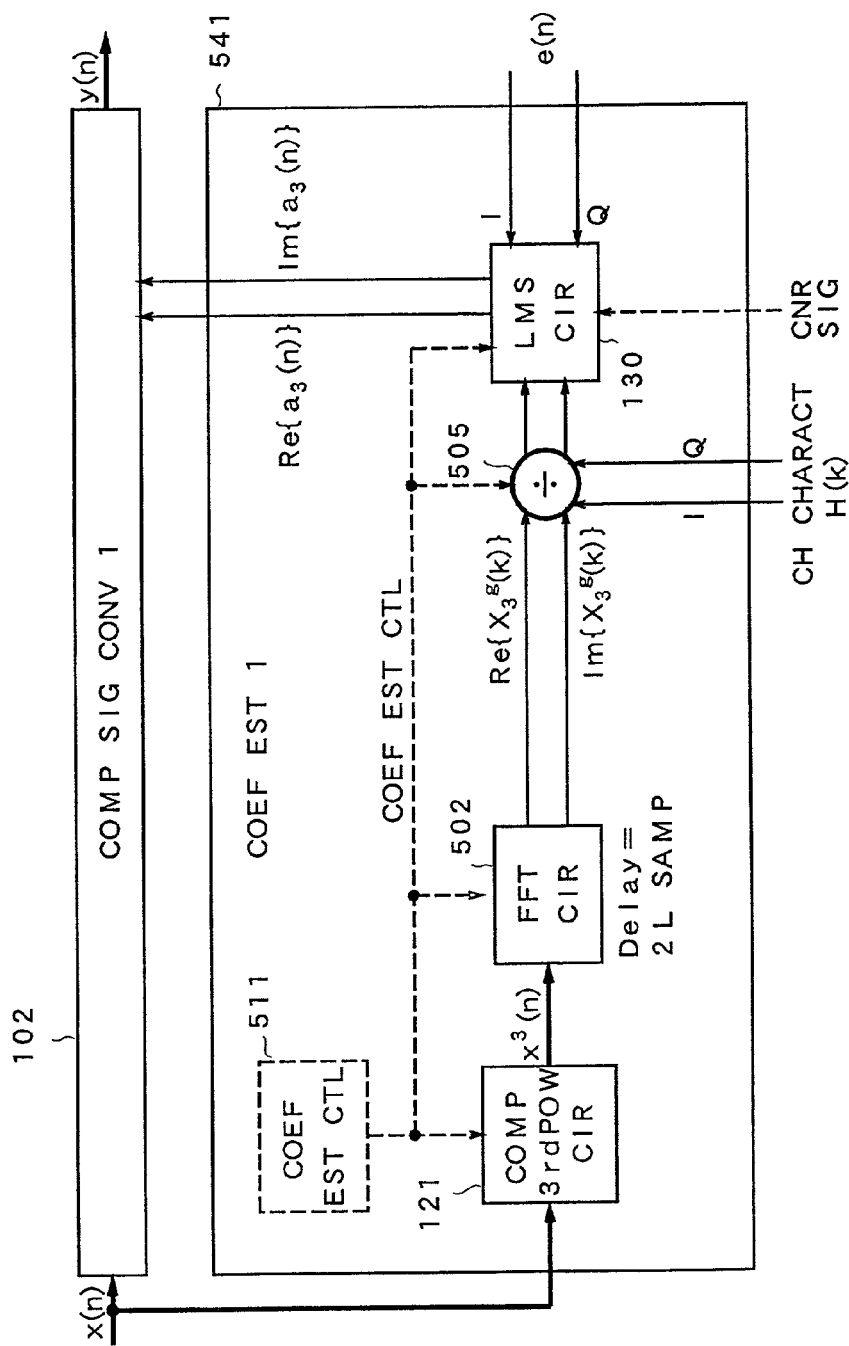
FIG. 35 is a block diagram of another example showing a configuration of the coefficient estimator for nonlinear distortion equalization according to Embodiment 5.

The configuration of the coefficient estimator 541 for nonlinear distortion equalization in this case is shown in FIG. 35. The coefficient estimator 541 for nonlinear distortion equalization is gained by providing a complex divider 505 at the front stage of the LMS circuit 130 in the coefficient estimator 506 for nonlinear distortion equalization of FIG. 31. A complex division of the conversion value $X_3^g(k)$ of the FFT circuit 502 by the transmission path characteristics H(k) is carried out by using the complex divider 505 and $X_3^g(k)/H(k)$ is outputted to the LMS circuit 130. The operation of the coefficient estimator 541 for nonlinear distortion equalization other than the above is the same as that of the coefficient estimator 506 for nonlinear distortion equalization of FIG. 31.

According to the above described operation, nonlinear distortion in the OFDM baseband signal that has undergone a synchronization carrier modulation can be compensated for with a higher precision in accordance with equation (5-8). In addition, one point may be used, for example, for every two points as a representative value so that the remaining one point is interpolated as a representative value within the outputs of the FFT circuits 502 in the coefficient estimator 506 for nonlinear distortion equalization of FIG. 33 and in the coefficient estimator 541 for nonlinear distortion equalization. As an example, a case is considered wherein the point number of the FFT is four. In equation (5-16), k=0, 2 are used as a representative value while the P/S converter 532 carries out an interpolation as in the following equation with respect to the remaining k=1, 3.

$$X_3^0(1)=X_3^0(0), X_3^0(3)=X_3^0(2) \quad \text{equation (5-17)}$$

In this case, the butterfly operation circuit 521 of FIG. 32 can be implemented by only using the portion surrounded by the broken lines and the circuit scale can be set at approximately 1/2. In addition, for example, one point for every two points is used from among the inputs of the FFT circuit 502 in the coefficient estimator 506 for nonlinear distortion equalization of FIG. 31 and coefficient estimator 541 for nonlinear distortion equalization of FIG. 35 so as to carry out an FFT conversion of the 1/2 point numbers, of which the result is used as a representative value. Then, the remaining one point may be interpolated as a representative value. As an example, a case is considered wherein the point number L=4 of the FFT, to which T=0 is substituted for the purpose of simplification, and g=0. When an FFT conversion of two points is carried out using n=0, 2 the following equation is gained.

$$X_3^0(2(p-1))'=\Sigma_{s=1 \text{ to } 2} x^3(2(s-1))W_2^{(P-1)(s-1)}, W_2=e^{-j2pie/2}(p=1, 2) \quad \text{equation (5-18)}$$

The values gained when k=0, 2 in equation (5-18) are assumed as representative values while an interpolation is carried out with respect to the remaining k=1, 3 based on the following equation.

$$X_3^0(1)'=X_3^0(0)', X_3^0(3)'=X_3^0(2)' \quad \text{equation (5-19)}$$

Figure 36:
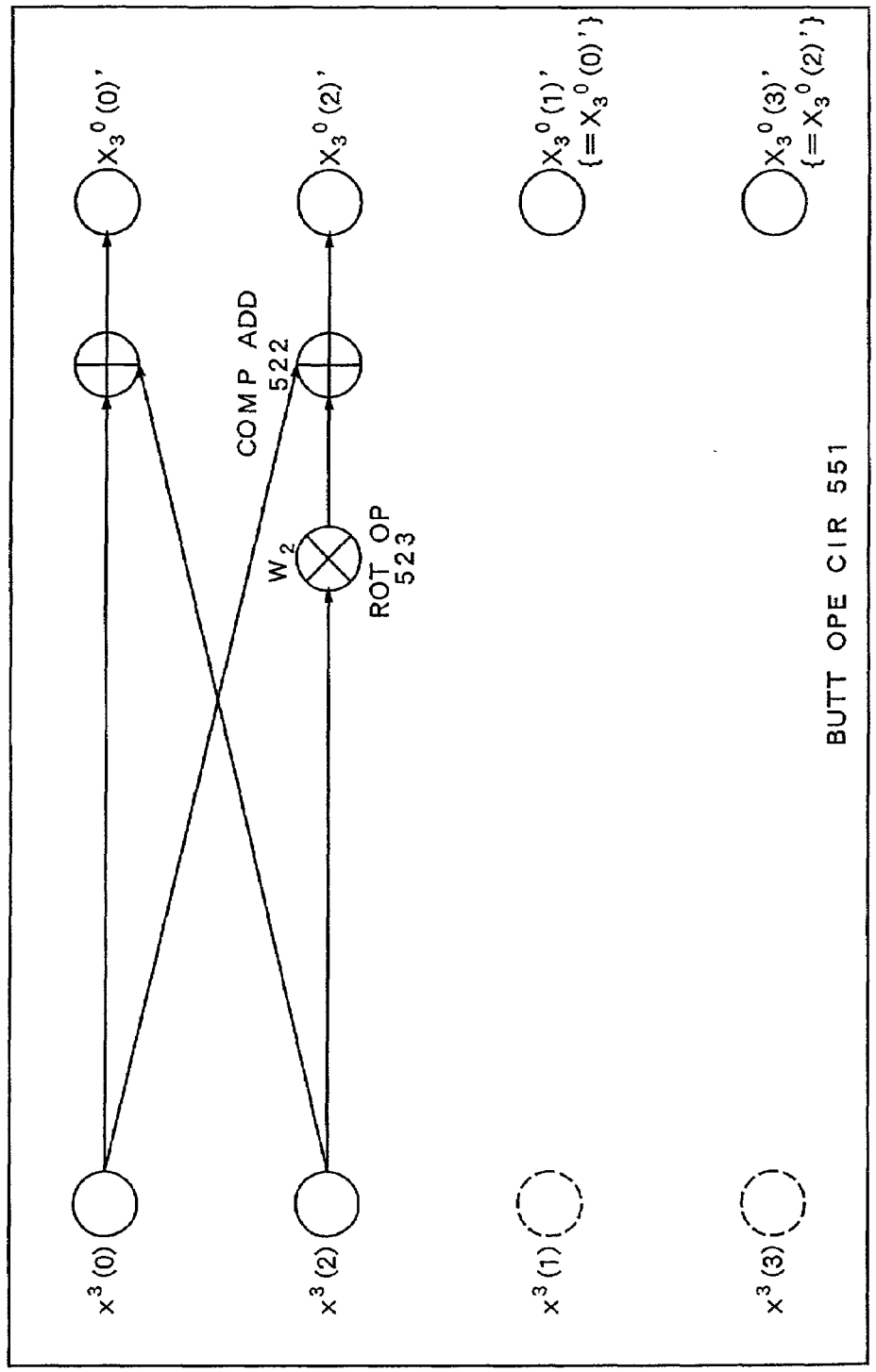
FIG. 36 is a block diagram of another example showing a configuration of the butterfly operation circuit according to Embodiment 5.

The configuration of a butterfly operation circuit 551 that implements equations (5-18) and (5-19) is shown in FIG. 36. The butterfly operation circuit 551 has two complex adders 522 and one rotation operator 523. In this case, the circuit scale of the butterfly operation circuit 551 of FIG. 36 can be made approximately 1/4 of that of the butterfly operation circuit 521 of FIG. 32.

Figure 37:
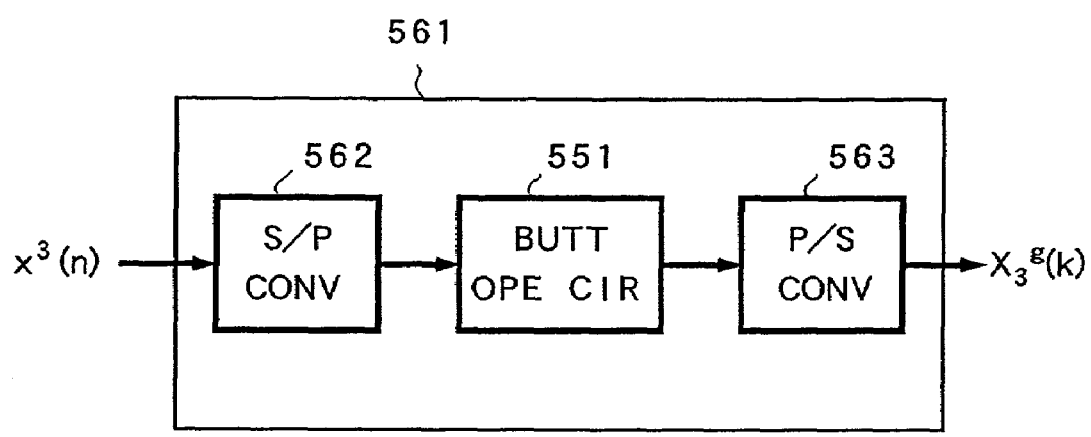
FIG. 37 is a block diagram of another example showing a configuration of the FFT circuit according to Embodiment 5.
Figure 38:
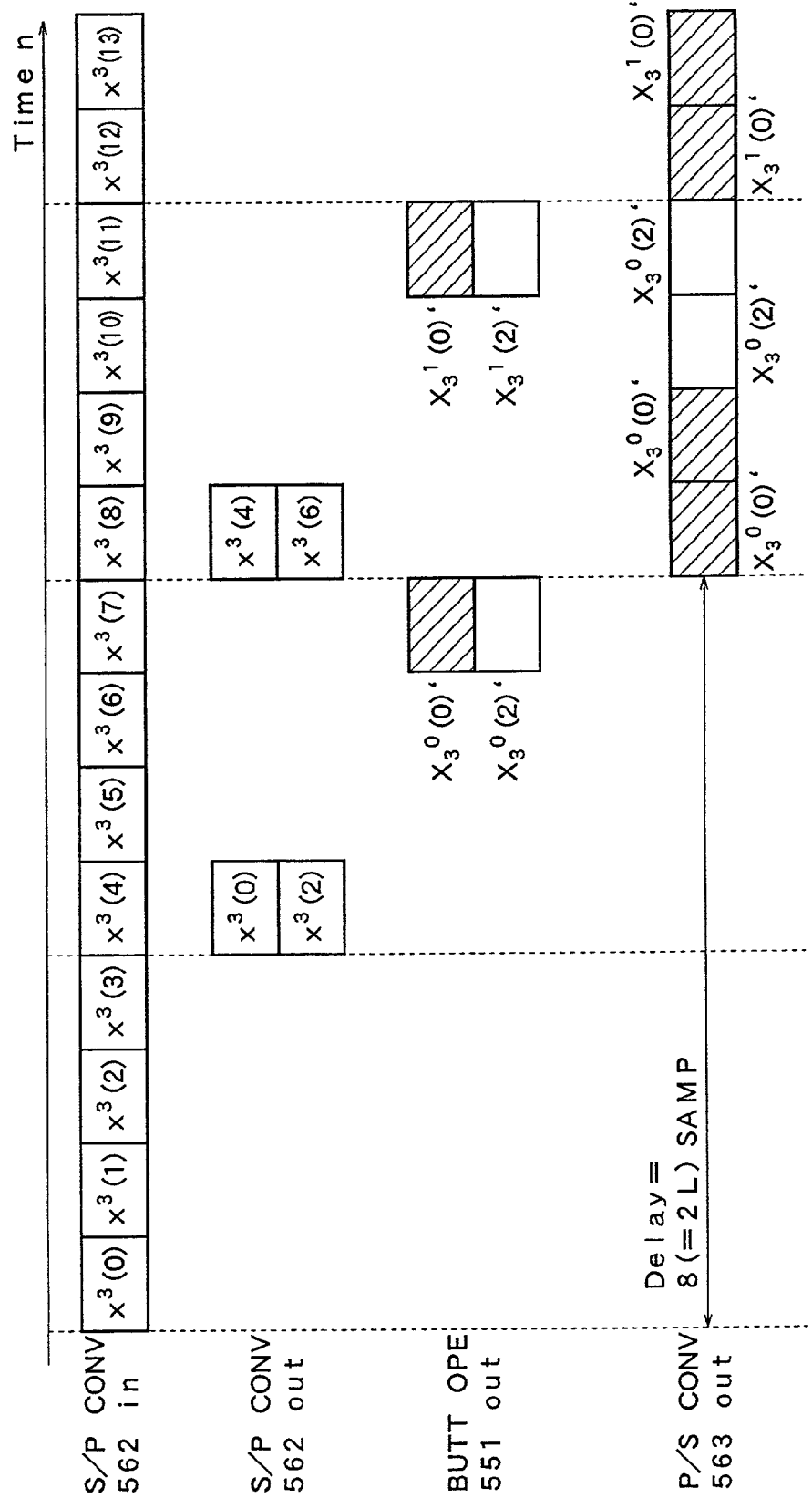
FIG. 38 is an explanatory diagram of another example showing the operation of the FFT circuit according to Embodiment 5.

The configuration of the FFT circuit 561 in this case is shown in FIG. 37. The FFT circuit 561 has an S/P converter 562, the butterfly operation circuit 551 and a P/S converter 563. The appearance of the operation of the FFT circuit 561 is shown in FIG. 38. The horizontal axis represents time n. The S/P converter 562 carries out an S/P conversion for every four samples so as to output the first and third pieces of data from among the four samples. The butterfly operation circuit 551 carries out a butterfly operation of the parallel data. The P/S converter 563 carries out a P/S conversion of the butterfly operation result and carries out interpolation processing in equation (5-19) so as to output the result of the FFT conversion. In the example of FIG. 38 the process delay is eight (=2L) samples.

In addition, the FFT circuit 502 in the coefficient estimator 506 for nonlinear distortion equalization in FIG. 31 may be eliminated so that time division multiplexing is applied to the FFT circuit 502 in the nonlinear distortion equalizer 501 in FIG. 30.

Figure 39:
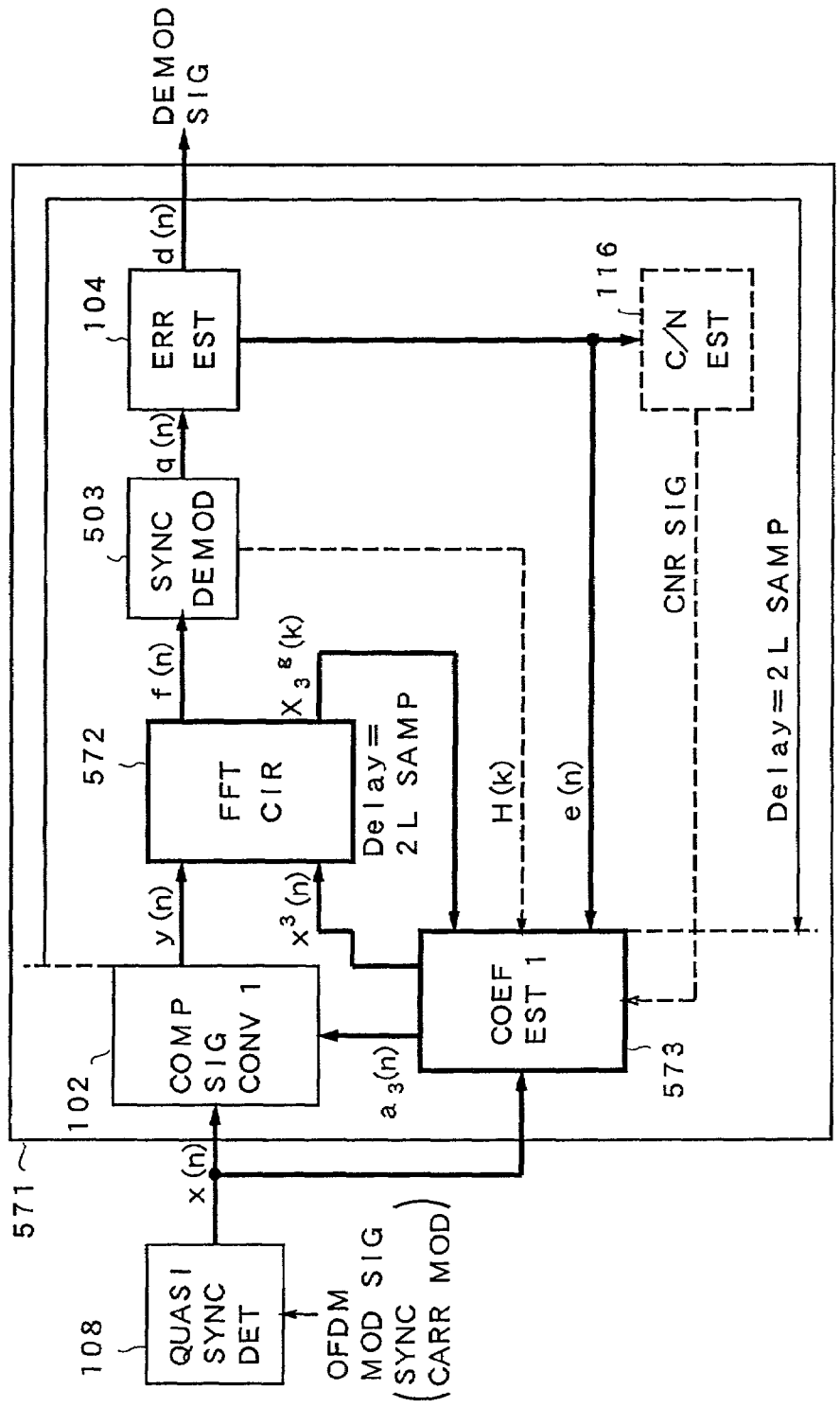
FIG. 39 is a block diagram of another example showing the entire configuration of the front end processor for a data receiver according to Embodiment 5.

The configuration of the front end processor for data receiver in this case is shown in FIG. 39. The nonlinear distortion equalizer 571 is replaced with the FFT circuit 572 and the coefficient estimator 573 for nonlinear distortion equalization in the nonlinear distortion equalizer 501 of FIG. 30.

Figure 40:
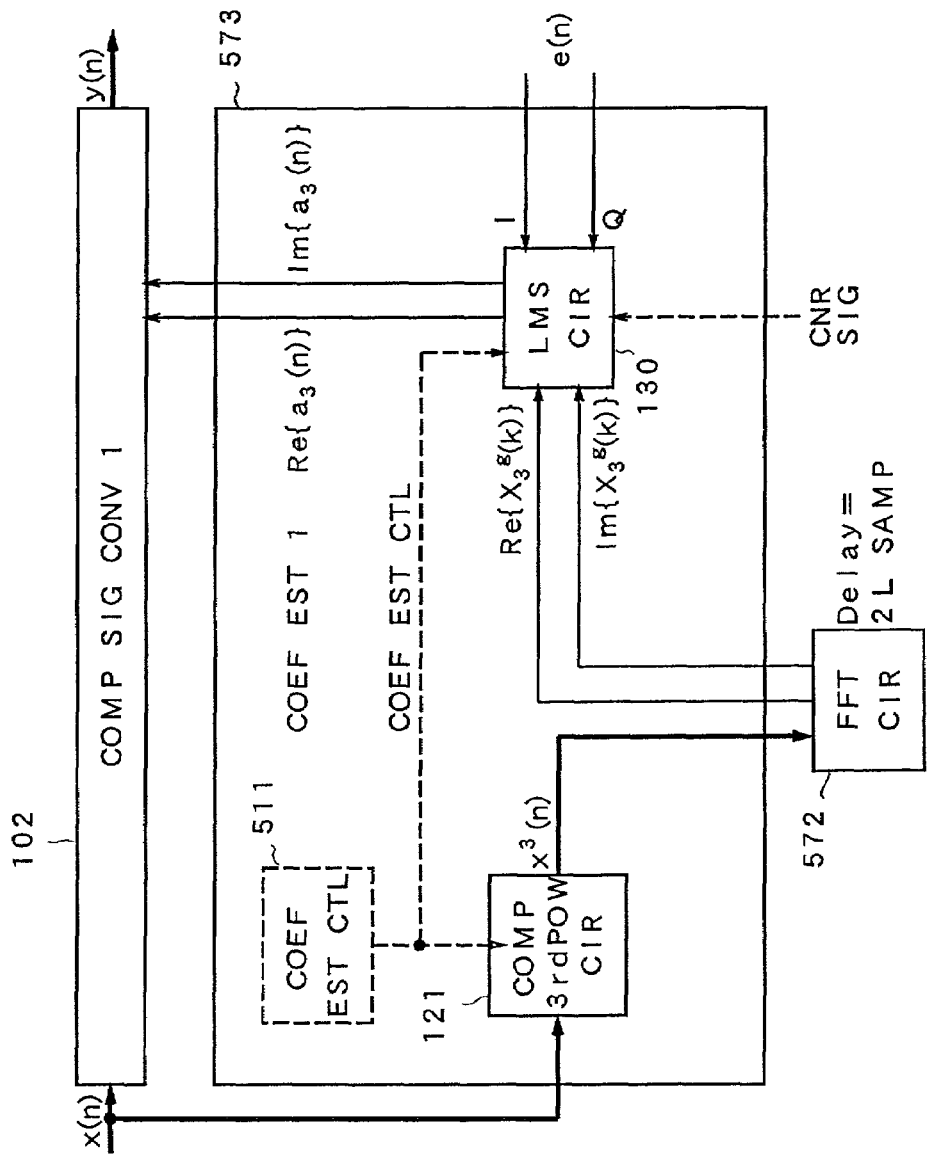
FIG. 40 is a block diagram of another example showing a configuration of a coefficient estimator for nonlinear distortion equalization according to Embodiment 5.

In addition, the configuration of the coefficient estimator 573 for nonlinear distortion equalization is shown in FIG. 40. The coefficient estimator 573 for nonlinear distortion equalization is gained by eliminating the FFT circuit 502 in the coefficient estimator 506 for nonlinear distortion equalization in FIG. 31.

The operation of the nonlinear distortion equalizer 571 is described. The complex cube calculator 121 of the coefficient estimator 573 for nonlinear distortion equalization converts the signal x(n) into the cubed value $x^3(n)$ and outputs the conversion result to the FFT circuit 572. The FFT circuit 572 carries out time division multiplexing on the signal y(n) and the cubed value $x^3(n)$ so as to carry out the FFT conversion respectively and outputs the signal f(n) to the synchronized demodulator 503 and outputs the converted value $x_3^g(k)$ to the coefficient estimator 573 for nonlinear distortion equalization. The converted value $x_3^g(k)$ and the error signal e(n) are inputted to the LMS circuit 130 of the coefficient estimator 573 for nonlinear distortion equalization, which carries out a coefficient update in the same manner as in Embodiment 1. Then, the LMS circuit 130 outputs the coefficient $a_3(n)$ for third order distortion equalization to the complex signal converter 102 for nonlinear distortion equalization. The other part of the operation is the same as that of the nonlinear distortion equalizer 501 of FIG. 30.

Figure 41:
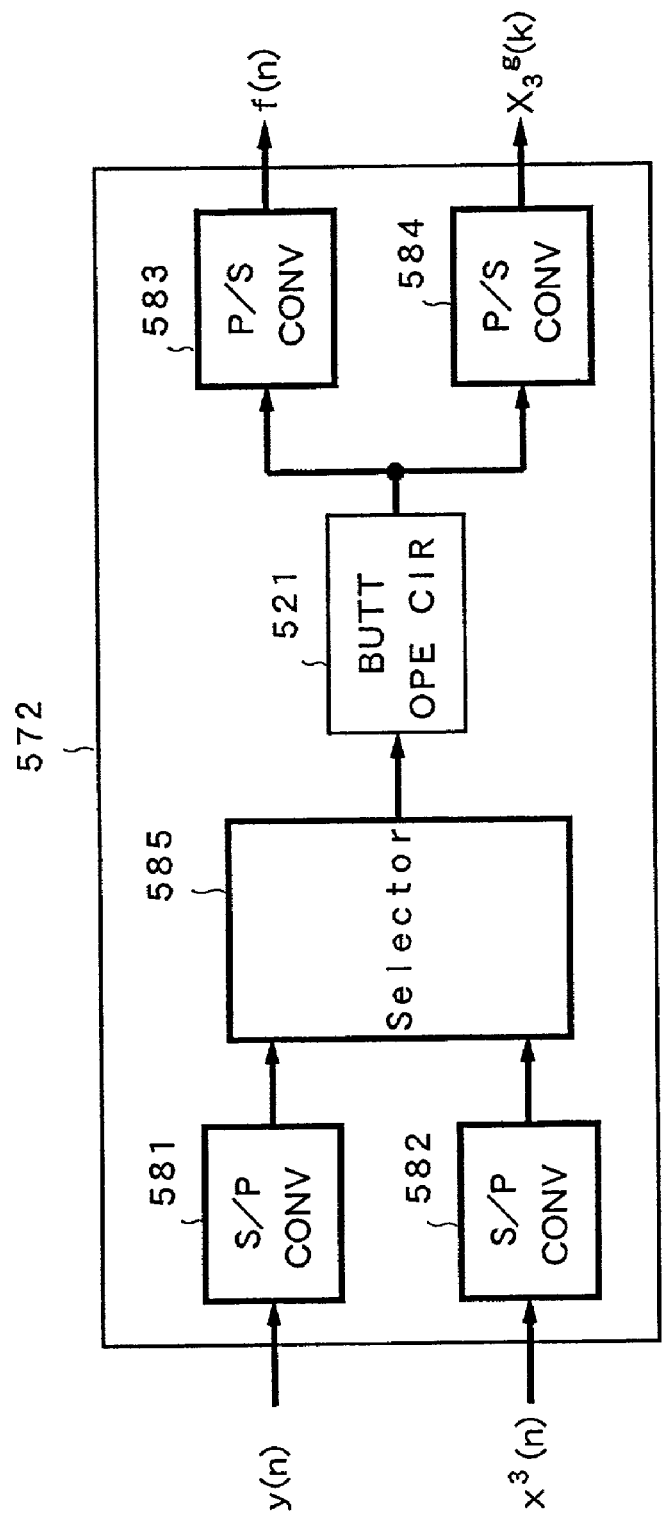
FIG. 41 is a block diagram of another example showing a configuration of the FFT circuit according to Embodiment 5.
Figure 42:
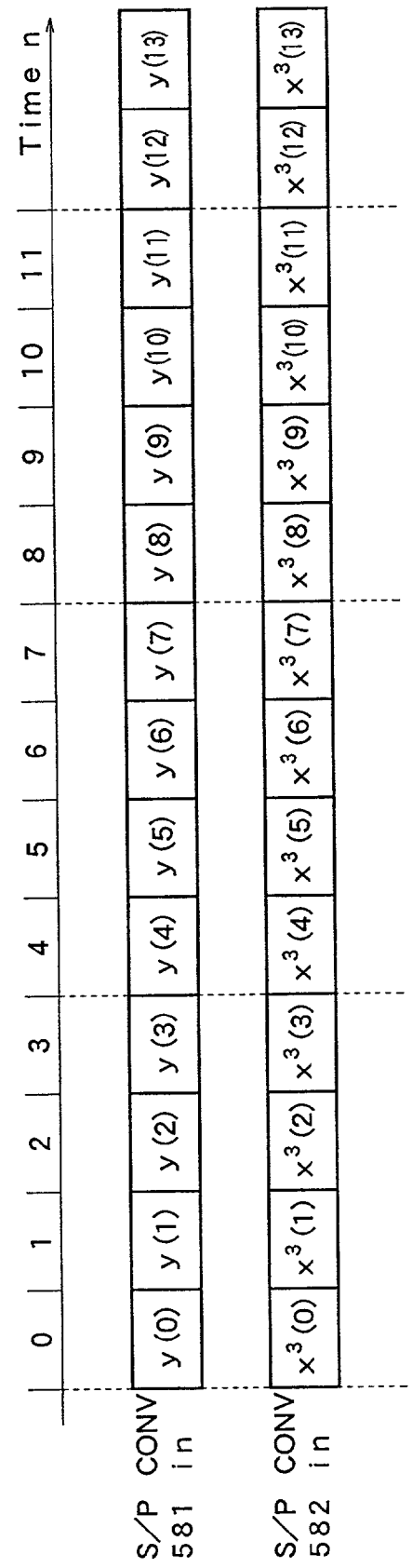
FIG. 42 is an explanatory diagram (part 1) of another example showing the operation of the FFT circuit according to Embodiment 5.
Figure 43:
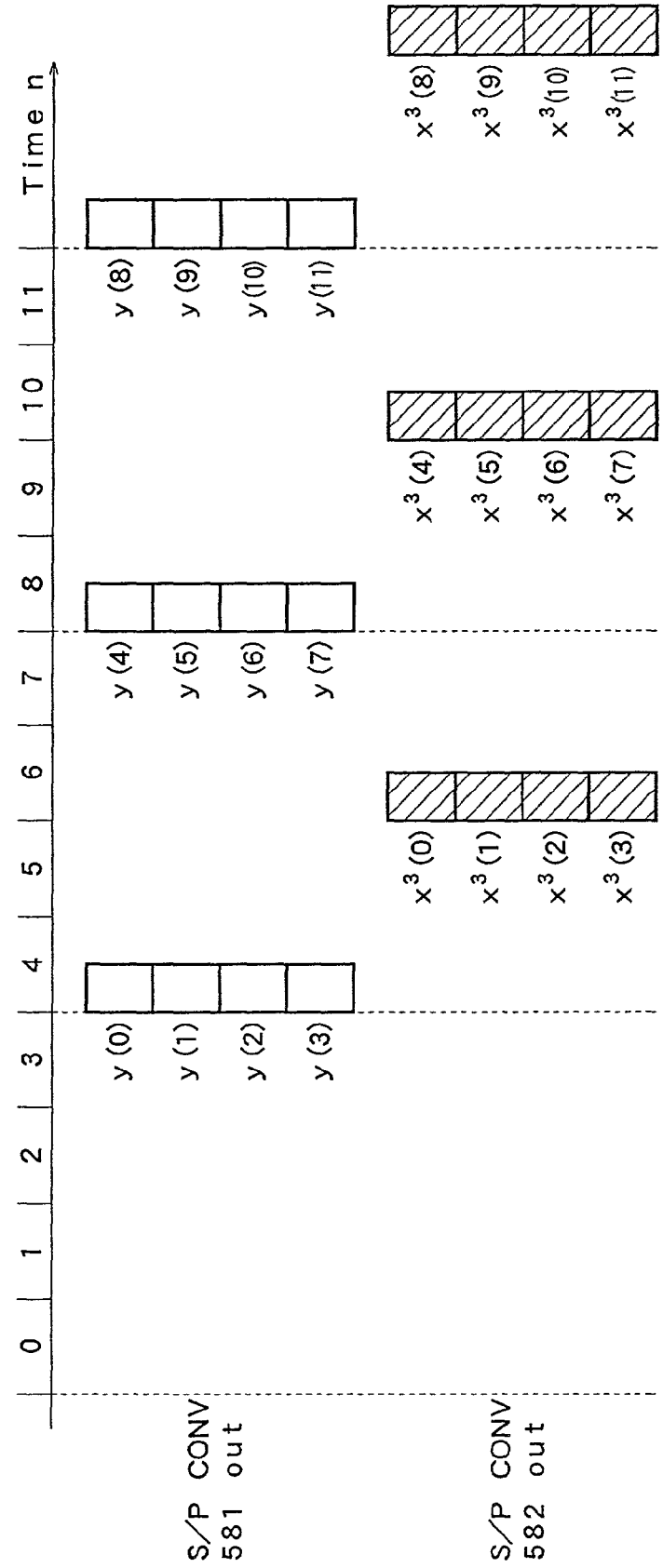
FIG. 43 is an explanatory diagram (part 2) of another example showing the operation of the FFT circuit according to Embodiment 5.

The configuration of the FFT circuit 572 is shown in FIG. 41. The FFT circuit 572 has S/P converters 581, 582, the butterfly operation circuit 521, P/S converters 583, 584 and a selector 585. The appearance of the operation of the FFT circuit 572 is shown in FIGS. 42 to 45. The horizontal axis represents time n. As an example, a case of the point number L=4 of the FFT is considered. As shown in FIGS. 42 and 43, the S/P converters 581 and 582 carried out an S/P conversion for every four samples so as to output parallel data. Here, the S/P converter 582 delays the output by (1/2) OFDM symbols, that is to say, by two samples in comparison with that of the S/P converter 581.

Figure 44:
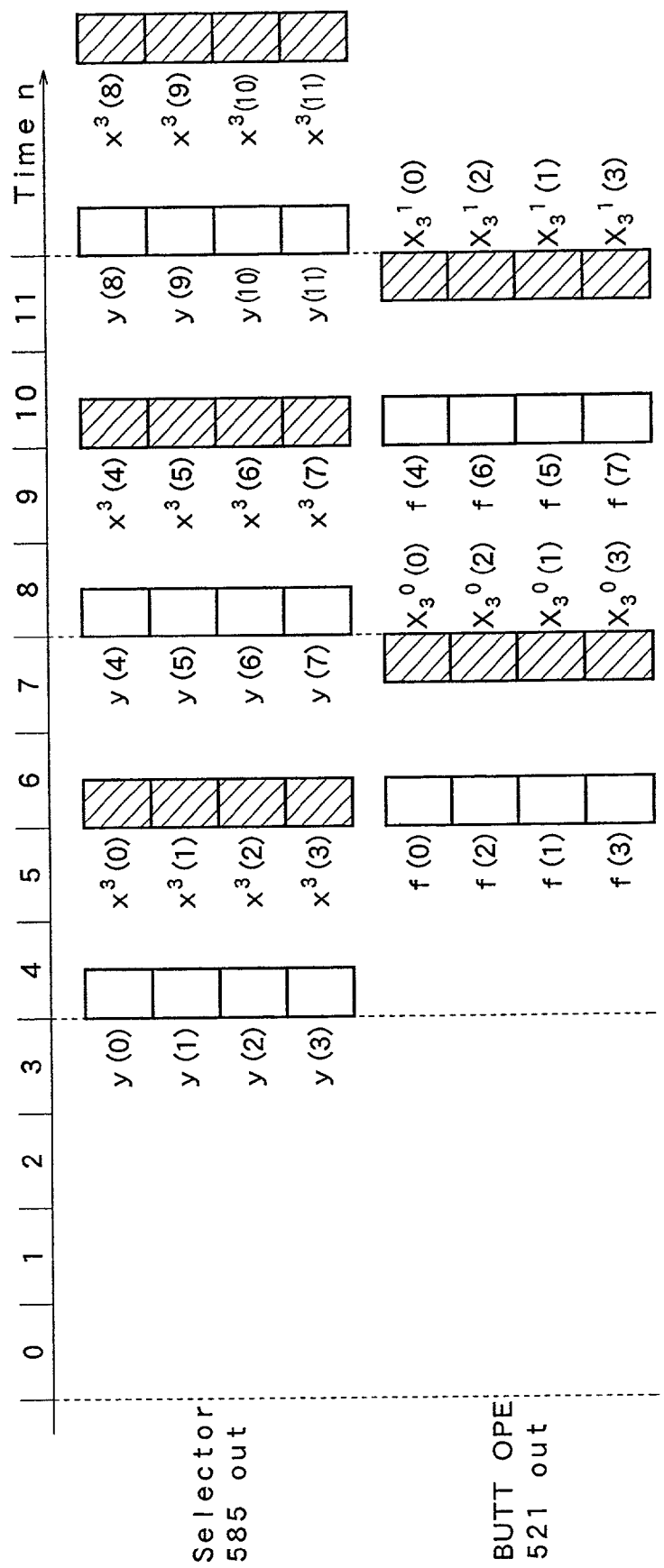
FIG. 44 is an explanatory diagram (part 3) of another example showing the operation of the FFT circuit according to Embodiment 5.
Figure 45:
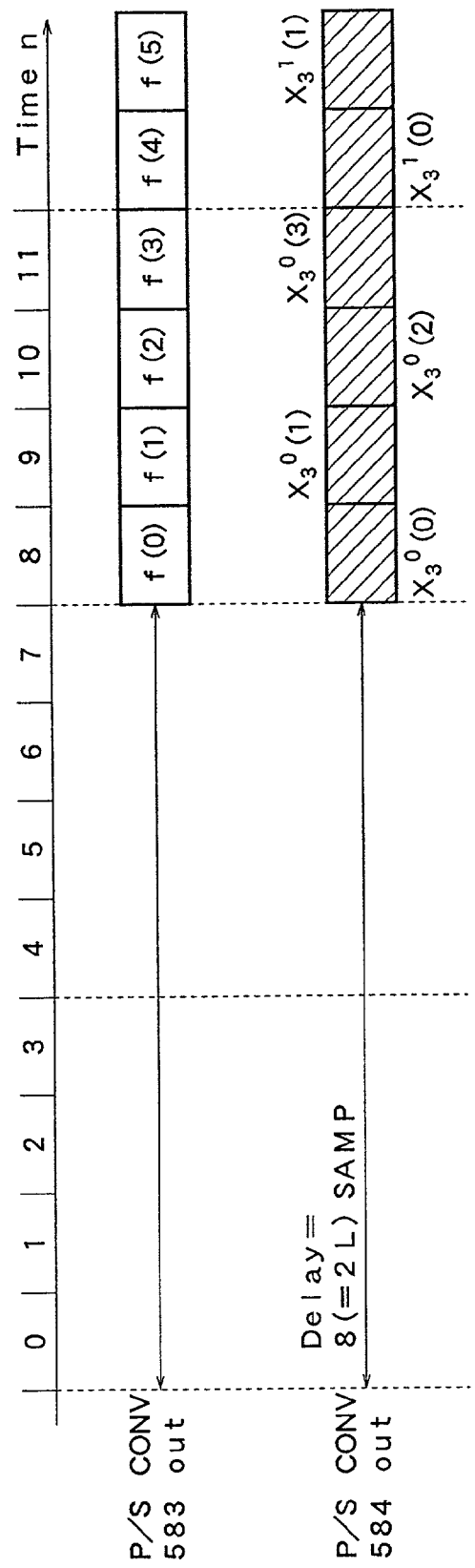
FIG. 45 is an explanatory diagram (part 4) of another example showing the operation of the FFT circuit according to Embodiment 5.

As shown in FIG. 44, the selector 585 selects the outputs of the S/P converters 581 and 582, which are outputted to the butterfly operation circuit 521. The butterfly operation circuit 521 carries out a butterfly operation of parallel data according to a clock two times as fast as the case of FIG. 34. As shown in FIG. 45, the P/S converters 583 and 584 respectively rearrange the butterfly operation results f(n) and $X_3^g(k)$ and carries out a P/S conversion so as to output the result of the FFT conversion. Here, the P/S converter 583 delays the output by (1/2) OFDM symbols, that is to say, by two samples after the completion of the butterfly operation. In the example of FIGS. 42 to 45, the process delay is eight (=2L) samples. According to the above described operation, time division multiplexing is carried out on one FFT circuit, which is then operated so that nonlinear distortion in the OFDM baseband signal that has undergone a synchronization carrier modulation can be compensated for using a smaller circuit scale.

In addition, the output f(n) of the FFT circuit 572 in the nonlinear distortion equalizer 571 in FIG. 39 passes through the synchronized demodulator 503. By taking this into consideration, according to equation (5-8), nonlinear distortion in the OFDM baseband signal that has undergone a synchronization carrier modulation may be compensated for with a higher precision.

Figure 46:
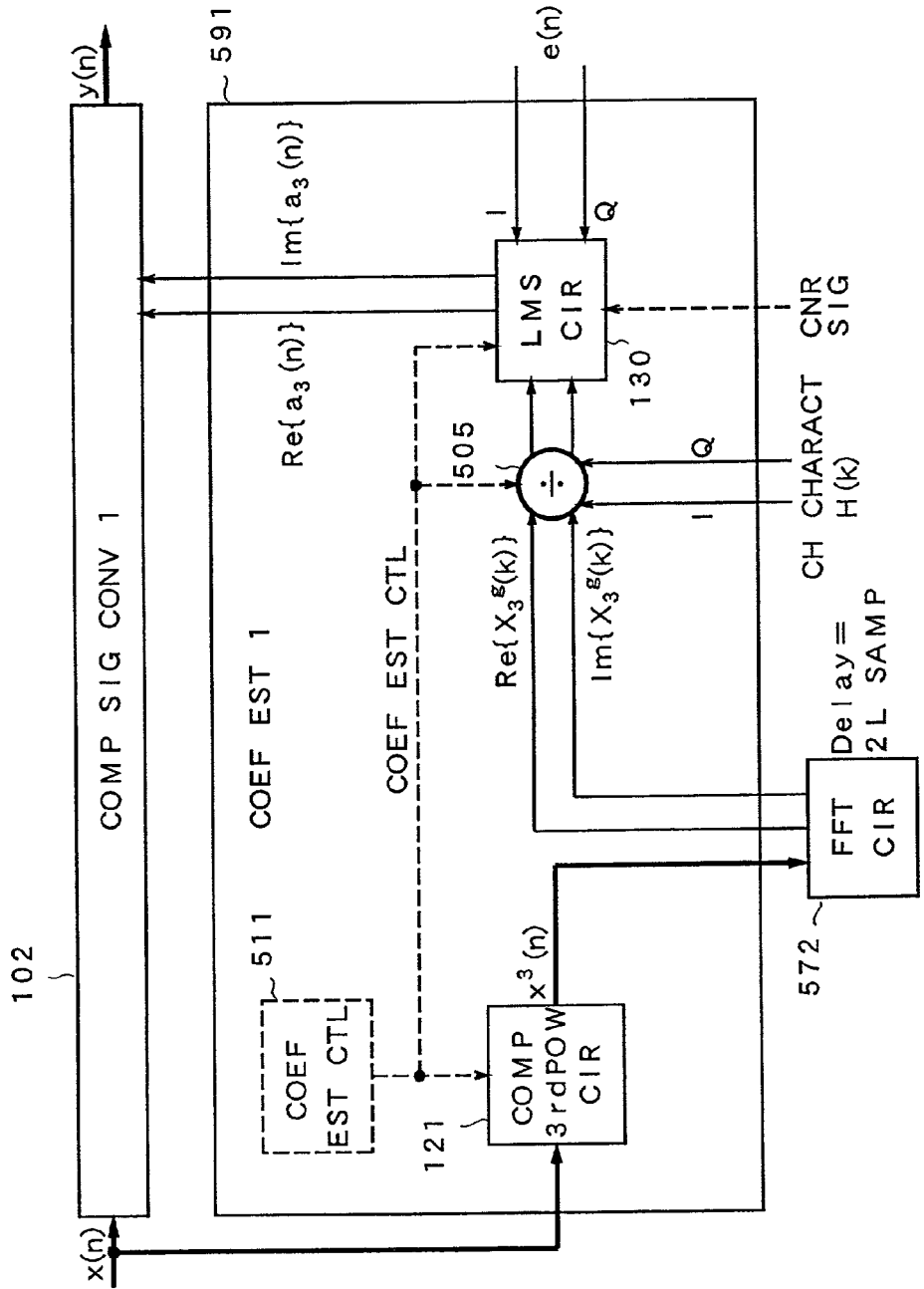
FIG. 46 is a block diagram of another example showing a configuration of the coefficient estimator for nonlinear distortion equalization according to Embodiment 5.

The configuration of the coefficient estimator 591 for nonlinear distortion equalization in this case is shown in FIG. 46. The coefficient estimator 591 for nonlinear distortion equalization is gained by providing a complex divider 505 to the front stage of the LMS circuit 130 in the coefficient estimator 573 for nonlinear distortion equalization of FIG. 40. The coefficient estimator 591 for nonlinear distortion equalization carries out a complex division of the converted value $X_3^g(k)$ of the FFT circuit 572 by the transmission path characteristics H(k) by using the complex divider 505 and outputs $X_3^g(k)/H(k)$ to the LMS circuit 130. The part of the operation other than this is the same as that of the coefficient estimator 573 for nonlinear distortion equalization of FIG. 40. According to the above described operation, time division multiplexing is carried out on one FFT circuit, which is then operated so that nonlinear distortion in the OFDM baseband signal that has undergone a synchronization carrier modulation can be compensated for with a higher precision using a smaller circuit scale according to equation (5-8).

In addition, a delay profile h'(n) may be calculated by applying time division multiplexing that is carried out on the transmission path characteristics H(k), which is generated in the synchronized demodulator 503 in the nonlinear distortion equalizer 501, to the FFT circuit 502.

A delay profile shows delay time of electrical power of a delay wave relative to the electrical power of a desired wave. In general, a delay time due to a multi-path interference is taken into consideration in the OFDM so that the length of transmission symbols is elongated by the set guard interval. On the receiver side, the data of guard interval wherein interference is expected is ignored and a window is placed on the received signal so as to cut out a portion thereof, which is used as an effective symbol. The FFT is applied only to this effective symbol. By using such a delay profile a delay time of the electrical power of the delay wave relative to the electrical power of the desired wave can be precisely determined. Therefore, the position in time in the effective symbol for avoiding the interference from the adjacent symbols is determined. Thus, the ability of removing the effects of the delay wave can be significantly enhanced.

Figure 47:
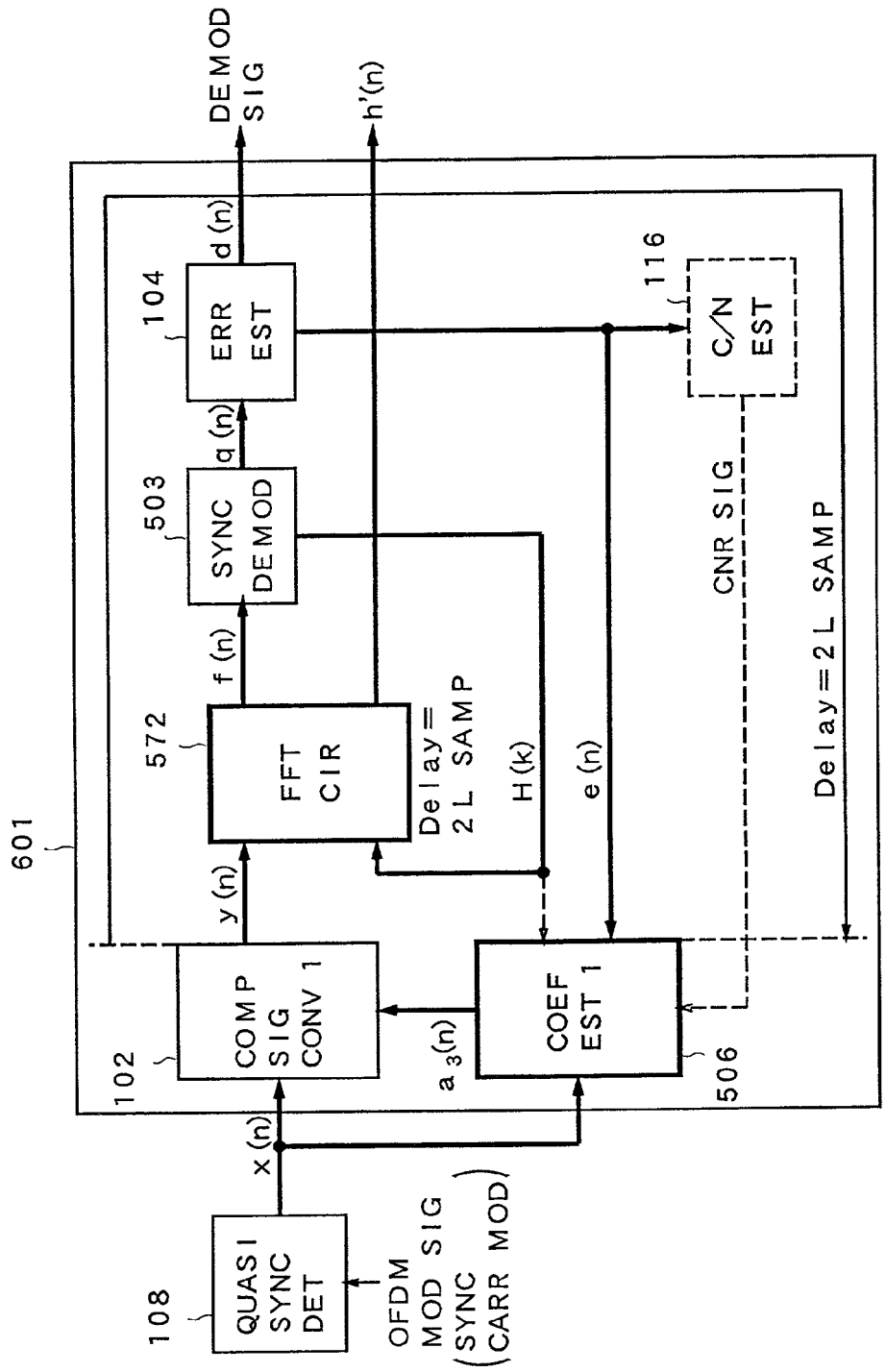
FIG. 47 is a block diagram of another example showing the entire configuration of the front end processor for a data receiver according to Embodiment 5.

The configuration of the front end processor 600 for data receiver in this case is shown in FIG. 47. In FIG. 47, a nonlinear distortion equalizer 601 is replaced with the FFT circuit 572 in the nonlinear distortion equalizer 501 of FIG. 30.

The operation of the nonlinear distortion equalizer 601 is herein described. The FFT circuit 572 carries out time division multiplexing on the signal y(n) and on the transmission path characteristics H(x) so as to carry out an FFT conversion on these respectively. Then, the FFT circuit 572 outputs the signal f(n) to the synchronized demodulator 503 and also outputs a delay profile h'(n). The other parts of the operation are the same as for the nonlinear distortion equalizer 501 of FIG. 30.

The calculation method of the delay profile is herein described. As an example, a case is considered wherein the point number L=4 of the FFT, to which T=0 is substituted for the purpose of simplification, and g=0. The delay profile h(n) is given in the following equation as an IFFT conversion of H(k).

$$h(n)=(1/4)\Sigma_{k=0\ to\ 3}H(k)W_4^{-kn},\ W_4=e^{-j2pie/4}(n=0, 1, 2, 3) \qquad \text{equation (5-20)}$$

While, the FFT conversion h'(n) of H(k) is given in the following equation.

$$h'(n)=\Sigma_{k=0\ to\ 3}H(k)W_4^{kn}\ W_4=e^{-j2pie/4}(n=0, 1, 2, 3) \qquad \text{equation (5-21)}$$

In equation (5-21) n(n=1, 2, 3) is replaced with 4−n to gain the following equation.

$$h'(4-n)=\Sigma_{k=0\ to\ 3}H(k)W_4^{k(4-n)}=\Sigma_{k=0\ to\ 3}H(k)W_4^{-kn}$$
$$(W_4^4)^k=\Sigma_{k=0\ to\ 3}H(k)W_4^{-kn}=4h(n) \qquad \text{equation (5-22)}$$

In the equation, n=3, 2, 1 is substituted into equation (5-22) so as to gain the following equation.

$$h'(1)=4h(3),\ h'(2)=4h(2),\ h'(3)=4h(1) \qquad \text{equation (5-23)}$$

In addition, the following equation is gained from equation (5-20) and equation (5-21).

$$h'(0)=4h(0) \qquad \text{equation (5-24)}$$

Figure 48:
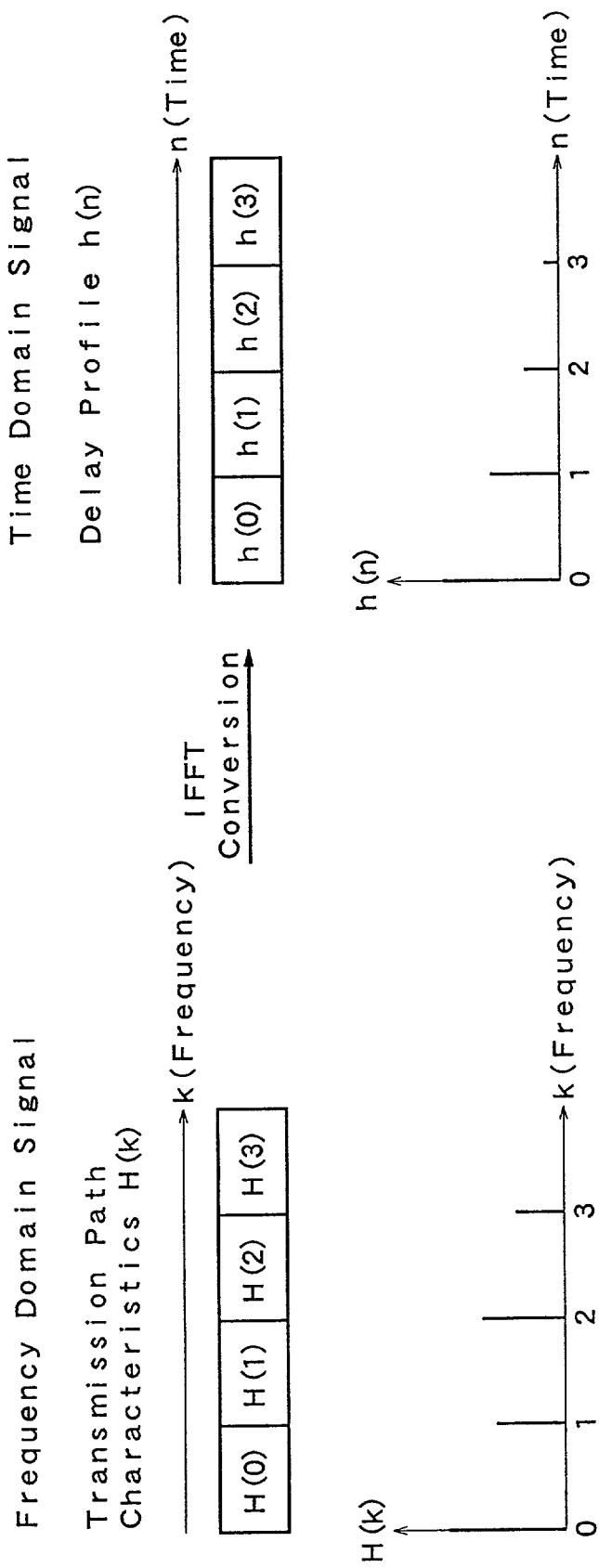
FIG. 48 is an explanatory diagram (part 1) showing a delay profile calculation method according to Embodiment 5.
Figure 49:
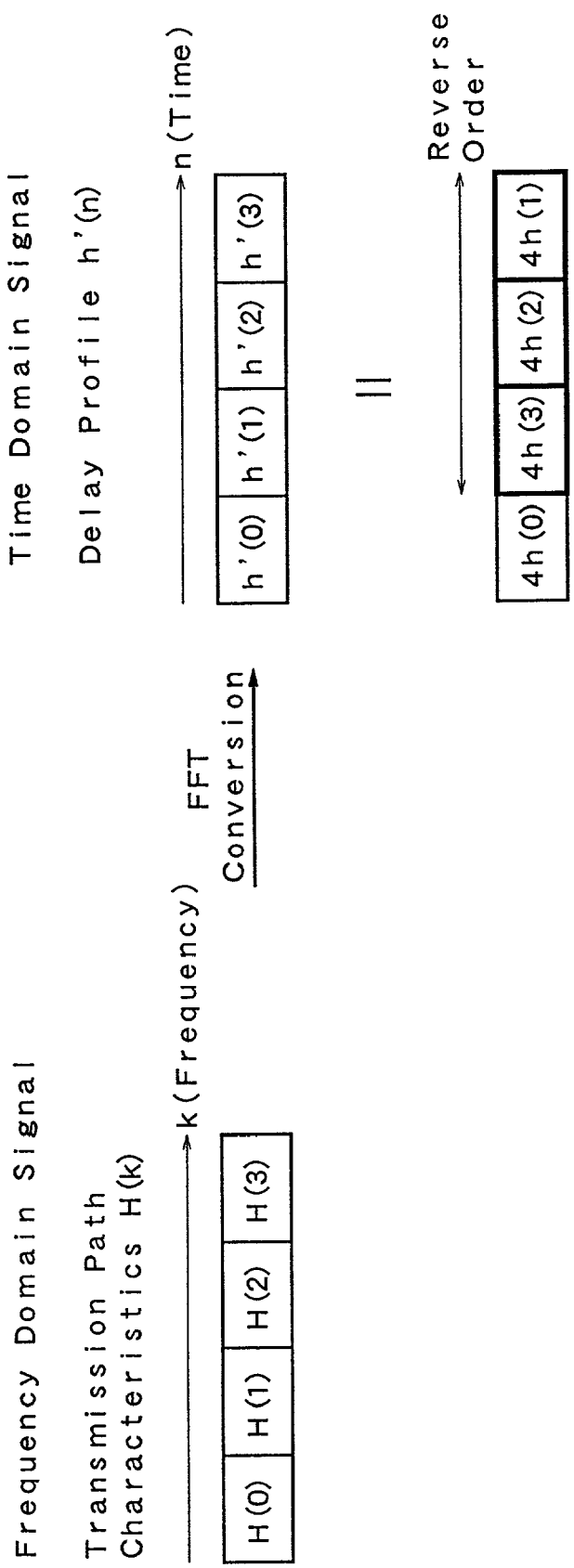
FIG. 49 is an explanatory diagram (part 2) showing a delay profile calculation method according to Embodiment 5.

FIGS. 48 and 49 illustrate the above. As shown in FIG. 48, when an IFFT conversion is carried out on the transmission path characteristics H(k) that are a frequency axis signal, the delay profile h(n) that is a time axis signal is calculated. While, as shown in FIG. 49, when the transmission path characteristics H(k) that are a frequency axis signal is assumed to be the FFT, the delay profile h'(n) is calculated. When the coefficient of four times is ignored in equation (5-23) and equation (5-24), the delay profile h'(n) becomes of reversed order of the delay profile h(n) that is a time axis signal in the range of n≧1. Though the delay profile h'(n) is different from the definition of equation (5-20), it can be utilized as a delay profile when the above described relationships are recognized and, therefore, no particular obstacle is caused. According to the above described operation, nonlinear distortion in the OFDM baseband signal that has undergone the synchronization carrier modulation is compensated for and a delay profile can be calculated without adding a new circuit.

In addition, time division multiplexing carried out on the transmission path characteristics H(k) that are generated in the synchronized demodulator 503 in the nonlinear distortion equalizer 501 in FIG. 30 is applied to the FFT circuit in the coefficient estimator 506 for nonlinear distortion equalization and, thereby, the delay profile h'(n) may be calculated.

Figure 50:
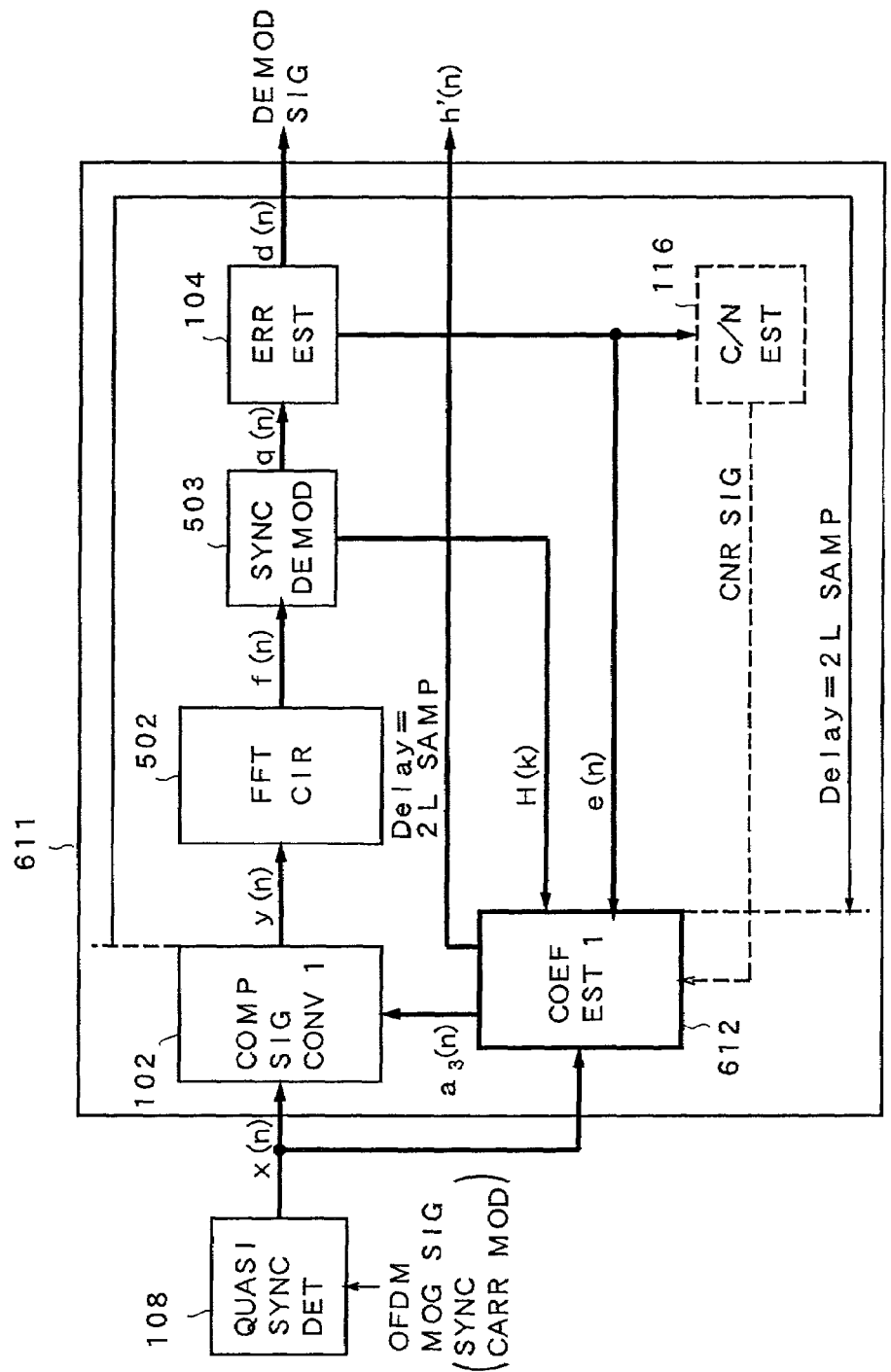
FIG. 50 is a block diagram of another example showing the entire configuration of the front end processor for a data receiver according to Embodiment 5.

The configuration of the front end processor 610 for data receiver in this case is shown in FIG. 50. In FIG. 50, a nonlinear distortion equalizer 611 is replaced with the coefficient estimator 612 for nonlinear distortion equalization in the nonlinear distortion equalizer 501 of FIG. 30.

Figure 51:
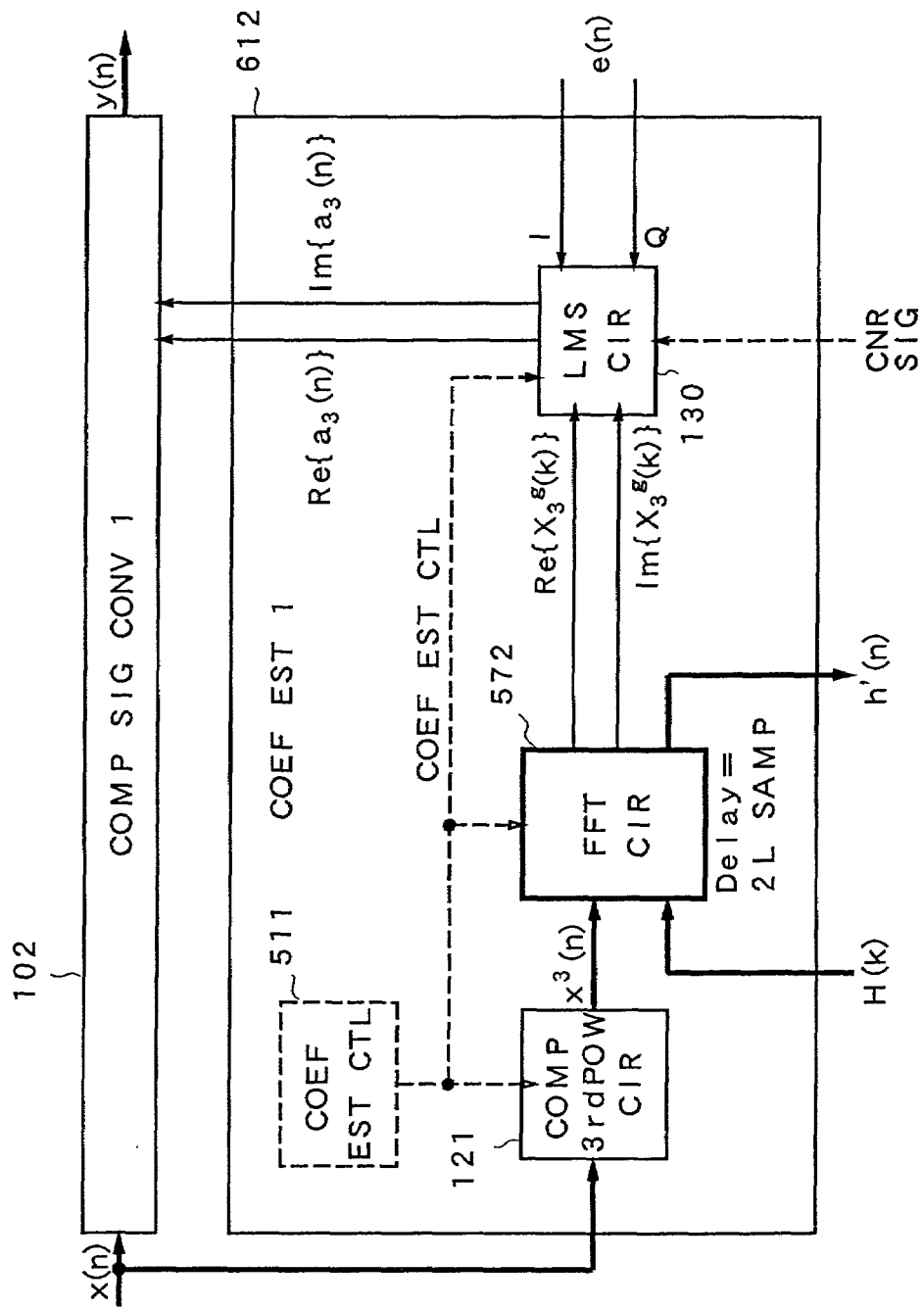
FIG. 51 is a block diagram of another example showing a configuration of the coefficient estimator for nonlinear distortion equalization according to Embodiment 5.

The configuration of the coefficient estimator 612 for nonlinear distortion equalization is shown in FIG. 51. The coefficient estimator 612 for nonlinear distortion equalization is gained by replacing the FFT circuit 502 with an FFT circuit 572 in the coefficient estimator 506 for nonlinear distortion equalization of FIG. 31. The FFT circuit 572 carries out time division multiplexing on the converted value $x^3(n)$ of the complex cube calculator 121 and the transmission path characteristics H(k) so as to carry out the FFT conversion on these respectively. Then, the FFT circuit 572 outputs the converted value $X_3^g(k)$ to the LMS circuit 130 and also outputs the delay profile h'(n). The operation of the coefficient estimator 612 for nonlinear distortion equalization is the same, with the exception of the operation of the above parts, as that of the coefficient estimator 506 for nonlinear distortion equalization of FIG. 31.

In addition, the operation of the nonlinear distortion equalizer 611 is the same, with the exception of the operation of the above parts, as that of the coefficient estimator 601 for nonlinear distortion equalization of FIG. 30. According to the above described operation, nonlinear distortion in the OFDM baseband signal that has undergone synchronization carrier modulation is compensated for and a delay profile can be calculated without adding a new circuit.

In addition, the output f(n) of the FFT circuit 502 in the nonlinear distortion equalizer 611 of FIG. 50 passes through the synchronized demodulator 503. By taking this into consideration, nonlinear distortion in the OFDM baseband signal that has undergone synchronization carrier modulation may be compensated for with a higher precision according to equation (5-8).

Figure 52:
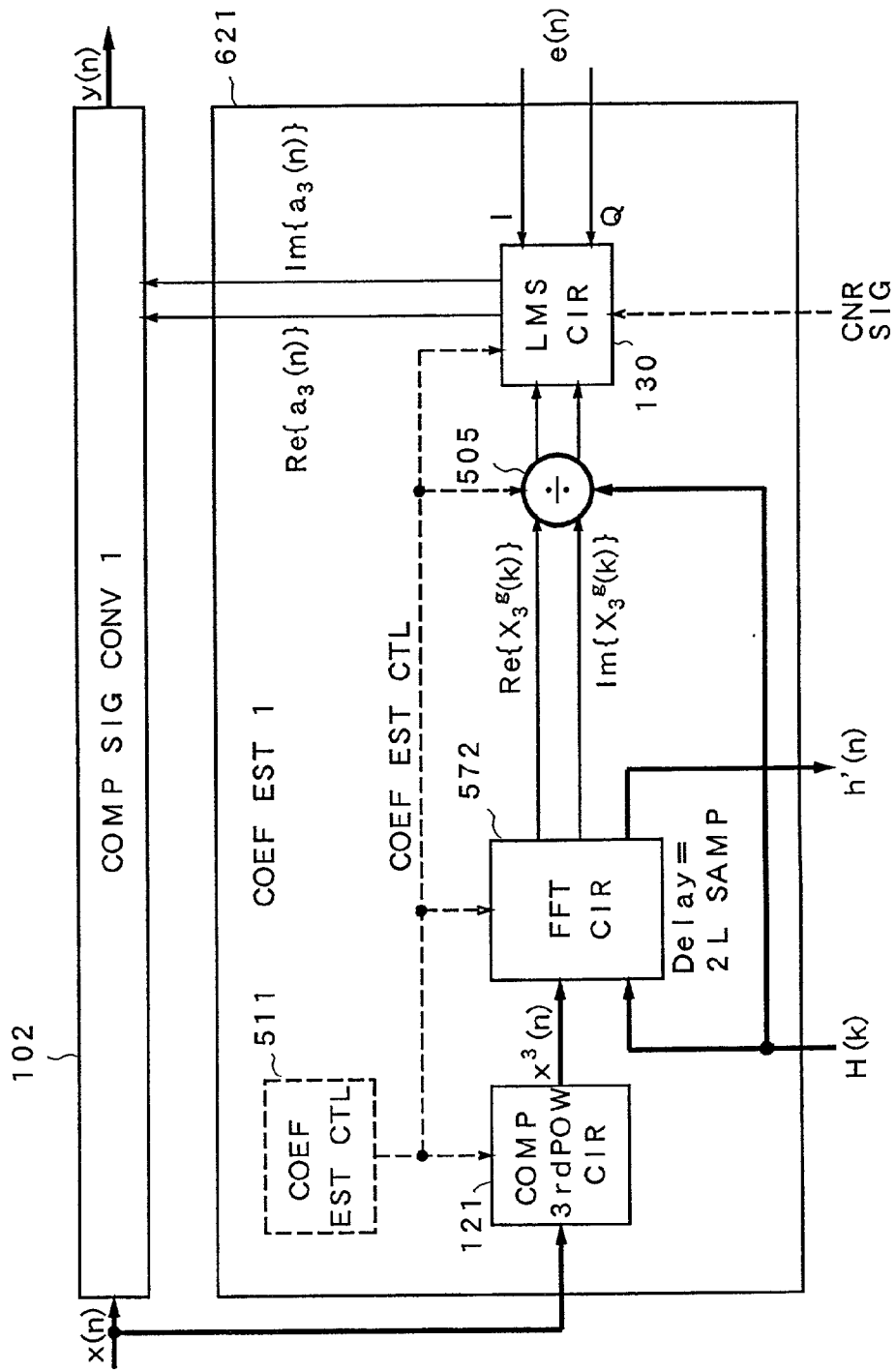
FIG. 52 is a block diagram of another example showing a configuration of the coefficient estimator for nonlinear distortion equalization according to Embodiment 5.

The configuration of the coefficient estimator 621 for nonlinear distortion equalization in this case is shown in FIG. 52. The coefficient estimator 621 for nonlinear distortion equalization is gained by providing a complex divider 505 at the front stage of the LMS circuit 130 in the coefficient estimator 612 for nonlinear distortion equalization of FIG. 51. The coefficient estimator 612 for nonlinear distortion equalization carries out a complex division of the converted value $X_3^g(k)$ of the FFT circuit 572 by the transmission path characteristics H(k) using the complex divider 505 and outputs $X_3^g(k)/H(k)$ to the LMS circuit 130. The operation of the coefficient estimator 612 for nonlinear distortion equalization is the same, with the exception of the above, as that of the coefficient estimator 612 for nonlinear distortion equalization of FIG. 51.

According to the above described operation, nonlinear distortion in the OFDM baseband signal that has undergone synchronization carrier modulation is compensated for with a higher precision according to equation (5-8) and the delay profile can be calculated without adding a new circuit.

In addition, the coefficient estimator 506 for nonlinear distortion equalization of FIG. 31, the coefficient estimator 541 for nonlinear distortion equalization of FIG. 35, the coefficient estimator 573 for nonlinear distortion equalization of FIG. 40, the coefficient estimator 591 for nonlinear distortion equalization of FIG. 46, the coefficient estimator 612 for nonlinear distortion equalization of FIG. 51 and the coefficient estimator 621 for nonlinear distortion equalization of FIG. 52 may carry out coefficient update on only one OFDM symbol, for example, for every two OFDM symbols.

The coefficient estimator 506 for nonlinear distortion equalization of FIG. 31 is provided with a coefficient estimator controller 511. The coefficient estimator controller 511 outputs a coefficient update control signal (COEF EST CON), wherein only one OFDM symbol becomes of "H" for every two OFDM symbols. The complex cube calculator 121, the FFT circuit 502 and the LMS circuit 130 respectively stop the operation during the period of time when the coefficient update control signal is "L."

The coefficient estimator 541 for nonlinear distortion equalization of FIG. 35, the coefficient estimator 573 for nonlinear distortion equalization of FIG. 40, the coefficient estimator 591 for nonlinear distortion equalization of FIG. 46, the coefficient estimator 612 for nonlinear distortion equalization of FIG. 51 and the coefficient estimator 621 for nonlinear distortion equalization of FIG. 52 are provided with a coefficient estimator controller 511 in the same manner. Each circuit in the coefficient estimator for nonlinear distortion equalization stops the operation during the period of time when the coefficient update control signal is "L." According to the above described operation, though the convergence period of time of the coefficient for third order distortion equalization becomes slightly long, the power consumption of the coefficient estimator for nonlinear distortion equalization can be reduced to approximately 1/2.

In addition, the coefficient estimator 612 for nonlinear distortion equalization in the nonlinear distortion equalizer 611 of FIG. 50 may carry out coefficient update on only one OFDM symbol for, for example, every two OFDM symbols so as to calculate the delay profile h'(n) during the period of the OFDM symbols that do not undergo coefficient update.

Figure 53:
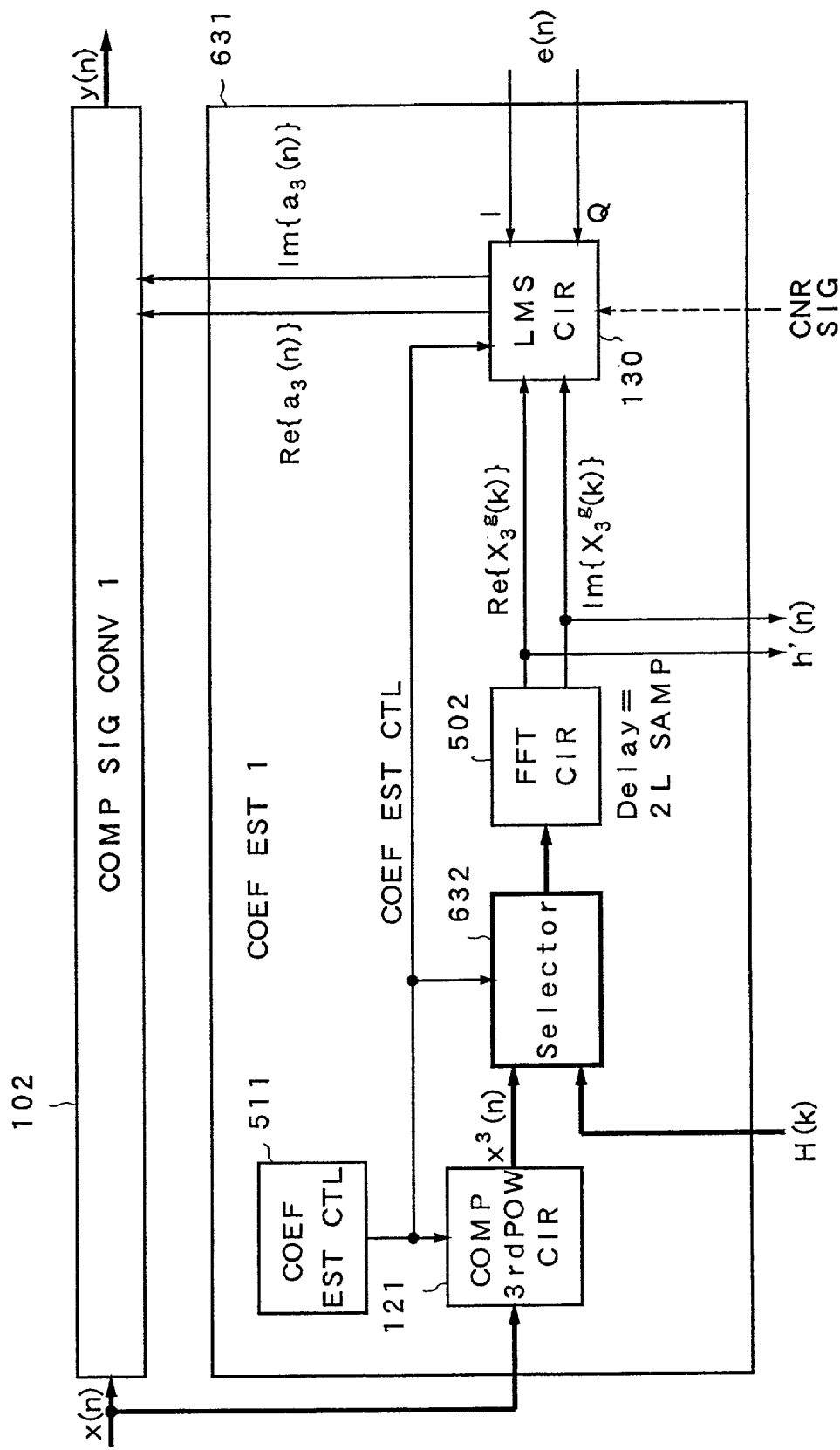
FIG. 53 is a block diagram of another example showing a configuration of the coefficient estimator for nonlinear distortion equalization according to Embodiment 5.

The configuration of the coefficient estimator 631 for nonlinear distortion equalization in this case is shown in FIG. 53. The coefficient estimator 631 for nonlinear distortion equalization is gained by replacing the FFT circuit 572 with an FFT circuit 502 and by providing a selector 632 to the front stage of the FFT circuit 502 in the coefficient estimator 612 for nonlinear distortion equalization of FIG. 51.

The coefficient estimator controller 511 outputs a coefficient update control signal wherein only one OFDM symbol for every two OFDM symbols becomes "H." The complex cube calculator 121 and the LMS circuit 130 stop the operations during the period of time when the coefficient update control signal is "L". In addition, the selector 632 selects the cubed value $X_3(n)$ of the complex cube calculator 121 during the period of time when the coefficient update control signal is "H" and selects the transmission path characteristics H(k) during the period of time of "L", which is outputted to the FFT circuit 502. The FFT circuit 502 carries out an FFT conversion on the selected signal, which is outputted to the LMS circuit 130 and to an external circuit. The FFT circuit 502 alternately outputs the converted value $X_3^g(k)$ and the delay profile h'(n) for every one OFDM symbol. However, the LMS circuit 130 stops the operation during the OFDM symbols wherein the delay profile h'(n) is outputted. In addition, only the OFDM symbols wherein the delay profile h'(n) is outputted allow the output to an external circuit to be effective.

According to the above described operation, nonlinear distortion in the OFDM baseband signal that has undergone synchronization carrier modulation is compensated for and a delay profile can be carried out only by adding a selector without increasing the power consumption.

In addition, the output f(n) in the FFT circuit 502 in the nonlinear distortion equalizer 611 of FIG. 50 passes through the synchronized demodulator 503. By taking this into consideration, nonlinear distortion in the OFDM baseband signal that has undergone synchronization carrier modulation may be compensated for with a higher precision according to equation (5-8).

Figure 54:
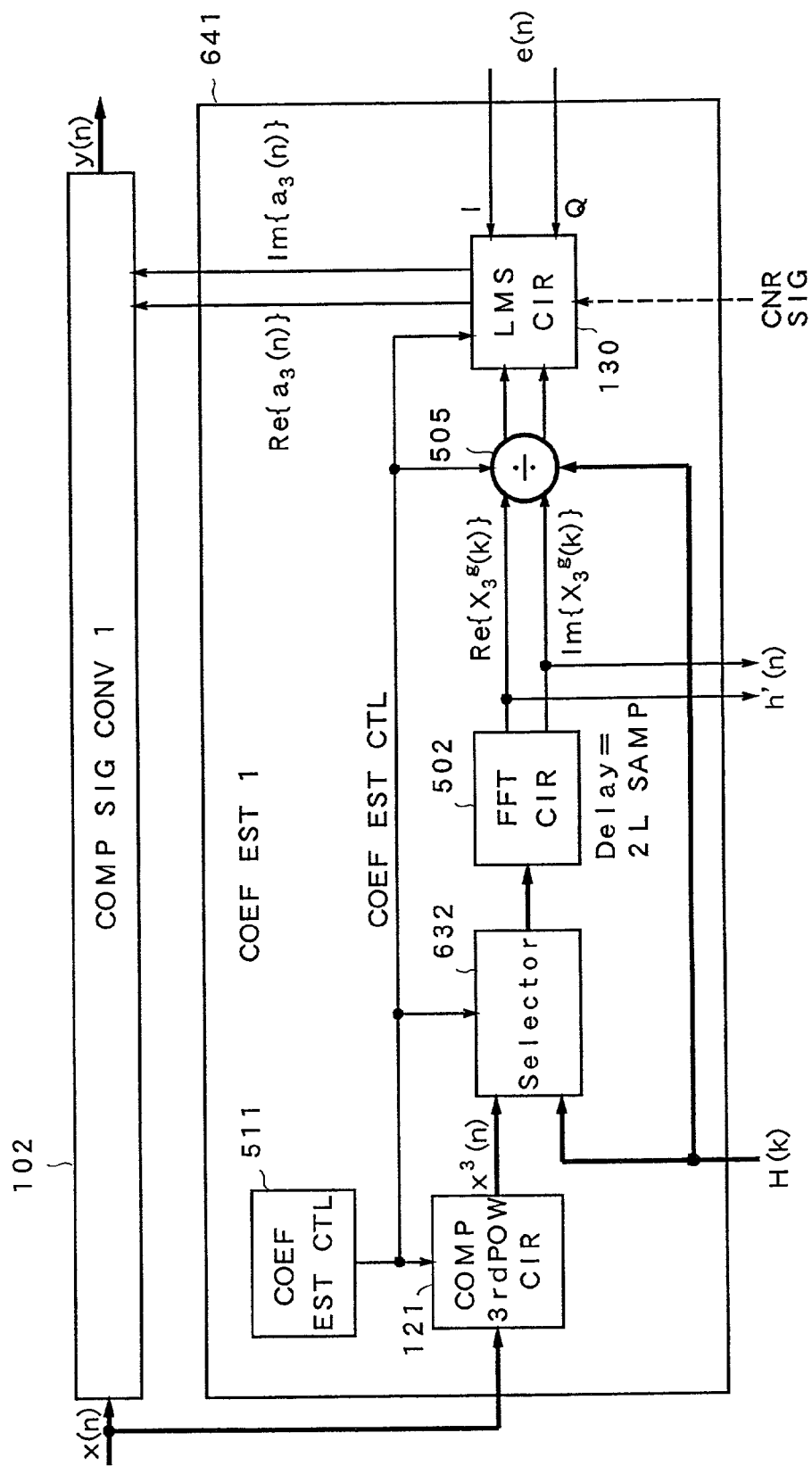
FIG. 54 is a block diagram of another example showing a configuration of the coefficient estimator for nonlinear distortion equalization according to Embodiment 5.

The configuration of the coefficient estimator 641 for nonlinear distortion equalization in this case is shown in FIG. 54. The coefficient estimator 641 for nonlinear distortion equalization is gained by providing a complex divider 505 to the front stage of the LMS circuit 130 in the coefficient estimator 631 for nonlinear distortion equalization of FIG. 53. The coefficient estimator 641 for nonlinear distortion equalization carries out a complex division of the converted value $X_3g(k)$ of the FFT circuit 502 by the transmission path characteristics $H(k)$ using the complex divider 505 and outputs $X_3{}^g(k)/H(k)$ to the LMS circuit 130. The operation of the coefficient estimator 641 for nonlinear distortion equalization, with the exception of the above, is the same as that of the coefficient estimator 631 for nonlinear distortion equalization of FIG. 53.

According to the above described operation, nonlinear distortion in the OFDM baseband signal that has undergone synchronization carrier modulation is compensated for with a higher precision in accordance with equation (5-8) and a delay profile can be calculated only by adding a selector without increasing the power consumption.

In addition, the coefficient estimator 573 for nonlinear distortion equalization in the nonlinear distortion equalizer 571 of FIG. 39 carries out coefficient update on only one OFDM symbol for, for example, every two OFDM symbols. Then, in the case that the delay profile h'(n) is calculated during the period of time of the OFDM symbols that do not undergo coefficient update, time division multiplexing may be applied to the FFT circuit 572 in the nonlinear distortion equalizer 571.

The configuration of the front end processor 650 for data receiver in this case is shown in FIG. 55. In FIG. 55, the nonlinear distortion equalizer 651 is gained by adding a selector 632 to the nonlinear distortion equalizer 571 of FIG. 39.

The operation of the nonlinear distortion equalizer 655 is described. The coefficient estimator 573 for nonlinear distortion equalization carries out an operation on only one OFDM symbol for every two OFDM symbols by means of a coefficient update control signal generated in the coefficient estimator controller. Then, the complex cube calculator 121 converts the signal x(n) into the cubed value $x^3(n)$ and outputs the conversion result to a selector 632. The selector 632 selects the cubed value $x^3(n)$ during the period of time when the coefficient update control signal is "H" and selects the transmission path characteristics H(k) during the period of time of "L", and outputs to the FFT circuit 572.

The FFT circuit 572 applies time division multiplexing to the signal y(n) and the output of the selector 632 and carries out an FFT conversion on them, respectively. Then, the FFT circuit 572 outputs the signal f(n) to the synchronized demodulator 503 and outputs the FFT conversion value of the selector 632 to the coefficient estimator 573 for nonlinear distortion equalization and to an external circuit. The FFT circuit 572 alternately outputs the converted value $X_3{}^g(k)$ and the delay profile h'(n) for every other OFDM symbol as the FFT conversion value of the selector 632. However, the coefficient estimator 573 for nonlinear distortion equalization stops the operation during the OFDM symbols wherein the delay profile h'(n) is outputted. In addition, only the values of the OFDM symbols wherein the delay profile h'(n) is outputted become effective to an external circuit. The operation of the other parts is the same as that of the nonlinear distortion equalizer 571 of FIG. 39.

According to the above described operation, only one FFT circuit is operated by applying time division multiplexing and nonlinear distortion in the OFDM baseband signal that has undergone synchronization carrier modulation can be compensated for using a smaller circuit scale. In addition, a delay profile can be calculated only by adding a selector without increasing the power consumption.

Furthermore, in the nonlinear distortion equalizer 651 of FIG. 55, the output f(n) of the FFT circuit 572 passes through the synchronized demodulator 503. By taking this into consideration, nonlinear distortion in the OFDM baseband signal that has undergone synchronization carrier modulation may be compensated for with a higher precision in accordance with equation (5-8).

The configuration of the front end processor 660 for data receiver in this case is shown in FIG. 56. The nonlinear distortion equalizer 661 is gained by replacing the coefficient estimator 573 for nonlinear distortion equalization with a coefficient estimator 591 for nonlinear distortion equalization in the nonlinear distortion equalizer 651 of FIG. 55. The nonlinear distortion equalizer 661 carries out a complex division of the converted value $X_3{}^g(k)$ of the FFT circuit 572 by the transmission path characteristics H(k) using the complex divider 505 of the coefficient estimator 591 for nonlinear distortion equalization. Then, the complex divider 505 outputs the division result $X_3{}^g(k)/H(k)$ to the LMS circuit 130. The operation of the nonlinear distortion equalizer 661, with the exception of the above, is the same as the operation of the nonlinear distortion equalizer 651 of FIG. 55.

According to the above described operation, only one FFT circuit is operated by applying time division multiplexing and nonlinear distortion in the OFDM baseband signal that has undergone synchronization carrier modulation in accordance with equation (5-8) can be compensated for using a smaller circuit scale. Then, a delay profile can be calculated only by adding a selector without increasing the power consumption.

In addition, the coefficient estimator 506 for nonlinear distortion equalization of FIG. 31, the coefficient estimator 541 for nonlinear distortion equalization of FIG. 35, the coefficient estimator 573 for nonlinear distortion equalization of FIG. 40, the coefficient estimator 591 for nonlinear distortion equalization of FIG. 46, the coefficient estimator 612 for nonlinear distortion equalization of FIG. 51, the coefficient estimator 621 for nonlinear distortion equalization of FIG. 52, the coefficient estimator 631 for nonlinear distortion equalization of FIG. 53 and the coefficient estimator 641 for nonlinear distortion equalization of FIG. 54 may carry out coefficient update only at the time of high C/N.

A C/N estimator is provided in the nonlinear distortion equalizer 501 of FIG. 30, in the nonlinear distortion equalizer 571 of FIG. 39, in the nonlinear distortion equalizer 601 of FIG. 47, in the nonlinear distortion equalizer 611 of FIG. 50, in the nonlinear distortion equalizer 651 of FIG. 55 and in the nonlinear distortion equalizer 661 of FIG. 56 in the same manner as in Embodiment 1. The C/N estimator 116 calculates and averages the C/N and outputs the result as a CNR signal. The coefficient estimator for nonlinear distortion equalization makes the setting of $a_3(n)=0$ in the case that the C/N shown by the CNR signal is smaller than the set threshold value, and the complex signal converter 102 for nonlinear distortion equalization outputs y(n)=x(n) in the same manner as in Embodiment 1. In the case that the C/N shown by the CNR signal is the set threshold value, or greater, a coefficient update is carried out. According to the above described operation, nonlinear distortion in the OFDM baseband signal that has undergone synchronization carrier modulation can be compensated for without being negatively affected at the time of low C/N.

Here, though in the present embodiment, only the nonlinear distortion that is the dominant third order distortion is removed as shown in equation (1-1), arbitrary high order nonlinear distortion of second order distortion, or higher, may be compensated for by using equation (1-11). The coefficient updating equation in this case is gained as the following equation when $H(k)=1$ is assumed in the respective orders.

$$a_m(n+1)=a_m(n)+ue(n)[FFT(x'''(n))]^* (m>1) \quad \text{equation (5-25)}$$

The next equation can be gained by taking into consideration that the signal $f(n)$ passes through the synchronized demodulator 503.

$$a_m(n+1)=a_m(n)+ue(n)[FFT(x'''(n))/H(k)]^* (m>1) \quad \text{equation (5-26)}$$

Here, $x'''(n)=|x^{m-1}(n)|x(n)$ is formed.

Figure 57:
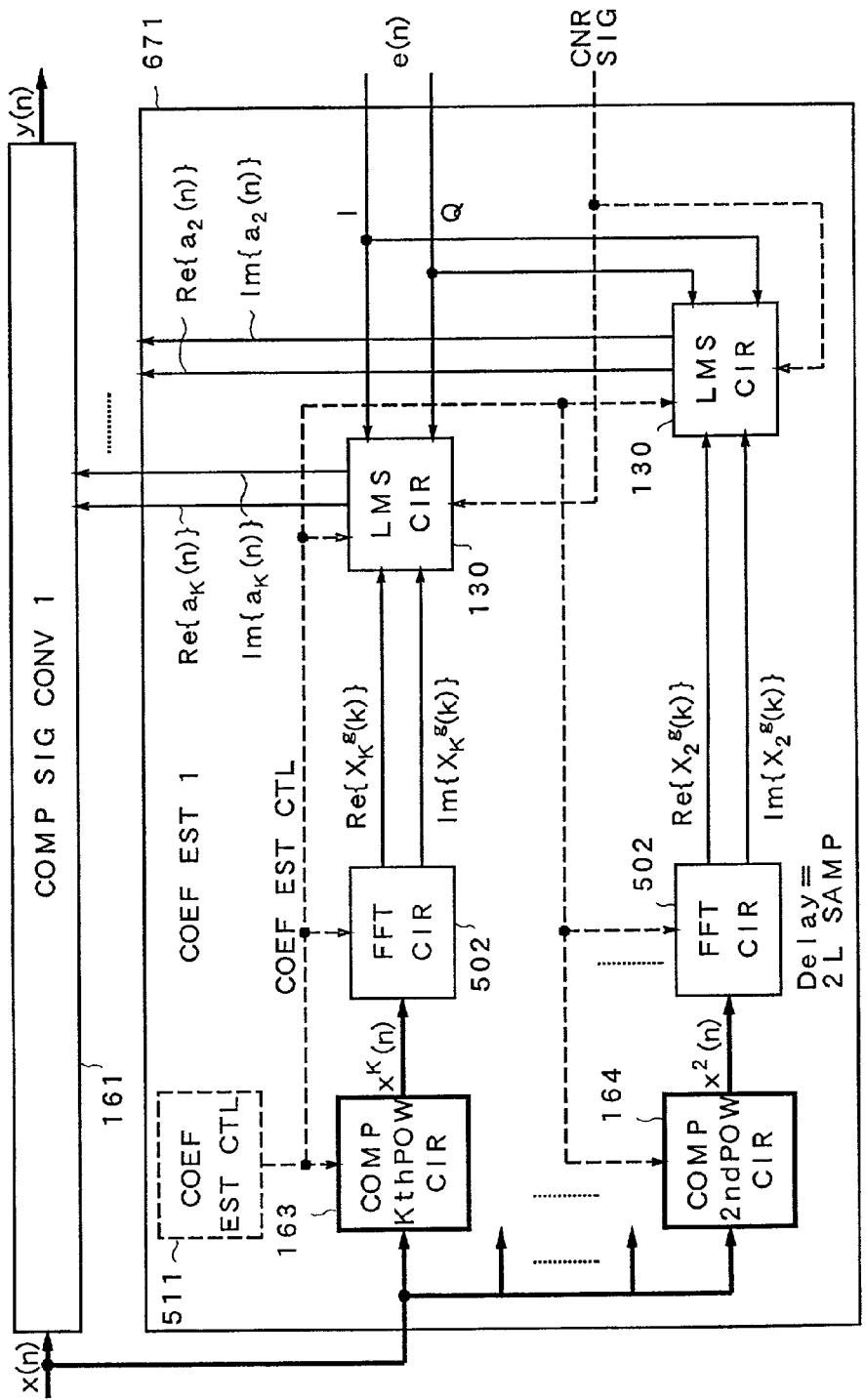
FIG. 57 is a block diagram of another example showing a configuration of the coefficient estimator for nonlinear distortion equalization according to Embodiment 5.

The configuration diagram of the coefficient estimator 671 for nonlinear distortion equalization that compensates for a high order nonlinear distortion of at least second order distortion and no more than K-th order distortion by using equation (5-25) in the nonlinear distortion equalizer 501 of FIG. 30 and in the nonlinear distortion equalizer 601 of FIG. 47 is shown in FIG. 57. The coefficient estimator 671 for nonlinear distortion equalization has a complex K-th power calculator 163, a complex square calculator 164, a plurality of FFT circuits 502 according to the number of the orders and a plurality of LMS circuits 130 according to the number of the orders. The complex signal converter 161 for nonlinear distortion equalization is the same as shown in FIG. 9.

When the signal $x(n)$ on which a quasi-synchronization detection is carried out is inputted to the coefficient estimator 671 for nonlinear distortion equalization, the complex K-th power calculator 163 generates $|x^{K-1}(n)|x(n)$, that is $x^K(n)$ while the complex square calculator 164 generates $|x(n)|x(n)$, that is $x^2(n)$. The FFT circuit 502 of each order carries out an FFT conversion on the value of K-th power $x^K(n)$ and the squared value $x^2(n)$, respectively, so as to output the converted values $X_K{}^g(k)$ and $X_2{}^g(k)$ on the frequency axis to the LMS circuit 130 of each order. The LMS circuit 130 of each order uses the converted values $X_K{}^g(k)$ and $X_2{}^g(k)$ and the error signal $e(n)$ so as to carry out a coefficient update. Then, the LMS circuit 130 outputs the coefficient $a_K(n)$ for K-th order distortion equalization and the coefficient $a_2(n)$ for the second order distortion equalization to the complex signal converter 161 for nonlinear distortion equalization.

The complex m-th power calculator generates $|x^{m-1}(n)|x(n)$, as m-th power value $x'''(n)$, in the same manner as for the other orders. Then, the LMS circuit 130 uses the output signal of the complex m-th power value $x'''(n)$ and the error signal $e(n)$ so as to carry out a coefficient update and outputs the coefficient $a_m(n)$ for the m-th order distortion equalization to the complex signal converter 161 for nonlinear distortion equalization. In addition, the complex signal converter 161 for nonlinear distortion equalization has the same configuration as described in Embodiment 1 and outputs $y(n)$ shown in equation (1-11). According to the above described operation arbitrary high order nonlinear distortion of second order distortion, or higher, can be compensated for.

In addition, in the case that the coefficient estimator 506 for nonlinear distortion equalization in the nonlinear distortion equalizer 501 of FIG. 30 and in the nonlinear distortion equalizer 601 of FIG. 47 is replaced with the coefficient estimator 541 for nonlinear distortion equalization of FIG. 35, arbitrary high order nonlinear distortion of the second order distortion, or higher, can be compensated for in the same manner. Equation (5-26) is used for the respective orders as the coefficient updating equation in this case.

Figure 58:
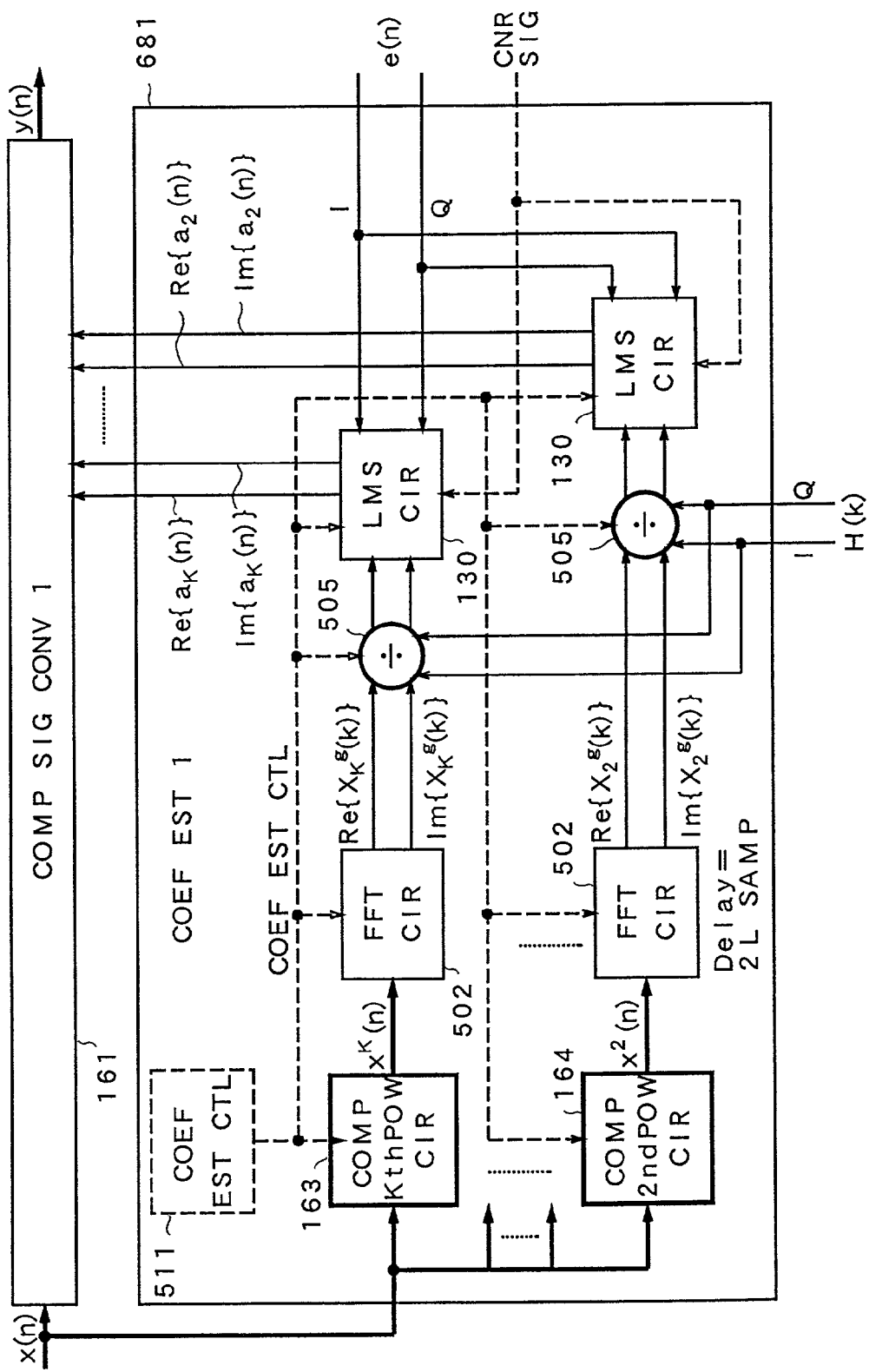
FIG. 58 is a block diagram of another example showing a configuration of the coefficient estimator for nonlinear distortion equalization according to Embodiment 5.

The configuration of the coefficient estimator 681 for nonlinear distortion equalization in this case is shown in FIG. 58. This circuit is gained by adding complex dividers 505, respectively, to the front stages of the LMS circuit 130 for the respective orders in the coefficient estimator 671 for nonlinear distortion equalization.

In addition, arbitrary high order nonlinear distortion of the second order distortion, or higher, can be compensated for in the nonlinear distortion equalizer 571 of FIG. 39 and in the nonlinear distortion equalizer 651 of FIG. 55 in the same manner. Equation (5-25) is used for the respective orders as the coefficient updating equation in this case.

Figure 59:
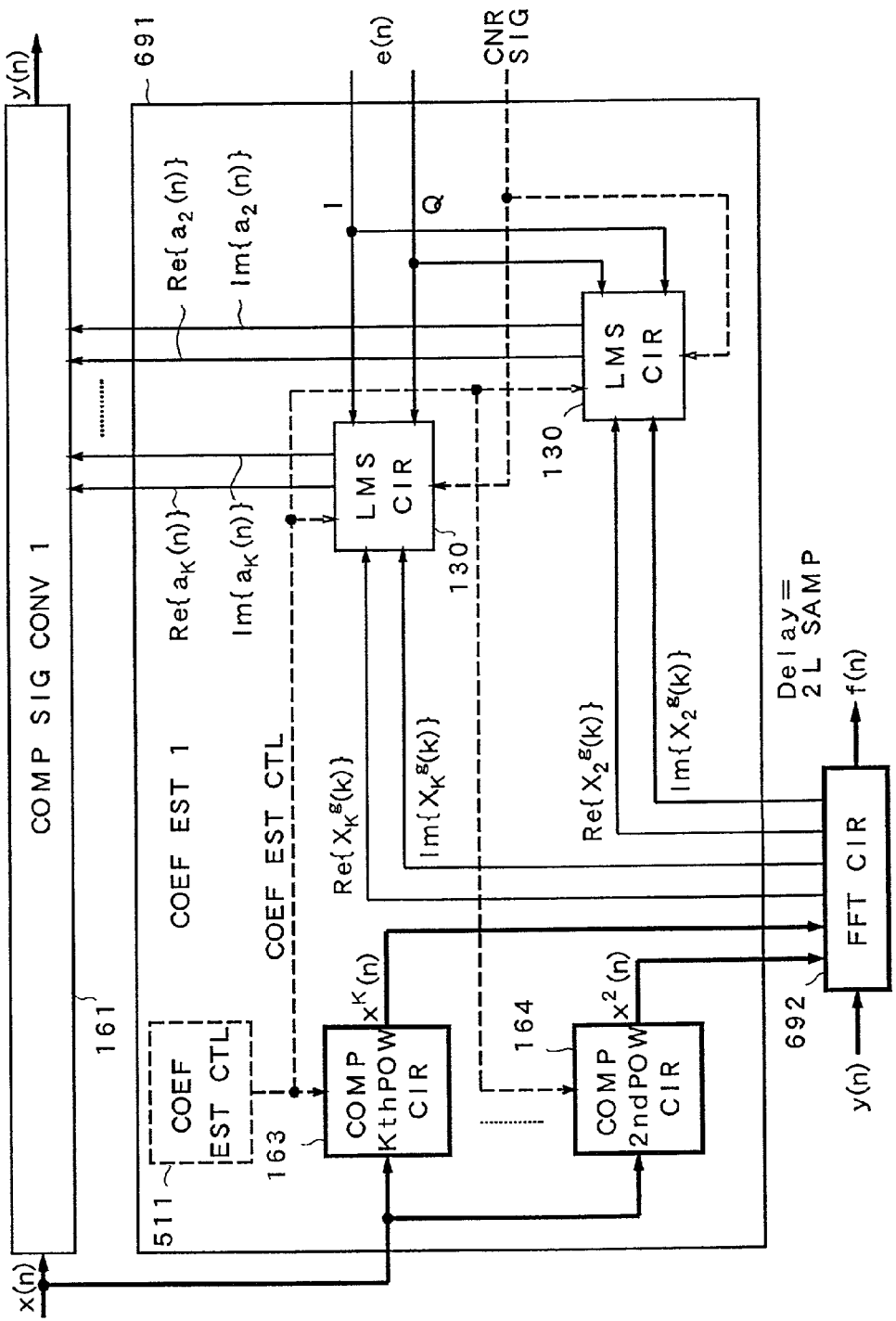
FIG. 59 is a block diagram of another example showing a configuration of the coefficient estimator for nonlinear distortion equalization according to Embodiment 5.

The configuration of the coefficient estimator 691 for nonlinear distortion equalization in this case is shown in FIG. 59. The coefficient estimator 691 for nonlinear distortion equalization has a complex K-th power calculator 163, a complex square calculator 164 and a plurality of LMS circuits 130 according to the number of the orders. In addition, the FFT circuit 572 in FIG. 39 or in FIG. 55 is replaced with an FFT circuit 692 while the complex signal converter 161 for nonlinear distortion equalization is the same as shown in FIG. 9.

The operation of the coefficient estimator 691 for nonlinear distortion equalization is herein described. The complex K-th power calculator 163 and the complex square calculator 164 output, respectively, the K-th power value $x^K(n)$ and the squared value $x^2(n)$ to the external FFT circuit 692. The FFT circuit 692 carries out time division multiplexing on the signal $y(n)$, the K-th power value $x^K(n)$ and the squared value $x^2(n)$ so as to carry out an FFT conversion on them, respectively. Then, the FFT circuit 692 outputs the signal $f(n)$ to the synchronized demodulator 503 and outputs the converted values $X_K{}^g(k)$ and $X_2{}^g(k)$ to the LMS circuits 130 of each order, respectively. The LMS circuit 130 of each order uses the converted values $X_K{}^g(k)$ and $X_2{}^g(k)$ and the error signal $e(n)$ so as to carry out a coefficient update and outputs the coefficient $a_K(n)$ for K-th order distortion equalization and the coefficient $a_2(n)$ for second order distortion equalization to the complex signal converter 161 for nonlinear distortion equalization. In addition, the complex signal converter 161 for nonlinear distortion equalization has the same configuration as described in Embodiment 1 and outputs the signal $y(n)$ shown in equation (1-11).

Figure 60:
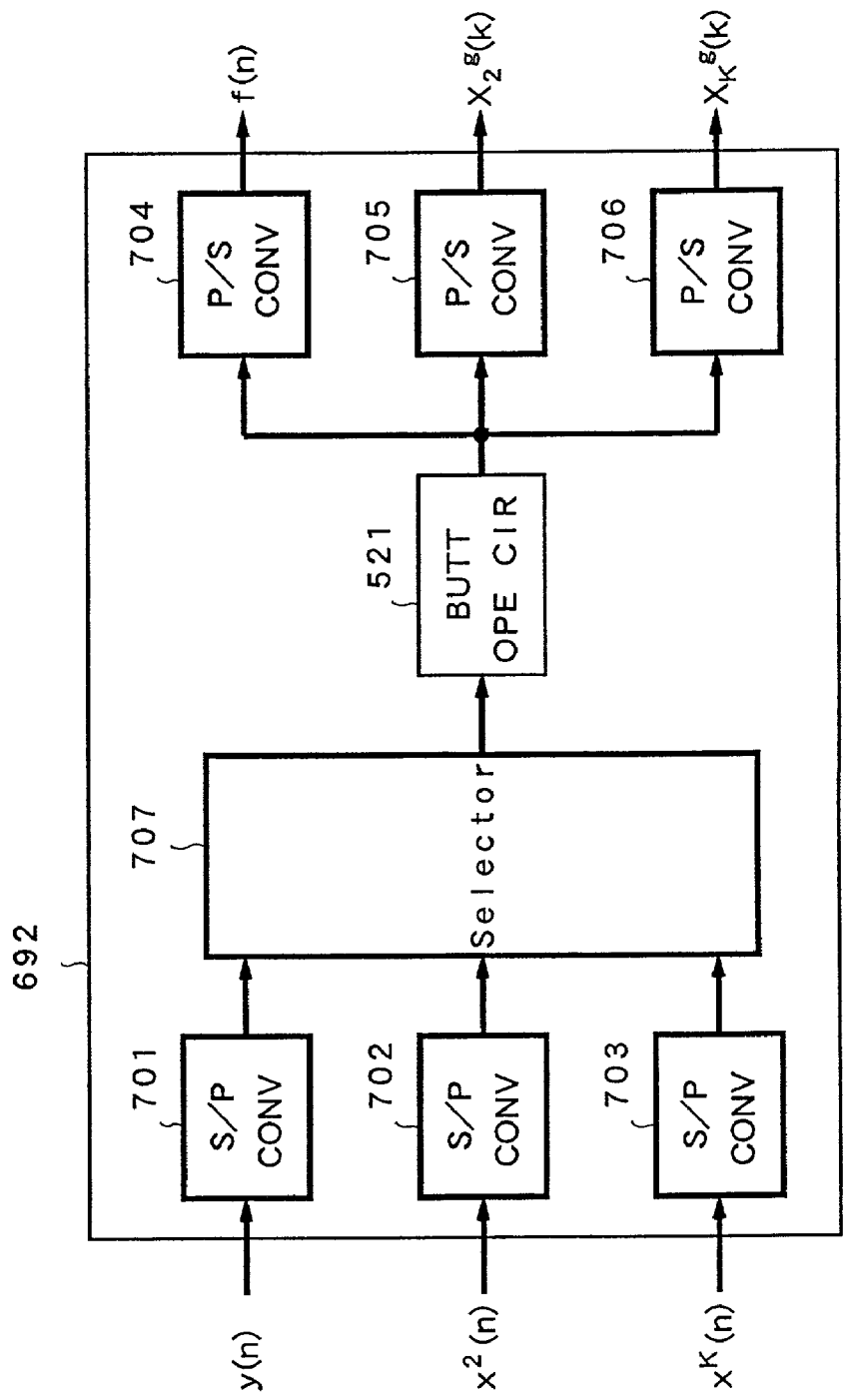
FIG. 60 is a block diagram of another example showing a configuration of the FFT circuit according to Embodiment 5.

The configuration of the FFT circuit 692 is shown in FIG. 60. The FFT circuit 692 has S/P converters 701, 702 and 703, a butterfly operation circuit 521, P/S converters 704, 705 and 706 and a selector 707.

Figure 61:
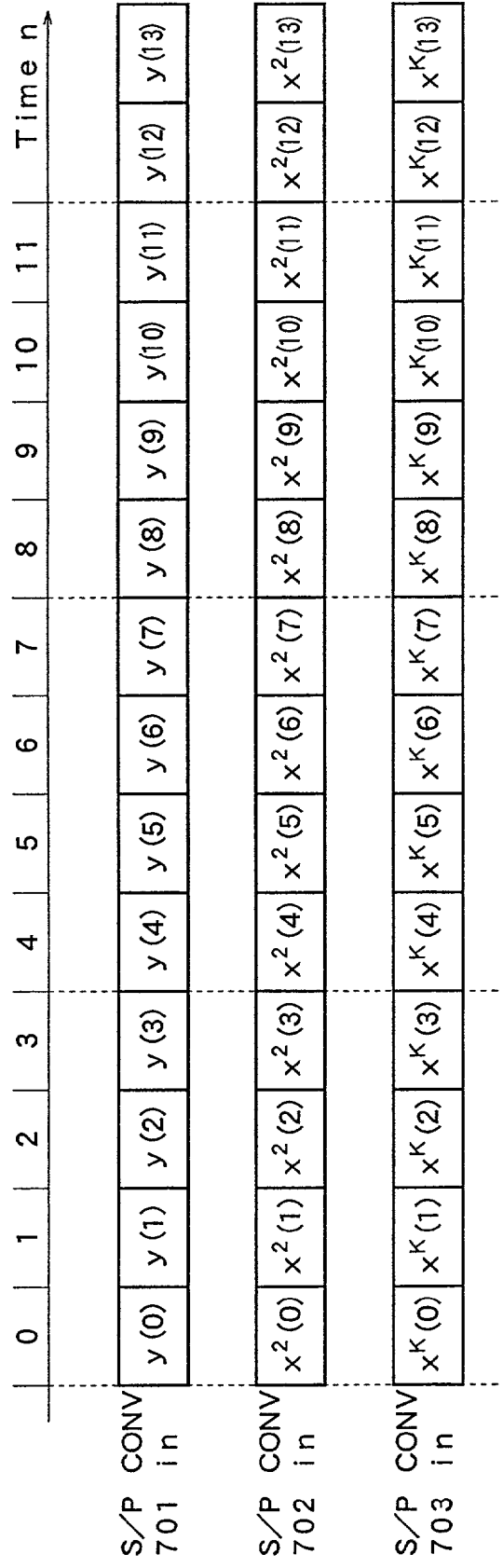
FIG. 61 is an explanatory diagram (part 1) of another example showing operation of the FFT circuit according to Embodiment 5.
Figure 62:
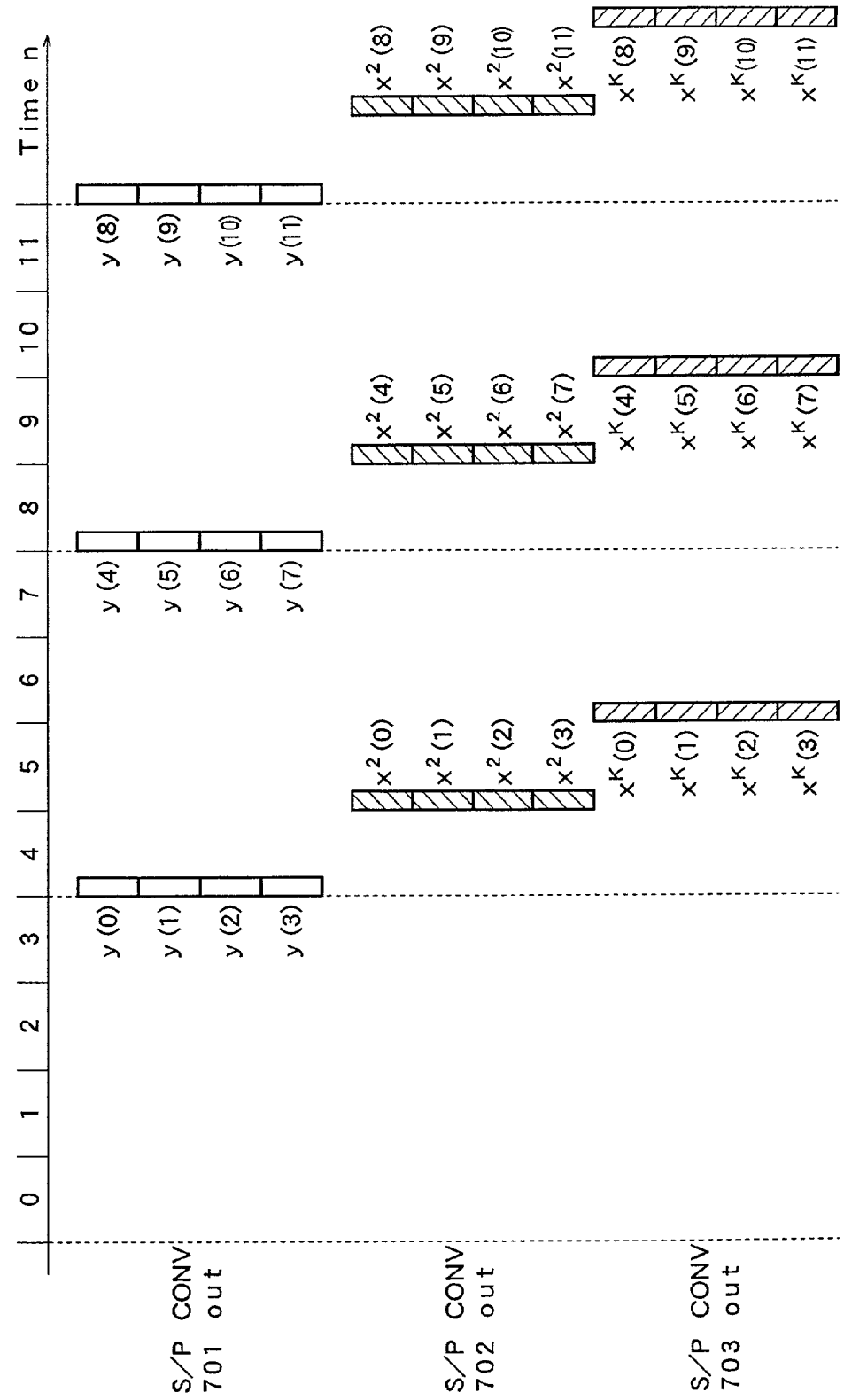
FIG. 62 is an explanatory diagram (part 2) of another example showing operation of the FFT circuit according to Embodiment 5.
Figure 63:
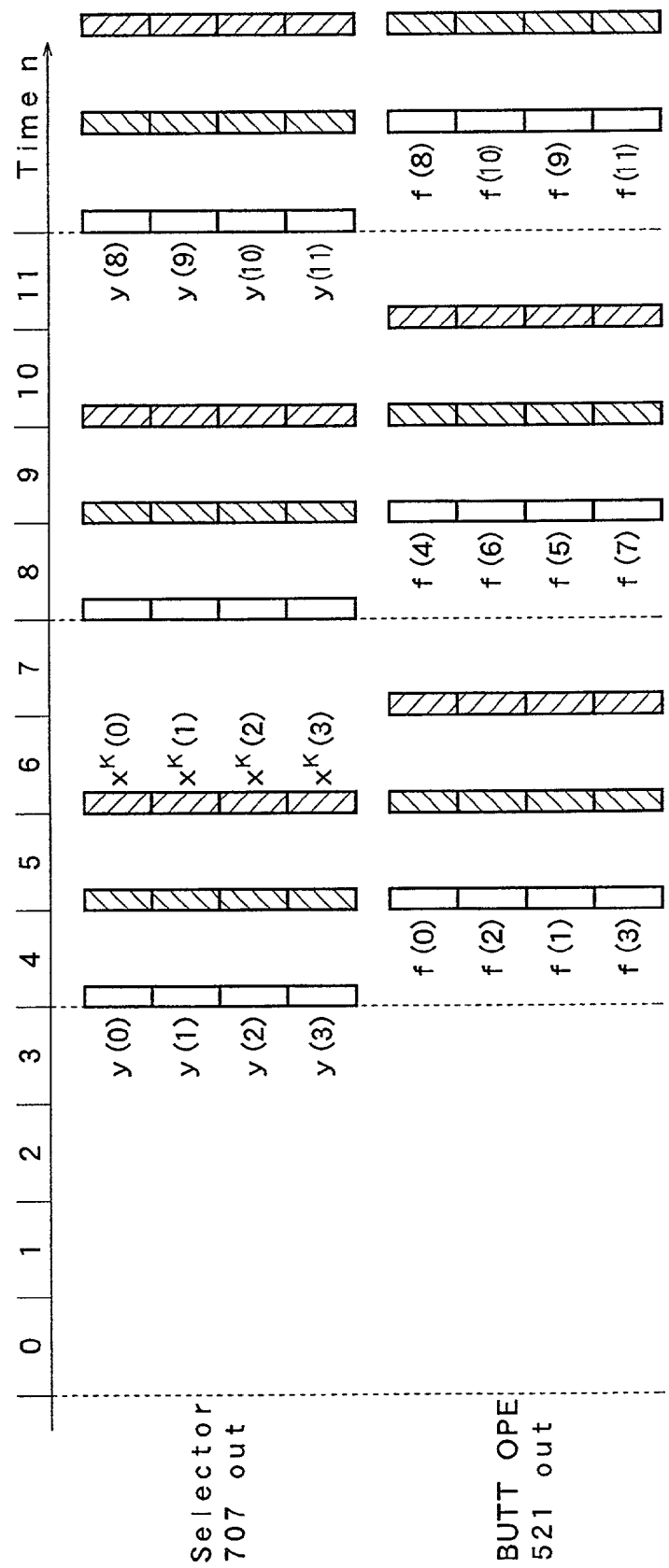
FIG. 63 is an explanatory diagram (part 3) of another example showing operation of the FFT circuit according to Embodiment 5.

The appearance of the operation of the FFT circuit 692 is shown in FIGS. 61 to 65. The horizontal axis represents time n. As an example, a case wherein the point number L=4 of the FFT is assumed. As shown in FIGS. 61 and 62, the S/P converters 701, 702 and 703 output parallel data by carrying out an S/P conversion for every four samples. Here, the S/P converters 702 and 703 delay the outputs by one sample and by two samples, respectively, relative to the S/P converter 701. As shown in FIG. 63, the selector 707 selects the outputs of the S/P converters 701, 702 and 703, which are outputted to the butterfly operation circuit 521.

Figure 64:
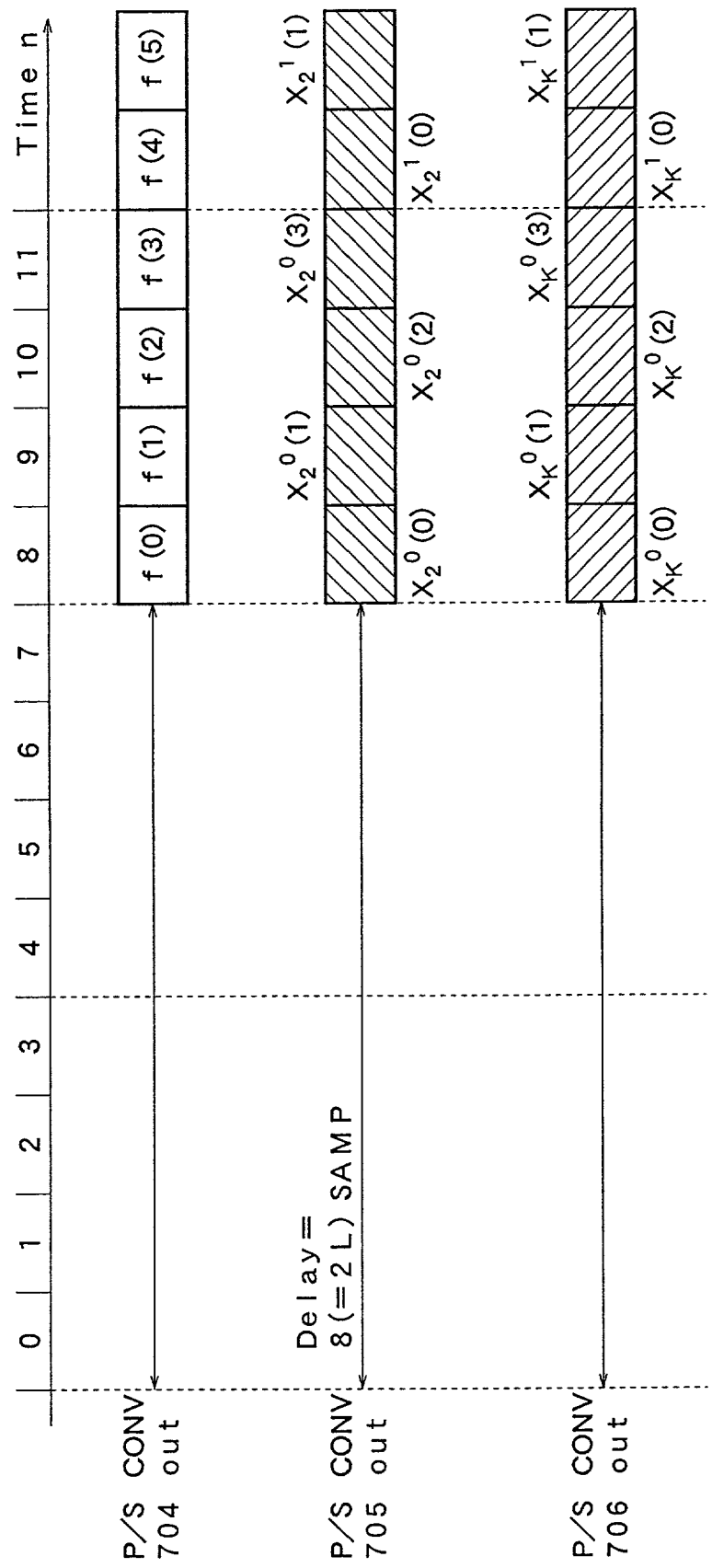
FIG. 64 is an explanatory diagram (part 4) of another example showing operation of the FFT circuit according to Embodiment 5.

As shown in FIG. 63, the butterfly operation circuit 521 carries out a butterfly operation of the parallel data according to a clock four times faster than the case of FIG. 34. As shown in FIG. 64, the P/S converters 704, 705 and 706, respectively, rearrange the butterfly operation results $f(n)$, $X_2{}^g(k)$ and $X_K{}^g(k)$ so as to carry out a P/S conversion and output the results of the FFT conversion. Here, the P/S converters 705 and 706 delay the outputs by two samples and by one sample, respectively, after the completion of the butterfly operation. In the example of FIGS. 61 to 64, the process delay is eight (=2L) samples.

According to the above described operation, time division multiplexing is carried out on one FFT circuit, which is operated so that arbitrary high order nonlinear distortion of the second order distortion, or higher, can be compensated for using a smaller circuit scale. In the case that nonlinear distortion of another order is compensated for, a complex m-th power calculator of this order m and an LMS circuit 130 are added and the degree of multiplexing of the FFT circuit 792 may be raised if necessary.

In addition, in the case that the coefficient estimator 573 for nonlinear distortion equalization in the nonlinear distortion equalizer 571 of FIG. 39 and in the nonlinear distortion equalizer 651 of FIG. 55 is replaced with the coefficient estimator 591 for nonlinear distortion equalization of FIG. 46, arbitrary high order nonlinear distortion of second order distortion, or higher, can be compensated for in the same manner. Equation (5-26) is used in the respective order as the coefficient update equation of this case.

Figure 65:
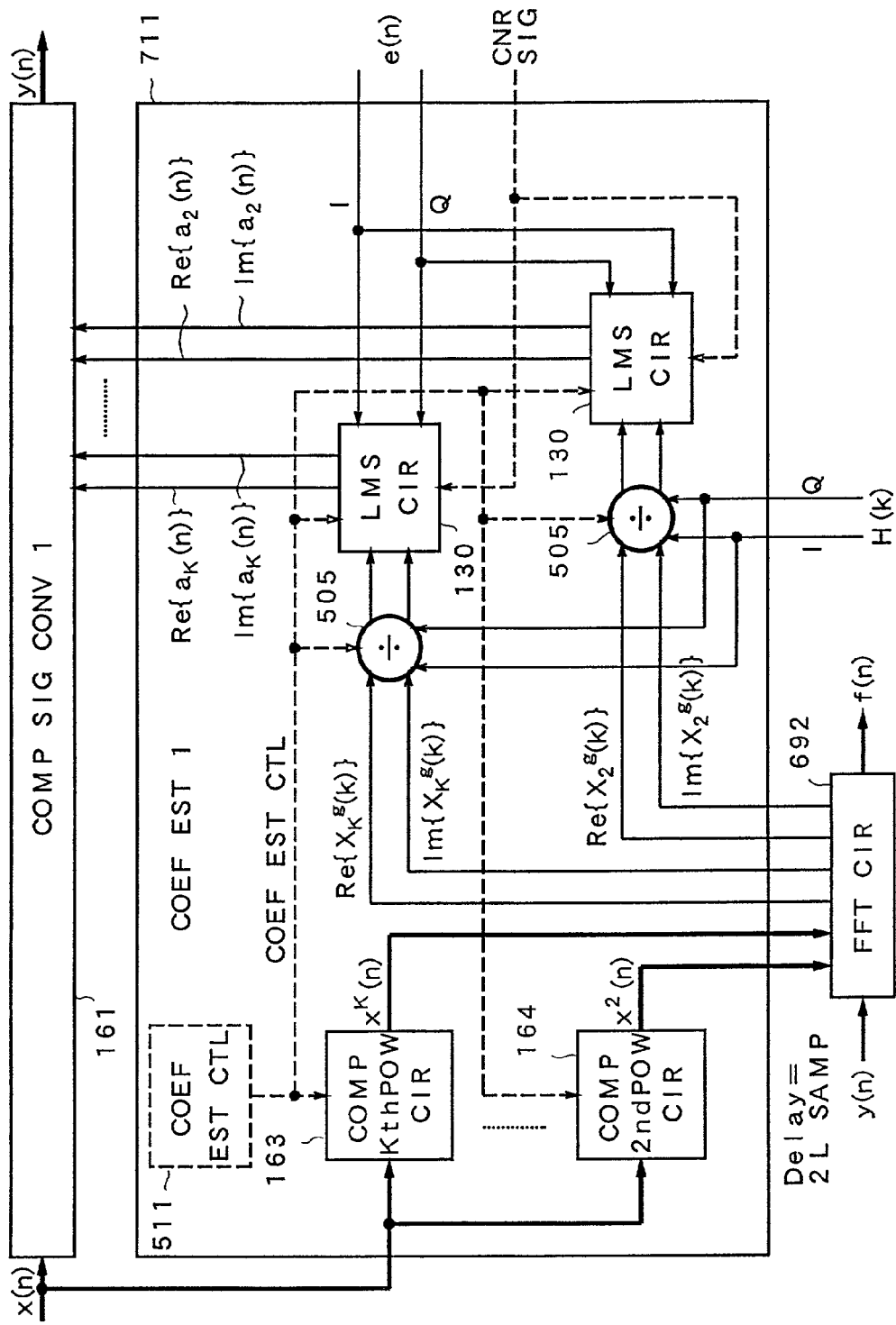
FIG. 65 is a block diagram of another example showing a configuration of the coefficient estimator for nonlinear distortion equalization according to Embodiment 5.

The configuration of the coefficient estimator 711 for nonlinear distortion equalization in this case is shown in FIG. 65. This circuit is gained by providing a complex divider 505 to the front stage of the LMS circuit 130 of each order, respectively, in the coefficient estimator 691 for nonlinear distortion equalization of FIG. 59.

Figure 66:
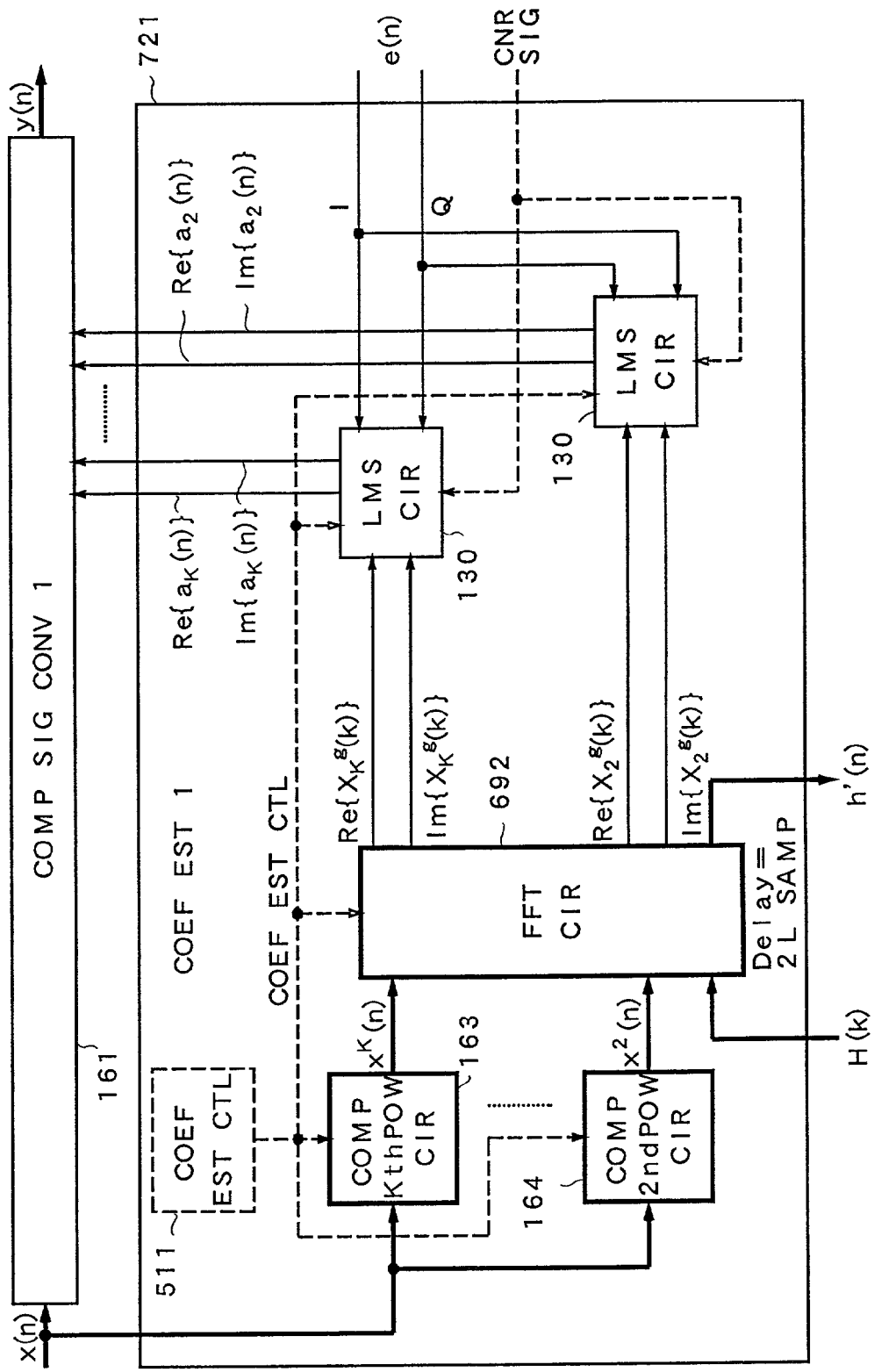
FIG. 66 is a block diagram of another example showing a configuration of the coefficient estimator for nonlinear distortion equalization according to Embodiment 5.

In addition, arbitrary high order nonlinear distortion of second order distortion, or higher, can be compensated for in the same manner in the nonlinear distortion equalizer 611 in FIG. 50. Equation (5-25) is used in the respective orders as the coefficient update equation of this case. The configuration of the coefficient estimator 721 for nonlinear distortion equalization in this case is shown in FIG. 66. The coefficient estimator 721 for nonlinear distortion equalization has a complex K-th power calculator 163, a complex square calculator 164, an FFT circuit 692 and a plurality of LMS circuits 130 according to the number of orders. In addition, the complex signal converter 161 for nonlinear distortion equalization is the same as that shown in FIG. 9.

The operation of the coefficient estimator 721 for nonlinear distortion equalization is herein described. The complex K-th power calculator 163 and the complex square calculator 164 respectively output the K-th power value $x^K(n)$ and the squared value $x^2(n)$ to the FFT circuit 692. The FFT circuit 692 carries out time division multiplexing on the K-th power value $x^K(n)$, on the squared value $x^2(n)$ and on the transmission characteristics H(k) so as to carry out the respective FFT conversions and outputs the converted values $X_K{}^g(k)$ and $X_2{}^g(k)$ to the LMS circuits 130 of the respective orders and, at the same time, outputs the delay profile h'(n). The LMS circuit 130 of each order uses the converted values and the error signal e(n) so as to carry out a coefficient update and outputs the coefficient $a_K(n)$ for K-th order distortion equalization and the coefficient $a_2(n)$ for second order distortion equalization to the complex signal converter 161 for nonlinear distortion equalization.

In addition, the complex signal converter 161 for nonlinear distortion equalization has the same configuration as that described in Embodiment 1 and outputs the signal y(n) shown in equation (1-11). According to the above described operation, arbitrary high order nonlinear distortion of second order distortion, or higher, can be compensated for and a delay profile can be calculated without adding a new circuit.

In the case that nonlinear distortion of another order is compensated for, a complex m-th power calculator of that order m and an LMS circuit 130 are added and the degree of multiplexing of the FFT circuit 692 may be increased if necessary.

Figure 67:
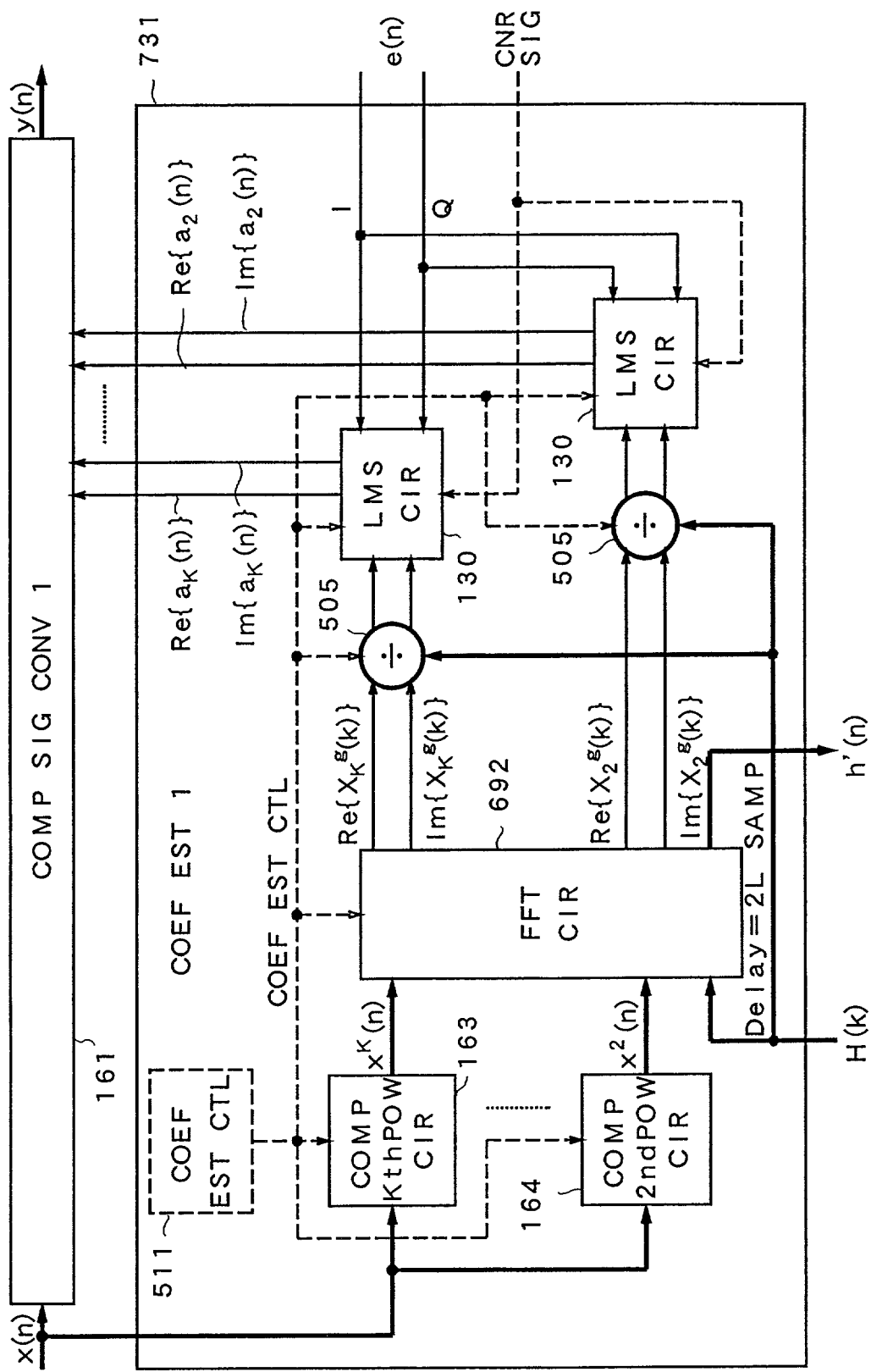
FIG. 67 is a block diagram of another example showing a configuration of the coefficient estimator for nonlinear distortion equalization according to Embodiment 5.

In addition, in the case that the coefficient estimator 612 for nonlinear distortion equalization in the nonlinear distortion equalizer 611 in FIG. 50 is replaced with the coefficient estimator 621 for nonlinear distortion equalization of FIG. 52, arbitrary high order nonlinear distortion of second order distortion, or higher, can be compensated for in the same manner. Equation (5-26) is used in the respective orders as the coefficient update equation of this case. The coefficient estimator 731 for nonlinear distortion equalization shown in FIG. 67 is gained by providing a complex divider 505, respectively, to the front stage of the LMS circuit 130 of each order in the coefficient estimator 721 for nonlinear distortion equalization of FIG. 66.

In addition, in the case that the coefficient estimator 612 for nonlinear distortion equalization in the nonlinear distortion equalizer 611 in FIG. 50 is replaced with the coefficient estimator 631 for nonlinear distortion equalization of FIG. 53, arbitrary high order nonlinear distortion of second order distortion, or higher, can be compensated for in the same manner. Equation (5-25) is used in the respective orders as the coefficient update equation of this case.

Figure 68:
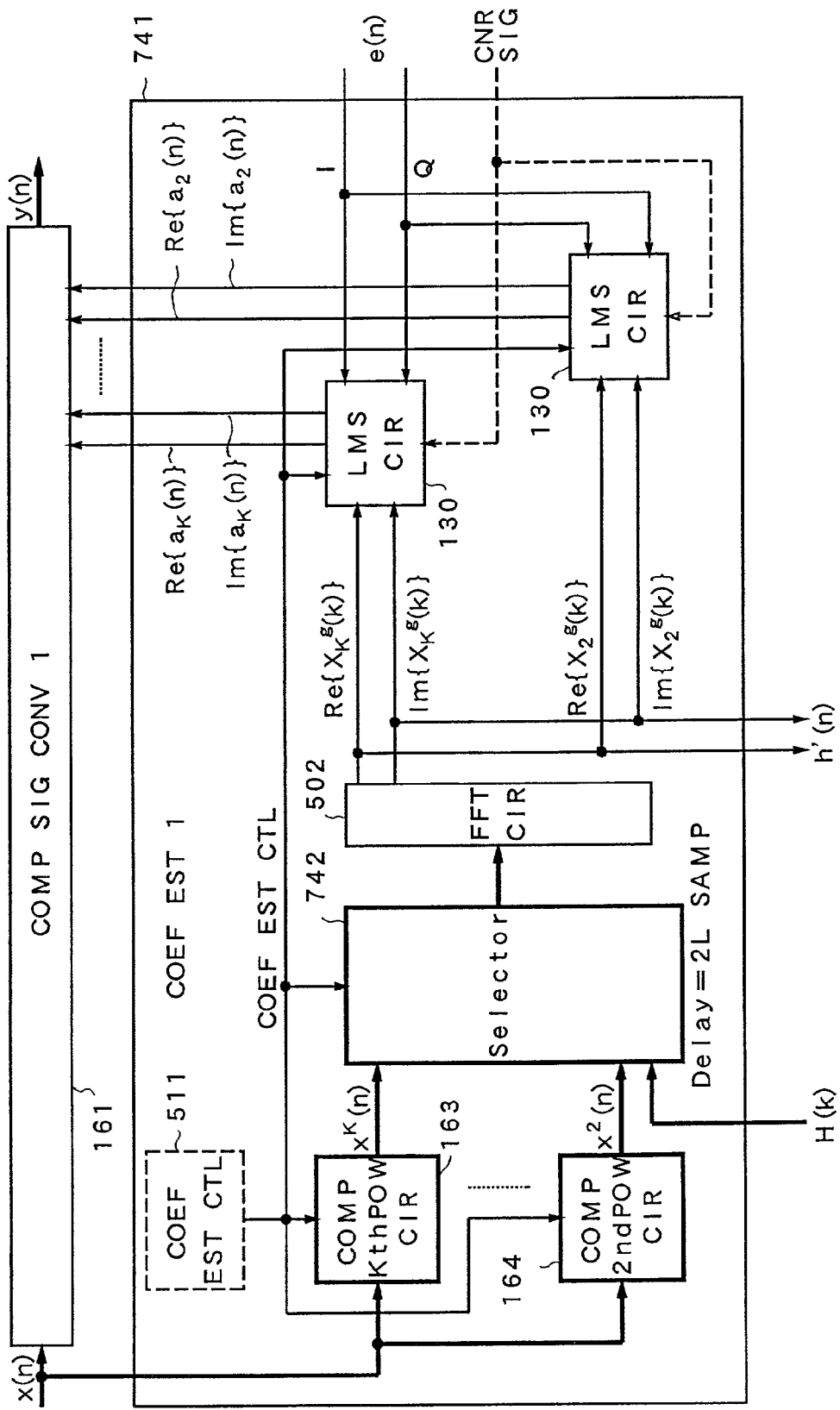
FIG. 68 is a block diagram of another example showing a configuration of the coefficient estimator for nonlinear distortion equalization according to Embodiment 5.

The configuration of the coefficient estimator 741 for nonlinear distortion equalization of this case is shown in FIG. 68. The coefficient estimator 741 for nonlinear distortion equalization has a complex K-th power calculator 163, a complex square calculator 164, a selector 742, an FFT circuit 502 and a plurality of LMS circuits 130 according to the number of the orders. In addition, the complex signal converter 161 for nonlinear distortion equalization is the same as that shown in FIG. 9.

The operation of the coefficient estimator 741 for nonlinear distortion equalization is herein described. The coefficient estimator controller 511 outputs coefficient update control signals that become "1" for the first OFDM symbol, "2" for the third OFDM symbol and "0" for the second and fourth OFDM symbols, respectively, in each section of, for example, the four OFDM symbol periods. The complex K-th power calculator 163 and the LMS circuit 130 for K-th order distortion equalization operate only during the period when the coefficient update control signal is "1." Then, the complex square calculator 164 and the LMS circuit 130 for second order distortion equalization operate only during the period when the coefficient update control signal is "2".

The selector 742 selects the output $x^K(n)$ of the complex K-th power calculator 163 during the period when the coefficient update control signal is "1," selects the output $x^2(n)$ of the complex square calculator 164 during the period of "2" and selects H(k) during the period of "0," which are outputted to the FFT circuit 502. The FFT circuit 502 carries out an FFT conversion on the selected signal and outputs the conversion result to the LMS circuit 130 of each order and to an external circuit. The FFT circuit 502 outputs the converted value $X_K{}^g(k)$ for the first OFDM symbol, outputs the converted value $X_2{}^g(k)$ for the third OFDM symbol and outputs the delay profile h'(n) for the second and fourth OFDM symbols in each section of the four OFDM symbol period. The LMS circuits 130 for K-th order distortion equalization and for second order distortion equalization operate only for the first and third OFDM symbols, respectively. In addition, the output to the external circuit becomes effective for the second and fourth OFDM symbols when the delay profile h'(n) is outputted.

According to the above described operation, the delay profile can be calculated without increasing the power consumption only by compensating for arbitrary high order nonlinear distortion of second order distortion, or higher, and by adding a selector. In the case that nonlinear distortion of another order is compensated for, a complex m-th power calculator of that order m and an LMS circuit 130 are added and the coefficient update control signal generated in the coefficient estimator controller 511 may be updated and the degree of multiplexing of the selector 742 may be increased if necessary.

Figure 69:
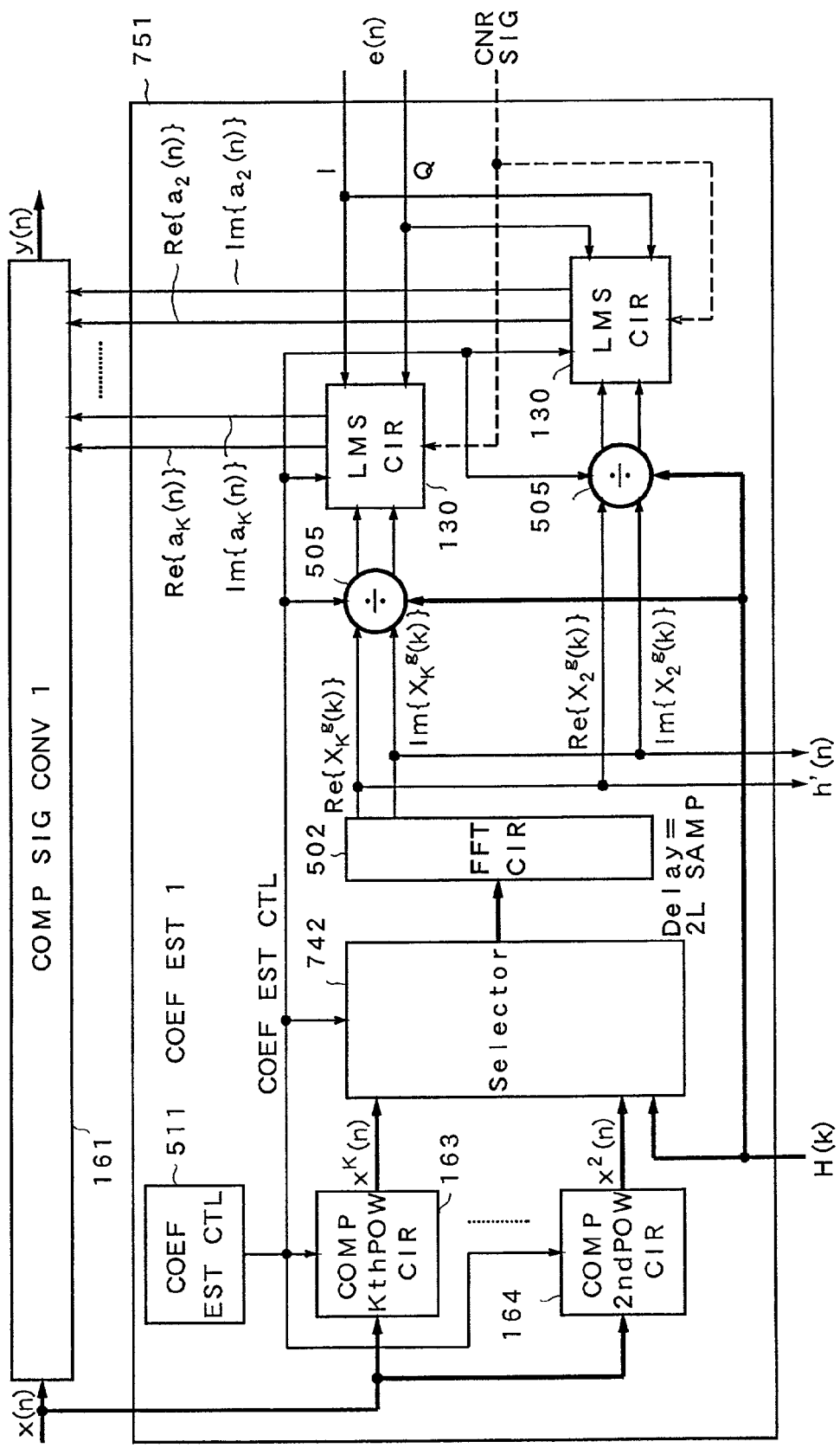
FIG. 69 is a block diagram of another example showing a configuration of the coefficient estimator for nonlinear distortion equalization according to Embodiment 5.

In addition, in the case that the coefficient estimator 612 for nonlinear distortion equalization in the nonlinear distortion equalizer 611 in FIG. 50 is replaced with the coefficient estimator 641 for nonlinear distortion equalization of FIG. 54, arbitrary high order nonlinear distortion of second order distortion, or higher, can be compensated for in the same manner. Equation (5-26) is used in the respective orders as the coefficient update equation of this case. The configuration of the coefficient estimator 751 for nonlinear distortion equalization of this case is shown in FIG. 69. This circuit is gained by providing a complex divider 505, respectively, to the front stage of the LMS circuit 130 of each order in the coefficient estimator 741 for nonlinear distortion equalization of FIG. 68.

Here, in each of the above described examples wherein arbitrary high order nonlinear distortion of second order distortion, or higher, is compensated for, a case is shown wherein the configuration has a complex K-th power calculator 163, a complex square calculator 164 and a complex m-th power calculator of each order, respectively. However, sharing of circuits can be achieved in the same manner as in Embodiment 1 by sequentially outputting the powers of, for example, the I and Q axis components to a circuit of the next high order. In addition, other methods for circuit sharing may be used.

Embodiment 6

Figure 70:
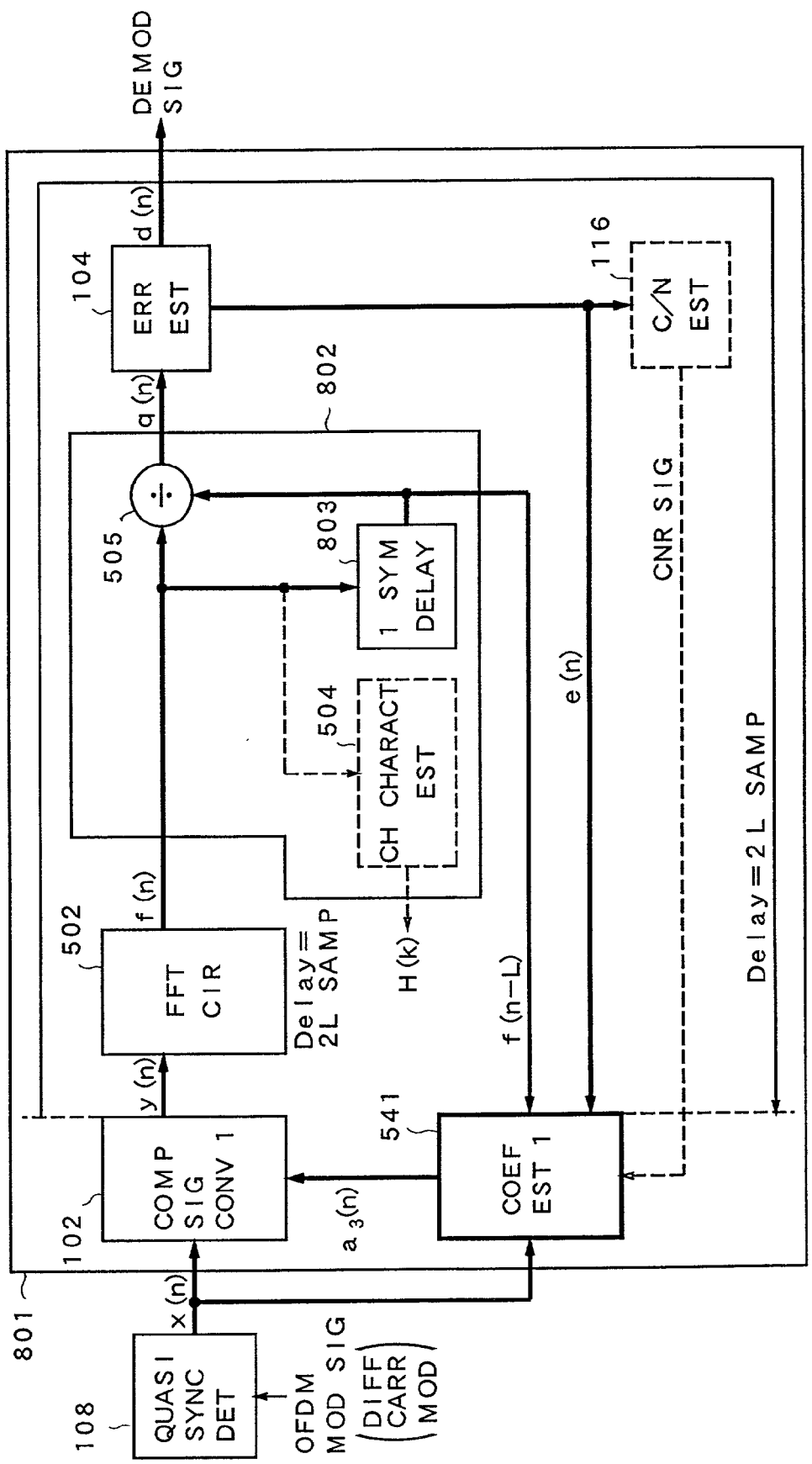
FIG. 70 is a block diagram showing the entire configuration of a front end processor for a data receiver according to Embodiment 6.

A front end processor for data receiver in Embodiment 6 of the present invention is described in reference to the drawings. FIG. 70 is a block diagram showing the configuration of a front end processor 800 for data receiver in the present embodiment. The front end processor 800 for data receiver is formed to include are quasi-synchronized detector 108 and a nonlinear distortion equalizer 801. The nonlinear distortion equalizer 801 of FIG. 70 is gained by replacing the coefficient estimator 506 for nonlinear distortion equalization with a coefficient estimator 541 for nonlinear distortion equalization and by replacing the synchronized demodulator 503 with a differential demodulator 802 in the nonlinear distortion equalizer 501 of FIG. 30. The differential demodulator 802 has a one symbol delay circuit 803 and complex divider 505.

When an OFDM modulation signal that has undergone a differential carrier modulation is received by an antenna, not shown, the quasi-synchronized detector 108 carries out a detection of I axis and Q axis data in the same manner as in Embodiment 1 so as to generate a detected output x(n).

The operation of the nonlinear distortion equalizer 801 is herein described. The complex signal converter 102 for nonlinear distortion equalization uses the coefficient $a_3(n)$ for third order distortion equalization that is generated in the coefficient estimator 541 for nonlinear distortion equalization and removes third order distortion included in the signal x(n) so as to output the signal y(n). Then, the FFT circuit 502 carries out an FFT conversion of the signal y(n) so as to output the signal f(n) on the frequency axis to the differential demodulator 802.

FFT conversions for L points are carried out as shown in FIG. 70 so that the process delay becomes of 2L samples. In the differential demodulator 802, the one symbol delay circuit 803 delays the f(n) by one OFDM symbol so as to output f(n−L) and the complex divider 505 carries out a complex division of f(n) by f(n−L) and, thereby, carries out a differential demodulation. Then, the differential demodulator 802 outputs the demodulated signal q(n) to the error estimator 104. The error estimator 104 calculates an error between the signal q(n) and the closest mapping point d(n) and outputs the mapping point d(n) to the error correction part as a demodulation signal. Here, in the case that the error correction part carries out a soft decision decoding, the nonlinear distortion equalizer 801 outputs the input q(n) of the error estimator 104 to the error correction part as a demodulation signal.

The coefficient estimator 541 for nonlinear distortion equalization uses the error signal e(n) and the signal x(n) as well as the signal f(n−L) so as to update the coefficient $a_3(n)$ according to the LMS algorithm. The configuration of the coefficient estimator 541 for nonlinear distortion equalization is the same as shown in FIG. 35 and only the transmission path characteristics H(k) to the complex divider 505 is replaced with the signal f(n−L). Here, when the differential demodulator 802 and the error estimator 104 are assumed not to have a delay, the amount of delay during the calculation of the error signal e(n) from the signal y(n) becomes of 2L samples of the FFT circuit 502. The amount of delay in the coefficient estimator 541 for nonlinear distortion equalization also corresponds to the 2L samples of the FFT circuit 502 so that the amounts of delay thereof become equal. According to the above described operation, nonlinear distortion in the OFDM baseband signal that has undergone a differential carrier modulation can be compensated for.

The coefficient update algorithm of the coefficient estimator 541 for nonlinear distortion equalization in the present embodiment is herein described. The error signal e(n) is represented by equation (5-1) from FIG. 70.

$$q(n)=f(n)/f(n-L) \qquad \text{equation (6-1)}$$

Equation (6-1) and equation (5-3) are substituted into equation (5-1) so as to gain the following equation.

$$e(n)=d(n)-FFT(y(n))/f(n-L) \qquad \text{equation (6-2)}$$

Equation (1-1) is substituted into equation (6-2) so as to gain the following equation.

$$e(n)=d(n)-FFT(x(n)+a_3(n)x^3(n))/f(n-L) \qquad \text{equation (6-3)}$$

Since the convergence speed of the coefficient update is relatively slow in the LMS algorithm, the coefficient $a_3(n)$ is assumed to be a constant so as to gain the following equation.

$$e(n)=d(n)-FFT(x(n))/f(n-L)+a_3(n) \cdot FFT(x^3(n))/f(n-L) \qquad \text{equation (6-4)}$$

Here, equation (6-4) is substituted into equation (1-5) and a partial differentiation is carried out so as to gain the following equation.

$$\begin{aligned} dJ(a_3)/da_3(n) &= 2[e(n) \cdot de(n)/da_3(n)] \\ &= -2e(n)[FFT(x^3(n))/f(n-L)]^* \end{aligned} \qquad \text{equation (6-5)}$$

When u=2α is assumed and equation (6-5) is substituted into equation (1-6) so as to gain the following equation.

$$a_3(n+1)=a_3(n)+ue(n)[FFT(x^3(n))/f(n-L)]^* \quad \text{equation (6-6)}$$

While, the coefficient $a_3(n)$ is represented by the following equation from FIG. 35.

$$a_3(n)=a_3(n-1)+ue(n)[FFT(|x^2(n)|x(n))/f(n-L)]^* \quad \text{equation (6-7)}$$

The coefficient $a_3(n)$ is delayed by one sample in comparison with the error signal e(n), the signal x(n) and the signal f(n−L) in equation (6-7). However, this delay is not, in practice, an obstacle because the convergence speed of the coefficient update is relatively slow in the LMS algorithm.

When the FFT circuit 502 starts the operation at time n=T, wherein the range of n is in equation (5-11) in the same manner as in Embodiment 5, the FFT conversions of the signal y(n) and the cubed value $X^3(k)$ during this period are, respectively, represented as the converted values $Y^g(k)$ and $X_3^g(k)$ so that the following equation is formed.

$$Y^g(k)=\Sigma_{j=(T+gL) \text{ to } (T+(g+1)L-1)} y(j) W_L^{k(j-T-gL)}, W_L = e^{-j2\pi /L} (k=0, 1, \ldots, L-1) \quad \text{equation (6-8)}$$

Here, $X_3^g(k)$ becomes the same as in equation (5-12).
Then, f(n−L) is represented by the following equation.

$$f(n-L)=FFT(y(n-L)) \quad \text{equation (6-9)}$$

When f(n−L) and FFT($x^3(n)$) are respectively represented as $Y^g(k')$ and $X_3^g(k)$ and k'=n'−T−gL(n'=n−L) and k=n−T−gL are assumed, the following equation is gained.

$$a_3(n+1)=a_3(n)+ue(n)[X_3^g(n-T-gL)/Y^{g-1}(n'-T-(g-1)L)]^* \quad \text{equation (6-10)}$$

In the present embodiment, for example, one point for every two points may be used as a representative value from among the outputs of the FFT circuit 502 in the coefficient estimator 541 for nonlinear distortion equalization of FIG. 35 and the remaining one point may be interpolated as a representative value in the same manner as in Embodiment 5. In this case, the butterfly operation circuit 521 of FIG. 32 can be implemented only by a portion surrounded by the broken lines so that the circuit scale can be reduced to approximately 1/2 in the same manner as in Embodiment 5.

In addition, for example, one point for every two points may be used from among the inputs of the FFT circuit 502 in the coefficient estimator 541 for nonlinear distortion equalization of FIG. 35 so as to carry out an FFT conversion of the point number of 1/2 and so as to gain a representative value and the remaining one point may be interpolated as a representative value. In this case, the FFT circuit 502 of FIG. 33 is replaced with the FFT circuit 561 of FIG. 37 in the coefficient estimator 541 for nonlinear distortion equalization in the same manner as in Embodiment 5. As a result, the butterfly operation circuit 521 of FIG. 32 is replaced with the butterfly operation circuit 551 of FIG. 36 so that the circuit scale can be reduced to approximately 1/4 in comparison with the butterfly operation circuit 521 of FIG. 32.

In addition, the FFT circuit 502 in the coefficient estimator 541 for nonlinear distortion equalization in FIG. 35 may be eliminated so that time division multiplexing is carried out on the FFT circuit 502 in the nonlinear distortion equalizer 801 in FIG. 70.

Figure 71:
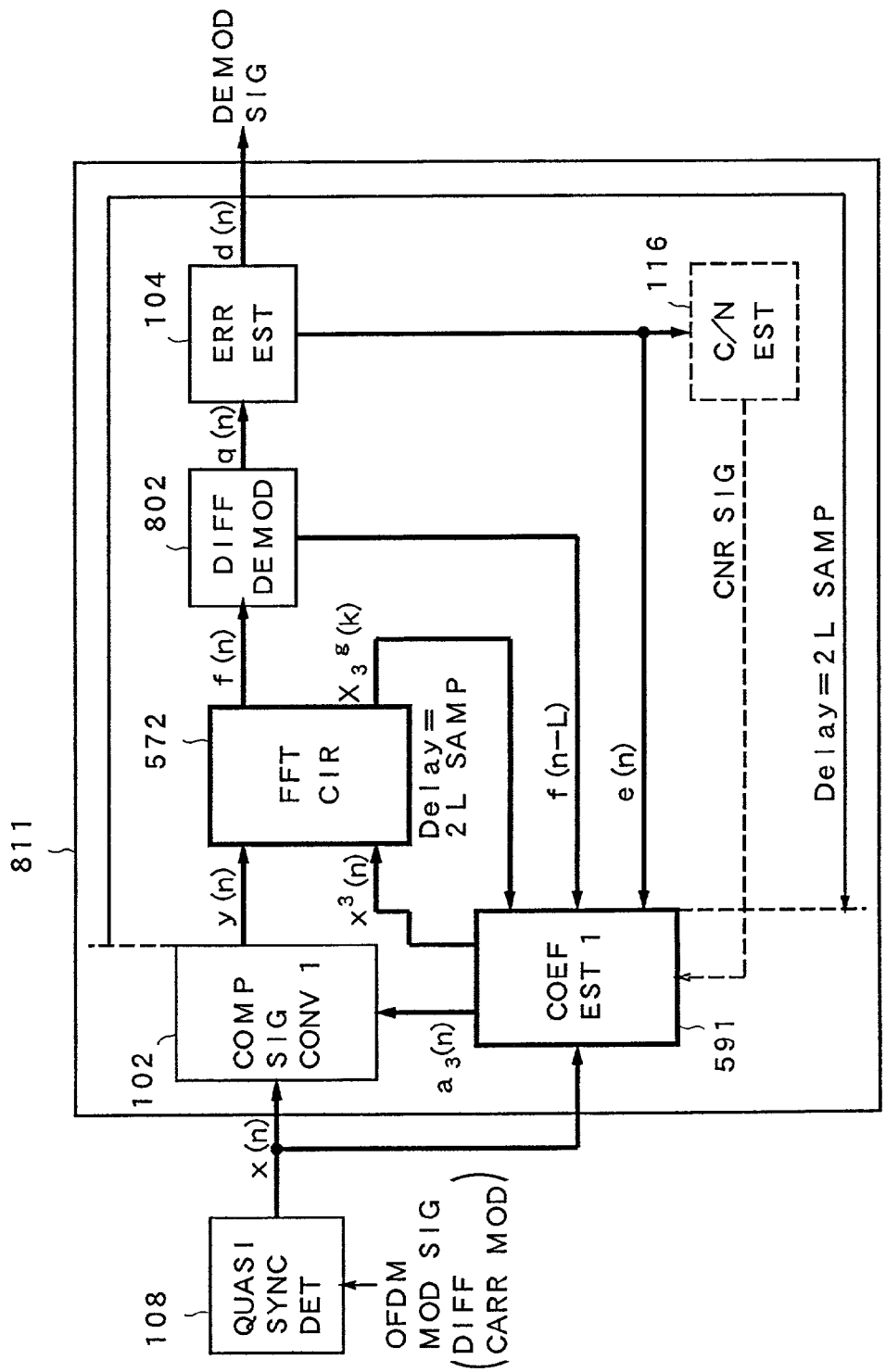
FIG. 71 is a block diagram of another example showing the entire configuration of the front end processor for a data receiver according to Embodiment 6.

The configuration of the front end processor for data receiver of this case is shown in FIG. 71. The nonlinear distortion equalizer 811 of FIG. 71 is gained by replacing the coefficient estimator 573 for nonlinear distortion equalization with the coefficient estimator 591 for nonlinear distortion equalization and by replacing the synchronized demodulator 503 with the differential demodulator 802 in the nonlinear distortion equalizer 571 of FIG. 39.

The differential demodulator 802 carries out a complex division of the signal f(n) by the signal f(n−L) and, thereby, carries out a differential demodulation so as to output the signal q(n) to the error estimator 104. The coefficient estimator 591 for nonlinear distortion equalization within the nonlinear distortion equalizer 811 carries out a coefficient update by using the signal x(n), the converted value $X_3^g(k)$, the error signal e(n) and the signal f(n−L) as the inputs and outputs the coefficient $a_3(n)$ for third order distortion equalization to the complex signal converter 102 for nonlinear distortion equalization. The operation of the parts other than this is the same as of the nonlinear distortion equalizer 571 of FIG. 39.

The coefficient estimator 591 for nonlinear distortion equalization is the same as that shown in FIG. 46 and the transmission path characteristics H(k) to the complex divider 505 is replaced with the signal f(n−L). According to the above described operation, time division multiplexing is carried out on one FFT circuit, which is operated, and nonlinear distortion in the OFDM baseband signal that has undergone a differential carrier modulation can be compensated for having a smaller circuit scale.

In addition, the differential demodulator 802 in the nonlinear distortion equalizer 801 in FIG. 70 generates the transmission path characteristics H(k) and time division multiplexing, which is applied to the FFT circuit 502, may be carried out on the transmission path characteristics H(k) and, thereby, the delay profile h'(n) may be calculated.

Figure 72:
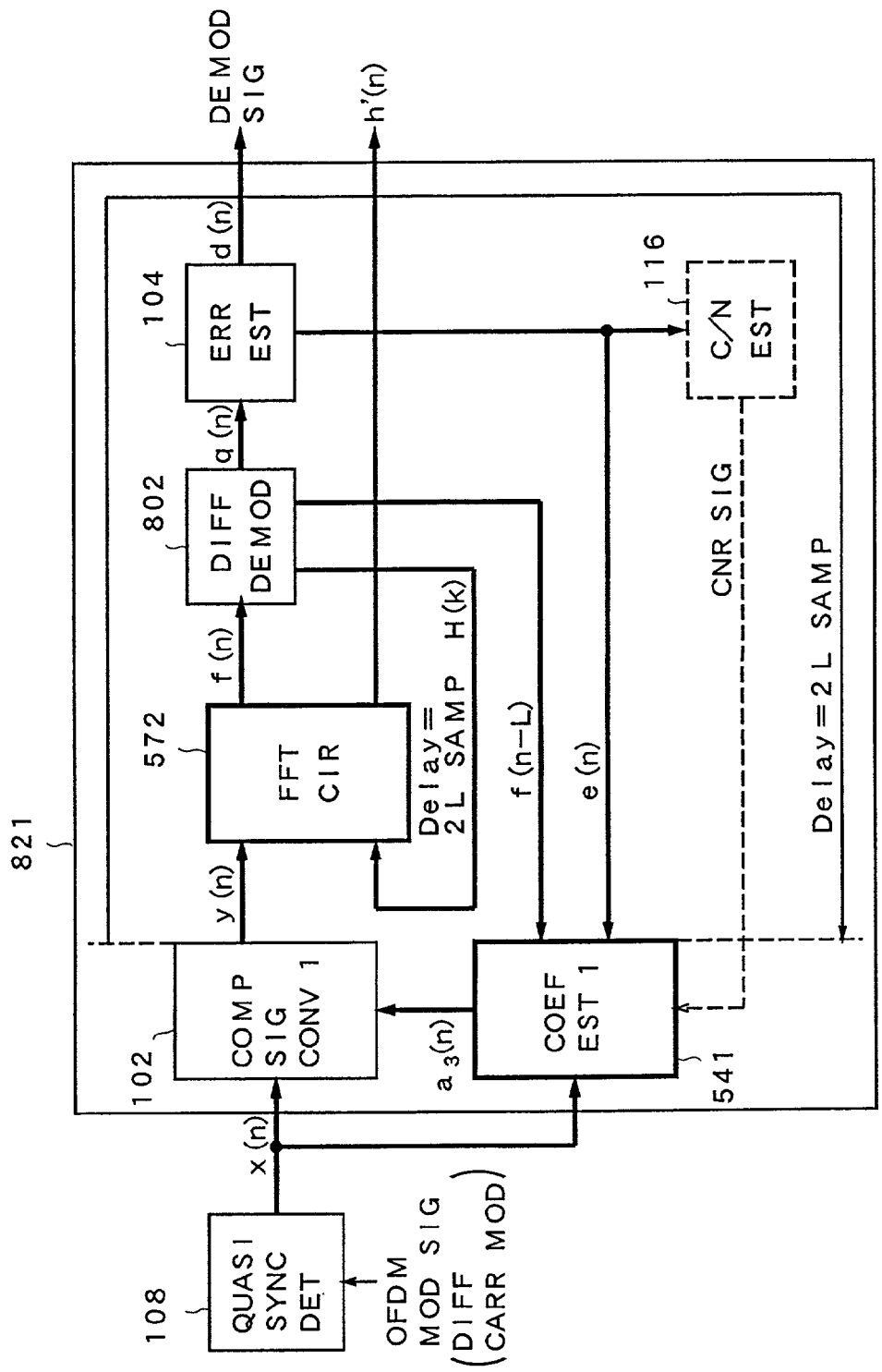
FIG. 72 is a block diagram of another example showing the entire configuration of the front end processor for a data receiver according to Embodiment 6.

The configuration of the front end processor 820 for data receiver of this case is shown in FIG. 72. The nonlinear distortion equalizer 821 of FIG. 72 is gained by replacing the coefficient estimator 506 for nonlinear distortion equalization with the coefficient estimator 541 for nonlinear distortion equalization and by replacing the synchronized demodulator 503 with the differential demodulator 802 in the nonlinear distortion equalizer 601 of FIG. 47.

The differential demodulator 802 carries out a complex division of the signal f(n) by the signal f(n−L) and, thereby, carries out a differential demodulation so as to output the signal q(n) to the error estimator 104. Then, the channel characteristic estimator 504 calculates the transmission path characteristics H(k) by using a pilot signal, or the like, that is included in the signal f(n) and outputs the transmission path characteristics H(k) to the FFT circuit 572. The coefficient estimator 541 for nonlinear distortion equalization carries out a coefficient update by using the signal x(n), the error signal e(n) and the signal f(n−L) as inputs and outputs the coefficient $a_3(n)$ for third order distortion equalization to the complex signal converter 102 for nonlinear distortion equalization. The operation of the parts other than this is the same as of the nonlinear distortion equalizer 601 of FIG. 47. The configuration of the coefficient estimator 541 for nonlinear distortion equalization is the same as that shown in FIG. 35 and only the transmission path characteristics H(k) to the complex divider 505 is replaced with the signal f(n−L).

According to the above described operation, nonlinear distortion in the OFDM baseband signal that has undergone a differential carrier modulation is compensated for and the delay profile can be calculated without adding a new circuit.

In addition, the differential demodulator 802 in the nonlinear distortion equalizer 801 in FIG. 70 generates the transmission path characteristics H(k). The nonlinear distortion equalizer 801 carries out time division multiplexing on the transmission path characteristics H(k) so as to be applied to the FFT circuit 502 in the coefficient estimator 541 for nonlinear distortion equalization and, thereby, the delay profile h'(n) may be calculated.

Figure 73:
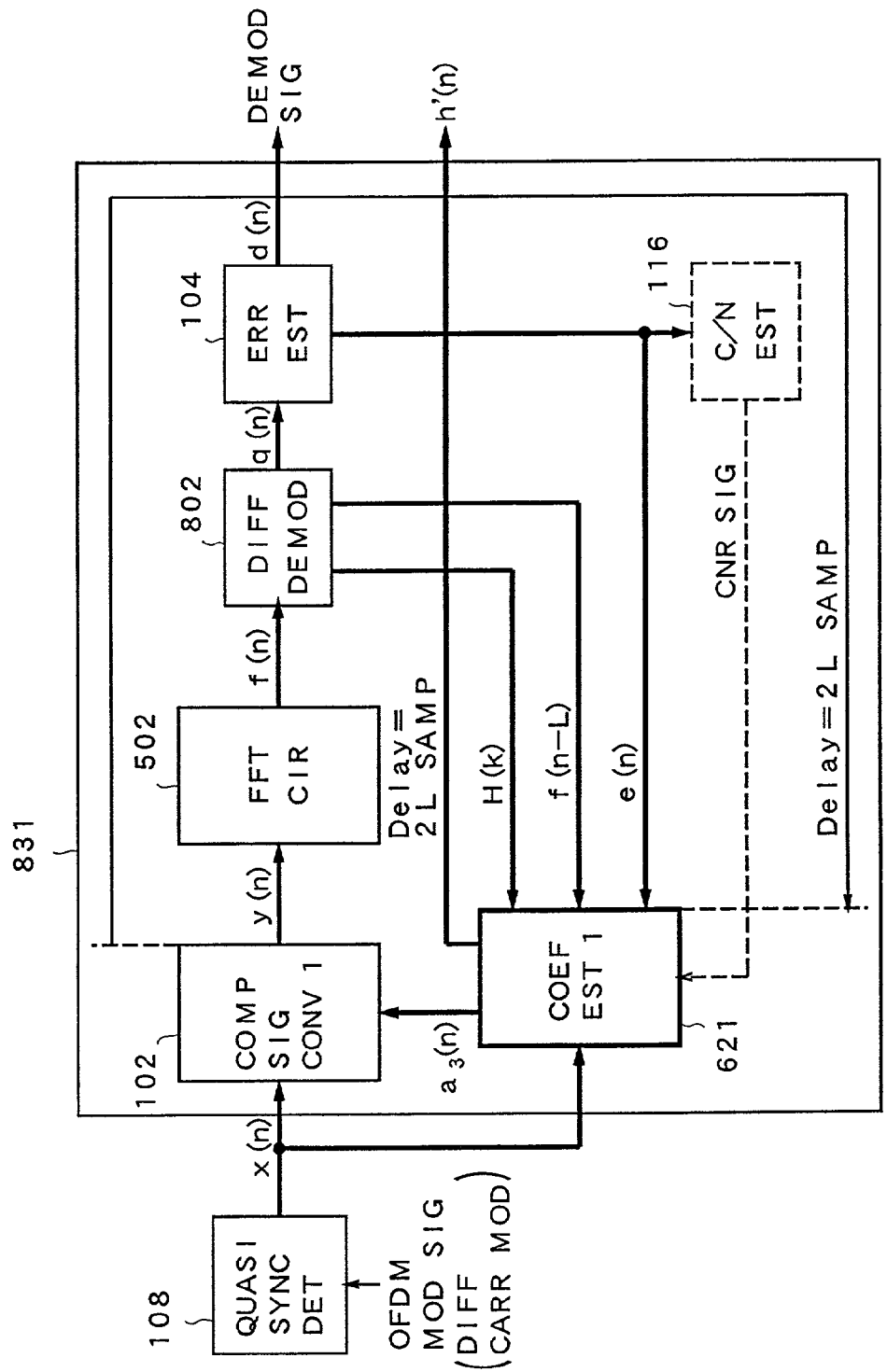
FIG. 73 is a block diagram of another example showing the entire configuration of the front end processor for a data receiver according to Embodiment 6.

The configuration of the front end processor 830 for data receiver of this case is shown in FIG. 73. The nonlinear distortion equalizer 831 of FIG. 73 is gained by replacing the coefficient estimator 612 for nonlinear distortion equalization with the coefficient estimator 621 for nonlinear distortion equalization and by replacing the synchronized demodulator 503 with the differential demodulator 802 in the nonlinear distortion equalizer 611 of FIG. 50.

The differential demodulator 802 carries out a complex division of the signal f(n) by the signal f(n–L) and, thereby, carries out a differential demodulation. The differential demodulator 802 outputs the demodulated signal q(n) to the error estimator 104. Furthermore, the channel characteristic estimator 504 of the differential demodulator 802 calculates the transmission path characteristics H(k) by using a pilot signal that is included in the signal f(n) and outputs the transmission path characteristics H(k) to the coefficient estimator 621 for nonlinear distortion equalization. The coefficient estimator 621 for nonlinear distortion equalization carries out a coefficient update by using the signal x(n), the error signal e(n) and the signal f(n–L) as inputs. The coefficient estimator 621 for nonlinear distortion equalization outputs the coefficient $a_3(n)$ for third order distortion equalization to the complex signal converter 102 for nonlinear distortion equalization and allows the transmission path characteristics H(k) to be inputted to the coefficient estimator 621 for nonlinear distortion equalization so as to generate the delay profile h'(n) which is outputted.

The operation of the parts other than this is the same as that of the nonlinear distortion equalizer 611 of FIG. 50. The configuration of the coefficient estimator 621 for nonlinear distortion equalization is the same as that shown in FIG. 52. Only the transmission path characteristics H(k) to the complex divider 505 is replaced with the signal f(n–L). According to the above described operation, nonlinear distortion in the OFDM baseband signal that has undergone a differential carrier modulation can be compensated for. In addition, the delay profile can be calculated without adding a new circuit.

In addition, the coefficient estimator 541 for nonlinear distortion equalization of FIG. 35, the coefficient estimator 591 for nonlinear distortion equalization of FIG. 46 and the coefficient estimator 621 for nonlinear distortion equalization of FIG. 52 may carry out a coefficient update only on one OFDM symbol, for example, for every two OFDM symbols.

The coefficient estimator 541 for nonlinear distortion equalization of FIG. 35, the coefficient estimator 591 for nonlinear distortion equalization of FIG. 46 and the coefficient estimator 621 for nonlinear distortion equalization of FIG. 52 may be provided with a coefficient estimator controller 511 in the same manner as in Embodiment 5. Each circuit in the coefficient estimator for nonlinear distortion equalization stops the operation during the period when the coefficient update control signal is "L." According to the above described operation, though the convergence time of the coefficient for third order distortion equalization becomes slightly longer, the power consumption of the coefficient estimator for nonlinear distortion equalization can be reduced to approximately 1/2.

In addition, the coefficient estimator 621 for nonlinear distortion equalization in the nonlinear distortion equalizer 831 of FIG. 73 may carry out a coefficient update on only one OFDM symbol, for example, for every two OFDM symbols and the delay profile h'(n) may be calculated during the period of the OFDM symbols on which a coefficient update is not carried out.

The above described FIG. 54 shows the configuration of the coefficient estimator 641 for nonlinear distortion equalization in this case. Here, the transmission path characteristics H(k) to the complex divider 505 is replaced with the signal f(n–L). The operation thereof is the same as in Embodiment 5. According to the above described operation, nonlinear distortion in the OFDM baseband signal that has undergone a differential carrier modulation can be compensated for. In addition, the delay profile can be calculated without increasing the power consumption only by adding a selector.

In addition, the coefficient estimator 591 for nonlinear distortion equalization in the nonlinear distortion equalizer 811 of FIG. 71 carries out a coefficient update only on one OFDM symbol, for example, for every two OFDM symbols and calculates the delay profile h'(n) during the period of the OFDM symbols on which a coefficient update is not carried out. In this case, time division multiplexing may be carried out on the frequency conversion of the transmission path characteristics H(k), which is applied to the FFT circuit 572 in the nonlinear distortion equalizer 811.

Figure 74:
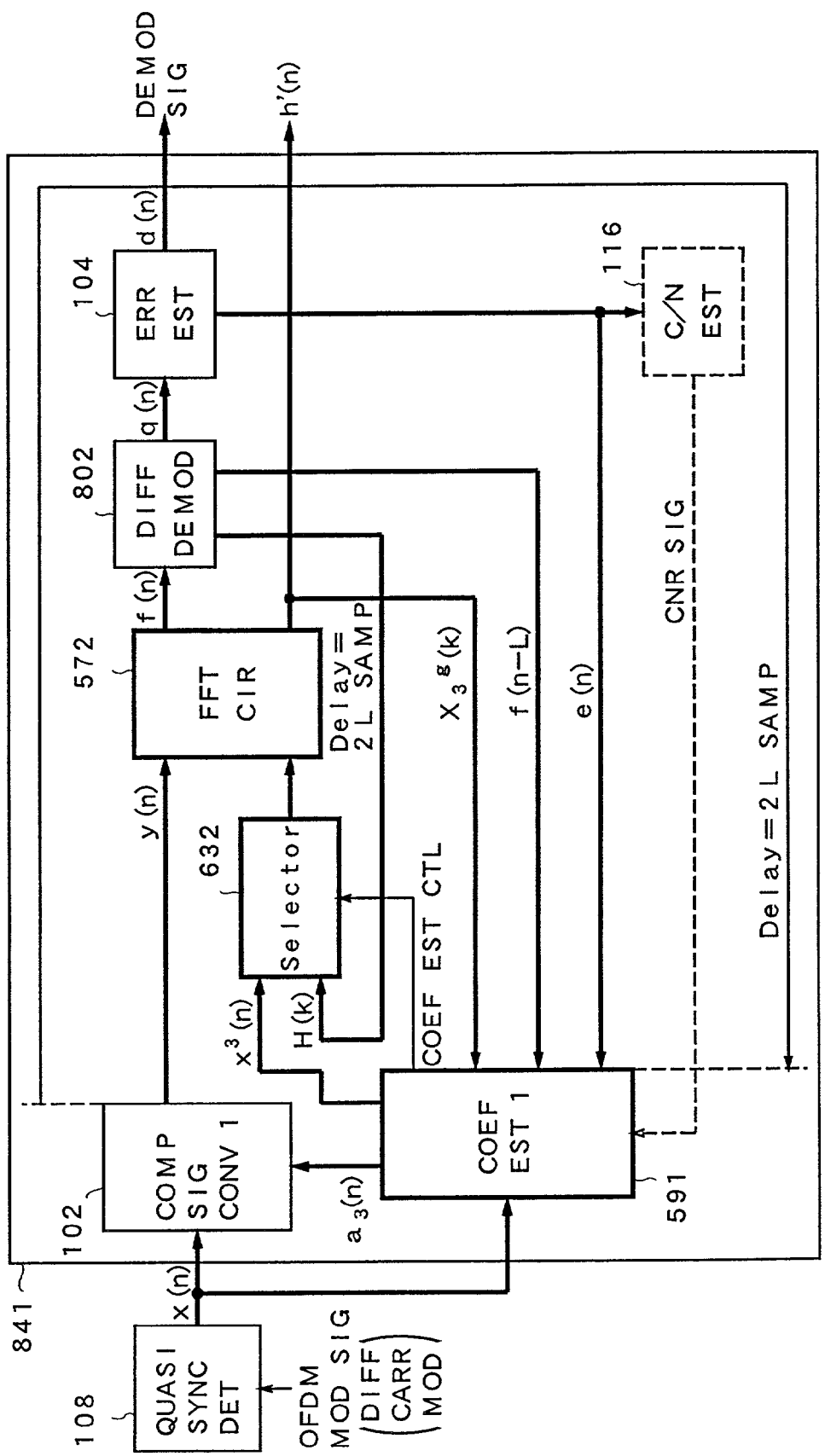
FIG. 74 is a block diagram of another example showing the entire configuration of the front end processor for a data receiver according to Embodiment 6.

The configuration of the front end processor 840 for data receiver of this case is shown in FIG. 74. The nonlinear distortion equalizer 841 of FIG. 74 is gained by replacing the synchronized demodulator 503 with the differential demodulator 802 in the nonlinear distortion equalizer 661 of FIG. 56.

The differential demodulator 802 carries out a complex division of the signal f(n) by the signal f(n–L) and, thereby, carries out a differential demodulation so as to output the signal q(n) to the error estimator 104. Then, the channel characteristic estimator 504 in the differential demodulator 802 calculates the transmission path characteristics H(k) by using a pilot signal, or the like, that is included in the signal f(n) and outputs the transmission path characteristics H(k) to the selector 632. The coefficient estimator 591 for nonlinear distortion equalization carries out a coefficient update by using the signal x(n), the converted value $X^g(k)$, the error signal e(n) and the signal f(n–L) as inputs and outputs the coefficient $a_3(n)$ for third order distortion equalization to the complex signal converter 102 for nonlinear distortion equalization. The operation of the parts other than this is the same as that of the nonlinear distortion equalizer 661 of FIG. 56.

The configuration of the coefficient estimator 591 for nonlinear distortion equalization is the same as that shown in FIG. 46. Here, the transmission path characteristics H(k) to the complex divider 505 are replaced with the signal f(n–L) and the cubed value $x^3(n)$ is outputted to the selector 632 from the complex cube calculator 121. The selector 632 selects either the cubed value $x^3(n)$ or the transmission path characteristics H(k) by means of the coefficient update control signal and outputs the selected signal to the FFT circuit 572.

According to the above described operation, time division multiplexing is carried out only on one FFT circuit, which is operated, and nonlinear distortion in the OFDM baseband signal that has undergone a differential carrier modulation can be compensated for using a smaller circuit scale. Then, the delay profile can be calculated without increasing the power consumption only by adding a selector.

In addition, the coefficient estimator 541 for nonlinear distortion equalization of FIG. 35, the coefficient estimator 591 for nonlinear distortion equalization of FIG. 46, the coefficient estimator 621 for nonlinear distortion equalization of FIG. 52 and the coefficient estimator 641 for nonlinear distortion equalization of FIG. 54 may carry out a coefficient update only at the time of high C/N. The C/N estimator 116 is provided in the nonlinear distortion equalizer 801 of FIG. 70, the nonlinear distortion equalizer 811 of FIG. 71, the nonlinear distortion equalizer 821 of FIG. 72, the nonlinear distortion equalizer 831 of FIG. 73 and the nonlinear distortion equalizer 841 of FIG. 74 so that the C/N estimator 116 calculates and averages the C/N and outputs the result as a CNR signal.

The coefficient estimator for nonlinear distortion equalization makes the setting of $a_3(n)=0$ in the case that the C/N shown by the CNR signal is smaller than the set threshold value, and the complex signal converter 102 for nonlinear distortion equalization outputs $y(n)=x(n)$ in the same manner as in Embodiment 1. In the case that the C/N shown by the CNR signal is the set threshold value, or greater, the coefficient estimator for nonlinear distortion equalization carries out a coefficient update. According to the above described operation, nonlinear distortion in the OFDM baseband signal that has undergone a differential carrier modulation can be compensated for without negative effects at the time of low C/N.

Here, in the present embodiment, only dominant third order distortion that is nonlinear distortion is removed as shown in equation (1-1). However, arbitrary high order nonlinear distortion of second order distortion, or higher, may be compensated for using equation (1-11). The following equation is formed for the respective orders as the coefficient update equation of this case.

$$a_m(n+1)=a_m(n)+ue(n)[FFT(x'^m(n))/f(n-L)]^* (m>1) \quad \text{equation (6-11)}$$

Here, $x'^m(n)=|x^{m-1}(n)|x(n)$ is formed.

The configuration of the coefficient estimator 681 for nonlinear distortion equalization that compensates for high order nonlinear distortion of no lower than second order distortion and no higher than K-th order distortion by using equation (6-11) in the nonlinear distortion equalizer 801 of FIG. 70 and in the nonlinear distortion equalizer 821 of FIG. 72 is that shown in FIG. 58. That is to say, the transmission path characteristics H(k) to the complex divider 505 is replaced with the signal f(n−L) and the operation of the other parts is the same as that of Embodiment 5. According to the above described operation, arbitrary high order nonlinear distortion of second order, or higher, distortion can be compensated for.

In addition, arbitrary high order nonlinear distortion of second order, or higher, distortion can be compensated for in the same manner in the nonlinear distortion equalizer 811 of FIG. 71 and in the nonlinear distortion equalizer 841 of FIG. 74. The configuration of the coefficient estimator 711 for nonlinear distortion equalization of this case is the same as that shown in FIG. 65. That is to say, the transmission path characteristics H(k) to the complex divider 505 is only replaced with the signal f(n−L).

In addition, arbitrary high order nonlinear distortion of second order, or higher, distortion can be compensated for in the same manner in the nonlinear distortion equalizer 831 in FIG. 73. The configuration of the coefficient estimator 731 for nonlinear distortion equalization of this case is the same as that shown in FIG. 67. That is to say, the transmission path characteristics H(k) to the complex divider 505 is only replaced with the signal f(n−L).

In addition, in the case that the coefficient estimator 721 for nonlinear distortion equalization in the nonlinear distortion equalizer 831 of FIG. 73 is replaced with the coefficient estimator 641 for nonlinear distortion equalization of FIG. 54, arbitrary high order nonlinear distortion of second order, or higher, distortion can be compensated for in the same manner. The configuration of the coefficient estimator 751 for nonlinear distortion equalization of this case is the same as that shown in FIG. 69. That is to say, the transmission path characteristics H(k) to the complex divider 505 is only replaced with the signal f(n−L).

Here, in each of the above described examples wherein arbitrary high order nonlinear distortion of second order, or higher, distortion can be compensated for, a case is shown and that the complex K-th power calculator 163, the complex square calculator 164 and the complex m-th power calculator for each order are respectively provided. However, the sharing of circuits can be achieved by sequentially outputting the powers of, for example, the I and Q axis components to the circuit of the next high order in the same manner as in Embodiment 1. In addition, other sharing methods may be used.

Embodiment 7

Figure 75:
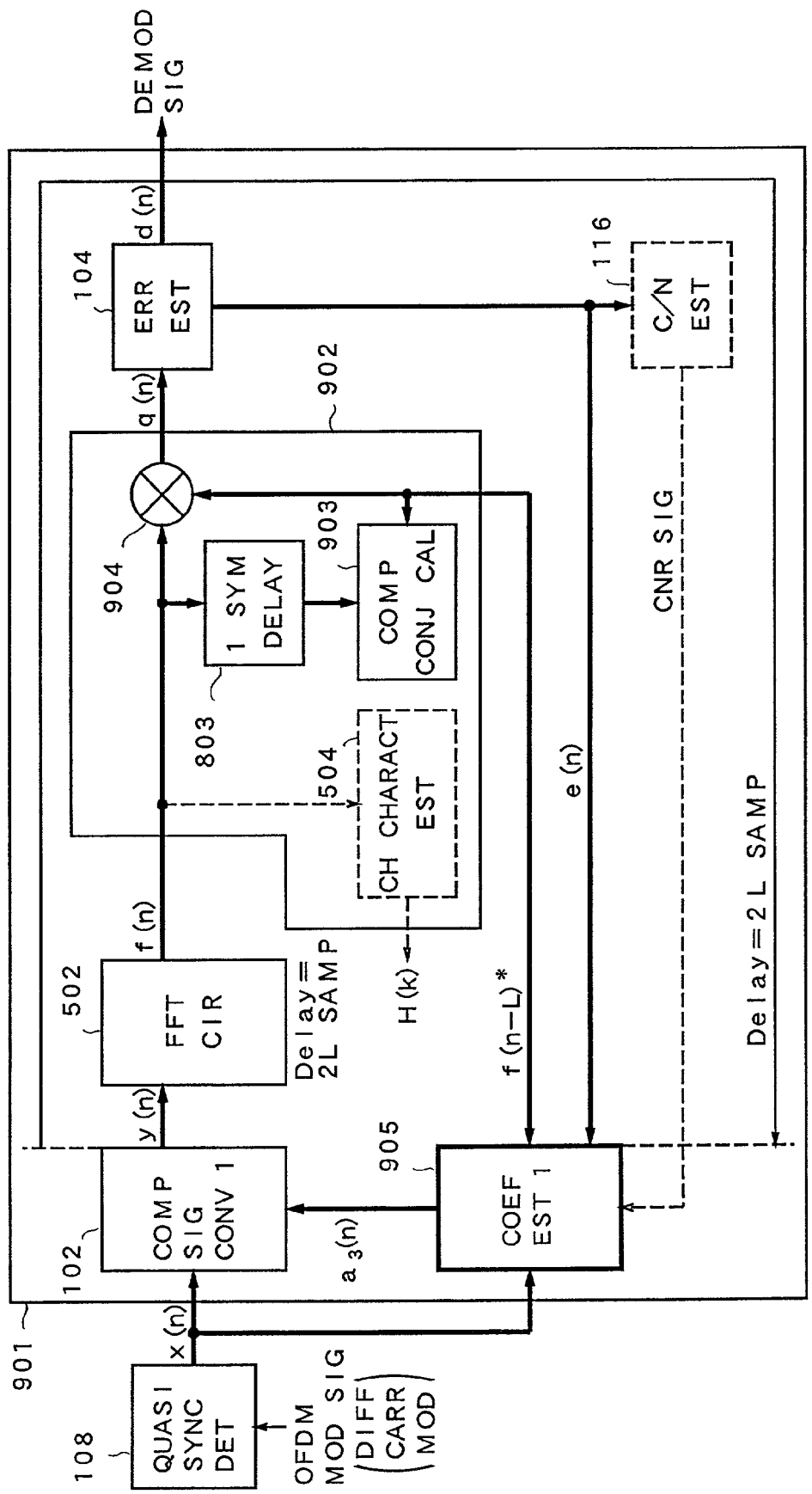
FIG. 75 is a block diagram showing an entire configuration of the front end processor for a data receiver according to Embodiment 7.

A front end processor for data receiver in Embodiment 7 of the present invention is described in reference to the drawings. FIG. 75 is a block diagram showing the configuration of a front end processor 900 for data receiver in the present embodiment. The front end processor 900 for data receiver is formed to include a quasi-synchronized detector 108 and a nonlinear distortion equalizer 901. The nonlinear distortion equalizer 901 of FIG. 75 is gained by replacing the differential demodulator 802 and the coefficient estimator 541 for nonlinear distortion equalization with a differential demodulator 902 and a coefficient estimator 905 for nonlinear distortion equalization in the nonlinear distortion equalizer 801 FIG. 70. The differential demodulator 902 has a one symbol delay circuit 803, a complex conjugate calculator 903 and a complex multiplier 904. The complex conjugate calculator 903 is a circuit for inverting positive and negative in the Q axis data only so as to generate a complex conjugate.

When an OFDM modulation signal that has undergone a differential carrier modulation is received by an antenna, not shown, the quasi-synchronized detector 108 detects the I and Q axis data in the same manner as in Embodiment 1 so as to generate the detected output x(n).

The operation of the nonlinear distortion equalizer 901 is herein described. The one symbol delay circuit 803 delays the signal f(n) by one OFDM symbol so as to output the signal f(n−L) in the differential demodulator 902. Then, the complex conjugate calculator 903 generates the complex conjugate signal f(n−L)* of the signal f(n−L). The complex multiplier 904 carries out a complex multiplication of the signal f(n) by the complex conjugate signal f(n−L)* and, thereby, carries out a differential demodulation so as to output the signal q(n) to the error estimator 104. The operation of the parts other than this is the same as that of the nonlinear distortion equalizer 801 of FIG. 70 with the exception of the configuration of the coefficient estimator 905 for nonlinear distortion equalization.

Figure 76:
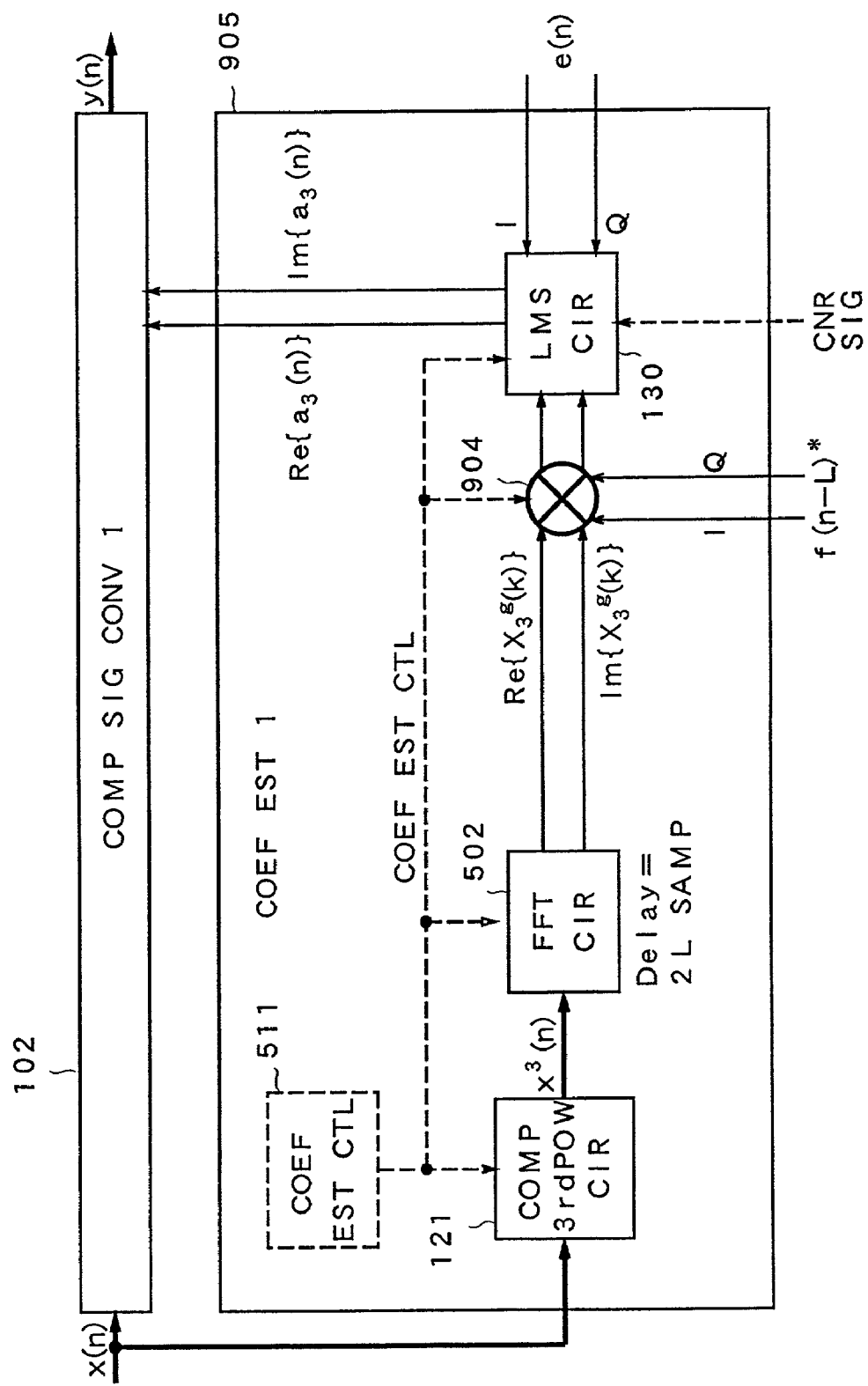
FIG. 76 is a block diagram showing a configuration of a coefficient estimator for nonlinear distortion equalization according to Embodiment 7.

The configuration of the coefficient estimator 905 for nonlinear distortion equalization is shown in FIG. 76. The coefficient estimator 905 for nonlinear distortion equalization is gained by replacing the complex divider 505 with a complex multiplier 904 and by replacing the transmission path characteristics H(k) to the complex multiplier 904 with the signal f(n−L)* in the coefficient estimator 541 for nonlinear distortion equalization of FIG. 35.

Here, when it is assumed that the differential demodulator 902 of FIG. 75 and the error estimator 104 have no delays in the signal processing, the amount of delay during the calculation of the error signal e(n) from the signal y(n) becomes of 2L samples of the FFT circuit 502. The amount of delay in the coefficient estimator 905 for nonlinear distortion equalization also corresponds to the 2L samples of the FFT circuit 502 so that the amounts of delays become equal. According to the above described operation, nonlinear distortion in the OFDM baseband signal that has undergone a differential carrier modulation can be compensated for.

The coefficient update algorithm of the coefficient estimator 905 for nonlinear distortion equalization in the present embodiment is described. The error signal e(n) is represented in equation (5-1) from FIG. 75. In addition, the following equation is defined.

$$q(n)=f(n) \cdot f(n-L)^* \qquad \text{equation (7-1)}$$

Equation (7-1) and equation (5-3) are substituted into equation (5-1) so as to gain the following equation.

$$e(n)=d(n)-FFT(y(n)) \cdot f(n-L)^* \qquad \text{equation (7-2)}$$

Equation (1-1) is substituted into equation (7-2) so as to gain the following equation.

$$e(n)=d(n)-FFT(x(n)+a_3(n)x^3(n)) \cdot f(n-L)^* \qquad \text{equation (7-3)}$$

Since the LMS algorithm is comparatively slow in the convergence speed of the coefficient update, the following equation is gained when the coefficient $a_3(n)$ is regarded as a constant.

$$e(n)=d(n)-FFT(x(n)) \cdot f(n-L)^*+a_3(n) \cdot FFT(x^3)n)) \cdot f(n-L)^* \qquad \text{equation (7-4)}$$

Here, equation (7-4) is substituted into equation (1-5) and a partial differentiation is carried out so as to gain the following equation.

$$dJ(a_3)/da_3(n)=2[e(n) \cdot de(n)/da_3(n)]=-2e(n)[FFT(x^3(n)) \cdot f(n-L)^*]^* \qquad \text{equation (7-5)}$$

When $u=2\alpha$ is assumed and equation (7-5) is substituted into equation (1-6), the following equation is gained.

$$a_3(n+1)=a_3(n)+ue(n)[FFT(x^3(n)) \cdot f(n-L)^*]^* \qquad \text{equation (7-6)}$$

On the other hand, the coefficient $a_3(n)$ is represented in the following equation.

$$a_3(n)=a_3(n-1)+ue(n)[FFT(x^3(n)) \cdot f(n-L)^*]^* \qquad \text{equation (7-7)}$$

In equation (7-7), the coefficient $a_3(n)$ is delayed by one sample in comparison with the error signal e(n), the signal x(n) and the signal f(n-L)*. However, since the LMS algorithm is comparatively slow in the convergence speed of the coefficient update, this delay is not, in practice, an obstacle.

The FFT circuit 502 starts the operation at time n=T in the same manner as in Embodiment 5. When the range of n is defined by equation (5-11), the FFT conversion of the signal y(n) and the cubed value $x^3(n)$ during this period of time are respectively represented as the converted values $Y^g(k)$ and $X_3^g(k)$. In this case, the converted value $Y^g(k)$ is defined by equation (6-8) and the converted value $X_3^g(k)$ is defined by equation (5-12).

The signal f(n−L) is represented in equation (6-9) and the signals f(n−L) and FFT ($x^3(n)$) are respectively represented as the converted values $Y^g(k')$ and $X_3^g(k)$ in equation (7-6) so as to gain the following equation when k'=n'−T−gL(n'=n−L) and k=n−T−gL are assumed.

$$a_3(n+1)=a_3(n)+ue(n)[X_3^g(n-T-gL) \cdot Y^{g-1}(n'-T-(g-1)L)^*]^* \qquad \text{equation (7-8)}$$

One point may be used as a representative value, for example, for every two points from among the outputs of the FFT circuit 502 in the coefficient estimator 905 for nonlinear distortion equalization of FIG. 76 while the remaining one point may be interpolated as a representative value in the same manner as in Embodiment 5. In this case, the butterfly operation circuit 521 of FIG. 32 can be implemented only with a portion surrounded by broken lines so that the circuit scale can be reduced to approximately 1/2 in the same manner as in Embodiment 5.

In addition, one point for every two points may be, for example, used from among the inputs of the FFT circuit 502 in the coefficient estimator 905 for nonlinear distortion equalization of FIG. 76 so as to carry out FFT conversions of 1/2 of the point number, which are used as the representative values, while the remaining one point may be interpolated as the representative value in the same manner as in Embodiment 5. In this case, the FFT circuit 502 of FIG. 33 is replaced with the FFT circuit 561 of FIG. 37 in the coefficient estimator 905 for nonlinear distortion equalization in the same manner as in Embodiment 5. As a result, the butterfly operation circuit 521 of FIG. 32 is replaced with the butterfly operation circuit 551 of FIG. 36. Therefore, the circuit scale can be reduced to approximately 1/4 in comparison with the butterfly operation circuit 521 of FIG. 32.

In addition, the FFT circuit 502 in the coefficient estimator 905 for nonlinear distortion equalization in FIG. 75 may be eliminated so that time division multiplexing may be carried out on the FFT circuit 502 in the nonlinear distortion equalizer 901 in FIG. 75.

Figure 77:
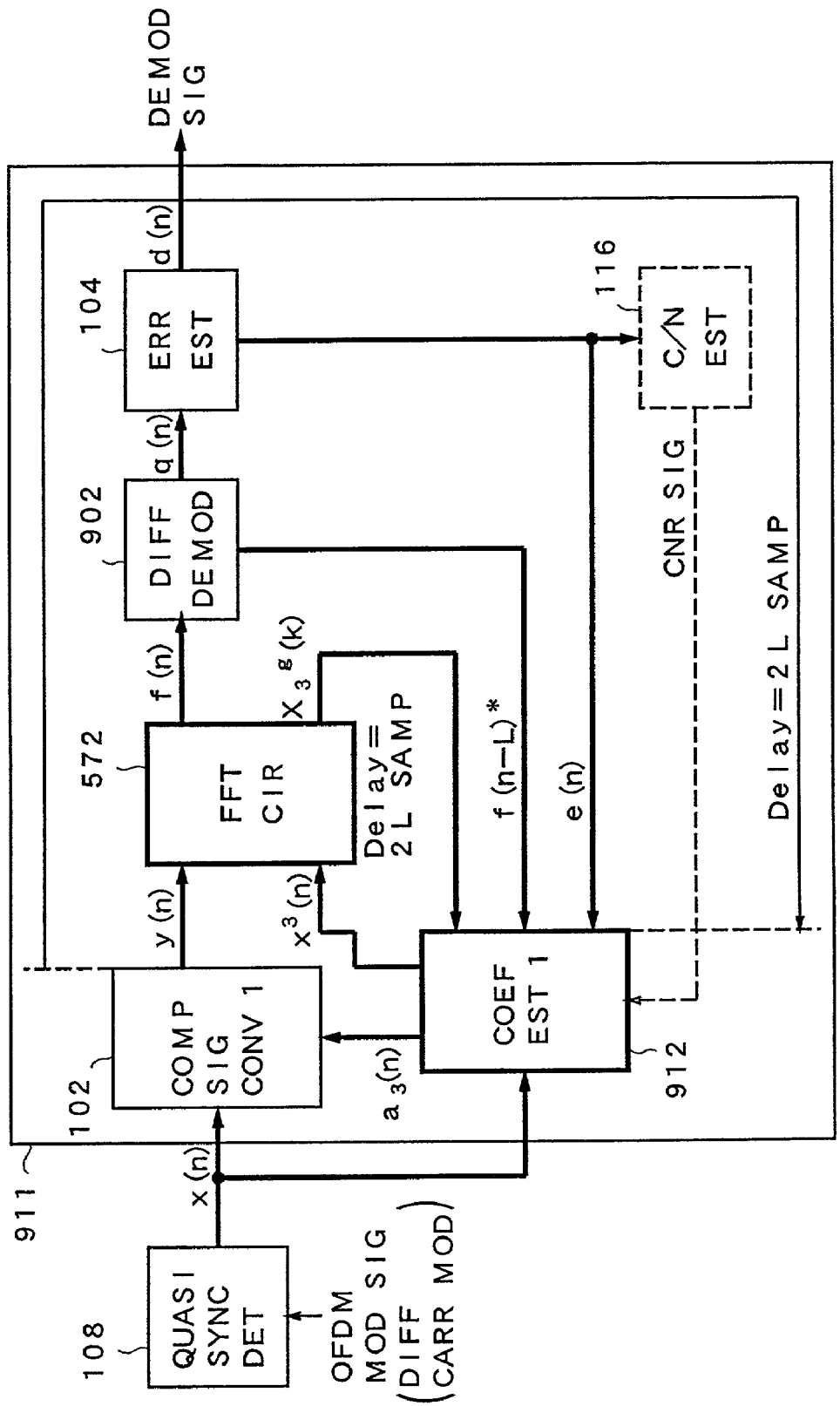
FIG. 77 is a block diagram of another example showing the entire configuration of the front end processor for a data receiver according to Embodiment 7.

The configuration of the front end processor 910 for data receiver of this case is shown in FIG. 77. The nonlinear distortion equalizer 911 of FIG. 77 is gained by replacing the differential demodulator 802 and the coefficient estimator 591 for nonlinear distortion equalization with a differential demodulator 902 and a coefficient estimator 912 for nonlinear distortion equalization in the nonlinear distortion equalizer 811 of FIG. 71.

The differential demodulator 902 carries out a complex multiplication of the signal f(n) and the complex conjugate signal f(n−L)* and, thereby, carries out a differential demodulation so as to output the signal q(n) to the error estimator 104. The operation of the parts other than this is the same as that of the nonlinear distortion equalizer 811 of FIG. 71 with the exception of the operation of the coefficient estimator 912 for nonlinear distortion equalization.

Figure 78:
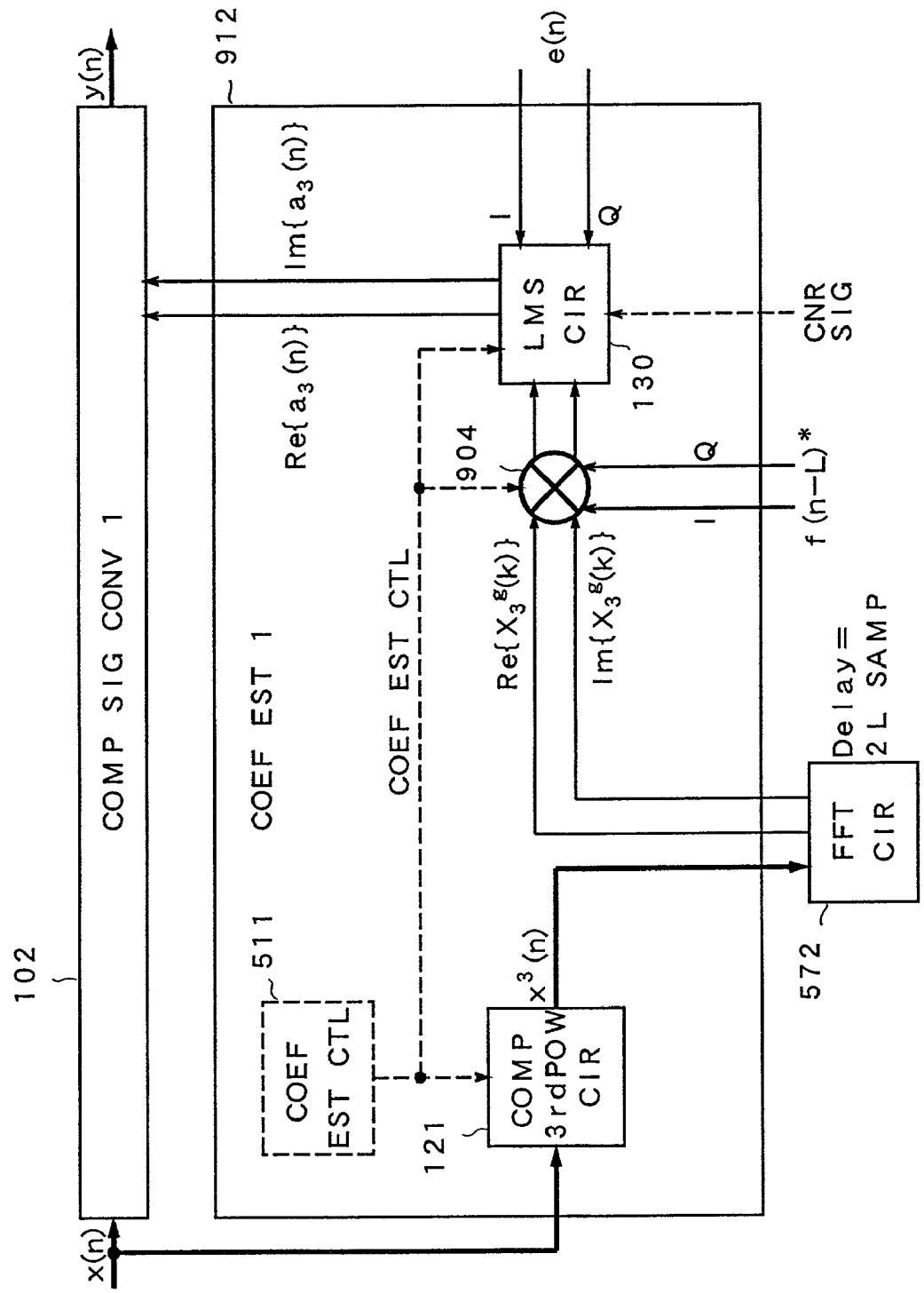
FIG. 78 is a block diagram of another example showing the configuration of the coefficient estimator for nonlinear distortion equalization according to Embodiment 7.

The configuration of the coefficient estimator 912 for nonlinear distortion equalization is shown in FIG. 78. The coefficient estimator 912 for nonlinear distortion equalization is gained by replacing the coefficient estimator 505 with the complex multiplier 904 and by replacing the transmission path characteristics H(k) to the complex multiplier 904 with the signal f(n−L)* in the coefficient estimator 591 for nonlinear distortion equalization of FIG. 46. According to the above described operation, time division multiplexing is carried out on one FFT circuit, which is operated, and nonlinear distortion in the OFDM baseband signal that has undergone a differential carrier modulation can be compensated for using a smaller circuit scale.

In addition, the transmission path characteristics H(k) is generated in the differential demodulator 902 in the nonlinear distortion equalizer 901 in FIG. 75 and time division multiplexing is carried out on the transmission path characteristics H(k), which is applied to the FFT circuit 502 and, thereby, the delay profile h'(n) may be calculated.

Figure 79:
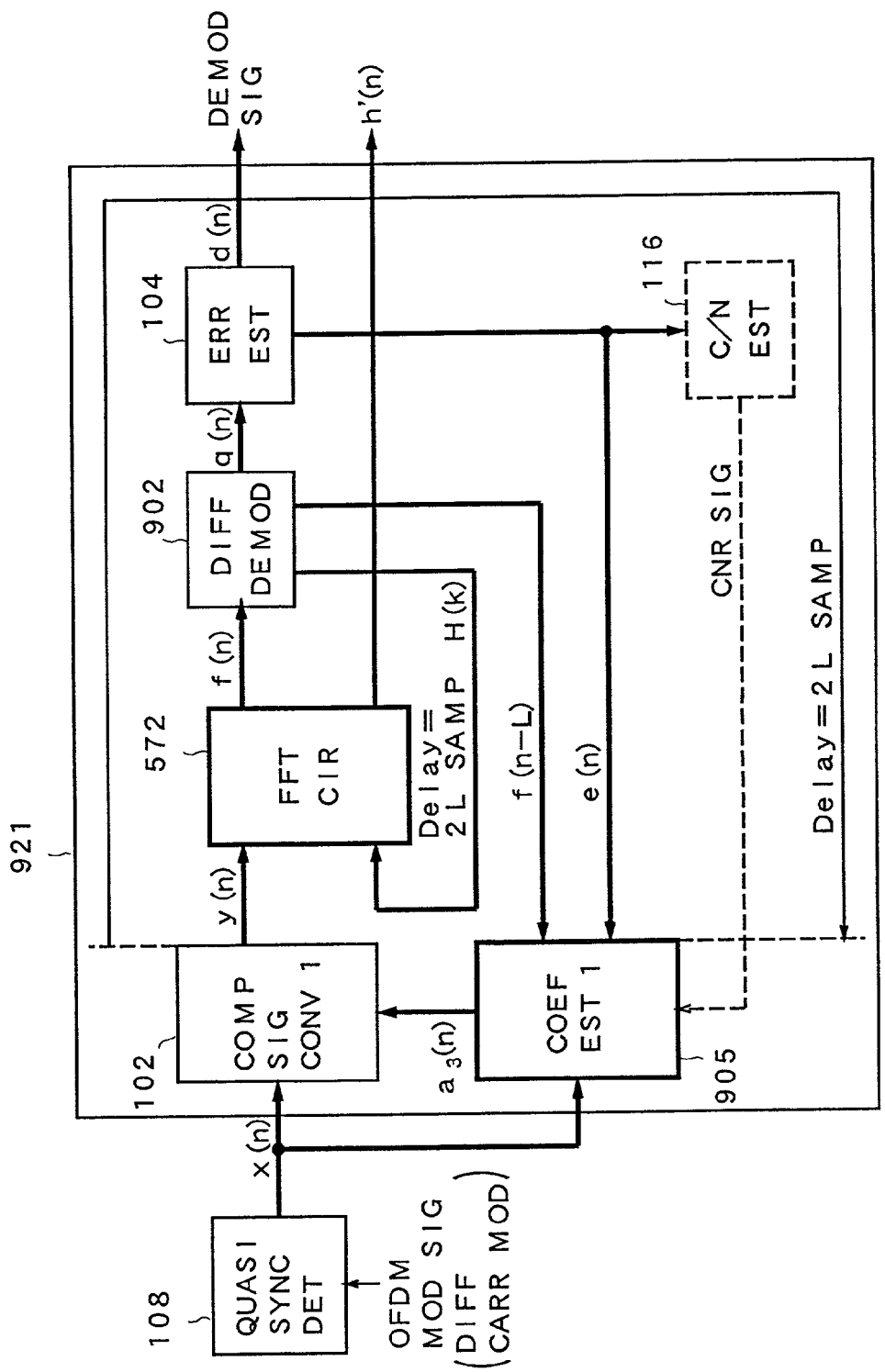
FIG. 79 is a block diagram of another example showing the entire configuration of the front end processor for a data receiver according to Embodiment 7.

The configuration of the nonlinear distortion equalizer 921 of this case is shown in FIG. 79. The nonlinear distortion equalizer 921 is gained by replacing the differential demodulator 802 and the coefficient estimator 541 for nonlinear distortion equalization with a differential demodulator 902 and a coefficient estimator 905 for nonlinear distortion equalization in the nonlinear distortion equalizer 821 of FIG. 72.

The differential demodulator 902 carries out a complex multiplication of the signal f(n) by the complex conjugate signal f(n−L)* and, thereby, carries out a differential demodulation so as to output the signal q(n) to the error estimator 104. In addition, the channel characteristic estimator 504 in the differential demodulator 902 calculates the transmission path characteristics H(k) by using a pilot signal, or the like, that is included in the signal f(n) and outputs the transmission path characteristics H(k) to the FFT circuit 572. The operation of the parts other than this is the same as that of the nonlinear distortion equalizer 821 of FIG. 72 with the exception of the operation of the coefficient estimator 905 for nonlinear distortion equalization.

The configuration of the coefficient estimator 905 for nonlinear distortion equalization is the same as that shown in FIG. 76. According to the above described operation, nonlinear distortion in the OFDM baseband signal that has undergone a differential carrier modulation can be compensated for. In addition, the delay profile can be calculated without adding a new circuit.

Furthermore, the transmission path characteristics H(k) is generated in the differential demodulator 902 in the nonlinear distortion equalizer 901 in FIG. 75 and time division multiplexing is carried out on the transmission path characteristics H(k), which is applied to the FFT circuit 502 in the coefficient estimator 905 for nonlinear distortion equalization and, thereby, the delay profile h'(n) may be calculated.

Figure 80:
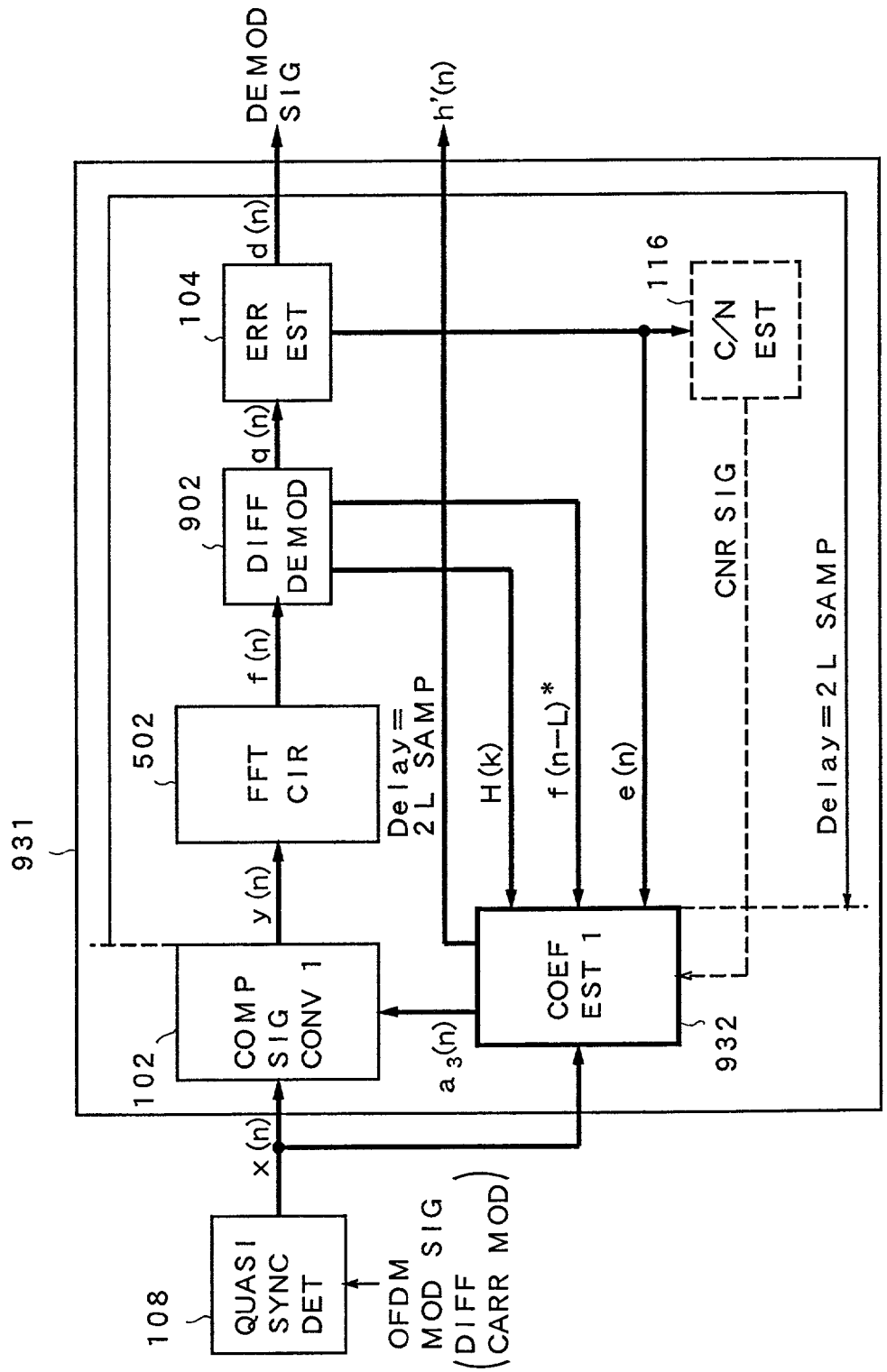
FIG. 80 is a block diagram of another example showing the entire configuration of the nonlinear distortion equalizer according to Embodiment 7.

The configuration of the front end processor 930 for data receiver of this case is shown in FIG. 80. The nonlinear distortion equalizer 931 of FIG. 80 is gained by replacing the differential demodulator 802 and the coefficient estimator 621 for nonlinear distortion equalization with a differential demodulator 902 and a coefficient estimator 932 for nonlinear distortion equalization in the nonlinear distortion equalizer 831 of FIG. 73.

The differential demodulator 902 carries out a complex multiplication of the signal f(n) by the complex conjugate signal f(n−L)* and, thereby, carries out a differential demodulation so as to output the signal q(n) to the error estimator 104. In addition, the channel characteristic estimator 504 calculates the transmission path characteristics H(k) by using a pilot signal, or the like, that is included in the signal f(n) and outputs the transmission path characteristics H(k) to the coefficient estimator 932 for nonlinear distortion equalization. The operation of the parts other than this is the same as that of the nonlinear distortion equalizer 831 of FIG. 73 with the exception of the operation of the coefficient estimator 932 for nonlinear distortion equalization.

The configuration of the coefficient estimator 932 for nonlinear distortion equalization is shown in FIG. 81. The coefficient estimator 932 for nonlinear distortion equalization is gained by replacing the complex divider 505 with the complex multiplier 904 and by replacing the transmission path characteristics H(k) to the complex multiplier 904 with the signal f(n−L)* in the coefficient estimator 621 for nonlinear distortion equalization of FIG. 52. According to the above described operation, nonlinear distortion in the OFDM baseband signal that has undergone a differential carrier modulation can be compensated for. Thereby, the delay profile can be calculated without adding a new circuit.

In addition, the coefficient estimator 905 for nonlinear distortion equalization of FIG. 76, the coefficient estimator 912 for nonlinear distortion equalization of FIG. 78 and the coefficient estimator 932 for nonlinear distortion equalization of FIG. 81 may carry out a coefficient update only on one OFDM symbol, for example, for every two OFDM symbols.

A coefficient estimator controller 511 is provided in the coefficient estimator 905 for nonlinear distortion equalization of FIG. 76, the coefficient estimator 912 for nonlinear distortion equalization of FIG. 78 and the coefficient estimator 932 for nonlinear distortion equalization of FIG. 81 in the same manner as in Embodiment 5. Each circuit in the coefficient estimator for nonlinear distortion equalization stops the operation during the period of time when the coefficient update control signal is "L" in the same manner as in Embodiment 5. According to the above described operation, the power consumption of the coefficient estimator for nonlinear distortion equalization can be reduced to approximately 1/2, even though the convergence time of the coefficient for third order distortion equalization becomes slightly longer.

In addition, the coefficient estimator 932 for nonlinear distortion equalization in the nonlinear distortion equalizer 931 of FIG. 80 may carry out a coefficient update on only one OFDM symbol, for example, for every two OFDM symbols and the delay profile h'(n) may be calculated during the period of the OFDM symbols on which a coefficient update is not carried out.

The configuration of the coefficient estimator 941 for nonlinear distortion equalization of this case is shown in FIG. 82. The coefficient estimator 941 for nonlinear distortion equalization is gained by replacing the complex divider 505 with a complex multiplier 904 and by replacing the transmission path characteristics H(k) to the complex multiplier 904 with the signal f(n−L)* in the coefficient estimator 641 for nonlinear distortion equalization of FIG. 54. According to the above described operation, nonlinear distortion in the OFDM baseband signal that has undergone a differential carrier modulation can be compensated for. In addition, the delay profile can be calculated without increasing the power consumption only by adding a selector.

In addition, the coefficient estimator 912 for nonlinear distortion equalization in the nonlinear distortion equalizer 911 of FIG. 77 carries out a coefficient update on only one OFDM symbol, for example, for every two OFDM symbols and the delay profile h'(n) is calculated during the period of the OFDM symbols on which a coefficient update is not carried out. In such a case, time division multiplexing may be carried out on the FFT circuit 572 in the nonlinear distortion equalizer 911.

Figure 83:
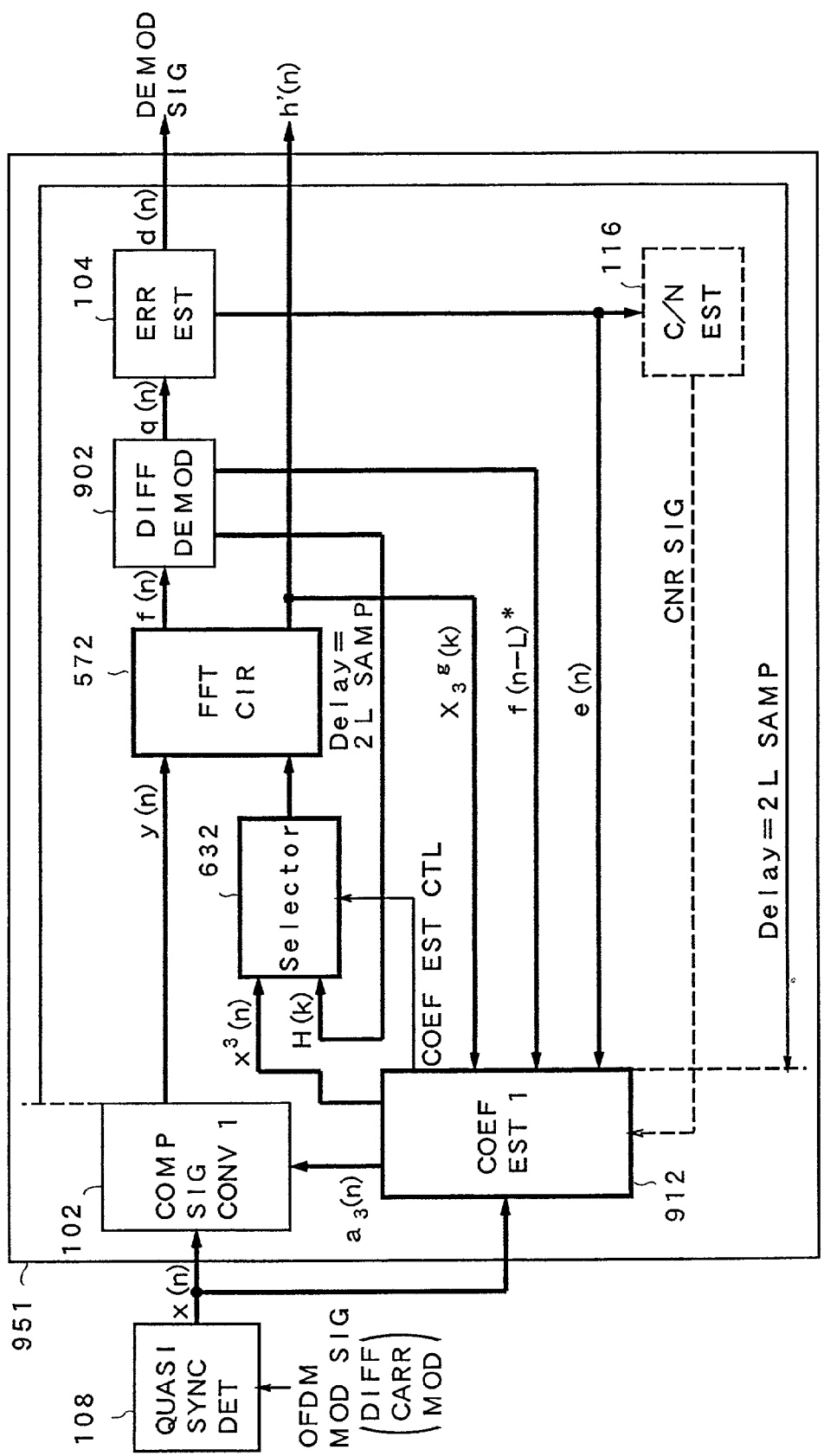
FIG. 83 is a block diagram of another example showing the entire configuration of the front end processor for a data receiver according to Embodiment 7.

The configuration of the front end processor 950 for data receiver of this case is shown in FIG. 83. The nonlinear distortion equalizer 951 of FIG. 83 is gained by replacing the differential demodulator 802 and the coefficient estimator 591 for nonlinear distortion equalization with a differential demodulator 902 and a coefficient estimator 912 for nonlinear distortion equalization in the nonlinear distortion equalizer 841 of FIG. 74.

The differential demodulator 902 carries out a complex multiplication of the signal f(n) by the complex conjugate signal f(n−L)* and, thereby, carries out a differential demodulation so as to output the signal q(n) to the error estimator 104. In addition, the channel characteristic estimator 504 calculates the transmission path characteristics H(k) by using a pilot signal, or the like, that is included in the signal f(n) and outputs the transmission path characteristics H(k) to the selector 632. The operation of the parts other than this is the same as that of the nonlinear distortion equalizer 841 with the exception of the operation of the coefficient estimator 912 for nonlinear distortion equalization.

The configuration of the coefficient estimator 912 for nonlinear distortion equalization is the same as that shown in FIG. 78. The cubed value $x^3(n)$ is outputted from the complex cube calculator 121 to the selector 632. The selector 632 selects either the cubed value $x^3(n)$ or the transmission path characteristics H(k) by means of the coefficient update control signal and outputs the selected signal to the FFT circuit 572.

According to the above described operation, time division multiplexing is carried out on only one FFT circuit, which is operated, and nonlinear distortion in the OFDM baseband signal that has undergone a differential carrier modulation can be compensated for using a smaller circuit scale. In addition, the delay profile can be calculated without increasing the power consumption only by adding a selector.

In addition, the coefficient estimator 905 for nonlinear distortion equalization of FIG. 76, the coefficient estimator 912 for nonlinear distortion equalization of FIG. 78, the coefficient estimator 932 for nonlinear distortion equalization of FIG. 81 and the coefficient estimator 941 for nonlinear distortion equalization of FIG. 82 may carry out a coefficient update only at the time of high C/N. A C/N estimator 116 is provided in the nonlinear distortion equalizer 901 of FIG. 75, in the nonlinear distortion equalizer 911 of FIG. 77, in the nonlinear distortion equalizer 921 of FIG. 79, in the nonlinear distortion equalizer 931 of FIG. 80 and in the nonlinear distortion equalizer 951 of FIG. 83. Then, the C/N estimator 116 calculates and averages the C/N and outputs the result as a CNR signal.

In the case that the C/N shown by the CNR signal is smaller than the set threshold value, the coefficient estimator for nonlinear distortion equalization makes the setting of $a_3(n)=0$ and the complex signal converter 102 for nonlinear distortion equalization outputs $y(n)=x(n)$. In the case that the C/N shown by the CNR signal is the set threshold value, or greater, the coefficient estimator for nonlinear distortion equalization carries out a coefficient update. According to the above described operation, nonlinear distortion in the OFDM baseband signal that has undergone a differential carrier modulation can be compensated for without having negative effects at the time of low C/N.

Here, in the present embodiment, only the dominant third order distortion, which is nonlinear distortion, is removed, as shown in equation (1-1) in the configuration. However, arbitrary high order nonlinear distortion of second order, or higher, distortion may be compensated for by using equation (1-11). As for the coefficient update equation of this case, the following equation is gained in the respective orders.

$$a_m(n+1)=a_m(n)+ue(n)[FFT(x^m(n)) \cdot f(n-L)^*]^*(m>1) \quad \text{equation (7-9)}$$

Here, $x^m(n)=|x^{m-1}(n)|x(n)$ is formed.

Figure 84:
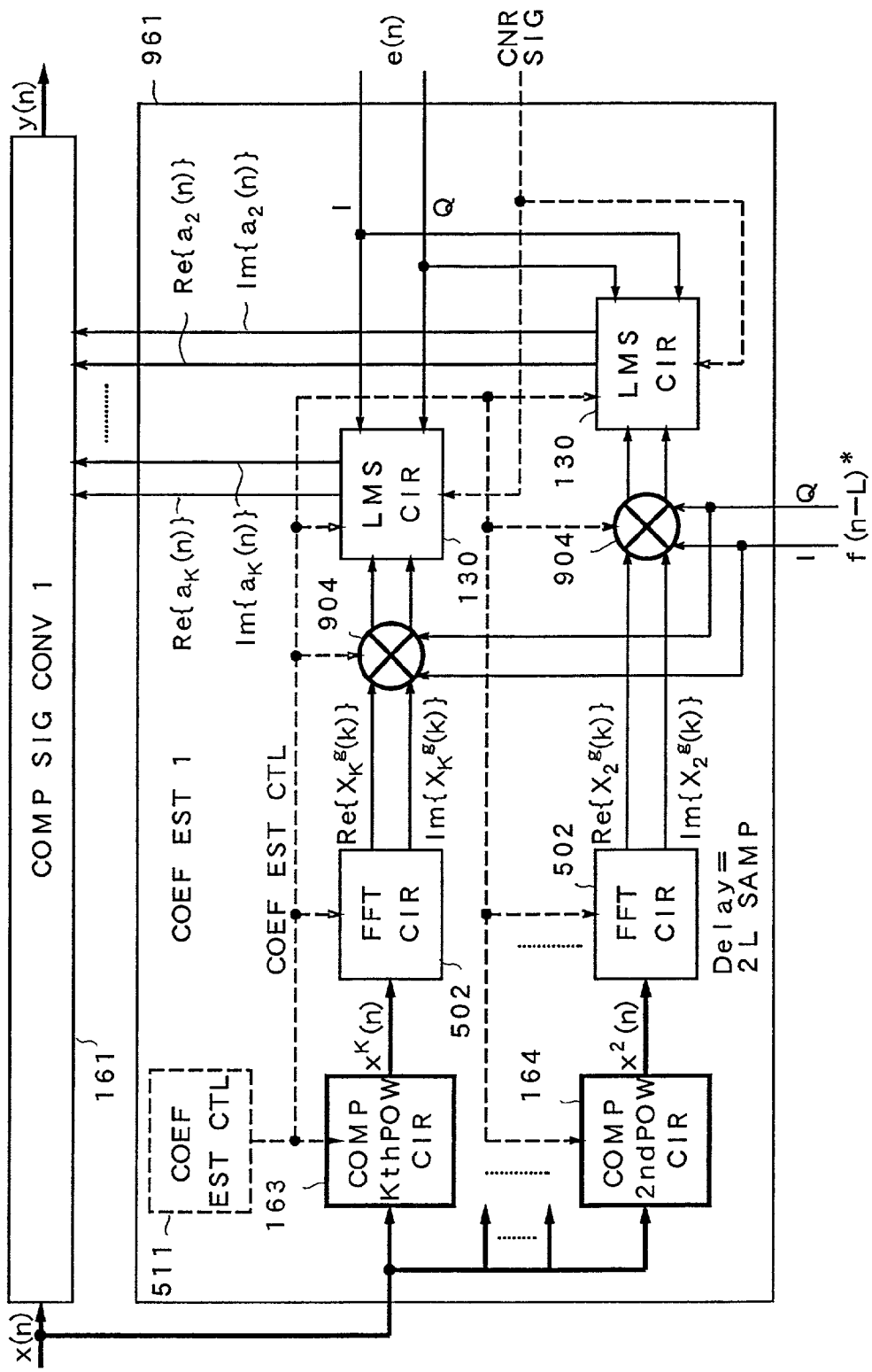
FIG. 84 is a block diagram of another example showing a configuration of the coefficient estimator for nonlinear distortion equalization according to Embodiment 7.

A configuration diagram of a coefficient estimator 961 for nonlinear distortion equalization that compensates for high order nonlinear distortion of at least second order distortion and at most K-th order distortion by using equation (7-9) in the nonlinear distortion equalizer 901 of FIG. 75 and in the nonlinear distortion equalizer 921 of FIG. 79 is shown in FIG. 84. The coefficient estimator 961 for nonlinear distortion equalization is gained by replacing the complex divider 505 with a complex multiplier 904 and by replacing the transmission path characteristics H(k) to the complex multiplier 904 with the complex conjugate signal $f(n-L)^*$ in the coefficient estimator 681 for nonlinear distortion equalization of FIG. 58. According to the above described operation, arbitrary high order nonlinear distortion of second order, or higher, distortion can be compensated for.

Figure 85:
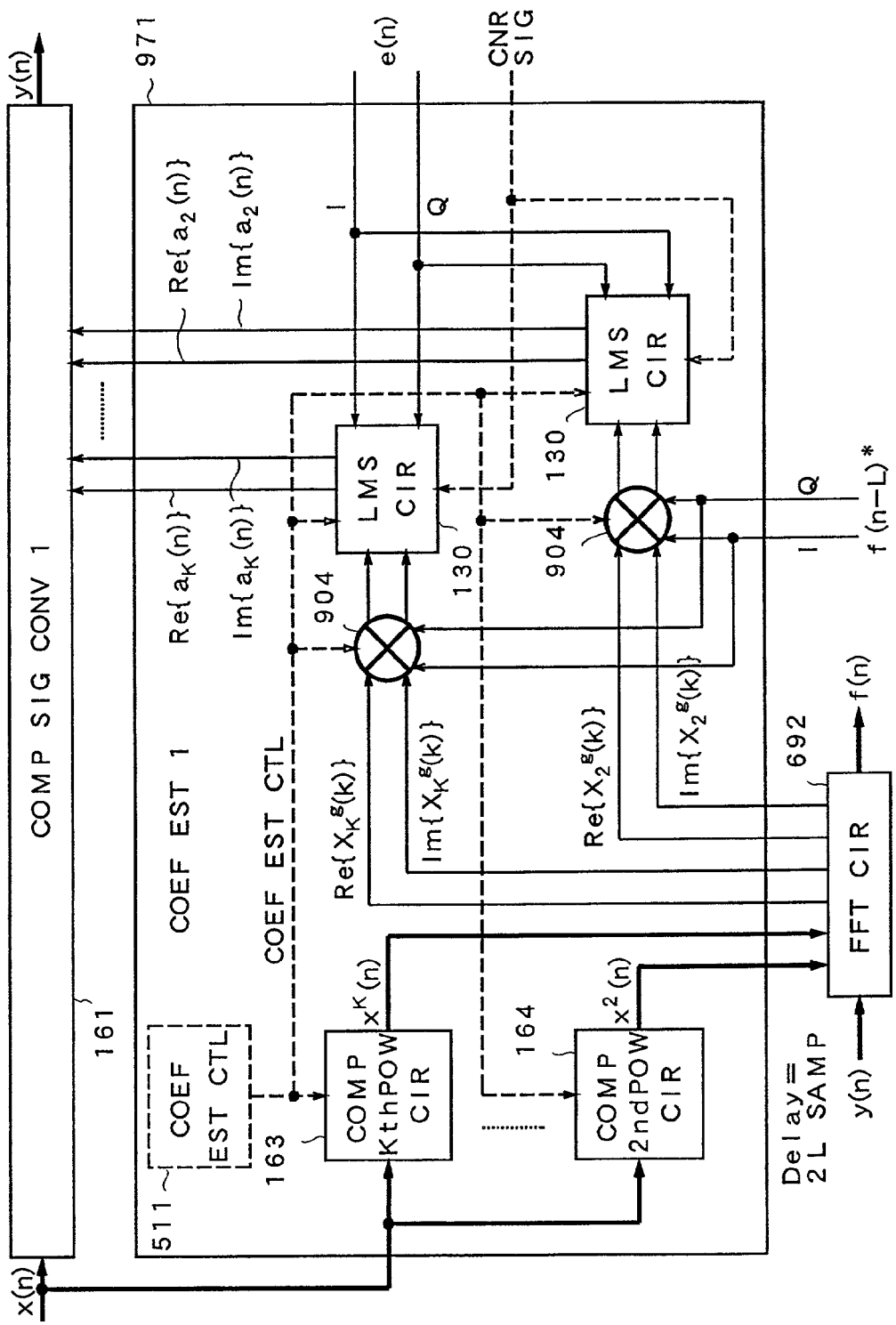
FIG. 85 is a block diagram of another example showing a configuration of the coefficient estimator for nonlinear distortion equalization according to Embodiment 7.

In addition, arbitrary high order nonlinear distortion of second order, or higher, distortion can be compensated for in the same manner in the nonlinear distortion equalizer 911 of FIG. 77 and in the nonlinear distortion equalizer 951 of FIG. 83. The configuration of the coefficient estimator 971 for nonlinear distortion equalization of this case is shown in FIG. 85. The coefficient estimator 971 for nonlinear distortion equalization is gained by replacing the complex divider 505 with a complex multiplier 904 and by replacing the transmission path characteristics H(k) to the complex multiplier 904 with the complex conjugate signal $f(n-L)^*$ in the coefficient estimator 711 for nonlinear distortion equalization of FIG. 65.

In addition, arbitrary high order nonlinear distortion of second order, or higher, distortion can be compensated for in the same manner as in the nonlinear distortion equalizer 931 in FIG. 80. The configuration of the coefficient estimator 981 for nonlinear distortion equalization of this case is shown in FIG. 86. The coefficient estimator 981 for nonlinear distortion equalization is gained by replacing the complex divider 505 with a complex multiplier 904 and by replacing the transmission path characteristics H(k) to the complex multiplier 904 with the complex conjugate signal $f(n-L)^*$ in the coefficient estimator 731 for nonlinear distortion equalization.

Figure 87:
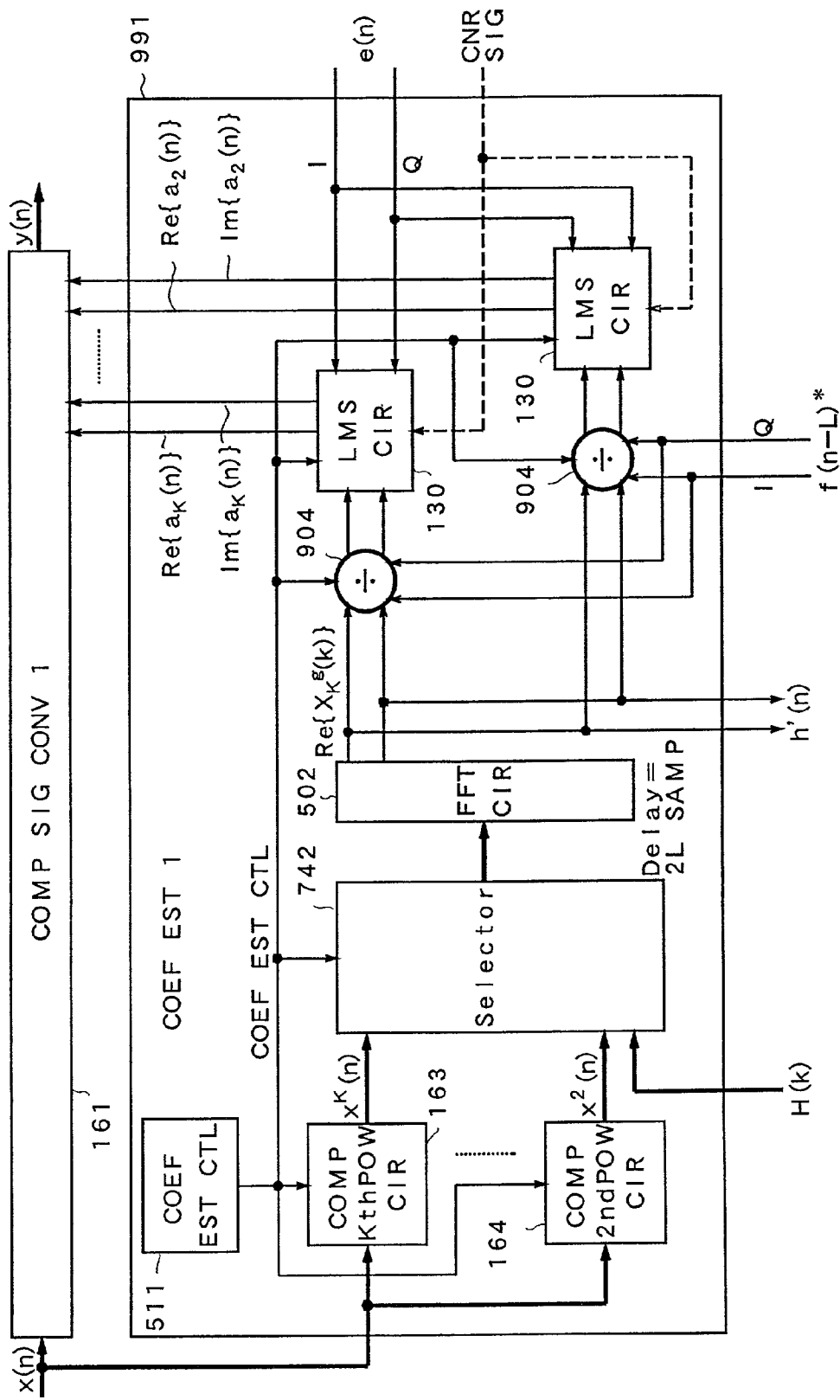
FIG. 87 is a block diagram of another example showing a configuration of the coefficient estimator for nonlinear distortion equalization according to Embodiment 7.

In addition, in the case that the coefficient estimator 932 for nonlinear distortion equalization in the nonlinear distortion equalizer 931 in FIG. 80 is replaced with a coefficient estimator 941 for nonlinear distortion equalization of FIG. 82, arbitrary high order nonlinear distortion of second order, or higher, distortion can be compensated for in the same manner. The configuration of the coefficient estimator 991 for nonlinear distortion equalization of this case is shown in FIG. 87. The coefficient estimator 991 for nonlinear distortion equalization is gained by replacing the complex divider 705 with a complex multiplier 904 and by replacing the transmission path characteristics H(k) to the complex multiplier 904 with the complex conjugate signal $f(n-L)^*$ in the coefficient estimator 751 for nonlinear distortion equalization of FIG. 69.

Here, a case is shown wherein each of the above described examples where arbitrary high order nonlinear distortion of second order, or higher, distortion is compensated for is provided with a complex K-th power calculator 163, a complex square calculator 164 and a complex m-th power calculator of each order, respectively. However, in the same manner as in Embodiment 1, the sharing of circuits can be achieved by sequentially outputting the powers of, for example, the I and Q axis components to a circuit of the next higher order. In addition, other sharing methods may be used.

Here, in Embodiments 1 to 7, quadrature detection is carried out with the quasi-synchronized detector 108. However, there are merely examples, and quadrature detection may be carried out with other methods.

In Embodiments 1 to 7, the conversion equations of the complex signal converter for nonlinear distortion equalization are shown by equations (1-1) and (1-11). However, these are merely examples and other conversion equations may be used. In addition, in Embodiments 1 to 7, $x^m(n)=|x^{m-1}(n)|x(n)(m>1)$, $x^3(n)=|x^2(n)|x(n)$, in particular, is used, although other equations may be used as equations for representing $x^m(n)$ and $x^3(n)(m>1)$.

In addition, in the above Embodiment 1, equations (1-8), (1-10) and (1-12) are used as the coefficient update equation of the coefficient estimator for nonlinear distortion equalization. However, a coefficient update may be carried out for every d symbols (d is an integer at least 2) or an LMS algorithm other than the steepest gradient method or an algorithm other than the LMS may be used.

Furthermore, in the above Embodiment 2, equations (2-1), (2-3) and (2-4) are used as the coefficient update equation of the coefficient estimator for nonlinear distortion equalization. However, a coefficient update may be carried out for every d symbols (d is an integer at least 2) or an LMS algorithm other than the steepest gradient method or an algorithm other than the LMS may be used.

In addition, in the above Embodiment 3, equations (1-8), (1-10), (3-4) to (3-6) and (1-12) are used as the coefficient update equation of the coefficient estimator for nonlinear distortion equalization. However, a coefficient update may be carried out for every d symbols (d is an integer at least 2) or an LMS algorithm other than the steepest gradient method or an algorithm other than the LMS may be used.

In addition, in the above Embodiment 4, equations (2-1), (4-3) to (4-6) and (2-4) are used as the coefficient update equation of the coefficient estimator for nonlinear distortion equalization. However, a coefficient update may be carried out for every d symbols (d is an integer at least 2) or an LMS algorithm other than the steepest gradient method or an algorithm other than the LMS may be used.

In addition, in the above Embodiment 5, equations (5-8), (5-10), (5-25) and (5-26) are used as the coefficient update equation of the coefficient estimator for nonlinear distortion equalization. However, a coefficient update may be carried out for every d samples (d is an integer at least 2) or an LMS algorithm other than the steepest gradient method or an algorithm other than the LMS may be used.

In addition, in the above Embodiment 6, equations (6-6) and (6-11) are used as the coefficient update equation of the coefficient estimator for nonlinear distortion equalization. However, a coefficient update may be carried out for every d samples (d is an integer at least 2) or an LMS algorithm other than the steepest gradient method or an algorithm other than the LMS may be used.

In addition, in the above Embodiment 7, equations (7-6) and (7-9) are used as the coefficient update equation of the coefficient estimator for nonlinear distortion equalization. However, a coefficient update may be carried out for every d samples (d is an integer at least 2) or an LMS algorithm other than the steepest gradient method or an algorithm other than the LMS may be used.

In addition, though in the above Embodiments 1 to 4, a modulation system is not specifically described in detail, the modulation system to which a nonlinear distortion equalizer of the present invention is applied is not limited to a specific system but, rather, a variety of modulation systems such as OFDM, QAM, VSB or PSK are possible.

In addition, though the step size parameter u of a coefficient estimator for nonlinear distortion equalization in the above Embodiments 1 to 7 is shared for each order, a step size parameter $u_m$ is allocated for each order so as to be respectively variable.

In addition, a determination method of the phase synchronization establishment, a C/N calculation method, shown in the above Embodiments 1 to 4, and a determination method of linear distortion equalization convergence in the above Embodiments 3 and 4 are merely examples and other methods may be used.

In addition, a C/N calculation method, shown in the above Embodiments 5 to 7, is merely an example and other methods may be used.

In addition, though in the above Embodiments 1 to 4 a case is shown wherein a raised cosine filter is used as a low pass filter in the nonlinear distortion equalizer, other low pass filters may be used.

In addition, in the present Embodiment 3, equation (3-2) is used as the coefficient update equation of coefficient estimator for linear distortion equalization. However, an LMS algorithm other than the steepest gradient method or an algorithm other than the LMS may be used.

In addition, in the present Embodiment 4, equation (4-1) is used as the coefficient update equation of the coefficient estimator for linear distortion equalization. However, an LMS algorithm other than the steepest gradient method or an algorithm other than the LMS may be used.

In addition, though in the present Embodiment 5, a synchronized demodulation is carried out by using a synchronized demodulator 503, shown in FIG. 30, this is merely an example.

In addition, though in the above Embodiments 6 and 7 a differential demodulation is carried out by using a differential demodulator 802, shown in FIG. 70, and a differential demodulator 902, shown in FIG. 75, respectively, these are merely examples.

In addition, in the above Embodiments 5 to 7, the point number L=4 of the FFT is used as an example for the description of the operation of the FFT circuit 502. Furthermore, for simplification, the FFT circuit 502 is assumed to start the operation at time n=T=0 and g=0 is assumed. However, these values are merely examples.

In addition, in the above Embodiments 5 to 7 the configurations of the FFT circuits 502, 561, 572 and 692 are those respectively shown in FIGS. 33, 37, 41 and 60. Then, the operations of these circuits are respectively shown in FIGS. 34, 38, 42 to 45 and 61 to 64 while the process delay is 2L samples. However, these are merely examples and the invention is not limited to the above described examples.

The below listed embodiments have configurations wherein the coefficient estimator controller 511 outputs a coefficient update control signal wherein only one OFDM symbol becomes "H" for every two OFDM symbols.

(1) Embodiment 5 coefficient estimator 506 for nonlinear distortion equalization of FIG. 31 coefficient estimator 573 for nonlinear distortion equalization of FIG. 40 coefficient estimator 612 for nonlinear distortion equalization of FIG. 51 coefficient estimator 631 for nonlinear distortion equalization of FIG. 53, (2) Embodiments 5 and 6 coefficient estimator 541 for nonlinear distortion equalization of FIG. 35 coefficient estimator 591 for nonlinear distortion equalization of FIG. 46 coefficient estimator 621 for nonlinear distortion equalization of FIG. 52 coefficient estimator 641 for nonlinear distortion equalization of FIG. 54, and (3) Embodiment 7 coefficient estimator 905 for nonlinear distortion equalization of FIG. 76 coefficient estimator 912 for nonlinear distortion equalization of FIG. 78 coefficient estimator 932 for nonlinear distortion equalization of FIG. 81 coefficient estimator 941 for nonlinear distortion equalization of FIG. 82.

However, a coefficient update control signal wherein only one OFDM symbol becomes "H" for every f OFDM symbols when f is an integer of at least 2 may be outputted so that each circuit in the above described coefficient estimator for nonlinear distortion equalization stops the operation for the symbols of "L."

The below listed embodiments have configurations wherein the coefficient update control signal operates the FFT circuit for all of the symbols of "L" so as to calculate the delay profile h'(n).

(1) Embodiment 5; coefficient estimator 631 for nonlinear distortion equalization of FIG. 53, (2) Embodiments 5 and 6; coefficient estimator 641 for nonlinear distortion equalization of FIG. 54, and (3) Embodiment 7; coefficient estimator 941 for nonlinear distortion equalization of FIG. 82.

However, iN-th order to reduce the power consumption, the coefficient update control signal may calculate the delay profile h'(n) during only one OFDM symbol for every f OFDM symbols from among the entirety of symbols of "L" when f is an integer of at least 2. In this case, the FFT circuit can be stopped during the period of time of the remaining (f-1) OFDM symbols.

The below listed embodiments have configurations wherein the FFT circuit 572 is operated at a speed twice as fast as the regular speed and, thereby, the delay profile h'(n) is calculated for the entirety of the symbols.

(1) Embodiment 5; nonlinear distortion equalizer 601 of FIG. 47, (2) Embodiments;5 and 6 nonlinear distortion equalizer gained by replacing the coefficient estimator with the coefficient estimator 541 for nonlinear distortion equalization in the nonlinear distortion equalizer 601 of FIG. 47, (3) Embodiment 6; nonlinear distortion equalizer 821 of FIG. 72, and (4) Embodiment 7; coefficient estimator 921 for nonlinear distortion equalization of FIG. 79.

However, iN-th order to reduce the power consumption, the delay profile h'(n) may be calculated during only one OFDM symbol for every f OFDM symbols when f is an integer of at least 2. In this case, the circuit with respect to the delay profile in the FFT circuit 572 can be stopped during the period of the remaining (f-1) OFDM symbols.

The delay profile h'(n) is calculated for the entirety of the symbols by allowing the FFT circuit 572 to operate at a speed two times as fast as the regular speed in the below listed embodiments.

(1) Embodiment 5; coefficient estimator 612 for nonlinear distortion equalization of FIG. 51, (2) Embodiments 5 and 6; coefficient estimator 621 for nonlinear distortion equalization of FIG. 52, and (3) Embodiment 7; coefficient estimator 932 for nonlinear distortion equalization of FIG. 81.

However, iN-th order to reduce the power consumption, the delay profile h'(n) may be calculated during only one OFDM symbol for every f OFDM symbols when f is an integer of at least 2. In this case, the circuit with respect to the delay profile in the FFT circuit 572 can be stopped during the period of the remaining (f-1) OFDM symbols.

In the below listed embodiments the delay profile h'(n) is calculated by operating the FFT circuit 502 for the entirety of the symbols wherein the coefficient update control signal is 0.

(1) Embodiment 5; coefficient estimator 741 for nonlinear distortion equalization of FIG. 68, (2) Embodiments 5 and 6; coefficient estimator 751 for nonlinear distortion equalization of FIG. 69, and (3) Embodiment 7; coefficient estimator 991 for nonlinear distortion equalization of FIG. 87.

However, iN-th order to reduce the power consumption, the delay profile h'(n) may be calculated during only one OFDM symbol for every f OFDM symbols in the entirety of the symbols wherein the coefficient update control signal is 0 when f is an integer of at least 2. In this case, the FFT circuit 502 can be stopped during the period of the remaining (f-1) OFDM symbols. In the case that nonlinear distortion of other orders is compensated for, the configuration may be such that the power consumption is reduced in the same manner.

The below listed embodiments have complex FFT circuits 502 for every order.

(1) Embodiment 5; coefficient estimator 671 for nonlinear distortion equalization of FIG. 57, (2) Embodiments 5 and 6; coefficient estimator 681 for nonlinear distortion equalization of FIG. 58, and (3) Embodiment 7; coefficient estimator 941 for nonlinear distortion equalization.

However, the circuit may be replaced with, for example, one FFT circuit 572 shown in FIG. 41 so as to be operated at a speed twice as fast as the regular speed and, thereby, time division multiplication is carried out and second order distortion and K-th order distortion may be compensated for. In the case that nonlinear distortion of other orders is compensated for, the degree of multiplexing of the FFT circuit 572 may be increased if necessary.

In addition, though the frequency synchronization is not particularly referred to in the present Embodiments 5 to 7, the coefficient estimator for nonlinear distortion equalization may start the operation after the establishment of the frequency synchronization when $a_3(n)=0$ is assumed during the capture process of the frequency synchronization.

In addition, in the present Embodiments 5 to 7, one point for every two points is used as a representative value from among the outputs of the FFT circuit 502 in the coefficient estimator for nonlinear distortion equalization while the remaining one point is interpolated as the above described representative value by using equation (5-17) as an interpolation equation. This is merely an example. When the point number of the FFT conversion is L, c is an integer of at least 2, q is an integer of at least 0 and no more than c−1 and r is an integer of at least −(c−1) and at most 0, the following equations are set.

$$X_3^g((p-1)c+q+b)=X_3^g((p-1)c+q)\ (p=2, 3, \ldots, (L/c-1)) \qquad \text{equation (8-1)}$$

$$X_3^g((p-1)c+q+b)=X_3^g((p-1)c+q)\ (p=1\ \text{and}\ q+b\geq 0) \qquad \text{equation (8-2)}$$

$$X_3^g((p-1)c+q+b)=X_3^g((p-1)c+q)\ (p=L/c\ \text{and}\ q+b\leq c-1) \qquad \text{equation (8-3)}$$

$$X_3^{g-1}(L+q+b)=X_3^g((p-1)c+q)\ (p=1\ \text{and}\ q+b\leq -1) \qquad \text{equation (8-4)}$$

$$X_3^{g+1}(q+b)=X_3^g((p-1)c+q)\ (p=L/c\ \text{and}\ q+b\geq c) \qquad \text{equation (8-5)}$$

$$(b=r, r+1, \ldots, r+(c-1))$$

As shown in the above equations, one point for every c points is used as a representative value from among the outputs of the FFT conversion while the remaining (c−1) points may be interpolated as the representative values.

Here, equations (8-1) to (8-5) are described in the following. A case of L=16, C=4 and m=3, which compensates for third order distortion, is contemplated as an example. Patterns of interpolations using equations (8-1) to (8-5) are shown in FIGS. 88 to 95. FIGS. 88 to 95 are explanatory diagrams wherein an attention is paid to $X_3^g(k)$ and wherein the lateral axis shows the carrier number k.

Figure 88:
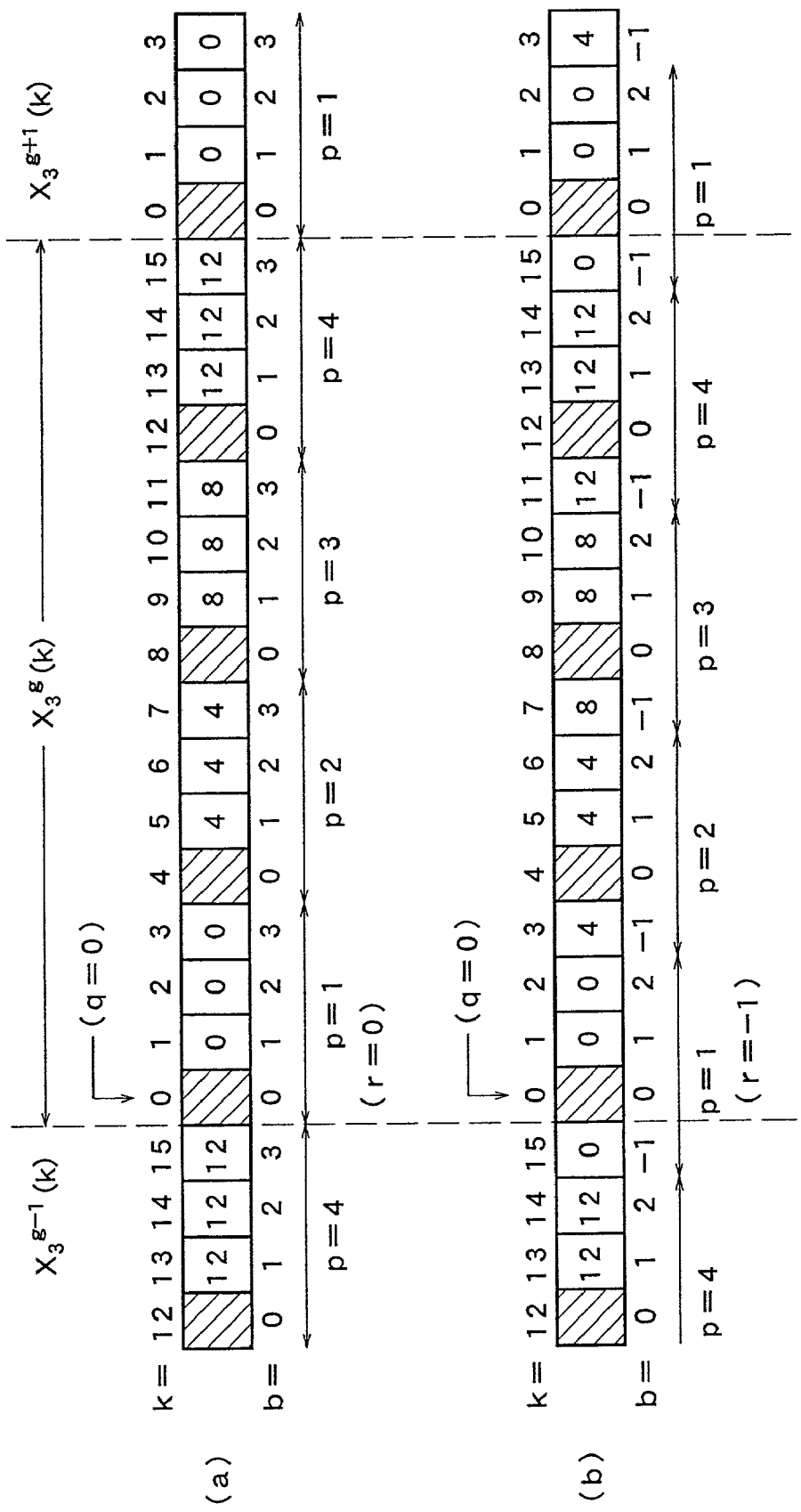
FIG. 88 is an explanatory diagram (part 1) showing an interpolation method of an FFT conversion according to Embodiment 7.
Figure 89:
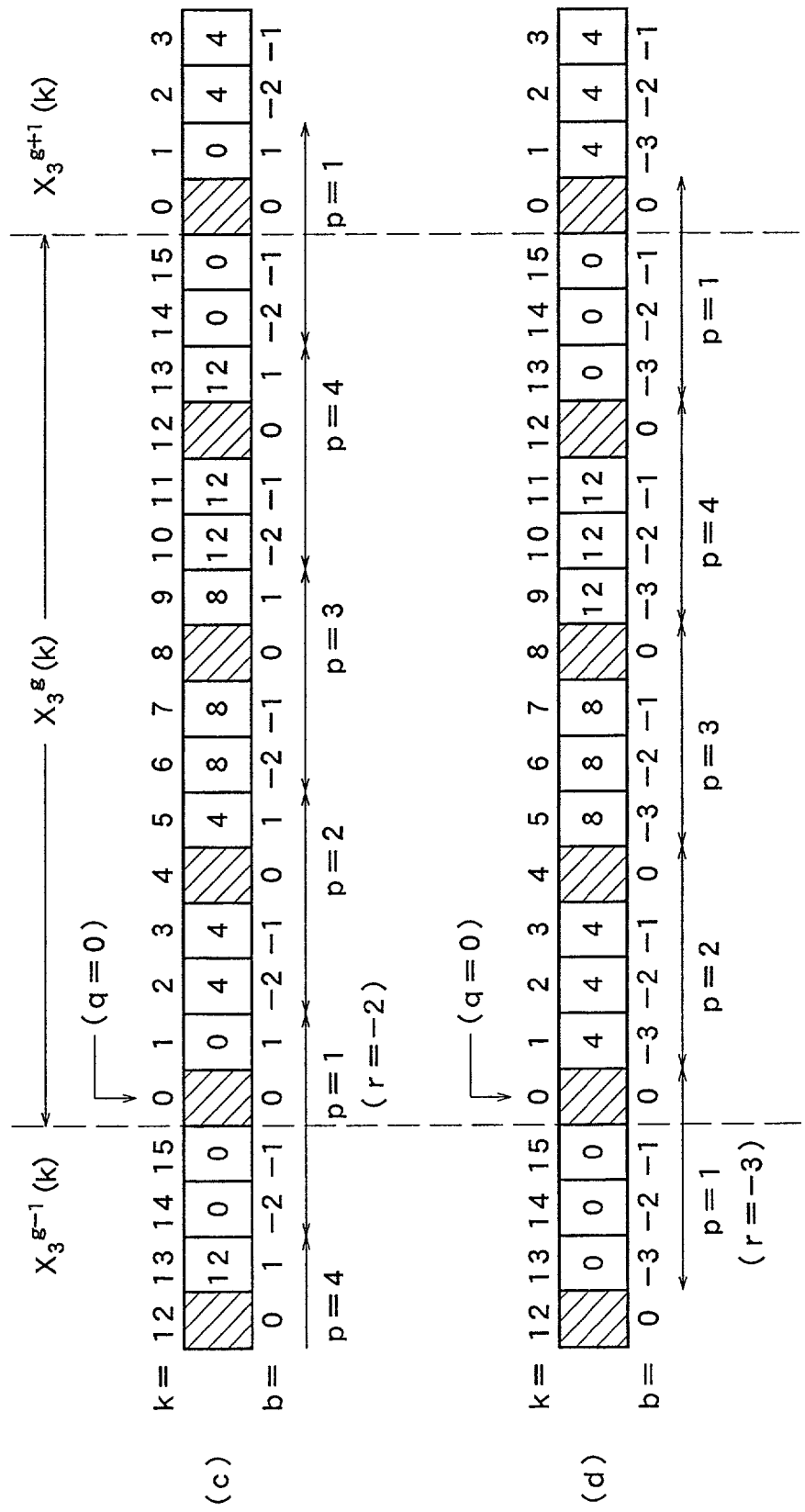
FIG. 89 is an explanatory diagram (part 2) showing the interpolation method of the FFT conversion according to Embodiment 7.
Figure 91:
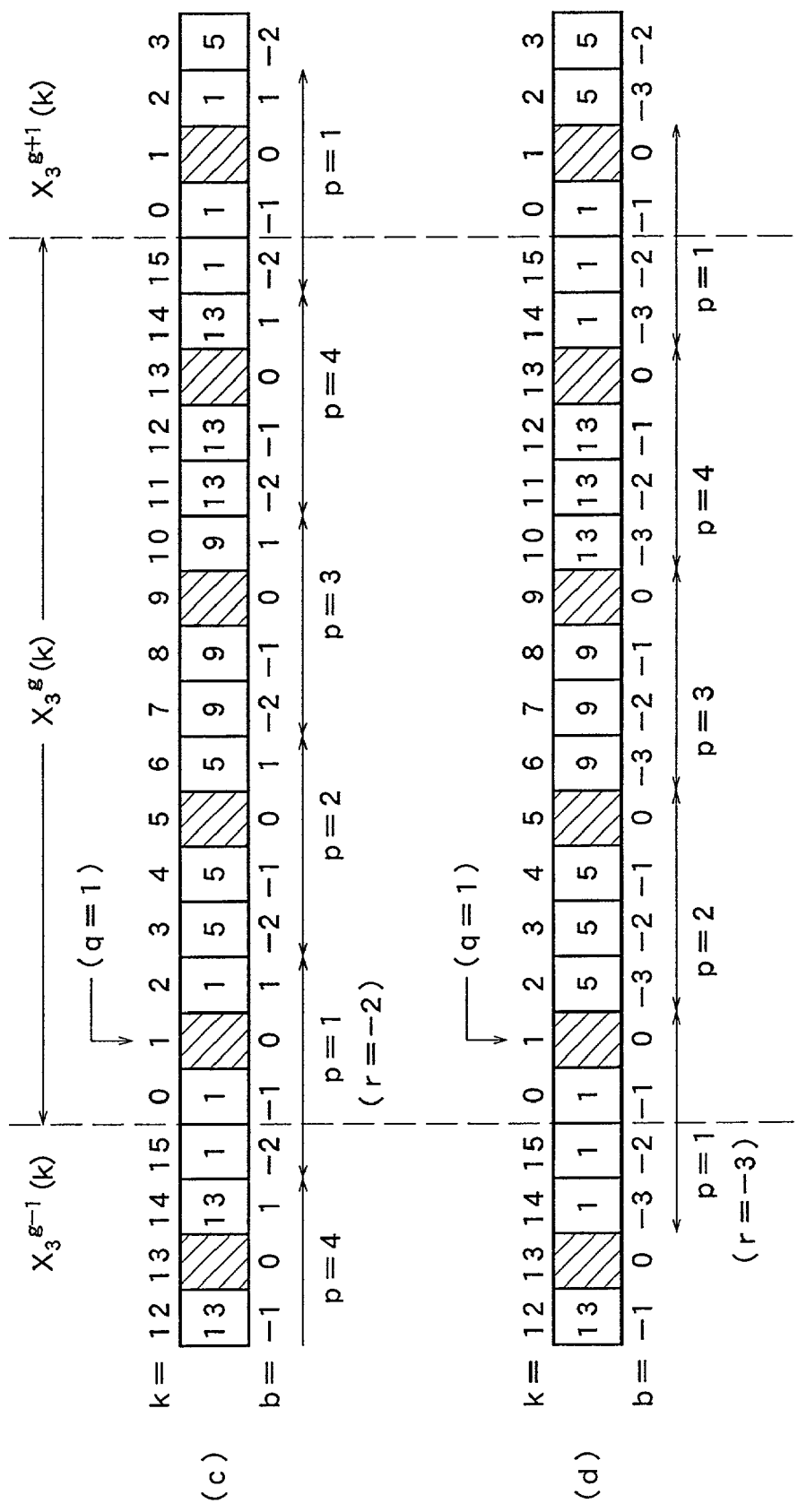
FIG. 91 is an explanatory diagram (part 4) showing the interpolation method of the FFT conversion according to Embodiment 7.
Figure 92:
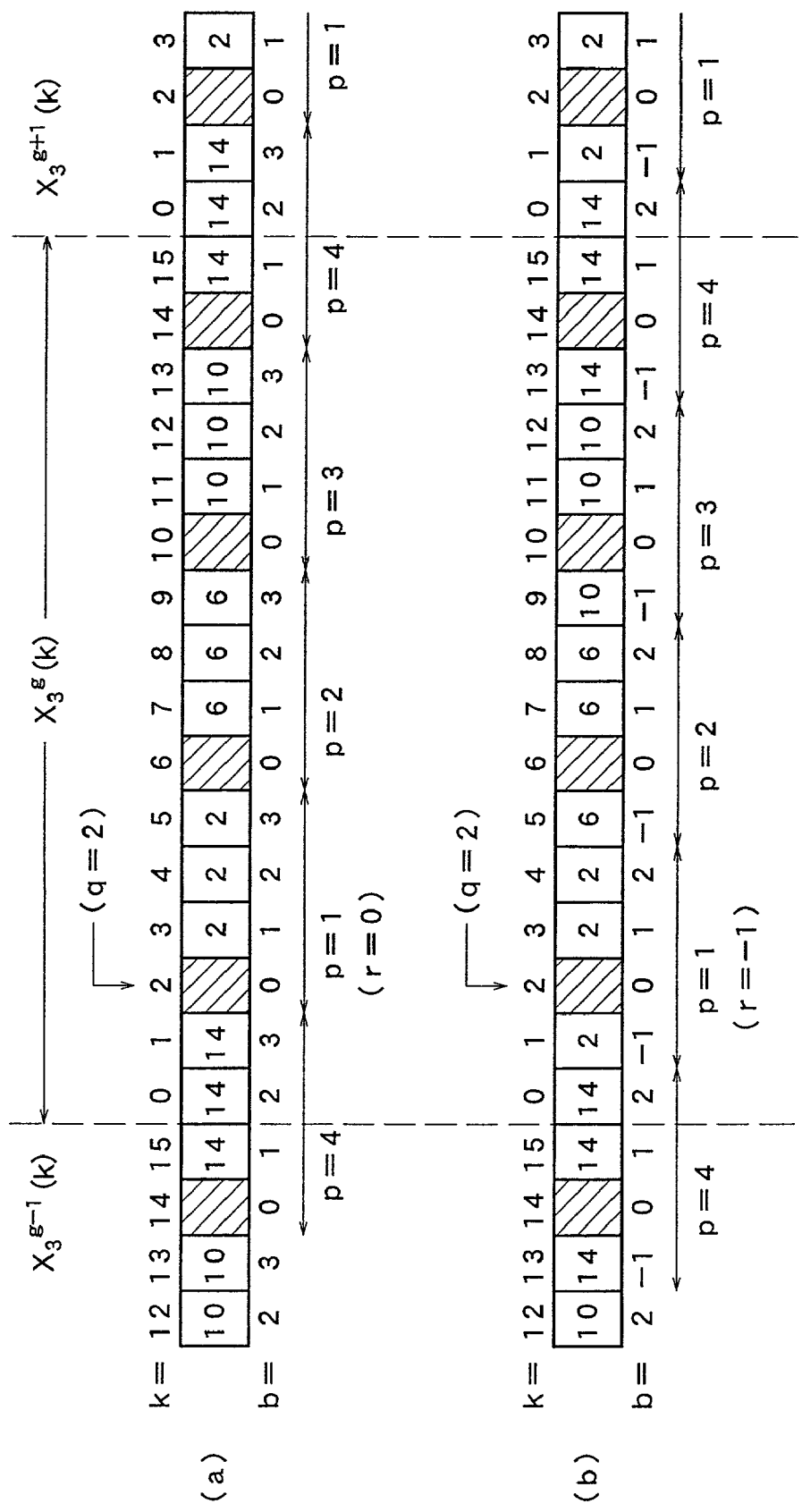
FIG. 92 is an explanatory diagram (part 5) showing the interpolation method of the FFT conversion according to Embodiment 7.
Figure 93:
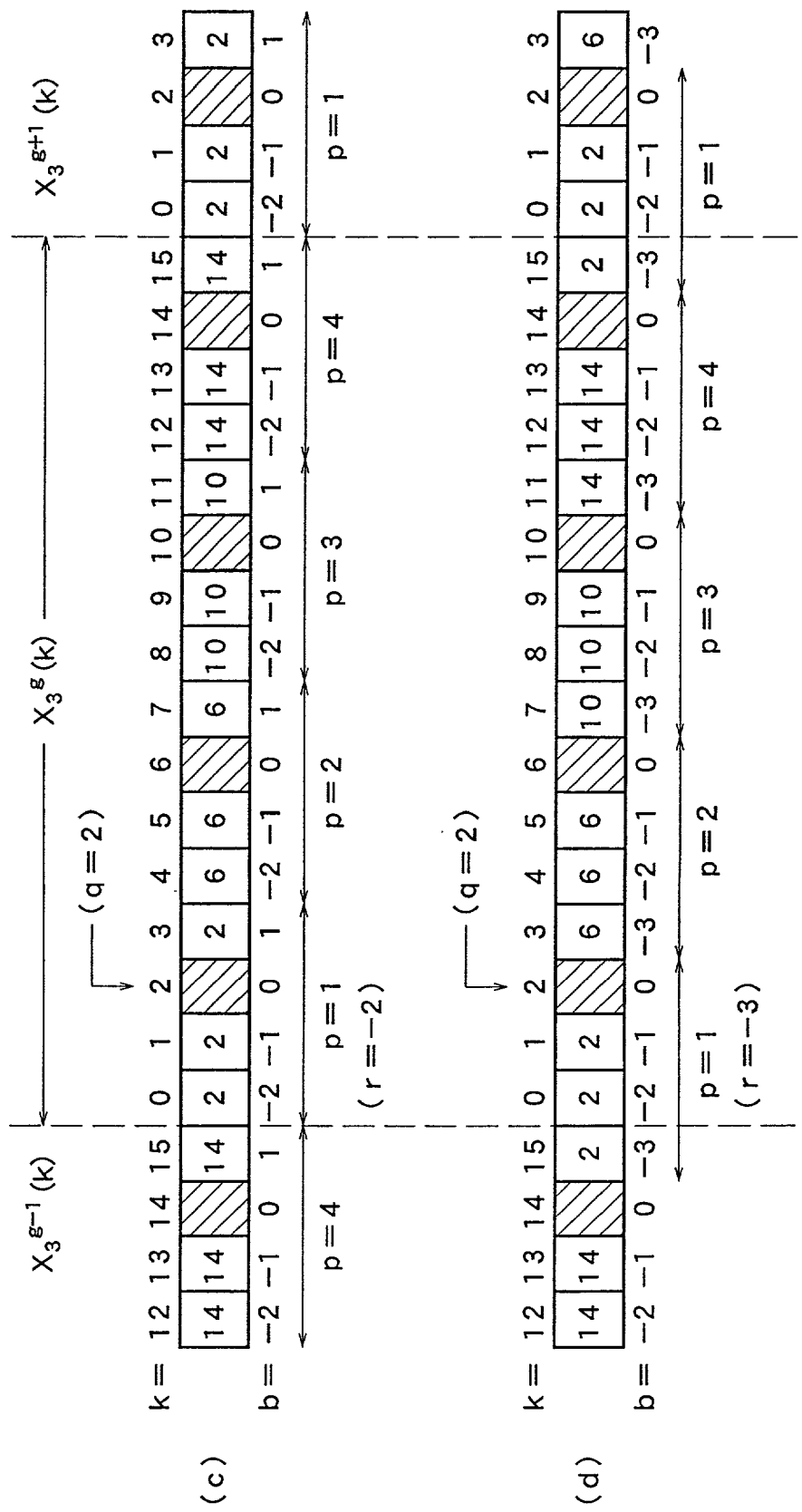
FIG. 93 is an explanatory diagram (part 6) showing the interpolation method of the FFT conversion according to Embodiment 7.
Figure 94:
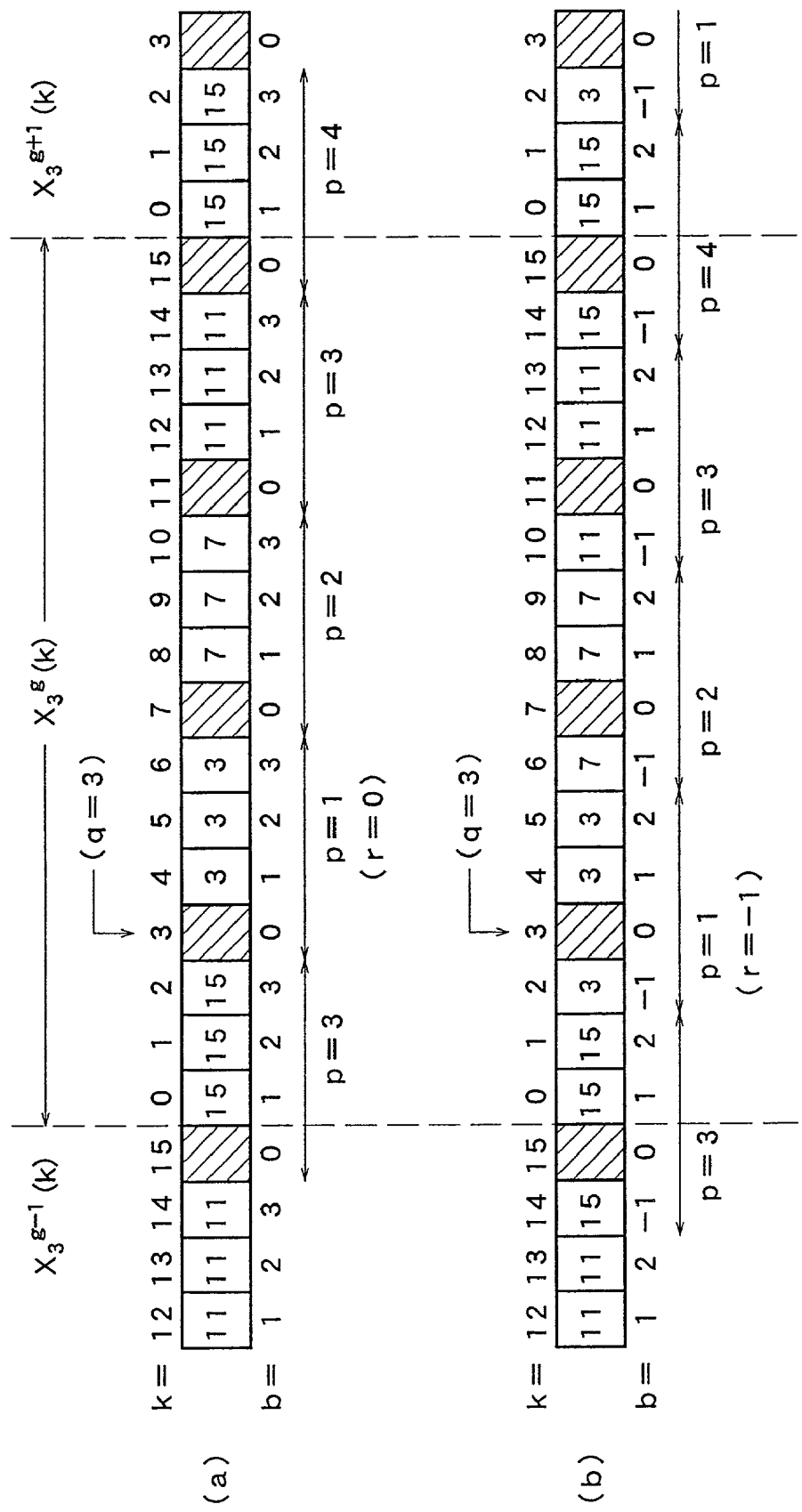
FIG. 94 is an explanatory diagram (part 7) showing the interpolation method of the FFT conversion according to Embodiment 7.
Figure 95:
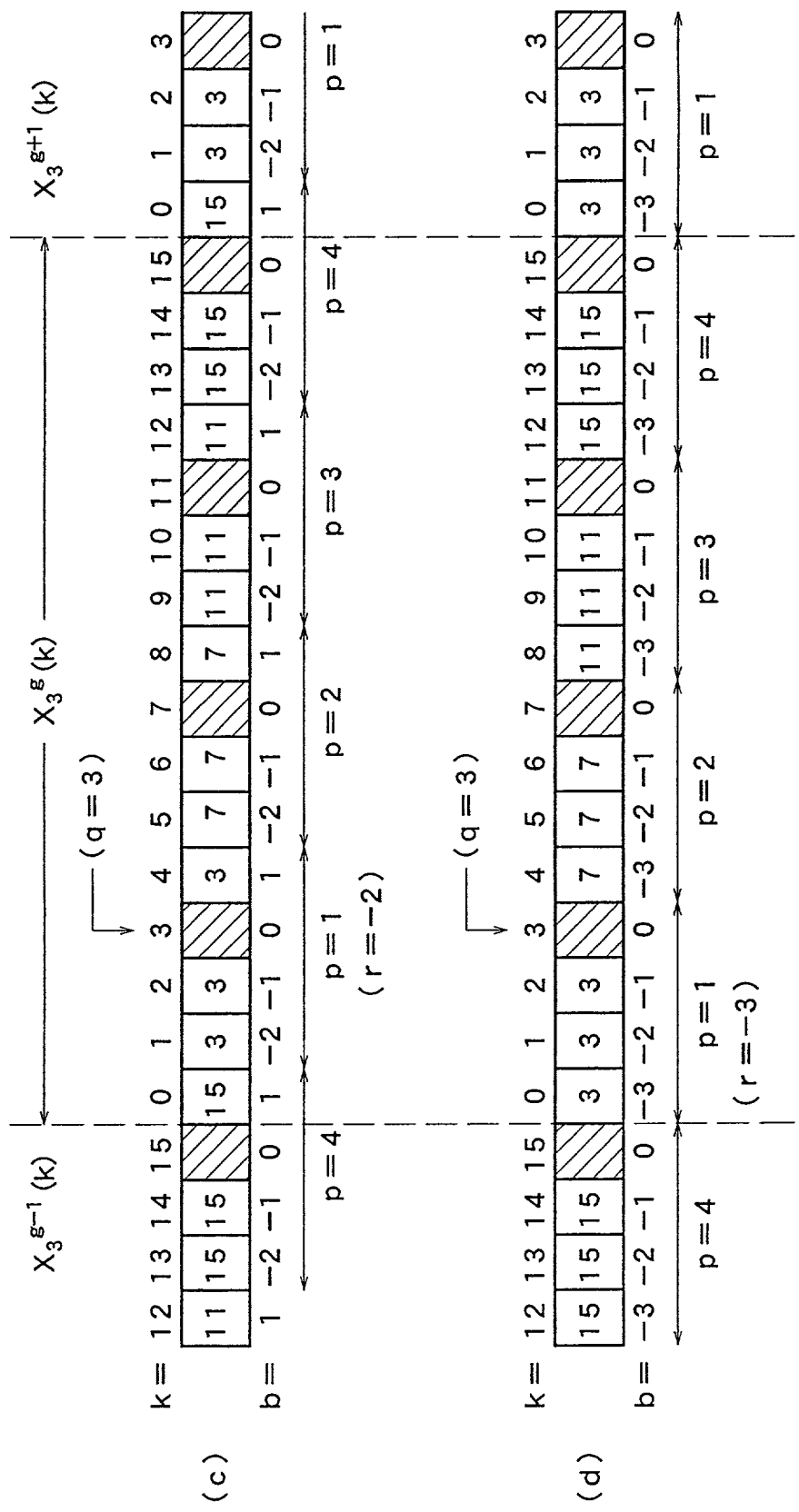
FIG. 95 is an explanatory diagram (part 8) showing the interpolation method of the FFT conversion according to Embodiment 7.

FIGS. 88 and 89: q=0
FIGS. 90 and 91: q=1
FIGS. 92 and 93: q=2
FIGS. 94 and 95: q=3

Here, (a) r=0, (b) r=−1, (c) r=−2 and (d) r=−3.

In FIGS. 88 to 95, the hatched boxes show carrier numbers that are used as representative values while the remaining boxes show carrier numbers that are used for interpolation by numerals from among the boxes respectively showing carrier numbers. As shown in FIGS. 88 to 95, each letters in equations (8-1) to (8-5) indicates the following contents.

p: pth representative value in each symbol ($1 \leq p \leq c/L$)

q: minimum carrier number used as a representative value ($0 \leq q \leq c-1$)

b: difference between a carrier number and the carrier number used as a representative value ($r \leq b \leq r+(c-1)$)

r: minimum value of b ($-(c-1) \leq r \leq 0$)

The range of q+b is represented as the following equation $$-(c-1) \leq q+b \leq 2(c-1) \quad \text{equation (8-6)}$$

That is to say, the carrier number used as a representative number is determined by q and the range of the carrier number that carries out an interpolation is determined by using the pth representative value. When b is 0 the carrier number used as a represented value is denoted by itself and when the sign − or + is attached to b, the carrier number before or after the carrier number used as the representative value is respectively shown.

L=16 and c=4 are substituted into equations (8-1) to (8-5) so as to gain the following equations, respectively.

$$X_3^g(4(p-1)+q+b)=X_3^g(4(p-1)+q) \ (p=2, 3) \quad \text{equation (8-7)}$$

$$X_3^g(4(p-1)+q+b)=X_3^g(4(p-1)+q) \ (p=1 \text{ and } q+b \geq 0) \quad \text{equation (8-8)}$$

$$X_3^g(4(p-1)+q+b)=X_3^g(4(p-1)+q) \ (p=4 \text{ and } q+b \leq 3) \quad \text{equation (8-9)}$$

$$X_3^{g-1}(16+q+b)=X_3^g(4(p-1)+q) \ (p=1 \text{ and } q+b \leq -1) \quad \text{equation (8-10)}$$

$$X_3^{g+1}(q+b)=X_3^g(4(p-1)+q) \ (p=4 \text{ and } q+b \geq 4) \quad \text{equation (8-11)}$$

$$(b=r, r+1, \ldots, r+3)$$

In these equations, each letter represents the following contents.

p: pth representative value ($1 \leq p \leq 4$)

q: minimum carrier number used as a representative value ($0 \leq q \leq 3$)

b: difference between a carrier number and the carrier number used as a representative value ($r \leq b \leq r+3$)

r: minimum value of b ($-3 \leq r \leq 0$)

The range of q+b is represented in the following equation.

$$-3 \leq q+b \leq 6 \quad \text{equation (8-12)}$$

Equations (8-7) to (8-9) show a case wherein an interpolation is carried out by closing within the gth OFDM symbol. Since L=16, the carrier number k is in the range of:

$$0 \leq k \leq 15 \quad \text{equation (8-13)}$$

The following equations are formed according to equation (8-12).

$$1 \leq 4(p-1)+q+b \leq 14 \ (p=2, 3) \quad \text{equation (8-14)}$$

$$-3 \leq 4(p-1)+q+b \leq 6 \ (p=1) \quad \text{equation (8-15)}$$

$$9 \leq 4(p-1)+q+b \leq 18 \ (p=4) \quad \text{equation (8-16)}$$

When p=2 or 3, it is unnecessary to use a plurality of equations for representing the carrier number, which is represented only in equation (8-7). On the other hand, when p=1, q+b≤−1 is formed so as to exceed the range of equation (8-13) and, therefore, it is necessary to use a plurality of equations, that are equations (8-8) and (8-10). In the case of q+b≤−1, that is to say, in the case that a negative value is gained in equation (8-15), data is interpolated one OFDM symbol before as shown in equation (8-10). When p=4, q+b≥4 is formed so as to exceed the range of equation (8-13) in the same manner as in the above and, therefore, it becomes necessary to use a plurality of equations such as equations (8-9) and (8-11). In the case of q+b≥4, that is to say, 16, or greater, in equation (8-16), data one OFDM symbol after is interpolated as shown in equation (8-11).

In addition, in the present embodiments 5 to 7, one point for every, for example, two points from among the outputs of the FFT circuit 502 in the coefficient estimator for nonlinear distortion equalization is used so as to set a representative value. Then the remaining one point is interpolated as a representative value by using equation (5-17) as an interpolation equation.

However, coefficients $h_1$, and $h_3$ are used to set the following equations.

$$X_3^0(1)=h_1 X_3^0(0), \ X_3^0(3)=h_3 X_3^0(2) \quad \text{equation (8-17)}$$

The coefficients $h_1$ and $h_3$ are values (coefficients for linear interpolation) for gaining the following equations.

$h_1 X_3^0(0)$: average value of $X_3^0(0)$ and $X_3^0(2)$ $h_3 X_3^0(2)$: average value of $X_3^0(2)$ and $X_3^1(0)$ In the case of m=3 for compensating for third order distortion, the following equations are set when the point number of the FFT conversion is L, c is an integer of at least 2, q is an integer of at least 0 and no more than c−1 and r is an integer of at least −(c−1) and no more than 0.

$$X_3^g((p-1)c+q+b)=h_{gpb}X_3^g((p-1)c+q) \ (p=2, 3, \ldots, (L/c-1)) \quad \text{equation (8-18)}$$

$$X_3^g((p-1)c+q+b)=h_{gpb}X_3^g((p-1)c+q) \ (p=1 \text{ and } q+b \geq 0) \quad \text{equation (8-19)}$$

$$X_3^g((p-1)c+q+b)=h_{gpb}X_{3g}((p-1)c+q) \ (p=L/c \text{ and } q+b \leq c-1) \quad \text{equation (8-20)}$$

$$X_3^{g-1}(L+q+b)=h_{gpb}X_{3g}((p-1)c+q) \ (p=1 \text{ and } q+b \leq -1) \quad \text{equation (8-21)}$$

$$X_3^{g+1}(q+b)=h_{gpb}X_3^g((p-1)c+q) \ (p=L/c \text{ and } q+b \geq c) \quad \text{equation (8-22)}$$

$$(b=r, r+1, \ldots, r+(c-1))$$

The coefficient $h_{gpb}$ may be multiplied in equations (8-1) to (8-5) in such a manner. As for the coefficient value, adjacent representative values, for example, may be used so as to achieve a linear interpolation.

When a case of L=16 and c=4 is assumed as an example the following equation is formed.

$$X_3^g(4(p-1)+q+b)=h_{gpb}X_3^g(4(p-1)+q) \ (p=2, 3) \quad \text{equation (8-23)}$$

$$X_3^g(4(p-1)+q+b)=h_{gpb}X_3^g(4(p-1)+q) \ (p=1 \text{ and } q+b \geq 0) \quad \text{equation (8-24)}$$

$$X_3^g(4(p-1)+q+b) = h_{gpb} X_3^g(4(p-1)+q) \ (p=4 \text{ and } q+b \leq 3) \quad \text{equation (8-25)}$$

$$X_3^{g-1}(16+q+b) = h_{gpb} X_3^g(4(p-1)+q) \ (p=1 \text{ and } q+b \leq -1) \quad \text{equation (8-26)}$$

$$X_3^{g+1}(q+b) = h_{gpb} X_3^g(4(p-1)+q) \ (p=4 \text{ and } q+b \geq 4) \quad \text{equation (8-27)}$$

$(b=r, r+1, \ldots, r+3)$

The coefficient $h_{gpb}$ may be multiplied in equations (8-7) to (8-11) in the above manner. As for the coefficient values, for example, adjacent representative values may be used so as to achieve a linear interpolation.

In addition, in the present embodiments 5 to 7, one point for every two points from among the inputs of the FFT circuit 502 of the coefficient estimator for nonlinear distortion equalization is used according to, for example, equation (5-18) so as to carry out an FFT conversion on the 1/2 point numbers so that a representative value is gained. In addition, the remaining one point is interpolated as a representative value by using equation (5-19) as an interpolation equation. However, this is merely an example.

In the case of m=3 for compensating for third order distortion, the following equations are set when the point number of the FFT conversion is L, c is an integer of at least 2, q is an integer of at least 0 and no more than c−1 and r is an integer of at least −(c−1) and no more than 0.

$$X_3^g((p-1)c+q)' = \Sigma_{s=1 \text{ to } L/c} X^3(T+gL+(s-1)c+q) W_{L/c}^{(p-1)(s-1)} W_{L/c} = e^{-j2pie/(L/c)} \ (p=1, 2, \ldots, L/c) \quad \text{equation (8-28)}$$

One point for every c points of the inputs of the above described FFT conversion is used so as to carry out an FFT conversion of the 1/c point numbers so that a representative value is gained. The following equations are gained in this case.

$$X_3^g((p-1)c+q+b)' = X_3^g((p-1)c+q)' \ (p=2, 3, \ldots, (L/c-1)) \quad \text{equation (8-29)}$$

$$X_3^g((p-1)c+q+b)' = X_3^g((p-1)c+q)' \ (p=1 \text{ and } q+b \geq 0) \quad \text{equation (8-30)}$$

$$X_3^g((p-1)c+q+b)' X_3^g((p-1)c+q)' \ (p=L/c \text{ and } q+b \leq c-1) \quad \text{equation (8-31)}$$

$$X_3^{g-1}(L+q+b) = X_3^g((p-1)c+q)' \ (p=1 \text{ and } q+b \leq -1) \quad \text{equation (8-32)}$$

$$X_3^{g+1}(q+b)' = X_3^g((p-1)c+q)' \ (p=L/c \text{ and } q+b \geq c) \quad \text{equation (8-33)}$$

$(b=r, r+1, \ldots, r+(c-1))$

The remaining (c−1) points may be interpolated as the representative values in such a manner. A case of L=16 and c=4 is assumed as an example. L=16 and c=4 are substituted into equations (8-29) to (8-33) so as to gain the following equations.

$$X_3^g(4(p-1)+q+b)' = X_3^g(4(p-1)+q)' \ (p=2, 3) \quad \text{equation (8-34)}$$

$$X_3^g(4(p-1)+q+b)' = X_3^g(4(p-1)+q)' \ (p=1 \text{ and } q+b \geq 0) \quad \text{equation (8-35)}$$

$$X_3^g(4(p-1)+q+b)' = X_3^g(4(p-1)+q)' \ (p=4 \text{ and } q+b \leq 3) \quad \text{equation (8-36)}$$

$$X_3^{g-1}(16+q+b) = X_3^g(4(p-1)+q)' \ (p=1 \text{ and } q+b \leq -1) \quad \text{equation (8-37)}$$

$$X_3^{g+1}(q+b)' = X_3^g(4(p-1)+q)' \ (p=4 \text{ and } q+b \geq 4) \quad \text{equation (8-38)}$$

$(b=r, r+1, \ldots, r+3)$

Thus the interpolation equations of equations (8-34) to (8-38) are gained only by replacing $X_3^g(k)$ with $X_3^g(k)'$ in FIGS. 88 to 95.

In addition, in the present Embodiments 5 to 7, one point for, for example, two points from among the inputs of the FFT circuit 502 of the coefficient estimator for nonlinear distortion equalization is used so as to carry out an FFT conversion on the 1/2 point numbers so that a representative value is gained. In addition, in the configuration wherein the remaining one point is interpolated as the above described representative value, equation (5-19) is used as the interpolation equation.

However, the coefficients $h_1$, and $h_3$ may be set so that the following equations are gained.

$$X_3^0(1)' = h_1 X_3^0(0)', \ X_3^0(3)' = h_3 X_3^0(1)' \quad \text{equation (8-39)}$$

In the case of the above equation the following values for carrying out linear interpolations are assumed as the coefficient values.

$h_1 X_3^0(0)'$: average value of $X_3^0(0)'$ and $X_3^0(2)'$ $h_3 X_3^0(1)'$: average value of $X_3^0(2)'$ and $X_3^1(0)'$ In the case of m=3 for compensating for third order distortion, the following equations are set when the point number of the FFT conversion is L, c is an integer of at least 2, q is an integer of at least 0 and no more than c−1 and r is an integer of at least −(c−1) and no more than 0.

$$X_3^g((p-1)c+q+b)' = h_{gpb} X_3^g((p-1)c+q)' \ (p=2, 3, \ldots, (L/c-1)) \quad \text{equation (8-40)}$$

$$X_3^g((p-1)c+q+b)' = h_{gpb} X_3^g((p-1)c+q)' \ (p=1 \text{ and } q+b \geq 0) \quad \text{equation (8-41)}$$

$$X_3^g((p-1)c+q+b)' = h_{gpb} X_3^g((p-1)c+q)' \ (p=L/c \text{ and } q+b \leq c-1) \quad \text{equation (8-42)}$$

$$X_3^{g-1}(L+q+b) = h_{gpb} X_3^g((p-1)c+q)' \ (p=1 \text{ and } q+b \leq -1) \quad \text{equation (8-43)}$$

$$X_3^{g+1}(q+b)' = h_{gpb} X_3^g((p-1)c+q)' \ (p=L/c \text{ and } q+b \geq c) \quad \text{equation (8-44)}$$

$(b=r, r+1, \ldots, r+(c-1))$

The coefficient $h_{gpb}$ may be multiplied in equations (8-29) to (8-33) in such a manner.

The adjacent representative values are, for example, contemplated to be used as the coefficient values for carrying out linear interpolations.

As an example, the case of L=16 and c=4 is assumed so that the following equations are formed.

$$X_3^g(4(p-1)+q+b)' = h_{gpb} X_3^g(4(p-1)+q)' \ (p=2, 3) \quad \text{equation (8-45)}$$

$$X_3^g(4(p-1)+q+b)' = h_{gpb} X_3^g(4(p-1)+q)' \ (p=1 \text{ and } q+b \geq 0) \quad \text{equation (8-46)}$$

$$X_3^g(4(p-1)+q+b)' = h_{gpb} X_3^g(4(p-1)+q)' \ (p=4 \text{ and } q+b \leq 3) \quad \text{equation (8-47)}$$

$$X_3^{g-1}(16+q+b)' = h_{gpb} X_3^g(4(p-1)+q)' \ (p=1 \text{ and } q+b \leq -1) \quad \text{equation (8-48)}$$

$$X_3^{g+1}(q+b)' = h_{gpb} X_3^g(4(p-1)+q)' \ (p=4 \text{ and } q+b \geq 4) \quad \text{equation (8-49)}$$

$(b=r, r+1, \ldots, r+3)$

Thus the coefficient $h_{gpb}$ may be multiplied in equations (8-34) to (8-38).

In addition, in the present Embodiments 5 to 7, the coefficient update equation was obtained through the definition of the evaluation function $J(a_3)$ as the equation (1-5). It is obvious that the coefficient equation is also changed as changing the evaluation function $J(a_3)$, following relations are essentially equal to the cases in Embodiments 5 to 7.

In Embodiment 5, the coefficient update equation (5-8) was obtained with respect to the evaluation function $J(a_3)$ of the equation (1-5). In this case, equation function $J(a_3)$ is defined as follows:

$$J(a_3)=|e(n)\cdot H(k)|^2 \qquad \text{equation (8-50).}$$

In this case, coefficient update equation is given as follows:

$$a_3(n+1)=a_3(n)+u[e(n)\cdot H(k)]\cdot [FFT(x^3(n))]^* \qquad \text{equation (8-51).}$$

In addition, evaluation function $J(a_3)$ is defined as follows:

$$J(a_3)=|IFFT(e(n)\cdot H(k))|^2 \qquad \text{equation (8-52)}$$

In the above equation, IFFT(e(n)·H(k)) shows a FFT transformation of (e(n)·H(k)). The coefficient update equation of the case is given as follows:

$$a_3(n+1)=a_3(n)+u\cdot IFFT(e(n)\cdot H(k))x^3(n)^* \qquad \text{equation (8-53)}$$

In Embodiment 6, the coefficient update equation (6-6) was obtained with respect to the evaluation function $J(a_3)$ of the equation (1-5). In this case, equation function $J(a_3)$ is defined as follows:

$$J(a_3)=|e(n)\cdot f(n-L)|^2 \qquad \text{equation (8-54).}$$

In this case, coefficient update equation is given as follows:

$$a_3(n+1)=a_3(n)+u[e(n)\cdot f(n-L)]\cdot [FFT(x^3(n))]^* \qquad \text{equation (8-55).}$$

In addition, evaluation function $J(a_3)$ is defined as follows:

$$J(a_3)=|IFFT(e(n)\cdot f(n-L))|^2 \qquad \text{equation (8-56).}$$

The coefficient update equation of the case is given as follows:

$$a_3(n+1)=a_3(n)+u\cdot IFFT(e(n)\cdot f(n-L))x^3(n)^* \qquad \text{equation (8-57).}$$

In Embodiment 7, the coefficient update equation (7-6) was obtained with respect to the evaluation function $J(a_3)$ of the equation (1-5). In this case, equation function $J(a_3)$ is defined as follows:

$$J(a_3)=|e(n)/f(n-L)^*|^2 \qquad \text{equation (8-58).}$$

In this case, coefficient update equation is given as follows:

$$a_3(n+1)=a_3(n)+u[e(n)/f(n-L)^*]\cdot [FFT(x^3(n))]^* \qquad \text{equation (8-59).}$$

In addition, evaluation function $J(a_3)$ is defined as follows:

$$J(a_3)=|IFFT(e(n)/f(n-L)^*)|^2 \qquad \text{equation (8-60).}$$

The coefficient update equation of the case is given as follows:

$$a_3(n+1)=a_3(n)+u\cdot IFFT(e(n)/f(n-L)^*)x^3(n)^* \qquad \text{equation (8-61).}$$

In addition, the nonlinear equalization method in the above described embodiments may be stored in a programmable memory and the nonlinear equalization process may be carried out in real time by using a CPU and, thereby, the purpose of the present invention can be implemented.

The effects of the present invention are examined using a computer simulation. An OFDM-16QAM signal (1024 carriers) wherein 16QAM is used for a primary modulation is allowed to pass through a nonlinear amplifier and a back-off is changed in the case wherein the nonlinear amplifier is operated in the saturated region so that the measurement of the average bit error rate is carried out by adjusting the step size parameter p.

Figure 96:
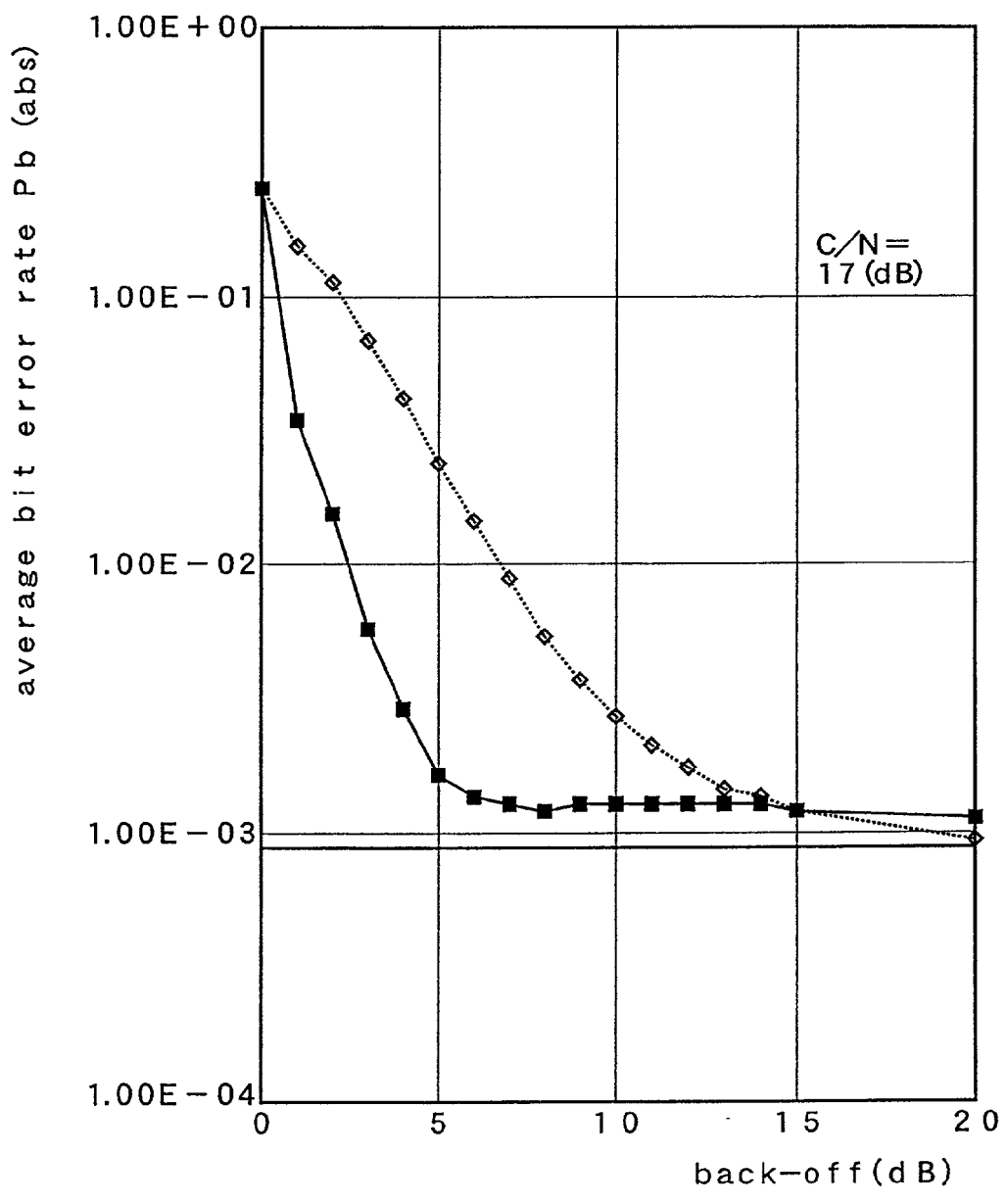
FIG. 96 is the result of a computer simulation showing an effect of the present invention.

The result of the simulation in C/N=17 dB is shown in FIG. 96. This result of the simulation shows that a back-off of approximately 15 dB is necessary when there is no compensation by nonlinear equalization processing iN-th order to prevent the deterioration of the bit error ratio due to nonlinear distortion and that a back-off of only approximately 5 dB is sufficient when there is compensation by nonlinear equalization processing. As described above, it is found that the configuration of the present invention can reduce the back-off by 10 dB.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority applications no. 2001-110202 filed on Apr. 9, 2001 and no. 2001-397657 filed on Dec. 27, 2001 is hereby incorporated by reference.

What is claimed is:

1. A front end processor for a data receiver which receives a digital modulation signal that has been amplified in a saturated region during either the process of transmission or of reception, comprising:
    a quadrature detector which receives data of a modulated digital signal, and converts said data into a complex baseband signal x(n) with quadrature detecting;
    a complex signal converter for nonlinear distortion equalization which deletes m-th order distortion components of said complex baseband signal x(n), based on a coefficient $a_m(n)$ for the nonlinear distortion equalization for showing information through which m-th order distortion components are estimated, where m is an integer greater than one;
    a demodulation circuit which outputs a demodulation signal after performing a demodulation process for an output signal of said complex signal converter for the nonlinear distortion equalization, and then outputs a control signal of a phase correction performed in said demodulation process; and
    an error estimator which calculates an error between said demodulation signal and an ideal reception point; and
    a coefficient estimator for the nonlinear distortion equalization generates said coefficient $a_m(n)$ for showing information through which the m-th order distortion components are estimated, based on an output of said error estimator and a control signal for phase correction, and then outputs said coefficient $a_m(n)$ to said complex signal converter for the nonlinear distortion equalization,
    wherein said front end processor for a data receiver updates the value of said coefficient $a_m(n)$ for the nonlinear distortion equalization so that the output of said error estimator becomes a minimum.

2. The front end processor for a data receiver according to claim 1,
    wherein said demodulation circuit comprises:
    a low pass filter which allows only low frequency components of an output of said complex signal converter for nonlinear distortion equalization to pass; and
    a carrier recovery circuit which establishes the phase synchronization of an output of said low pass filter;
    wherein said coefficient estimator for nonlinear distortion equalization generates said coefficient $a_m(n)$ for the nonlinear distortion equalization for showing information through which said m-th order distortion components are estimated, based on an output of said error estimator and a control signal for a phase correction performed in said carrier recovery circuit, and then outputs the coefficient to said complex signal converter for the nonlinear distortion equalization, and said complex signal converter for nonlinear distortion equalization comprises:

a circuit for generating m-th order signal components by raising an amplitude to the m-th power in an identical phase;

a multiplier for generating said m-th order distortion components by multiplying said m-th order signal components by said coefficient $a_m(n)$ for the nonlinear distortion equalization; and an adder for deleting said m-th order distortion components from said complex baseband signal x(n) by adding an output of said multiplier to said complex baseband signal x(n).

3. The front end processor for a data receiver according to claim 2, wherein said coefficient estimator for nonlinear distortion equalization comprises:

a circuit for performing a reverse rotation of a control signal for a phase correction performed in said carrier recovery circuit;

a multiplier for multiplying an output of said error estimator, a complex conjugate of said m-th order signal components, an output of a circuit for performing said reverse rotation and a step parameter; and an adder for performing a coefficient update process to produce a present coefficient for nonlinear distortion equalization by adding an output of said multiplier to said coefficient $a_m(n)$ for nonlinear distortion equalization, and then outputting the present coefficient to said complex signal converter for the nonlinear distortion equalization.

4. The front end processor for a data receiver according to claim 1, wherein said demodulation circuit comprises:

a low pass filter which allows only low frequency components of an output of said complex signal converter for nonlinear distortion equalization to pass;

a complex signal converter for linear distortion equalization which deletes linear distortion components from the output of said low pass filter, based on an coefficient for linear distortion equalization for showing information through which linear distortion components are estimated;

a carrier recovery circuit which establishes the phase synchronization of an output of said complex signal converter for linear distortion equalization; and a coefficient estimator for linear distortion equalization which generates said coefficient for linear distortion equalization for showing information through which linear distortion components are estimated, and then outputs the coefficient to said complex signal converter for linear distortion equalization, based on an output of said error estimator and a control signal of a phase correction; and wherein said coefficient estimator for nonlinear distortion equalization generates said coefficient $a_m(n)$ for the nonlinear distortion equalization for showing information through which m-th order distortion components are estimated, based on an output of said error estimator and a control signal for a phase correction performed in said carrier recovery circuit, and said complex signal converter for nonlinear distortion equalization comprises:

a circuit for generating m-th order signal components by raising amplitude for said complex baseband signal x(n) to the m-th power in an identical phase;

a multiplier for generating said m-th order distortion components by multiplying said m-th order signal components by said coefficient $a_m(n)$ for nonlinear distortion equalization; and an adder for deleting said m-th order distortion components from said complex baseband signal x(n) by adding an output of said multiplier to said complex baseband signal x(n).

5. The front end processor for a data receiver according to claim 4, wherein said coefficient estimator for nonlinear distortion equalization comprises:

a circuit for performing a reverse rotation of a control signal for a phase correction performed in said carrier recovery circuit;

a multiplier for multiplying an output of said error estimator, a complex conjugate of said m-th order signal components, an output of a circuit for performing said reverse rotation and a step parameter; and an adder for performing a coefficient update process to produce a present coefficient for nonlinear distortion equalization by adding an output of said multiplier to said coefficient $a_m(n)$ for nonlinear distortion equalization, and then outputting the present coefficient to said complex signal converter for nonlinear distortion equalization.

6. The front end processor for a data receiver according to claim 5, wherein said coefficient estimator for nonlinear distortion equalization performs an identical filtering as said low pass filter for said m-th order signal components; and said multiplier in said coefficient estimator for nonlinear distortion equalization multiplies an output of said error estimator, an output of said filtering, a conjugate complex of an output of said circuit for performing a reverse rotation and a step parameter.

7. The front end processor for a data receiver according to claim 5, wherein said complex signal converter for linear distortion equalization deletes said linear distortion components by performing a convolution operation for an output of said low pass filter and said coefficient for linear distortion equalization;

said coefficient estimator for nonlinear distortion equalization performs an identical convolution operation as said complex signal converter for the linear distortion equalization for said m-th signal components; and said multiplier in said coefficient estimator for nonlinear distortion equalization multiplies an output of said error estimator, a conjugate complex of an output of said convolution operation, an output of a circuit for performing said reverse rotation and a step parameter.

8. The front end processor for a data receiver according to claim 5, wherein said complex signal converter for linear distortion equalization deletes said linear distortion components by performing a convolution operation for an output of said low pass filter and said coefficient for linear distortion equalization;

said coefficient estimator for nonlinear distortion equalization performs an identical filtering as said low pass filter for said m-th order signal components and performs an identical convolution operation as said complex signal converter for linear distortion equalization for an output of said filtering; and said multiplier in said coefficient estimator for nonlinear distortion equalization multiplies an output of said error estimator, a conjugate complex of an output of said convolution operation, an output of a method for performing said reverse rotation and a step parameter.

9. The front end processor for a data receiver according to claim 1, wherein said digital modulation signal is an OFDM signal that has undergone a synchronization carrier modulation;

said demodulation circuit comprises:

an FFT circuit which carries out an FFT conversion on an output of said complex signal converter for nonlinear distortion equalization;

a synchronized demodulator which calculates the transmission path characteristics H(k) by using the output of said FFT circuit and carries out a synchronization demodulation by dividing an output of said FFT circuit by H(k); and said coefficient estimator for nonlinear distortion equalization generates said coefficient $a_m(n)$ for the nonlinear distortion equalization for showing information through which said m-th order distortion components are estimated, based on an output of said error estimator and said transmission path characteristics H(K) calculated in said synchronized modulator and outputs the coefficient to said complex signal converter for the nonlinear distortion equalization, and said complex signal converter for the nonlinear distortion equalization comprises:

a circuit for generating m-th order signal components by raising an amplitude for said OFDM baseband signal x(n) that has undergone a synchronization carrier modulation to the m-th power in identical phase;

a multiplier for generating said m-th order distortion components by multiplying said m-th order signal components by said coefficient $a_m(n)$ for the nonlinear distortion equalization; and an adder for deleting said m-th order distortion components from said OFDM baseband signal x(n) that has undergone a synchronization carrier modulation by adding an output of said multiplier to said OFDM baseband signal x(n) that has undergone a synchronization carrier modulation.

10. The front end processor for a data receiver according to claim 9, wherein said coefficient estimator for the nonlinear distortion equalization comprises:

a circuit for performing FFT conversion for said m-th order signal components;

a multiplier for multiplying an output of said error estimator, said conjugate complex of said m-th order signal components for which FFT conversion is performed, said transmission path characteristics H(k) and a step parameter; and an adder for performing a coefficient update process to produce a present coefficient for nonlinear distortion equalization by adding an output of said multiplier to said coefficient $a_m(n)$ for nonlinear distortion equalization, and outputting the present coefficient to said complex signal converter for nonlinear distortion equalization, and wherein in a coefficient update process of said coefficient estimator for nonlinear distortion equalization, when f is an integer of at least 1, so that a coefficient update is carried out on only one OFDM symbol for every f OFDM symbols.

11. The front end processor for a data receiver according to claim 10, wherein a representative value is set by using 1 point for every c points from an output of said FFT conversion in the coefficient update process of said coefficient estimator for nonlinear distortion equalization, where c is an integer greater than 1, and the remaining (c−1) points are replaced with the interpolations by using said representative values.

12. The front end processor for a data receiver according to claim 10, wherein a representative value is set by an FFT conversion of the number of the point of 1/c where 1 point for every c points on an input of said FFT conversion in the coefficient update process of said coefficient estimator for nonlinear distortion equalization is used, where c is an integer greater than 1, and the remaining (c−1) points are replaced with the interpolations by using said representative values.

13. The front end processor for a data receiver, according to claim 1, wherein said digital modulation signal is an OFDM signal that has undergone a differential carrier modulation;

said demodulation circuit comprises:

an FFT circuit which carries out an FFT conversion on an output of said complex signal converter for nonlinear distortion equalization;

a differential demodulator comprises;

a delay circuit which delays an output of said FFT circuit by said one OFDM symbol; and a division circuit where a differential demodulation is carried out by dividing an output of said FFT circuit by an output of said delay circuit, and wherein said coefficient estimator for nonlinear distortion equalization generates said coefficient $a_m(n)$ for nonlinear distortion equalization for showing said information through which said m-th order distortion components are estimated, based on an output of said error estimator and an output of said delay circuit in said differential demodulator, and then outputs the coefficient to said complex signal converter for nonlinear distortion equalization; and said complex signal converter for nonlinear distortion equalization comprises:

a circuit for generating said m-th order signal components by raising an amplitude for said OFDM baseband signal x(n) that has undergone said differential carrier modulation to the m-th power in an identical phase;

a multiplier for generating said m-th order distortion components by multiplying said m-th order signal components by said coefficient $a_m(n)$ for nonlinear distortion equalization; and an adder for deleting said m-th order distortion components from said OFDM baseband signal x(n) that has undergone a differential carrier modulation by adding an output of said multiplier to said OFDM baseband signal x(n) that has undergone a differential carrier modulation.

14. The front end processor for a data receiver according to claim 13, wherein said coefficient estimator for nonlinear distortion equalization comprises:

a circuit which carries out an FFT conversion of said m-th order signal components;

a multiplier which multiplies an output of said error estimator, a complex conjugate of said m-th order signal components to which an FFT conversion is carried out, an output of said delay circuit and a step parameter; and an adder for performing a coefficient update process to produce a present coefficient for nonlinear distortion equalization by adding an output of said multiplier to said coefficient $a_m(n)$ for nonlinear distortion equalization, and then outputting the present coefficient to said complex signal converter for nonlinear distortion equalization, wherein, when f is an integer of at least 1, said coefficient update process of said coefficient estimator for nonlinear distortion equalization carries out a coefficient update on only one OFDM symbol for every f OFDM symbols.

15. The front end processor for a data receiver according to claim 14, wherein a representative value is set by using 1 point for every c points from an output of said FFT conversion in the coefficient update process of said coefficient estimator for nonlinear distortion equalization, where c is an integer of at least 2, and the remaining (c−1) points are replaced with the interpolations by using said representative values.

16. The front end processor for a data receiver according to claim 14, wherein representative value is set by an FFT conversion of the number of the point of 1/c where 1 point for every c points on an input of said FFT conversion in the coefficient update process of said coefficient estimator for nonlinear distortion equalization is used, where c is an integer of at least 2, and the remaining (c−1) points are replaced with the interpolations by using said representative values.

17. The front end processor for a data receiver according to claim 1, wherein said digital modulation signal is an OFDM baseband signal that has undergone a differential carrier modulation;

said demodulation circuit comprises:

an FFT circuit which carries out an FFT conversion on an output of said complex signal converter for nonlinear distortion equalization; and a differential demodulator, said differential demodulator comprising:

a delay circuit which delays an output of said FFT circuit by said one OFDM symbol; and a multiplier where a differential demodulation is carried out by multiplying an output of said FFT circuit and an complex conjugate of an output of said delay circuit; and where said coefficient estimator for nonlinear distortion equalization generates said coefficient $a_m(n)$ for nonlinear distortion equalization for showing information through which said m-th order distortion components are estimated, based on an output of said error estimator and an output of said delay circuit in said differential demodulator, and said complex signal converter for nonlinear distortion equalization comprises:

a circuit for generating said m-th order signal components by raising an amplitude for said OFDM baseband signal $x(n)$ that has undergone a differential carrier modulation of said OFDM baseband signal $x(n)$ to the m-th power in an identical phase;

a multiplier for generating said m-th order distortion components by multiplying said m-th order signal components by said coefficient $a_m(n)$ for nonlinear distortion equalization; and an adder for deleting said m-th order distortion components from said OFDM baseband signal $x(n)$ that has undergone a differential carrier modulation by adding an output of said multiplier to said OFDM baseband signal $x(n)$ that has undergone the differential carrier modulation.

18. The front end processor for a data receiver according to claim 17, wherein said coefficient estimator for nonlinear distortion equalization comprises:

a circuit which carries out an FFT conversion of said m-th order signal components;

a multiplier which multiplies an output of said error estimator, a complex conjugate of said m-th order signal components that has undergone an FFT conversion and a step parameter;

a division circuit which divides an output of said multiplier by said complex conjugate of an output of said delay circuit; and an adder which carries out a coefficient update process to produce a present coefficient for nonlinear distortion equalization by adding an output of said division circuit and said coefficient $a_m(n)$ for nonlinear distortion equalization, and then outputs the present coefficient to said complex signal converter for nonlinear distortion equalization, wherein, when f is an integer of at least 1, said coefficient update process of said coefficient estimator for nonlinear distortion equalization carries out a coefficient update on only one OFDM symbol for every f OFDM symbols.

19. The front end processor for a data receiver according to claim 18, wherein a representative value is set by using 1 point for every c points from an output of said FFT conversion in the coefficient update process of said coefficient estimator for nonlinear distortion equalization, where c is an integer greater than 1, and the remaining (c−1) points are replaced with the interpolations by using said representative values.

20. The front end processor for a data receiver according to claim 18, wherein a representative value is set by an FFT conversion of the number of the point of 1/c where 1 point for every c points on an input of said FFT conversion in the coefficient update process of said coefficient estimator for nonlinear distortion equalization is used, where c is an integer greater than 1, and the remaining (c−1) points are replaced with the interpolations by using said representative values.

21. A nonlinear distortion equalization method which compensates for waveform distortion in a complex baseband signal $x(n)$, comprising the following steps of:

converting to delete m-th order distortion components of said baseband signal $x(n)$, based on a coefficient $a_m(n)$ for nonlinear distortion equalization for showing information through which said m-th order distortion components are estimated, where m is an integer greater than 1;

low pass filtering to allow only the low frequency components of the output of said complex signal conversion process for nonlinear distortion equalization to pass;

performing a carrier wave reproduction to establish the phase synchronization of an output of said low pass filtering;

calculating an error signal between the output of said carrier wave reproduction step and an ideal reception point; and generating coefficient $a_m(n)$ for nonlinear distortion equalization for showing information through which said m-th order distortion components are estimated, based on said error signal and a control signal for a phase correction performed in said carrier wave reproduction step, and then outputting the coefficient to said complex signal conversion process, and wherein said complex signal conversion process for nonlinear distortion equalization comprises:

a process for generating m-th order signal components by raising an amplitude for said complex baseband signal $x(n)$ to the m-th power in an identical phase;

a multiplication process for generating said m-th order distortion components by multiplying said m-th order signal components by said coefficient $a_m(n)$ for nonlinear distortion equalization, and an addition process for deleting said m-th order distortion components from said complex baseband signal $x(n)$ by adding an output of said multiplication process and said complex baseband signal $x(n)$.

22. A nonlinear distortion equalization method which compensates for waveform distortion in a complex baseband signal $x(n)$, comprising the following steps of:

converting to delete m-th order distortion components of said complex baseband signal $x(n)$, based on a coefficient $a_m(n)$ for nonlinear distortion equalization for showing information through which said m-th order distortion components are estimated, where m is an integer greater than 1;

low pass filtering to allow only the low frequency components of an output of said complex signal conversion process for nonlinear distortion equalization to pass;

performing a complex signal conversion for nonlinear distortion equalization to delete linear distortion components from an output of said low pass filtering, based on a coefficient for linear distortion equalization for showing information through which linear distortion components are estimated;

reproducing a carrier wave to establish the phase synchronization of said linear distortion equalization signal;

calculating an error signal between an output of said carrier wave reproduction and an ideal reception point;

performing a coefficient update process for linear distortion equalization for generating said coefficient for linear distortion equalization for showing information through which said linear distortion components are estimated, based on said error signal and a control signal of phase correction in said carrier wave reproduction process, and then outputting said coefficient to said complex signal converter for linear distortion equalization; and generating a coefficient $a_m(n)$ for nonlinear distortion equalization for showing information through which m-th order distortion components are estimated, based on said error signal and a control signal for a phase correction performed in said carrier wave reproduction process, and then outputting said coefficient to said complex signal conversion process for nonlinear distortion equalization, and wherein said complex signal conversion process for nonlinear distortion equalization comprises:

a process for generating said m-th order signal components by raising an amplitude for said complex baseband signal $x(n)$ to the m-th power in an identical phase;

a multiplication process for generating said m-th order distortion components by multiplying said m-th order signal components by said coefficient $a_m(n)$ for nonlinear distortion equalization; and an addition process for deleting said m-th order distortion components from said complex baseband signal $x(n)$ by adding an output of said multiplication process and said complex baseband signal $x(n)$.

23. A nonlinear distortion equalization method which compensates for waveform distortion in an OFDM baseband signal that has undergone a synchronization carrier modulation, comprising the following steps of:

converting to delete m-th order distortion components of said complex baseband signal $x(n)$, based on a coefficient $a_m(n)$ for nonlinear distortion equalization for showing information through which said m-th order distortion components are estimated, where m is an integer greater than 1;

performing an FFT process for carrying out an FFT conversion on an output of said complex signal conversion process for nonlinear distortion equalization;

carrying out synchronization demodulation process by calculating transmission path characteristics $H(k)$ using an output of said FFT process, and then dividing said output of FFT process by $H(k)$;

calculating an error signal from the output of said synchronization demodulation processing and an ideal reception point; and generating said coefficient $a_m(n)$ for nonlinear distortion equalization for showing information through which said m-th order distortion components are estimated, based on said error signal and a transmission path characteristics $H(k)$ calculated in said synchronization demodulation process, and then outputting the coefficient to said complex signal conversion process for nonlinear distortion equalization, and wherein said complex signal conversion process for nonlinear distortion equalization comprises:

a process for generating m-th order signal components by raising amplitude for said OFDM baseband signal $x(n)$ that has undergone said synchronization carrier modulation to the m-th power in identical phase;

a multiplication process for generating m-th order signal components by said coefficient $a_m(n)$ for nonlinear distortion equalization; and an addition process for eliminating said m-th order distortion components from said OFDM baseband signal $x(n)$ that has undergone a synchronization carrier modulation by adding an output of said multiplication process and said OFDM baseband signal $x(n)$ that has undergone a synchronization carrier modulation.

24. A nonlinear distortion equalization method which compensates for waveform distortion in an OFDM baseband signal $x(n)$ that has undergone a differential carrier modulation, comprising the following steps of:

converting to delete m-th order distortion components of a complex baseband signal $x(n)$, based on a coefficient $a_m(n)$ for nonlinear distortion equalization for showing information through which m-th order distortion components are estimated, where in is an integer greater than 1;

performing an FFT process so as to carry out an FFT conversion on an output of a complex signal conversion process for nonlinear distortion equalization;

performing a delay process for delaying the output of a FFT circuit by said one OFDM symbol, and a differential demodulation process by dividing an output of said FFT process by an output of said delay process;

calculating an error signal between the output of said differential demodulation processing and an ideal reception point; and generating a coefficient $a_m(n)$ for nonlinear distortion equalization for showing information through which said m-th order distortion components are estimated, based on said error signal and an output of said delay process in said differential demodulation process, and then outputting said coefficient to said complex signal conversion process, and wherein said complex signal conversion process for nonlinear distortion equalization comprises:

a process for generating said m-th order signal components by raising an amplitude for said OFDM baseband signal $x(n)$ that has undergone a differential carrier modulation to the m-th power in an identical phase;

a multiplication process for generating m-th order distortion components by multiplying said m-th order signal components by said coefficient $a_m(n)$ for nonlinear distortion equalization; and an addition process for deleting said m-th order distortion components from said OFDM baseband signal $x(n)$ that has undergone a differential carrier modulation by adding an output of said multiplication process to said OFDM baseband signal $x(n)$ that has undergone a differential carrier modulation.

25. A nonlinear distortion equalization method which compensates for waveform distortion in an OFDM baseband signal $x(n)$ that has undergone a differential carrier modulation, comprising the following steps of:

converting to delete m-th order distortion components of said complex baseband signal $x(n)$, based on a coefficient $a_m(n)$ for nonlinear distortion equalization for showing information through which said m-th order distortion components are estimated, where m is an integer greater than 1;

performing an FFT process so as to carry out an FFT conversion on said nonlinear distortion equalization signal;

performing a delay process for delaying the output of a FFT circuit by said on OFDM symbol;

carrying out a differential demodulation process for differential modulating by multiplying conjugate complexes of the delay process by an output of said FFT process;

calculating an error signal between an output of said differential demodulation process and an ideal reception point; and generating said coefficient $a_m(n)$ for nonlinear distortion equalization for showing information through which said m-th order distortion components are estimated, based on said error signal and an output of said delay process in said differential demodulation process, and then outputting the coefficient to said complex signal conversion process, and wherein a complex signal conversion process for nonlinear distortion equalization comprises:

a process for generating m-th order signal components by raising an amplitude for said OFDM baseband signal $x(n)$ that has undergone a differential carrier modulation to the m-th power in an identical phase;

a multiplication process for generating said m-th order distortion components by multiplying said m-th order signal components by said coefficient $a_m(n)$ for nonlinear distortion equalization; and an addition process for deleting said m-th order distortion components from said OFDM baseband signal $x(n)$ that has undergone a differential carrier modulation by adding an output of said multiplication process to said OFDM baseband signal $x(n)$ that has undergone a differential carrier modulation.

* * * * *